(12) United States Patent
Boisnard et al.

(10) Patent No.: US 12,545,640 B2
(45) Date of Patent: Feb. 10, 2026

(54) SUBSTITUTED 6,7-DIHYDRO-5H-BENZO[7]ANNULENE COMPOUNDS, PROCESSES FOR THEIR PREPARATION AND THERAPEUTIC USES THEREOF

(71) Applicant: SANOFI, Paris (FR)

(72) Inventors: Sabine Boisnard, Paris (FR); Youssef El-Ahmad, Paris (FR); Eykmar Fett, Paris (FR); Frank Halley, Paris (FR); Eric Nicolai, Paris (FR); Michel Tabart, Paris (FR); Corinne Terrier, Paris (FR); Bertrand Vivet, Paris (FR)

(73) Assignee: Sanofi, Paris (FR)

( * ) Notice: Subject to any disclaimer, the term of this patent is extended or adjusted under 35 U.S.C. 154(b) by 784 days.

(21) Appl. No.: 17/765,169

(22) PCT Filed: Sep. 29, 2020

(86) PCT No.: PCT/EP2020/077266
§ 371 (c)(1),
(2) Date: Mar. 30, 2022

(87) PCT Pub. No.: WO2021/063967
PCT Pub. Date: Apr. 8, 2021

(65) Prior Publication Data
US 2023/0115865 A1    Apr. 13, 2023

(30) Foreign Application Priority Data
Oct. 1, 2019  (EP) ..................... 19306252

(51) Int. Cl.
*C07D 207/12*    (2006.01)
*A61K 9/20*     (2006.01)
(Continued)

(52) U.S. Cl.
CPC .......... *C07D 207/12* (2013.01); *A61K 9/2013* (2013.01); *A61K 9/2018* (2013.01);
(Continued)

(58) Field of Classification Search
CPC .. C07D 207/12; C07D 207/38; C07D 401/12; C07D 403/12; C07D 405/12;
(Continued)

(56) References Cited

U.S. PATENT DOCUMENTS 6,495,607 B2   12/2002  Bohlmann et al.
7,429,681 B2    9/2008  Pinney et al.
(Continued)

FOREIGN PATENT DOCUMENTS

CN   1309635 A    8/2001
CN  106924210 A   7/2017
(Continued)

OTHER PUBLICATIONS

Bouaboula, M. et al., Pending U.S. Appl. No. 18/037,949, filed May 19, 2023.
(Continued)

*Primary Examiner* — Adam C Milligan
*Assistant Examiner* — Ernesto Valle
(74) *Attorney, Agent, or Firm* — McNeill PLLC

(57) ABSTRACT

The present invention relates to a compound of the formula (i) wherein Ar represents a phenyl or a 6-membered heteroaryl group, R1 and R2 represent independently a hydrogen atom or a deuterium atom, R3 represents (1) a —COR4 group, (2) a —BOR5OR6 group, (3) a —X—Z group, (4) a ($C_1$-$C_6$)alkyl group or a ($C_1$-$C_6$)alkenyl group, (5) a —X—S(O)$_n$(R7)$_p$(R8)$_q$ group, (6) a halogen atom, a —NH$_2$ group or a —CN group, (7) a —O—R11 group, (8) a —NH—COR9 group, (9) a —C(=NH)NHOH group, (10) a —NH—C(NH)—R9' group, or (11) a —NHCOCOOR12 group or a —NHCOCONR12'R12" group, X represents a bond, a —NH— group, a —CONH— group or a —CO— group, Z represents a 4 or 5-membered cycloalkyl, a 4 or 5-membered heterocylcloalkyl group, a 4 or 5-membered heteroaryl group or a phenyl group or a pharmaceutically acceptable salt thereof. The present invention further relates to a medicament comprising said compound of formula (I) and to said compound of formula (I) for use as an inhibitor and degrader of estrogen receptors.

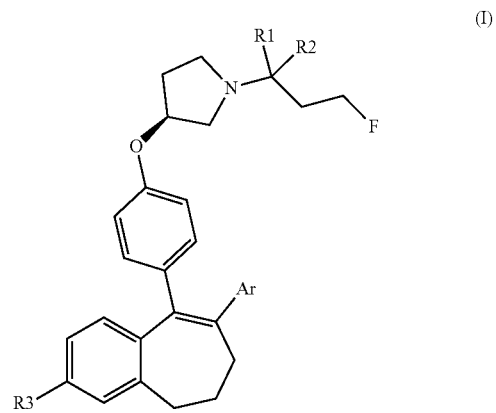

30 Claims, No Drawings

(51) Int. Cl.
  *C07D 207/38* (2006.01)
  *C07D 401/12* (2006.01)
  *C07D 403/12* (2006.01)
  *C07D 405/12* (2006.01)
  *C07D 413/12* (2006.01)
  *C07D 413/14* (2006.01)
  *C07D 417/12* (2006.01)
  *C07D 419/12* (2006.01)
  *C07F 5/02* (2006.01)

(52) U.S. Cl.
  CPC .......... *A61K 9/2054* (2013.01); *A61K 9/2059* (2013.01); *C07D 207/38* (2013.01); *C07D 401/12* (2013.01); *C07D 403/12* (2013.01); *C07D 405/12* (2013.01); *C07D 413/12* (2013.01); *C07D 413/14* (2013.01); *C07D 417/12* (2013.01); *C07D 419/12* (2013.01); *C07F 5/025* (2013.01)

(58) Field of Classification Search
  CPC .. C07D 413/12; C07D 413/14; C07D 417/12; C07D 419/12; A61K 9/2013; A61K 9/2018; A61K 9/2054; A61K 9/2059; C07F 5/025
  See application file for complete search history.

(56) References Cited

U.S. PATENT DOCUMENTS

| | | |
|---|---|---|
| 7,612,114 B2 | 11/2009 | Hamaoka et al. |
| 7,799,824 B2 | 9/2010 | Lagu et al. |
| 8,299,112 B2 | 10/2012 | Smith et al. |
| 9,309,211 B2 | 4/2016 | Xiao et al. |
| 9,540,361 B2 | 1/2017 | Dijcks et al. |
| 9,714,221 B1 * | 7/2017 | Bouaboula ............ C07F 7/0812 |
| 9,845,291 B2 | 12/2017 | Liang et al. |
| 10,570,090 B2 | 2/2020 | Bouaboula et al. |
| 10,966,963 B2 | 4/2021 | Labadie et al. |
| 11,149,031 B2 | 10/2021 | Bouaboula et al. |
| 11,214,541 B2 | 1/2022 | Bouaboula et al. |
| 11,260,057 B2 | 3/2022 | Bouaboula et al. |
| 11,713,296 B2 | 8/2023 | Malpart et al. |
| 12,157,721 B2 | 12/2024 | Rabion et al. |
| 2012/0130219 A1 | 5/2012 | Zhao et al. |
| 2013/0252890 A1 | 9/2013 | Wintermantel et al. |
| 2015/0080438 A1 | 3/2015 | Wintermantel et al. |
| 2015/0157606 A1 | 6/2015 | Maneval et al. |
| 2016/0184311 A1 | 6/2016 | Chen et al. |
| 2017/0197915 A9 | 7/2017 | Liang et al. |
| 2017/0233340 A1 | 8/2017 | Bouaboula et al. |
| 2018/0153828 A1 | 6/2018 | Garner et al. |
| 2019/0167652 A1 | 6/2019 | Abrams et al. |
| 2020/0155521 A1 | 5/2020 | Schwartz et al. |
| 2020/0352905 A1 | 11/2020 | Cartot-Cotton et al. |
| 2020/0361918 A1 | 11/2020 | Bouaboula et al. |
| 2020/0392081 A1 | 12/2020 | Bouaboula et al. |
| 2021/0188771 A1 | 6/2021 | Rabion et al. |
| 2021/0188772 A1 | 6/2021 | Malpart et al. |
| 2022/0073460 A1 | 3/2022 | Bouaboula et al. |
| 2022/0204488 A1 | 6/2022 | Bouaboula et al. |
| 2022/0362248 A1 | 11/2022 | Bouaboula et al. |
| 2023/0028566 A1 | 1/2023 | Billot et al. |
| 2023/0089371 A1 | 3/2023 | Bouaboula et al. |
| 2023/0382854 A1 | 11/2023 | Bernardelli et al. |
| 2023/0404971 A1 | 12/2023 | Bouaboula et al. |
| 2024/0091194 A1 | 3/2024 | Cartot-Cotton et al. |
| 2024/0101512 A1 | 3/2024 | Bernardelli et al. |
| 2024/0197692 A1 | 6/2024 | Bouaboula et al. |
| 2024/0197739 A1 | 6/2024 | Bouaboula et al. |
| 2025/0042849 A1 | 2/2025 | Rabion et al. |

FOREIGN PATENT DOCUMENTS

| | | |
|---|---|---|
| CN | 109896991 A | 6/2019 |
| EA | 023947 B1 | 7/2016 |
| EP | 1229036 A1 | 8/2002 |
| EP | 3434272 A1 | 1/2019 |
| JP | 2002520388 A | 7/2002 |
| JP | 2005528320 A | 9/2005 |
| JP | 2008512348 A | 4/2008 |
| JP | 2008546706 A | 12/2008 |
| JP | 2011500538 A | 1/2011 |
| JP | 2013530973 A | 8/2013 |
| JP | 2015500814 A | 1/2015 |
| JP | 2018537406 A | 12/2018 |
| WO | 1992015579 A1 | 9/1992 |
| WO | 2000003979 A1 | 1/2000 |
| WO | 2003016270 A2 | 2/2003 |
| WO | 2003091239 A1 | 11/2003 |
| WO | 2004058682 A1 | 7/2004 |
| WO | 2006012135 A1 | 2/2006 |
| WO | 2006138427 A2 | 12/2006 |
| WO | 2009047343 A1 | 4/2009 |
| WO | 2009101634 A2 | 8/2009 |
| WO | 2012037410 A2 | 3/2012 |
| WO | 2012037411 A2 | 3/2012 |
| WO | 2012062884 A2 | 5/2012 |
| WO | 2013097773 A1 | 7/2013 |
| WO | 2015028409 A1 | 3/2015 |
| WO | 2016051374 A1 | 4/2016 |
| WO | 2016097071 A1 | 6/2016 |
| WO | 2016097072 A1 | 6/2016 |
| WO | 2016176666 A1 | 11/2016 |
| WO | 2017140669 A1 | 8/2017 |
| WO | 2018091153 A1 | 5/2018 |
| WO | 2019020559 A1 | 1/2019 |
| WO | 2019106604 A1 | 6/2019 |
| WO | 2019144132 A1 | 7/2019 |
| WO | 2020014435 A1 | 1/2020 |
| WO | 2020049153 A1 | 3/2020 |
| WO | 2020112765 A1 | 6/2020 |
| WO | 2020225375 A1 | 11/2020 |
| WO | 2021116074 A1 | 6/2021 |
| WO | 2021127043 A1 | 6/2021 |
| WO | 2021170793 A1 | 9/2021 |
| WO | 2021178846 A1 | 9/2021 |
| WO | 2022084280 A1 | 4/2022 |
| WO | 2022084298 A1 | 4/2022 |
| WO | 2022106711 A1 | 5/2022 |
| WO | 2022218956 A1 | 10/2022 |
| WO | 2022218958 A1 | 10/2022 |

OTHER PUBLICATIONS

Cancer [online]—Medline Plus, [Retrieved on Jul. 6, 2007] Retrieved from the Internet, URL: http://www.nlm.nih.gov/medlineplus/cancer.html, pp. 1-10.
Anonymous, "Phase 1 / 2 Study of Amcenestrant (SAR439859) Single Agent and in Combination With Other Anti-cancer Therapies in Postmenopausal Women With Estrogen Receptor Positive Advanced Breast Cancer," Sep. 15, 2017, URL: https://www.clinicaltrials.gov/ct2/show/NCT03284957.
Besret, et al., "Translational strategy using multiple nuclear imaging biomarkers to evaluate target engagement and early therapeutic efficacy of SAR439859, a novel selective estrogen receptor degrader", Ejnmmi Research, Biomed Central Ltd, London, UK, vol. 10, No. 1, Jun. 29, 2020, pp. 1-13.
Bouaboula, M., et al., Pending U.S. Appl. No. 18/286,496, filed Oct. 11, 2023.
Bouaboula, M., et al., Pending U.S. Appl. No. 18/286,510, filed Oct. 11, 2023.
International Search Report for International Application No. PCT/EP2022/059700, mailed Jul. 8, 2022.
International Search Report for International Application No. PCT/EP2022/059704, mailed Jul. 21, 2022.
Robinson, Dan, R. et al., "Activating ESR1 mutations in hormone-resistant metastatic breast cancer", Nat. Genet., Dec. 2013, 45(12), 1446-1451.

(56) References Cited

OTHER PUBLICATIONS

Toy, Weiyi, et al., "Activating ESR1 mutations differentially impact the efficacy of ER antagonists", Cancer Discovery, Mar. 2017, 7(3), 277-287.
Chandarlapaty, S., et al., "277MO SAR439859, an oral selective estrogen receptor (ER) degrader (SERD), in ER +/ HER2− metastatic breast cancer (mBC): Biomarker analyses from a phase I/II study", Annals of Oncology, vol. 31, No. S4, Sep. 1, 2020, p. S351.
International Search Report for International Application No. PCT/EP2021/082583, mailed Feb. 25, 2022.
Bernardelli, P., et al., Pending U.S. Appl. No. 18/032,500, filed Apr. 18, 2023.
Bernardelli, P., et al., Pending U.S. Appl. No. 18/032,502, filed Apr. 18, 2023.
International Search Report for International Application No. PCT/EP2021/078883, mailed Dec. 9, 2021.
International Search Report for International Application No. PCT/EP2021/078916, mailed Dec. 9, 2021.
Bouaboula, M., et al., Pending U.S. Appl. No. 17/579,187, filed Jan. 19, 2022.
Littke, A.F., et al., "Versatile Catalysts for the Suzuki Cross-Coupling of Arylboronic Acids with Aryl and Vinyl Halides and Triflates under Mild Conditions," Journal of the American Chemical Society, 122(17): 4020-4028 (2000).
Ashizawa, Kazuhide, "Optimization of salt and crystalline forms, and crystallization techniques," Pharm Tech Japan, 2002, vol. 18, No. 10, pp. 81-96 (machine translation of excerpts).
Hirayama, Noriaki, "Handbook for organic compounds crystal preparation," 2008, pp. 17-23, 37-40, 45-51, 57-65 (machine translation of excerpts).
Rabion, A., et al., Pending U.S. Appl. No. 18/924,400, filed Oct. 23, 2024.
Anstead, Gregory, M. et al., "2,3-Diarylindenes and 2,3-Diarylindenones: Synthesis, Molecular Structure, Photochemistry, Estrogen Receptor Binding Activity, and Comparisons with Related Triarylethylenes", Journal of Medicinal Chemistry, 1988, vol. 31, No. 7, pp. 1316-1326.
Bardia, A., et al., Dose escalation study of SAR439859, an oral selective estrogen receptor (ER) degrader (SERD), in postmenopausal women with ER+/HER2− metastatic breast cancer (mBC), Journal of Clinical Oncology, vol. 37, Suppl. 15, p. 1054 (May 20, 2019).
Billot, P. et al., Pending U.S. Appl. No. 17/783,364, filed Jun. 8, 2022.
Boinsard, S., et al., Pending U.S. Appl. No. 17/765,169, filed Mar. 30, 2022.
Bouaboula, M. et al., Pending U.S. Appl. No. 17/532,051, filed Nov. 22, 2021.
Bouaboula, M., et al., Pending U.S. Appl. No. 17/460,629, filed Aug. 30, 2021.
Bouaboula, M., et al., Pending U.S. Appl. No. 17/802,223, filed Aug. 25, 2022.
Campone, M., et al., "Abstract P5-11-02: Dose-escalation study of SAR439859, an oral selective estrogen receptor degrader, in postmenopausal women with estrogen receptor-positive and human epidermal growth factor receptor 2-negative metastatic breast cancer," Cancer Research, vol. 80, Suppl. 4, pp. 1-4 (Feb. 2020).
Cartot-Cotton, S. et al., Pending U.S. Appl. No. 16/870,031, filed May 8, 2020.
Deroo, B.J., et al., "Estrogen Receptors and Human Disease", The Journal of Clinical Investigation, Mar. 2006, vol. 116, No. 3, pp. 561-570.
El-Ahmad, Y., et al., "Discovery of 6-(2,4-Dichlorophenyl)-5-[4-[(3S)-1-(3-fluoropropyl)-pyrrolidin-3-yl]-oxyphenyl]-8,9-dihydro-7H-benzo[7]annulene-2-carboxylic acid (SAR439859), a Potent and Selective Estrogen Receptor Degrader (SERD) for the Treatment of Estrogen-Receptor-Positive Breast Cancer," Journal of Medicinal Chemistry, vol. 63, No. 2, pp. 512-528 (2019).
Extended European Search Report issued in European Application No. 19305593.6 on Oct. 30, 2019, 7 pages.
Franks, et al., "Selective Estrogen Receptor Modulators: Cannabinoid Receptor Inverse Agonists with Differential CB1 and CB2 Selectively," Frontiers in Pharmacology, 7(503): 1-16 (2016).
Golub et al., "Molecular Classification of Cancer: Class Discovery and Class Prediction by Gene Expression Monitoring", Science, Oct. 15, 1999, vol. 286, pp. 531-537.
Gould, P., "Salt selection for basic drugs," International Journal of Pharmaceutics, vol. 33, pp. 201-217 (1986).
International Search Report for International Application No. PCT/EP2017/053282, mailed Jul. 6, 2017.
International Search Report for International Application No. PCT/EP2017/068446, mailed Sep. 12, 2017.
International Search Report for International Application No. PCT/EP2018/069901, mailed Oct. 12, 2018.
International Search Report for International Application No. PCT/EP2019/073823, mailed Oct. 10, 2019.
International Search Report for International Application No. PCT/EP2019/073827, mailed Oct. 9, 2019.
International Search Report for International Application No. PCT/EP2020/062743, mailed Aug. 10, 2020.
International Search Report for International Application No. PCT/EP2020/085011, mailed Jan. 25, 2021.
International Search Report for International Application No. PCT/EP2021/054815, mailed May 12, 2021.
Jordan, Craig V., "Antiestrogens and Selective Estrogen Receptor Modulators as Multifunctional Medicines. 1. Receptor Interactions," Journal of Medicinal Chemistry, 46(6): 883-908 (2003).
Lala, P.K., et al., "Role of Nitric Oxide in Tumor Progression: Lessons From Experimental Tumors", Cancer Metastasis Reviews, Mar. 1998, vol. 17, No. 1, pp. 91-106.
Malpart, J. et al., Pending U.S. Appl. No. 17/193,776, filed Mar. 5, 2021.
Mannava, M.K.C., et al., "Enhanced Bioavailability in the Oxalate Salt of the Antituberculosis Drug Ethionamide," Crystal Growth & Design, vol. 16(3), pp. 1591-1598, (2016).
McCague, Raymond et al., "Nonisomerizable Analogues of (Z)- and (E)-4-Hydroxytamoxifen. Synthesis and Endocrinological Properties of Substituted Diphenylbenzocycloheptenes", Journal of Medicinal Chemistry, 1988, vol. 31, No. 7, pp. 1285-1290.
Miller, Chris P., "SERMs: Evolutionary Chemistry, Revolutionary Biology," Current Pharmaceutical Design, 8(23):2089-2111 (2002).
Pickar, et al., "SERMs: Progress and future perspectives," Maturitas, Elsevier, 67:129-138 (2010).
Rabion, A. et al., Pending U.S. Appl. No. 17/193,706, filed Mar. 5, 2021.
RN 1861739-57-2, Registry Database Compound, 2016.
Ruff, et al., "Estrogen Receptor Transcription and Transactivation Structure-Function Relationship in DNA- and Ligand-Binding Domains of Estrogen Receptors", Breast Cancer Research, 2000, vol. 2, No. 5, pp. 353-359.
Translation of Office Action issued in Japanese Application No. 2018-515615, mailed on Sep. 18, 2018, 3 pages.
Translation of Search Report issued in Chinese Application No. 201780023008.0, mailed Apr. 23, 2020, 3 pages.
Ullrich, et al., "Estrogen receptor modulator review," Expert Opin. Ther. Patents (2006) 16(5):559-572.
André, F., et al., Alpelisib for PIK3CA-Mutated, Hormone Receptor-Positive Advanced Breast Cancer, The New England Journal of Medicine, vol. 380, No. 20, May 16, 2019, 12 pages (1929-1940).

* cited by examiner

SUBSTITUTED 6,7-DIHYDRO-5H-BENZO[7]ANNULENE COMPOUNDS, PROCESSES FOR THEIR PREPARATION AND THERAPEUTIC USES THEREOF

CROSS-REFERENCE TO RELATED APPLICATIONS

This application is a national phase entry pursuant to 35 U.S.C. § 371 of International Application No. PCT/EP2020/077266, filed Sep. 29, 2020, which claims the benefit of priority to European Application No. 19306252.8, filed Oct. 1, 2019, the contents of each of which are incorporated by reference herein in their entirety for any purpose.

The present invention relates to novel substituted 6,7-dihydro-5H-benzo[7]annulene compounds, the processes for their preparation, as well as the therapeutic uses thereof, in particular as anticancer agents via selective antagonism and degradation of estrogen receptors.

The Estrogen Receptors (ER) belong to the steroid/nuclear receptor superfamily involved in the regulation of eukaryotic gene expression, cellular proliferation and differentiation in target tissues. ERs are in two forms: the estrogen receptor alpha (ERα) and the estrogen receptor beta (ERβ) respectively encoded by the ESR1 and the ESR2 genes. ERα and ERβ are ligand-activated transcription factors which are activated by the hormone estrogen (the most potent estrogen produced in the body is 17β-estradiol). In the absence of hormone, ERs are largely located in the cytosol of the cell. When the hormone estrogen binds to ERs, ERs migrate from the cytosol to the nucleus of the cell, form dimers and then bind to specific genomic sequences called Estrogen Response Elements (ERE). The DNA/ER complex interacts with co-regulators to modulate the transcription of target genes.

ERα is mainly expressed in reproductive tissues such as uterus, ovary, breast, bone and white adipose tissue. Abnormal ERα signaling leads to development of a variety of diseases, such as cancers, metabolic and cardiovascular diseases, neurodegenerative diseases, inflammation diseases and osteoporosis.

ERα is expressed in not more than 10% of normal breast epithelium but approximately 50-80% of breast tumors. Such breast tumors with high level of ERα are classified as ERα-positive breast tumors. The etiological role of estrogen in breast cancer is well established and modulation of ERα signaling remains the mainstay of breast cancer treatment for the majority ERα-positive breast tumors. Currently, several strategies for inhibiting the estrogen axis in breast cancer exist, including: 1—blocking estrogen synthesis by aromatase inhibitors that are used to treat early and advanced ERα-positive breast cancer patients; 2—antagonizing estrogen ligand binding to ERα by tamoxifen which is used to treat ERα-positive breast cancer patients in both pre- and post-menopausal setting; 3—antagonizing and downregulating ERα levels by fulvestrant, which is used to treat breast cancer in patients that have progressed despite endocrine therapies such as tamoxifen or aromatase inhibitors.

Although these endocrine therapies have contributed enormously to reduction in breast cancer development, about more than one-third of ERα-positive patients display de-novo resistance or develop resistance over time to such existing therapies. Several mechanisms have been described to explain resistance to such hormone therapies. For example, hypersensitivity of ERα to low estrogen level in treatment with aromatase inhibitors, the switch of tamoxifen effects from antagonist to agonist effects in tamoxifen treatments or multiple growth factor receptor signaling pathways. More recently, acquired mutations in ERα occurring after initiation of hormone therapies may play a role in treatment failure and cancer progression. Certain mutations in ERα, particularly those identified in the Ligand Binding Domain (LBD), result in the ability to bind to DNA in the absence of ligand and confer hormone independence in cells harboring such mutant receptors.

Most of the endocrine therapy resistance mechanisms identified rely on ERα-dependent activity. One of the new strategies to counterforce such resistance is to shut down the ERα signaling by removing ERα from the tumor cells using Selective Estrogen Receptors degraders (SERDs). Clinical and preclinical data showed that a significant number of the resistance pathways can be circumvented by the use of SERDs.

There is still a need to provide SERDs with good degradation efficacy.

Document WO2017/140669 discloses some substituted 6,7-dihydro-5H-benzo[7]annulene compounds useful as SERDs.

The objective of the present invention is to provide novel compounds able to selectively antagonize and degrade the estrogen receptors (SERDs compounds), for use in cancer treatment.

The present invention relates to the compounds of the formula (I):

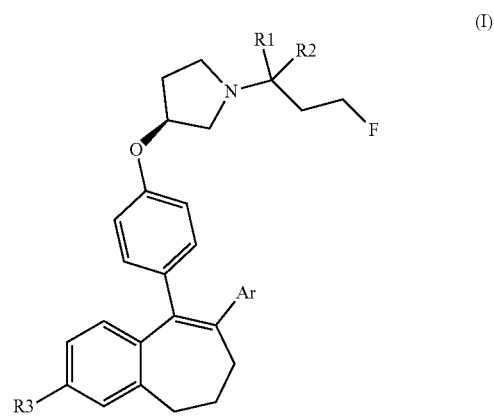

wherein:
Ar represents a phenyl or a 6-membered heteroaryl group, said phenyl or 6-membered heteroaryl group being optionally substituted with one to three groups selected from halogen atoms, a —OH group, a $(C_1-C_3)$alkyl group, a $(C_1-C_3)$alkoxy group, a $(C_1-C_3)$perfluoroalkoxy group, such as a trifluoromethoxy and an oxooxazolidinyl group, such as a 2-oxooxazolidine-3-yl,
R1 and R2 represent independently a hydrogen atom or a deuterium atom;
R3 represents
(1) a —COR4 group,
(2) a —BOR5OR6 group,
(3) a —X—Z group,
(4) a $(C_1-C_6)$alkyl group or a $(C_1-C_6)$alkenyl group, optionally substituted by 1 to 8 groups selected from a fluorine atom, a —OH group and a —COOH group, (5) a —X—S(O)$_n$(R7)$_p$(R8)$_q$ group,
(6) a halogen atom, a —NH$_2$ group or a —CN group,
(7) a —O—R11 group,
(8) a —NH—COR9 group,
(9) a —C(=NH)NHOH group,
(10) a —NH—C(NH)—R9' group,
(11) a —NHCOCOOR12 group or a —NHCOCONR12'R12" group, R4 represent a (C$_1$-C$_6$)alkyl group, a —NRR' group, a —NHNH$_2$ group, a —NHNHCONH$_2$ group, a —NHNHCS-1H-imidazolyl group or a —NHSO$_2$CH$_3$ group, wherein R and R' independently represent a hydrogen atom, a —OH group, a (C$_1$-C$_6$)alkoxy group or a (C$_1$-C$_6$)alkyl group, R5 and R6 independently represent a hydrogen atom, a (C$_1$-C$_6$)alkyl group, optionally forming with the bore atom to which they are attached a 4 or 5-membered ring, said ring being optionally substituted by 1 to 4 (C$_1$-C$_4$)alkyl groups, R7 and R8 independently represents a (C$_1$-C$_6$)alkyl group optionally partially or fully substituted by fluorine atoms, a —NH$_2$ group or a =NH group, R9 represents a hydrogen atom, a (C$_1$-C$_6$)alkoxy group, a (C$_1$-C$_6$)alkyl group or a (C$_3$-C$_6$)cycloalkyl group, each (C$_1$-C$_6$)alkoxy group, (C$_1$-C$_6$)alkyl group or (C$_3$-C$_6$) cycloalkyl group being optionally substituted by one to three fluorine atom(s), a —OH group or a (C$_1$-C$_4$)alkyl group, R9' represents a (C$_1$-C$_6$)alkyl group or a (C$_3$-C$_6$)cycloalkyl group, R11 represents a (C$_1$-C$_6$)alkyl group, optionally substituted by one to six fluorine atoms, R12 represents a (C$_1$-C$_6$)alkyl group, R12' and R12" independently represent a hydrogen group or a (C$_1$-C$_6$)alkyl group, X represents a bond, a —NH— group, a —CONH— group or a —CO— group, Z represents
(i) a 4 or 5-membered cycloalkyl,
(ii) a 4 or 5-membered heterocylcloalkyl group comprising 1 to 4 heteroatoms selected from oxygen, nitrogen and sulfur,
(iii) a 4 or 5-membered heteroaryl group comprising 1 to 4 heteroatoms selected from oxygen, nitrogen and sulfur,
said cycloalkyl, heteroaryl or heterocycloalkyl group being optionally substituted by 1 to 3 groups selected from a —OH group, an oxo group, a =NR12'R12" group and a thiooxo group, or
(iv) a phenyl group optionally substituted by a hydroxy group, by a COOR12' group, by a —CONH$_2$ group, by a —NO$_2$ group, by a —NH$_2$ group or by a (C$_1$-C$_6$)alkyl group itself optionally substituted by a hydroxy group, n is an integer and means 1 or 2,
p+q is an integer and means 1 or 2, with each of p and q being an integer and meaning 0, 1, or 2, and when n is 1, p+q is 2 and when n is 2, p+q is 1 and the sulfur atom stays pentavalent, and when n is 1 and p+q is 2, the two groups R7 and R8 on the sulfur atom may further form with the sulfur atom to which they are attached a 5-membered ring, optionally substituted by 1 to 3 groups selected from a (C$_1$-C$_6$)alkyl group and an oxo group.

or a pharmaceutically acceptable salt thereof.

The compounds of formula (I) contain one or more asymmetric carbon atoms, more particularly one asymmetric carbon atom on the pyrrolydinyl group. They may therefore exist in the form of enantiomers. These enantiomers form part of the invention.

As far as the carbon 3 of the pyrrolidinyl group linked to the oxygen atom of the formula (I) is concerned it may be in the absolute configuration (R) or (S). In the framework of the present invention, said carbon 3 of the pyrrolidinyl group is in the absolute configuration (S).

The compounds of formula (I) may be present as well under tautomer forms and are part of the invention. This is for example true for the compounds comprising heteroaryl groups.

The compounds of formula (I) may exist in the form of bases, acids, zwitterion or of addition salts with acids or bases. Such addition salts, bases, acids and zwitterion form part of the invention. Hence, the invention relates, inter alia, to the compounds of formula (I) or to pharmaceutically acceptable salts thereof.

These salts may be prepared with pharmaceutically acceptable acids or bases, although the salts of other acids or bases useful, for example, for purifying or isolating the compounds of formula (I) also form part of the invention.

Among suitable salts which form part of the invention, the following may be cited: trifluoroacetate, hydrochloride and formate, In the context of the present invention, the terms below have the following definitions unless otherwise mentioned throughout the instant specification:

a halogen atom: a fluorine, a chlorine, a bromine or an iodine atom, and in particular a fluorine and a chlorine atom;

an oxo: a "=O" group;

a thiooxo: a "=S" group;

a cyano group: a "—C≡N" group;

an amine group: a nitrogen atom unsubstituted or substituted with one or more (C$_1$-C$_6$)alkyl groups; an alkyl group: a linear or branched saturated hydrocarbon-based aliphatic group comprising, unless otherwise mentioned, from 1 to 6 carbon atoms (noted "(C$_1$-C$_6$) alkyl"). By way of examples, mention may be made of, but not limited to: methyl, ethyl, propyl, n-propyl, isopropyl, butyl, isobutyl, sec-butyl, tert-butyl, pentyl, isopentyl, hexyl and isohexyl groups, and the like;

a (C$_1$-C$_6$)alkyl group optionally partially or fully substituted by fluorine atoms respectively means a (C$_1$-C$_6$) alkyl being substituted by at least one fluorine atom or wherein each hydrogen atom is replaced by a fluorine atom. In this last case, said groups may be designated as perfluoroalkyl groups. Examples of perfluoroalkyl groups are trifluoromethyl group or perfluoroprolyl group;

a alkenyl group: a linear or branched hydrocarbon-based aliphatic group comprising at least one unsaturation and comprising, unless otherwise mentioned, from 1 to 6 carbon atoms (noted "(C$_1$-C$_6$)-alkenyl");

an alkoxy group: an —O-alkyl group where the alkyl group is as previously defined. By way of examples, mention may be made of, but not limited to: methoxy, ethoxy, propoxy, isopropoxy, linear, secondary or tertiary butoxy, isobutoxy, pentoxy or hexoxy groups, and the like;

a perfluoroalkoxy group: an alkoxy group of which all the hydrogen atoms have been substituted with a fluorine atom. By way of example, mention may be made of trifluoromethoxy group and the like;

a cycloalkyl group: a cyclic alkyl group comprising, unless otherwise mentioned, from 4 to 5 carbon atoms (noted "4 or 5-membered cycloalkyl group"), saturated or partially unsaturated and unsubstituted or substituted. By way of examples, mention may be made of, but not limited to: cyclobutyl, cyclopentyl, cyclobutenyl, cyclopentenyl groups and the like;

a heterocycloalkyl group: a monocyclic alkyl group comprising, unless otherwise mentioned, from 4 to 5 carbon atoms (noted "4 or 5-membered heterocycloalkyl group") and containing 1 to 4 heteroatoms selected from oxygen, nitrogen and sulfur. Such heterocycloalkyl group may be saturated or partially saturated and unsubstituted or substituted. By way of examples of heterocycloalkyl groups, mention may be made of, but not limited to: azetidine, oxetane, thietane, 2H-pyrrole, 1H-, 2H- or 3H-pyrroline, pyrrolidine, THF, tetrahydrothiophene, oxadiazole and more particularly 1,3,4-oxadiazole or 1,3,5-oxadioazole, thiadiazole and more particularly 1,3,4-thiadiazole, isoxazoline, 2- or 3-pyrazoline and more particularly 3-pyrazoline, pyrroline, pyrazolidine, imidazoline, imidazolidine, thiazolidine, isooxazoline, isoxazolidine, dioxalane, oxathiazole, oxathiadiazole, dioxazole groups and the like. a 4 or 5-membered heteroaryl group means: a cyclic aromatic group containing between 4 and 5 carbon atoms and containing between 1 and 4 heteroatoms selected from nitrogen, oxygen and sulfur. By way of examples of 4 or 5-membered heteroaryl groups, mention may be made of, but not limited to: pyrrole, furan, thiophene, oxazole, isoxazole, triazole, tetrazole, oxadiazole, furazan, thiazole, isothiazole, thiadiazole, pyrazole, imidazole groups and the like;

a 6-membered heteroaryl group means a cyclic aromatic group containing 6 carbon atoms and containing between 1 and 4 heteroatoms selected from nitrogen, oxygen and sulfur. By way of examples of 6-membered heteroaryl group, mention may be made of, but not limited to: pyridine, pyrimidine, pyridazine, triazine groups and the like.

A zwitterion means: a globally neutral molecule with a positive and a negative electrical charge and having an acid group and a basic group.

In an embodiment, in the compound of formula (I), R1 and R2 represent hydrogen atoms.

In another embodiment, in the compounds of formula (I), R1 and R2 represent deuterium atoms.

In another embodiment, in the compounds of formula (I), Ar represents a phenyl or a pyridinyl group, in particular a 3-pyridinyl group, said phenyl or pyridinyl group being optionally substituted with one or two groups selected among chlorine, fluorine, hydroxy, methyl, trifluoromethoxy, 2-oxooxazolidine-3-yl and ethoxy, or a pharmaceutically acceptable salt thereof.

In another embodiment, in the compound of formula (I), the phenyl or on the 6-membered heteroaryl group may be substituted by one or two groups selected from halogen atoms, a hydroxy, a methyl or ethyl group, a methoxy or ethoxy group, a trifluoromethoxy and an oxooxazolidinyl group, such as a 2-oxooxazolidine-3-yl.

In another embodiment, in the compounds of formula (I), Ar represents a group selected from:

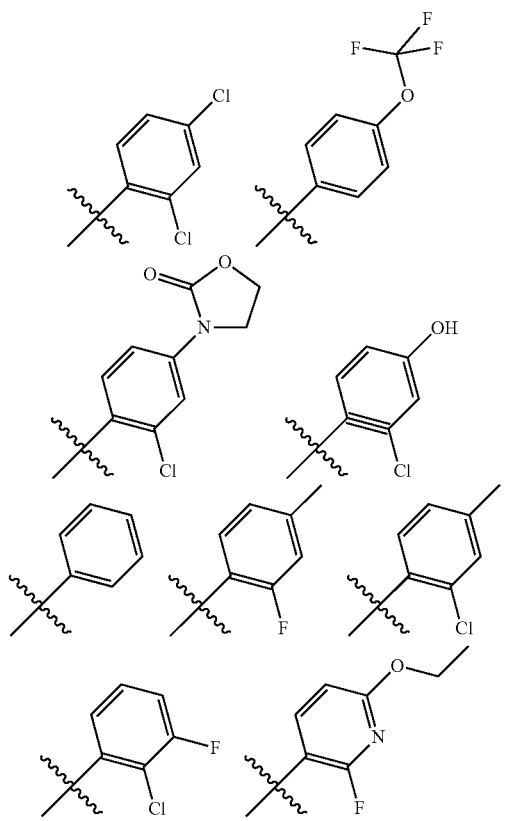

In another embodiment, in the compounds of formula (I), R3 represents a —COR4 group, wherein R4 represent a (C$_1$-C$_6$)alkyl group, a —NRR' group, a —NHNH$_2$ group, a —NHNHCONH$_2$ group, a —NHNHCS-1H-imidazolyl group or a —NHSO$_2$CH$_3$ group, and R and R' independently represent a hydrogen atom, a —OH group, a (C$_1$-C$_6$)alkoxy group or a (C$_1$-C$_6$)alkyl group, or a pharmaceutically acceptable salt thereof.

In another embodiment, in the compounds of formula (I), R3 represents a —BOR5OR6 group, wherein R5 and R6 independently represent a hydrogen atom or a (C$_1$-C$_6$)alkyl group, optionally forming with the bore atom to which they are attached a 5-membered ring, said ring being optionally substituted by 1 to 4 methyl groups, or a pharmaceutically acceptable salt thereof.

In another embodiment, in the compounds of formula (I), R3 represents a —B(OH)$_2$ group or a

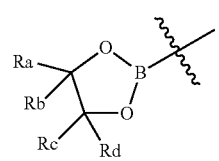

group, wherein Ra, Rb, Rc and Rd independently represent a (C$_1$-C$_4$)alkyl, and in particular a methyl group.

In another embodiment, in the compounds of formula (I), R3 represents a —X—Z group, wherein X represents a bond, a —NH— group, a —CONH— group or a —CO— group, Z represents a
(i) 4 or 5-membered cycloalkyl, more particularly chosen from a cyclobutenyl and a cyclopentenyl,
(ii) a 4 or 5-membered heterocylcloalkyl group comprising 1 to 4 heteroatoms selected from oxygen, nitrogen and sulfur, more particularly chosen from an azetidinyl, an oxetanyl, a dihydropyrazolyl, a dihydroisoxazolyl, a dihydropyrrolyl and more particularly a 1,5-dihydro-2H-pyrrolyl, an oxazolidinyl, an imidazolidinyl, a dioxazolyl, an oxathiazolyl, and even more particularly a 1,2,4-dioxazolyl, an oxathiazolyl, and even more particularly a 1,3,4-oxathiazolyl, an oxathiadiazolyl and a pyrrolidinyl,
(iii) a 4 or 5-membered heteroaryl group comprising 1 to 4 heteroatoms selected from oxygen, nitrogen and sulfur, more particularly chosen from a triazolyl, even more particularly a 1,2,4-triazolyl, an isoxazolyl, a thiazolyl, an oxadiazolyl, even more particularly a 1,3,5-oxadiazolyl, a 1,3,4-oxadiazolyl, a 1,2,4-oxadiazolyl or a 1,2,5-oxadiazolyl, a thiadiazolyl, and even more particularly a 1,3,5-thiadiazolyl, a 1,2,4-thiadiazolyl, a 1,2,5-thiadiazolyl or a 1,3,4-thiadiazolyl, a tetrazolyl and a pyrazolyl,
said cycloalkyl, heteroaryl or heterocycloalkyl group being optionally substituted by 1 to 3 groups selected from a —OH group, an oxo group, a =NR12'R12" group and a thiooxo group, or
(iv) a phenyl group optionally substituted by a hydroxy group, by a COOR12' group, by a —CONH₂ group, by a —NO₂ group, by a —NH₂ group or by a (C₁-C₆)alkyl group, itself optionally substituted by a hydroxy group,
with R12' and R12" independently being a hydrogen group or a (C1-C6)alkyl group,
or a pharmaceutically acceptable salt thereof.

In another embodiment in the compounds of formula (I), R3 represents a group selected from

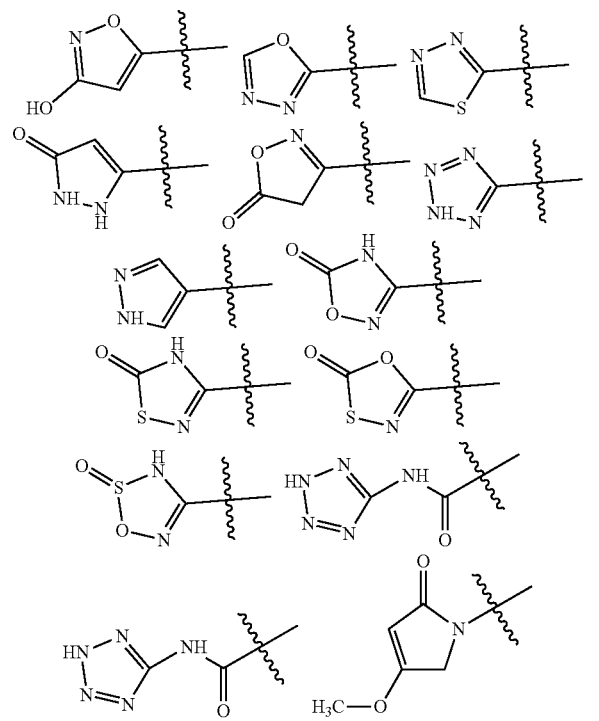

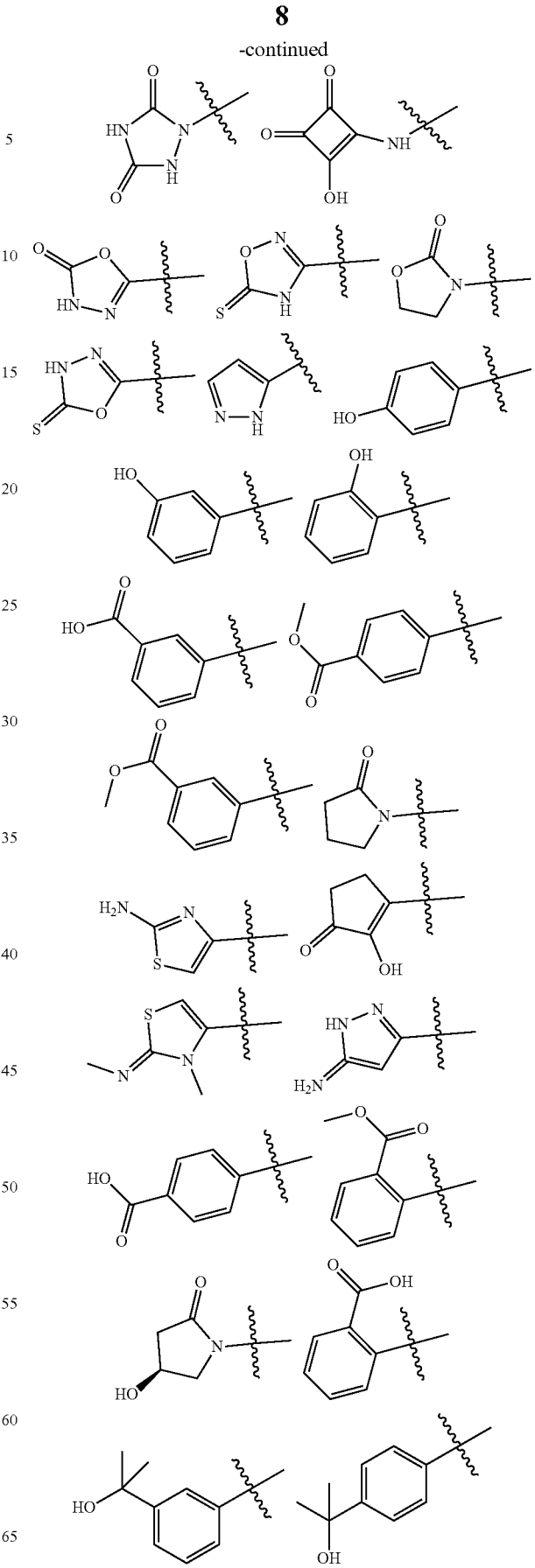

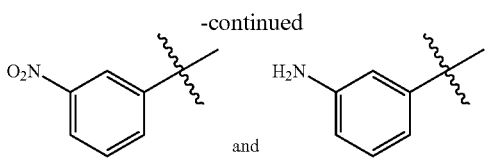
and

In another embodiment, in the compounds of formula (I), R3 represents a
(i) 4 or 5-membered cycloalkyl, more particularly chosen from a cyclopentenyl,
(ii) a 4 or 5-membered heterocylcloalkyl group comprising 1 to 4 heteroatoms selected from oxygen, nitrogen and sulfur, more particularly chosen from a dihydropyrazolyl, a dihydroisoxazolyl, a dihydropyrrolyl and more particularly a 1,5-dihydro-2H-pyrrolyl, an oxazolidinyl, an imidazolidinyl, a dioxazolyl, and even more particularly a 1,2,4-dioxazolyl, an oxathiazolyl, and even more particularly a 1,3,4-oxathiazolyl, an oxathiadiazolyl and a pyrrolidinyl,
(iii) a 4 or 5-membered heteroaryl group comprising 1 to 4 heteroatoms selected from oxygen, nitrogen and sulfur, more particularly chosen from a triazolyl, even more particularly a 1,2,4-triazolyl, an isoxazolyl, a thiazolyl, an oxadiazolyl, even more particularly a 1,3,5-oxadiazolyl, a 1,3,4-oxadiazolyl, a 1,2,4-oxadiazolyl or a 1,2,5-oxadiazolyl, a thiadiazolyl, and even more particularly a 1,3,5-thiadiazolyl, a 1,2,4-thiadiazolyl, a 1,2,5-thiadiazolyl or a 1,3,4-thiadiazolyl, a tetrazolyl, and a pyrazolyl,
said cycloalkyl, heteroaryl or heterocycloalkyl group being optionally substituted by 1 to 3 groups selected from a —OH group, an oxo group, a =NR12'R12" group and a thiooxo group, or
(iv) a phenyl group optionally substituted by a hydroxy group, by a COOR12' group, by a —CONH$_2$ group, by a —NO$_2$ group, by a —NH$_2$ group or by a (C$_1$-C$_6$)alkyl group, itself optionally substituted by a hydroxy group, with R12' and R12" independently being a hydrogen group or a (C$_1$-C$_6$)alkyl group,
or a pharmaceutically acceptable salt thereof.

In another embodiment, in the compounds of formula (I), R3 represents a
(i) 4 or 5-membered cycloalkyl, more particularly chosen from a cyclobutenyl,
(ii) a 4 or 5-membered heterocylcloalkyl group comprising 1 to 4 heteroatoms selected from oxygen, nitrogen and sulfur, more particularly chosen from an azetidinyl and an oxetanyl, or
(iii) a 4 or 5-membered heteroaryl group comprising 1 to 4 heteroatoms selected from oxygen, nitrogen and sulfur, more particularly chosen from a tetrazolyl
said cycloalkyl, heteroaryl or heterocycloalkyl group being optionally substituted by 1 to 3 groups selected from a —OH group and an oxo group, or
or a pharmaceutically acceptable salt thereof.

In another embodiment, in the compounds of formula (I), R3 represents a (C$_1$-C$_6$)alkyl group or a (C$_1$-C$_6$)alkenyl group, optionally substituted by 1 to 4 groups selected from a fluorine atom, a —OH group and a —COOH group, or a pharmaceutically acceptable salt thereof.

In another embodiment, in the compounds of formula (I), R3 represents a group selected from a —SO$_2$NHCO(CH$_3$) group, a —CONHSO$_2$(CH$_3$) group, a —SO$_2$NH$_2$ group, a —SO(CH$_3$)NH group, a —SO$_2$CH$_3$ group, a —NHSO$_2$(CH$_3$) group or a —NHSO$_2$(CF$_3$) group,
or a pharmaceutically acceptable salt thereof.

In another embodiment, in the compounds of formula (I), R3 represents a halogen atom, in particular a bromine atom, a —NH$_2$ group, or a —CN group,
or a pharmaceutically acceptable salt thereof.

In another embodiment, in the compounds of formula (I), R3 represents a —O—R11 group, wherein
R11 represents a (C$_1$-C$_6$)alkyl group optionally substituted by one to six fluorine atoms, preferably by one to three fluorine atoms,
or a pharmaceutically acceptable salt thereof.

In another embodiment, in the compounds of formula (I), R3 represents a —NH—COR9 group, wherein
R9 represents a (C$_1$-C$_6$)alkoxy group, a (C$_1$-C$_6$)alkyl group or a (C$_3$-C$_6$)cycloalkyl group, each (C$_1$-C$_6$)alkyl group or (C$_3$-C$_6$)cycloalkyl group being optionally substituted by one to three fluorine atom(s), a —OH group or (C$_1$-C$_4$)alkyl group,
or a pharmaceutically acceptable salt thereof.

In another embodiment, in the compounds of formula (I), R3 represents a —NH—C(NH)—R9' group, wherein
R9' represents a (C$_1$-C$_6$)alkyl group or a (C$_3$-C$_6$)cycloalkyl group,
or a pharmaceutically acceptable salt thereof.

In another embodiment, in the compounds of formula (I), R3 represents
a —NHCOCOOR12 group or a —NHCOCONR12'R12" group, wherein
R12 represents a (C$_1$-C$_6$)alkyl group, and
R12' and R12" independently represent a hydrogen group or a (C$_1$-C$_6$)alkyl group,
or a pharmaceutically acceptable salt thereof.

In another embodiment, in the compounds of formula (I), Ar represents a phenyl or a pyridinyl group, in particular a 3-pyridinyl group, said phenyl or pyridinyl group being optionally substituted with one or two groups selected among chlorine, fluorine, hydroxy, methyl, trifluoromethoxy, 2-oxooxazolidine-3-yl and ethoxy,
R1 and R2 represent independently a hydrogen atom,
R3 represents
(1) a —COR4 group, wherein R4 represent a (C$_1$-C$_6$) alkyl group, a —NRR' group, a —NHNH$_2$ group, a —NHNHCONH$_2$ group, a —NHNHCS-imidazol-1-yl group or a —NHSO$_2$CH$_3$ group, and R and R' independently represent a hydrogen atom, a —OH group, a (C$_1$-C$_6$)alkoxy group and a (C$_1$-C$_6$)alkyl group,
(2) a 4,4,5,5-tetramethyl-1,3,2-dioxaborolane-2-yl or a —B(OH)$_2$ group,
(3)
a cyclopentenyl,
a —NH—Z group, wherein Z is a cyclobutenyl,
a —CO—Z group, wherein Z is an azetidinyl,
a 4 or 5-membered heterocylcloalkyl group comprising 1 to 4 heteroatoms selected from oxygen, nitrogen and sulfur, more particularly chosen from an azetidinyl, a dihydropyrazolyl, a dihydroisoxazolyl, a dihydropyrrolyl and more particularly a 1,5-dihydro-2H-pyrrolyl, an oxazolidinyl, an imidazolidinyl, a dioxazolyl, and even more particularly a 1,2,4-dioxazolyl, an oxathiazolyl, and even more particularly a 1,3,4-oxathiazolyl, an oxathiadiazolyl and a pyrrolidinyl,
a —CO—NH—Z group, wherein Z is an oxetanyl, a 4 or 5-membered heteroaryl group comprising 1 to 4 heteroatoms selected from oxygen, nitrogen and sulfur, more particularly chosen from a triazolyl, even more particularly a 1,2,4-triazolyl, an isoxazolyl, a thiazolyl, an oxadiazolyl, even more particularly a 1,3,5-oxadiazolyl, a 1,3,4-oxadiazolyl, a 1,2,4-oxadiazolyl or a 1,2,5-oxadiazolyl, a thiadiazolyl, and even more particularly a 1,3,5-thiadiazolyl, a 1,2,4-thiadiazolyl, a 1,2,5-thiadiazolyl or a 1,3,4-thiadiazolyl, a tetrazolyl, and a pyrazolyl, a —CO—NH—Z group, wherein Z is a tetrazolyl, said cycloalkyl, heteroaryl or heterocycloalkyl group being optionally substituted by 1 to 3 groups selected from a —OH group, an oxo group, a =NR12R12' group and a thiooxo group, or a phenyl group optionally substituted by a hydroxy group, by a COOR12' group, by a —CONH$_2$ group, by a —NO$_2$ group, by a —NH$_2$ group or by a (C$_1$-C$_6$)alkyl group, itself optionally substituted by a hydroxy group, with R12' and R12" independently being a hydrogen group or a (C$_1$-C$_6$)alkyl group, (4) a (C$_1$-C$_6$)alkyl group or a (C$_1$-C$_6$)alkenyl group, optionally substituted by 1 to 8 groups selected from a fluorine atom, a —OH group and a —COOH group, (5) a —CONHSO$_2$CH$_3$ group, a —NH—SO$_2$CH$_3$ group, a —NHSO$_2$—CF$_3$ group or a —NHSO$_2$CH$_3$ group, (6) a halogen atom, a —NH$_2$ group or a —CN group, (7) a OCF$_2$H group, (8) a —NH—COR9 group, wherein R9 represents a (C$_1$-C$_6$)alkoxy group, a (C$_1$-C$_6$)alkyl group or a (C$_3$-C$_6$)cycloalkyl group, each (C$_1$-C$_6$)alkyl group or (C$_3$-C$_6$)cycloalkyl group being optionally substituted by one to three fluorine atom(s), a —OH group or (C$_1$-C$_4$)alkyl group, (9) a —C(=NH)NHOH group,

(10) a —NH—C(NH)—R9' group, wherein R9' represents a (C$_1$-C$_3$)alkyl group,

(11) a —NHCOCOOR12 group or a —NHCOCONR12'R12" group, wherein

R12 represents a (C$_1$-C$_6$)alkyl group,

R12 and R12' independently represent a hydrogen group or a (C$_1$-C$_6$)alkyl group, or a pharmaceutically acceptable salt thereof.

Among the compounds of formula (I) that are subject matter of the invention, mention may be made in particular of the following compounds:

(S)-3-(4-(8-(2,4-dichlorophenyl)-3-(4,4,5,5-tetramethyl-1,3,2-dioxaborolan-2-yl)-6,7-dihydro-5H-benzo[7]annulen-9-yl)phenoxy)-1-(3-fluoropropyl)pyrrolidine (1)

(S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)boronic acid (2)

(S)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide (3)

(S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-3-ol (4)

1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2-difluoroethan-1-ol (5)

(S)-8-(2,4-dichlorophenyl)-9-(4-((1-(3-fluoropropyl)pyrrolidin-3-yl)oxy)phenyl)-6,7-dihydro-5H-benzo[7]annulene-3-carbohydrazide (6)

(S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole (7)

(S)-3-(4-(8-(2,4-dichlorophenyl)-3-(difluoromethyl)-6,7-dihydro-5H-benzo[7]annulen-9-yl)phenoxy)-1-(3-fluoropropyl)pyrrolidine (8)

(S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-thiadiazole (9)

1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol (10)

(S)-3-(4(3-bromo-8-(2,4-dichlorophenyl)-6,7-dihydro-5H-benzo[7]annulen-9-yl)phenoxy)-1-(3-fluoropropyl)pyrrolidine (11)

(S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2-dihydro-3H-pyrazol-3-one (12)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-5(4H)-one (13)

(S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonyl)hydrazine-1-carboxamide (14)

(S)-8-(2,4-dichlorophenyl)-9-(4-((1-(3-fluoropropyl)pyrrolidin-3-yl)oxy)phenyl)-(methylsulfonyl)-6,7-dihydro-5H-benzo[7]annulene-3-carboxamide (15)

(S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2H-tetrazole (16)

(S)-8-(2,4-dichlorophenyl)-9-(4-((1-(3-fluoropropyl)pyrrolidin-3-yl)oxy)phenyl)-N-(2H-tetrazol-5-yl)-6,7-dihydro-5H-benzo[7]annulene-3-carboxamide (17)

(S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboxamide (18)

(S)-8-(2,4-dichlorophenyl)-9-(4-((1-(3-fluoropropyl)pyrrolidin-3-yl)oxy)phenyl)-N-methoxy-6,7-dihydro-5H-benzo[7]annulene-3-carboxamide (19)

(S,E)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)acrylic acid (20)

(S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazole (21)

(S)-8-(2,4-dichlorophenyl)-9-(4-((1-(3-fluoropropyl)pyrrolidin-3-yl)oxy)phenyl)-6,7-dihydro-5H-benzo[7]annulene-3-carbonitrile (22)

(S)-4-(9-(4-((1-(3-fluoropropyl)pyrrolidin-3-yl)oxy)phenyl)-8-(4-(trifluoromethoxy)phenyl)-6,7-dihydro-5H-benzo[7]annulen-3-yl)-1H-pyrazole (23)

(S)-3-(4-(3-(difluoromethoxy)-8-(4-(trifluoromethoxy)phenyl)-6,7-dihydro-5H-benzo[7]annulen-9-yl)phenoxy)-1-(3-fluoropropyl)pyrrolidine (24)

Methyl (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate (25)

(S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboximidamide (26)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-oxadiazol-5(4H)-one (27)

(S)-8-(2,4-dichlorophenyl)-9-(4-((1-(3-fluoropropyl)pyrrolidin-3-yl)oxy)phenyl)-6,7-dihydro-5H-benzo[7]annulen-3-amine (28)

4-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-3H-1,2,3,5-oxathiadiazole 2-oxide hydrochloride (29)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)methane sulfonamide (30)

(S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazol-2(3H)-one (31)

Tert-butyl (S)-(8-(2,4-dichlorophenyl)-9-(4-((1-(3-fluoropropyl) pyrrolidin-3-yl)oxy)phenyl)-6,7-dihydro-5H-benzo[7]annulen-3-yl)carbamate (32)

(S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxathiazol-2-one (33)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-oxadiazole-5(4H)-thione (34)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,1,1-trifluoromethanesulfonamide (35)

(S)-3-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-4-hydroxycyclobut-3-ene-1,2-dione (36)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-thiadiazol-5(4H)-one (37)

(S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-methoxy-1,5-dihydro-2H-pyrrol-2-one (38)

(S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)ethan-1-one (39)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)oxazolidin-2-one (40)

(S)-3-(8-(2-chloro-4-(2-oxooxazolidin-3-yl)phenyl)-9-(4-((1-(3-fluoropropyl)pyrrolidin-3-yl)oxy)phenyl)-6,7-dihydro-5H-benzo[7]annulen-3-yl)oxazolidin-2-one (41)

(S)-4-(3-amino-9-(4-((1-(3-fluoropropyl)pyrrolidin-3-yl)oxy)phenyl)-6,7-dihydro-5H-benzo[7]annulen-8-yl)-3-chlorophenol (42)

5-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)imidazolidine-2,4-dione (43)

(S)-8-(2,4-dichlorophenyl)-9-(4-((1-(3-fluoropropyl)pyrrolidin-3-yl)oxy)phenyl)-N-methoxy-N-methyl-6,7-dihydro-5H-benzo[7]annulene-3-carboxamide (44)

(S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole-2(3H)-thione (45)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetimidamide (46)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2,2,2-trifluoroacetamide (47)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl) acetamide (48)

1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)ethan-1-ol (49)

(S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)propan-2-ol (50)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazole (51)

(S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol (52)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol (53)

(S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol (54)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid (55)

methyl (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate (56)

methyl (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate (57)

(S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)pyrrolidin-2-one (58)

(S)-8-(2,4-dichlorophenyl)-9-(4-((1-(3-fluoropropyl)pyrrolidin-3-yl)oxy)phenyl)-N'-(1H-imidazole-1-carbonothioyl)-6,7-dihydro-5H-benzo[7]annulene-3-carbohydrazide (59)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)cyclopropanecarboxamide (60)

(S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)thiazol-2-amine (61)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)pivalamide (62)

(S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxamide (63)

(S)-8-(2-chloro-4-methylphenyl)-9-(4-((1-(3-fluoropropyl)pyrrolidin-3-yl)oxy)phenyl)-6,7-dihydro-5H-benzo[7]annulene-3-carbonitrile 2,2,2-trifluoroacetate (64)

1-(8-(2-chloro-3-fluorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol (65)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-fluorocyclopropane-1-carboxamide (66)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-methylcyclopropane-1-carboxamide (67)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2-hydroxycyclopent-2-en-1-one (68)

(S,Z)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-N,3-dimethylthiazol-2(3H)-imine hydrochloride (69)

(S)-5-(8-(2-chloro-4-methylphenyl)-9-(4-((1-(3-fluoropropyl)pyrrolidin-3-yl)oxy)phenyl)-6,7-dihydro-5H-benzo[7]annulen-3-yl)-2H-tetrazole 2,2,2-trifluoroacetate (70)

tert-butyl (S)-(9-(4-((1-(3-fluoropropyl)pyrrolidin-3-yl)oxy)phenyl)-8-phenyl-6,7-dihydro-5H-benzo[7]annulen-3-yl) carbamate (71)

(S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid (72)

(S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazol-5-amine (73)

(S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)(3-hydroxyazetidin-1-yl)methanone (74)

(S)-8-(2,4-dichlorophenyl)-9-(4-((1-(3-fluoropropyl)pyrrolidin-3-yl)oxy)phenyl)-N-(oxetan-3-yl)-6,7-dihydro-5H-benzo[7]annulene-3-carboxamide (75)

ethyl (S)-2-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-2-oxoacetate (76)

(S)—N1-(8-(2,4-dichlorophenyl)-9-(4-((1-(3-fluoropropyl)pyrrolidin-3-yl)oxy)phenyl)-6,7-dihydro-5H-benzo[7]annulen-3-yl)oxalamide (77)

(S)-8-(2-chloro-4-methylphenyl)-9-(4-((1-(3-fluoropropyl)pyrrolidin-3-yl)oxy)phenyl)-6,7-dihydro-5H-benzo[7]annulen-3-amine (78)

(S)-8-(6-ethoxy-2-fluoropyridin-3-yl)-9-(4-((1-(3-fluoropropyl)pyrrolidin-3-yl)oxy)phenyl)-6,7-dihydro-5H-benzo[7]annulene-3-carboxamide (79)

(S)-8-(6-ethoxy-2-fluoropyridin-3-yl)-9-(4-((1-(3-fluoropropyl)pyrrolidin-3-yl)oxy)phenyl)-6,7-dihydro-5H-benzo[7]annulene-3-carbonitrile 2,2,2-trifluoroacetate (80)

(S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzamide (81)

(S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)methanol (82)

methyl (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate (83)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-hydroxycyclopropane-1-carboxamide formate (84)

(S)-1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-4-hydroxypyrrolidin-2-one (85)

(S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid (86)

N-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2-difluorocyclopropane-1-carboxamide (87)

(S)-3-((8-(2-chloro-4-methylphenyl)-9-(4-((1-(3-fluoropropyl)pyrrolidin-3-yl)oxy)phenyl)-6,7-dihydro-5H-benzo[7]annulen-3-yl)amino)-4-hydroxycyclobut-3-ene-1,2-dione (88)

(S)-8-(2-chloro-3-fluorophenyl)-9-(4-((1-(3-fluoropropyl)pyrrolidin-3-yl)oxy)phenyl)-6,7-dihydro-5H-benzo[7]annulen-3-amine (89)

(S)—N-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)methanesulfonamide (90)

(S)-1-(3-fluoropropyl)-3-(4-(8-phenyl-3-(4,4,5,5-tetramethyl-1,3,2-dioxaborolan-2-yl)-6,7-dihydro-5H-benzo[7]annulen-9-yl)phenoxy)pyrrolidine (91)

(S)-(9-(4-((1-(3-fluoropropyl)pyrrolidin-3-yl)oxy)phenyl)-8-phenyl-6,7-dihydro-5H-benzo[7]annulen-3-yl)boronic acid (92)

(S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetic acid (93)

(S)-2-(3-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol (94)

(S)-2-(4-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol (95)

(S)-3-(4-(8-(2-chloro-3-fluorophenyl)-3-(3-nitrophenyl)-6,7-dihydro-5H-benzo[7]annulen-9-yl)phenoxy)-1-(3-fluoropropyl)pyrrolidine (96)

(S)-3-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)aniline (97)

(S)-2-(4-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)phenyl)propan-2-ol (98)

or a pharmaceutically acceptable salt thereof.

Among the preceding listed compounds, the following compounds may particularly be cited: (2), (3), (5), (8), (10), (21), (28), (31), (42), (43), (45), (46), (49), (63), (64), (78), (80), (82), (89) and (92).

Another subject-matter of the instant invention is a compound selected from the above list, or a pharmaceutically acceptable salt thereof, for use in therapy, especially as an inhibitor and degrader of estrogen receptors.

Another subject-matter of the instant invention is a compound selected from the above list, or a pharmaceutically acceptable salt thereof, for use in the treatment of cancer, especially breast cancer.

Another subject-matter of the instant invention is a method of treating cancer, comprising administering to a subject in need thereof, in particular a human, a therapeutically effective amount of a compound selected from the above list, or a pharmaceutically acceptable salt thereof.

Another subject-matter of the instant invention is a pharmaceutical composition comprising as active principle an effective dose of a compound selected from the above list, or a pharmaceutically acceptable salt thereof, and also at least one pharmaceutically acceptable excipient.

In accordance with the invention, the compounds of the formula (I) can be prepared by the following processes.

The compounds of the formula (I) and other related compounds having different substituents are synthesized using techniques and materials described below or otherwise known by the skilled person in the art. In addition, solvents, temperatures and other reaction conditions presented below may vary as deemed appropriate to the skilled person in the art.

General below methods for the preparation of compounds of the invention are optionally modified by the use of appropriate reagents and conditions for the introduction of the various moieties found in the formula (I) as described below.

The following abbreviations and empirical formulae are used:
AIBN 2,2'-azobisisobutyronitrile
CDI 1,1'-carbonyldiimidazole
Cs$_2$CO$_3$ cesium carbonate
DBU 1,8-diazabicyclo[5.4.0]undec-7-ene DCM dichloromethane
DMAP 4-dimethylaminopyridine
DMF N,N-dimethylformamide
DMSO dimethyl sulfoxide
DIPEA N,N-diisopropylethylamine
DPA diphenylphosphoryl azide
EDCI 1-Ethyl-3-(3-dimethylaminopropyl)carbodiimide
EtOH ethanol
EtOAc ethyl acetate
HBTU 2-(1H-benzotriazol-1-yl)-1,1,3,3-tetramethyluronium hexafluorophosphate
HCl hydrochloric acid
iPrOH isopropyl alcohol
$K_2CO_3$ potassium carbonate
$LiAlH_4$ lithium aluminium hydride
MeCN acetonitrile
MeOH methanol
$MgCl_2$ magnesium chloride
$MgSO_4$ magnesium sulfate
$NaBH_4$ sodium borohydride
$NaHCO_3$ sodium bicarbonate
$Na_2CO_3$ sodium carbonate
$NaIO_4$ sodium periodate
NaOAc sodium acetate
NaOH sodium hydroxide
$Na_2SO_4$ sodium sulfate
NBS N-bromo succinimide
$NH_4CO_3$ ammonium carbonate
$NH_4HCO_3$ ammonium bicarbonate
NMP N-methyl-2-pyrrolidone
P4-T-BU N''''-(1,1-dimethylethyl)-N,N',N'''-tris[tris(dimethylamino) phosphoranylidene]phosphorimidic triamide
$Pd_2(dba)_3$ tris(dibenzylideneacetone)dipalladium(0)
$Pd(dppf)Cl_2$ 1,1'-Bis(diphenylphosphino)ferrocene
$Pd(PPh_3)_2Cl_2$ bis (triphenylphosphine) palladium(II) chloride
PIDA phenyliodine diaceteate
PTAB Phenyltrimethylammonium Perbromide
TBAF tetrabutylammonium fluoride
tBuXPhos 2-di-tert-butylphosphino-2',4',6'-triisopropylbiphenyl
TBTU 2-(1H-benzotriazole-1-yl)-1,1,3,3-tetramethylaminium tetrafluoroborate
TCDI 1,1'-thiocarbonyldiimidazole
TEA triethylamine
TFA trifluoroacetic acid
TFAA trifluoroacetic anhydride
THF tetrahydrofuran
$THPO-NH_2$ O-(tetrahydro-2H-pyran-2-yl)hydroxylamine SCHEME 1a: Preparation of compounds of the formula (I) - General process

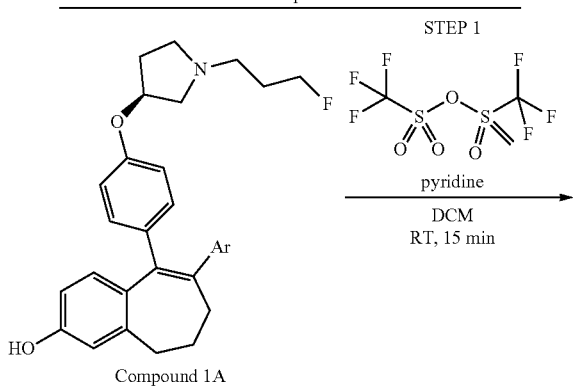

Compound 1A

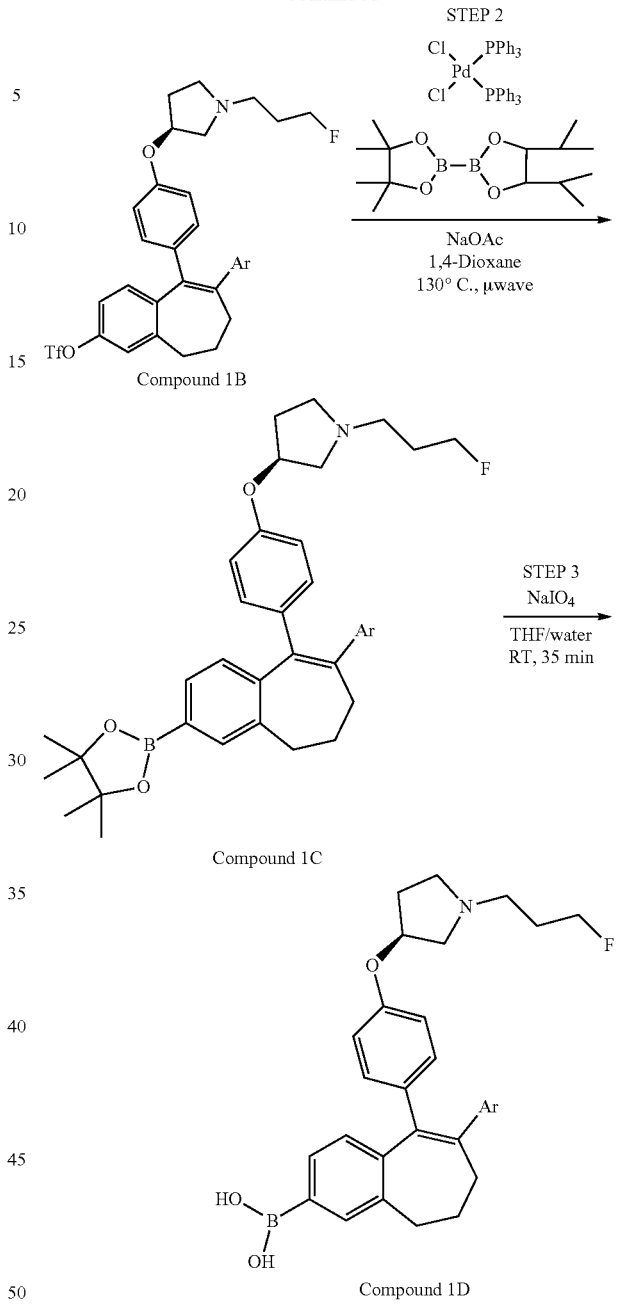

According to SCHEME 1a, in which Ar is defined as described above, compound 1A (prepared according to WO2017140669), can be converted in STEP 1 to the corresponding compound 1B, by treatment with triflic anhydride, in presence of a base such as pyridine, in aprotic solvent such as DCM. This intermediate can be converted in STEP 2 to compound 1C by treatment for example with 4,4,4',4',5,5,5',5'-octamethyl-2,2'-bi(1,3,2-dioxaborolane), and with a palladium catalyst, for example bis (triphenylphosphine) palladium(II) chloride $Pd(PPh_3)_2Cl_2$, in solution in 1,4-dioxane at refluxing temperature or above in a sealed tube in a microwave apparatus, in presence of a base such as NaOAc. This compound 1C may be subjected in STEP 3 to a hydrolysis using $NaIO_4$ in solution in THF and water at room temperature for example for 35 minutes to give compound 1D.

Said route further allows to prepare for example the following compound:

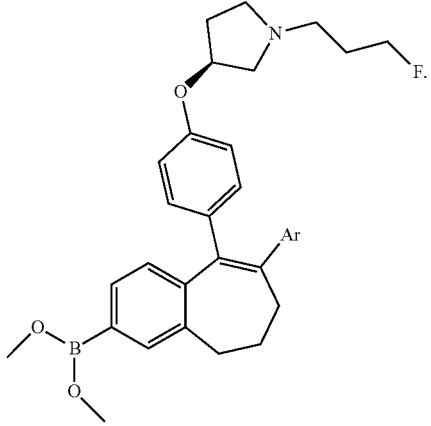

SCHEME 1b: Preparation of compounds of the formula (I) - General process

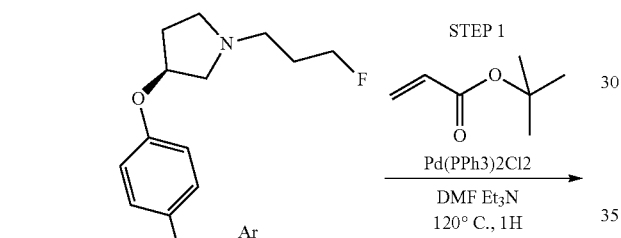

Compound 1B

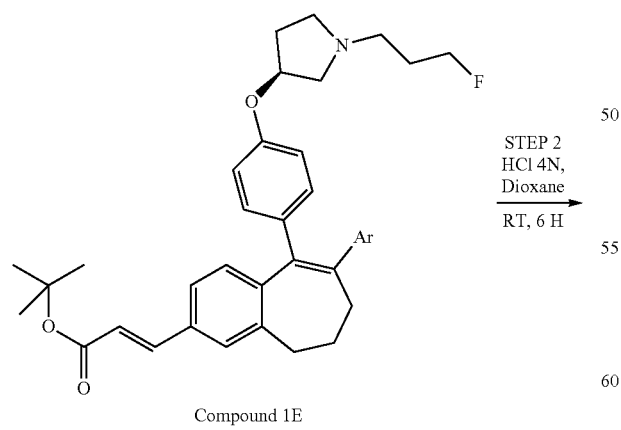

Compound 1E

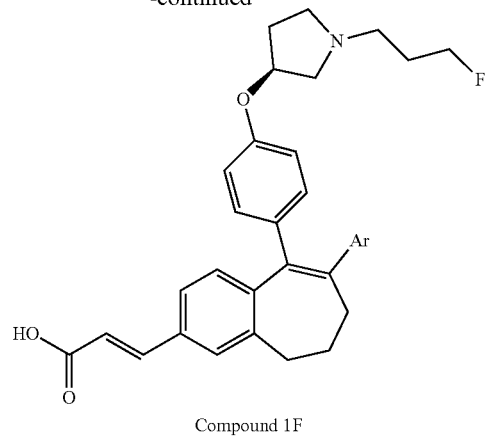

Compound 1F

According to SCHEME 1b, in which Ar is defined as described above, compound 1B can be converted in STEP 1 to compound 1E, by treatment in HECK conditions with tert-butyl acrylate, in the presence of a catalyst such as bis (triphenylphosphine) palladium(II) chloride, with TEA as base, in DMF, at a temperature around 120° C., for 1 hour. This compound 1E can be converted in STEP 2 to compound 1F in presence of an acid such as hydrochloric acid in solution in 1,4-dioxane.

SCHEME 1c: Preparation of compounds of the formula (I) - General process

STEP 1

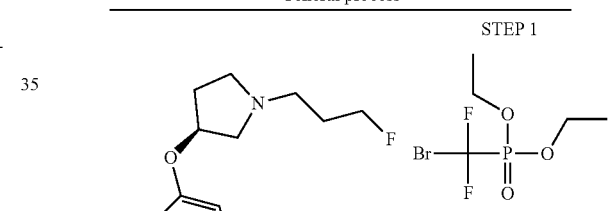

Compound 1A

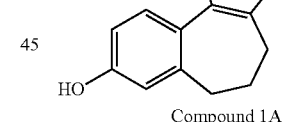

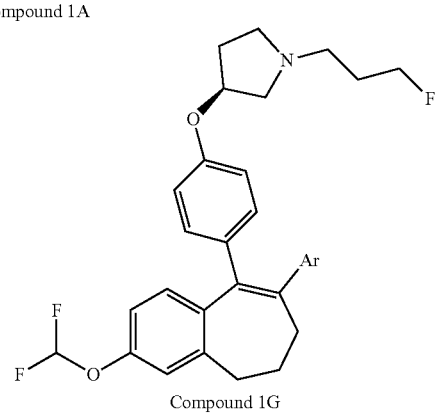

Compound 1G

According to SCHEME 1c, in which Ar is defined as described above, compound 1A (prepared according to WO2017140669), can be converted in STEP 1 to compound 1G, by treatment with diethyl (bromodifluoromethyl)phosphonate, in presence of potassium hydroxide, for example in a mixture of MeCN and water, at a temperature around 0° C. for 1 hour.

SCHEME 1d: Preparation of compounds of the formula (I) - General process

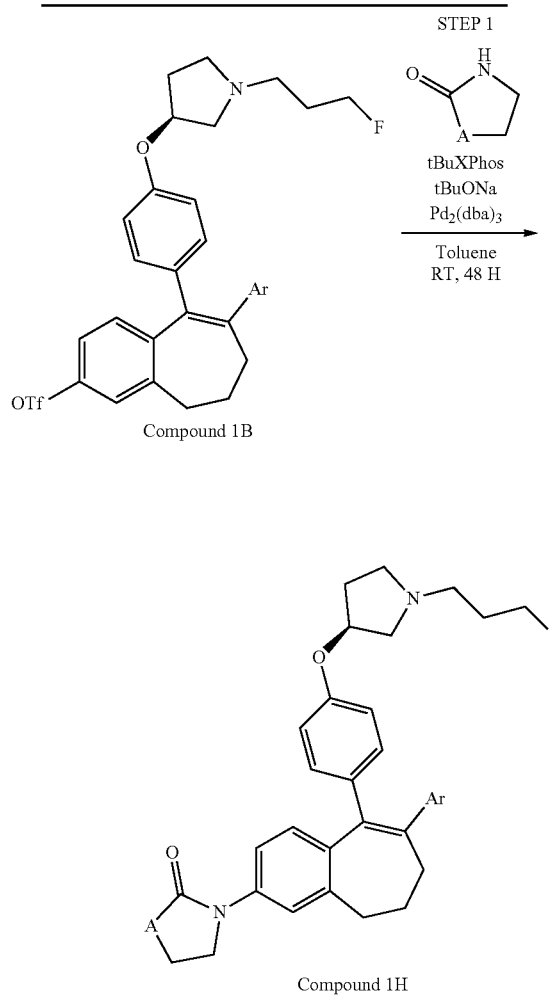

A = O, CH$_2$

SCHEME 1d: Preparation of compounds of the formula (I) -
General processSCHEME 1d: Preparation of compounds of the formula (I) -
General process According to SCHEME 1d, in which Ar is defined as described above, compound 1B can be converted in STEP 1 to compound 1H, with 2-oxazolidone or pyrrolidinone, tBuXphos, Pd$_2$(dba)$_3$, sodium terbutylate, in toluene at room temperature.

SCHEME 1e: Preparation of compounds of the formula (I) - General process

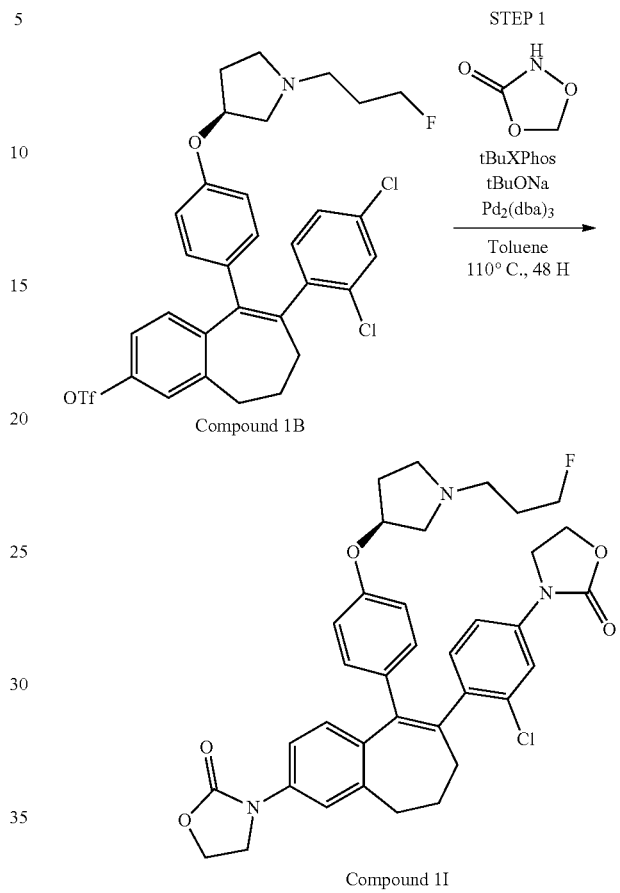

According to SCHEME 1e, in which Ar is defined as described above, compound 1B, can be converted in STEP 1 to compound 1I, with 2-oxazolidone, tBuXphos, Pd$_2$(dba)$_3$, sodium terbutylate, in toluene at 110° C.

SCHEME 1f: Preparation of compounds of the formula (I) - General process

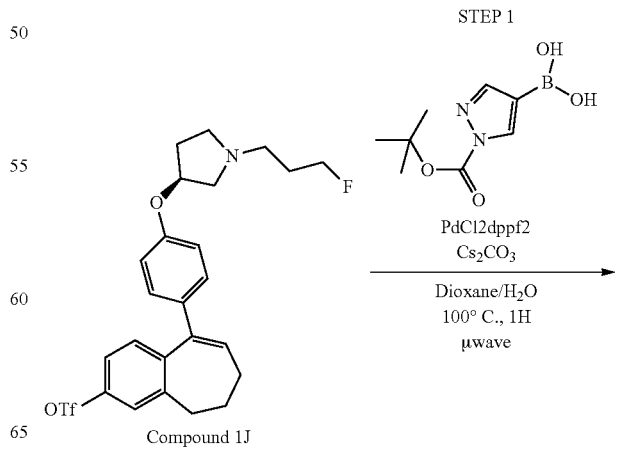

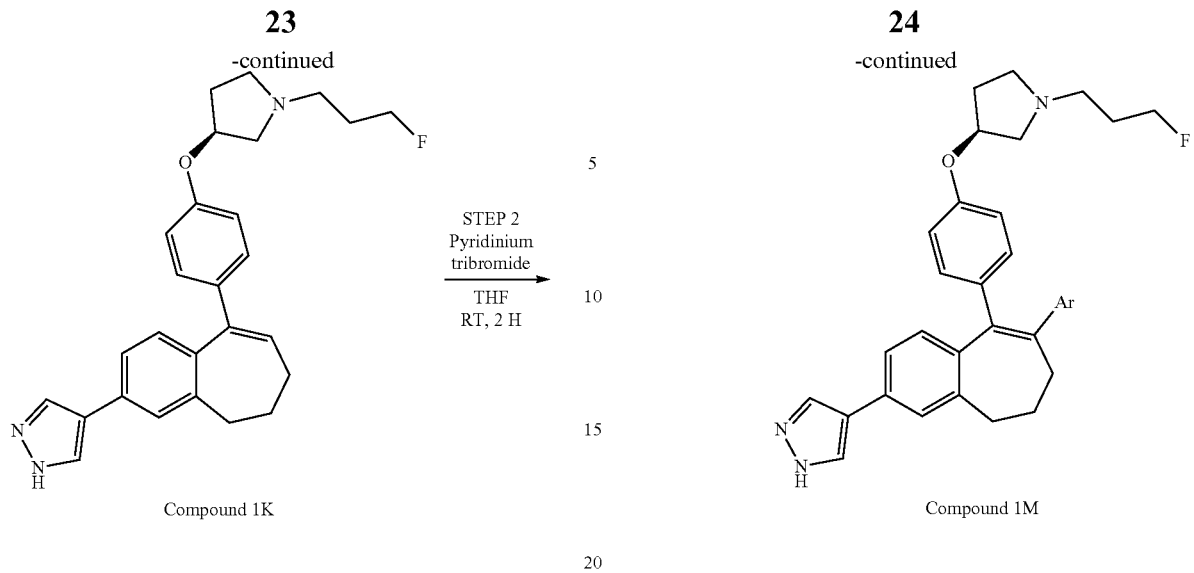

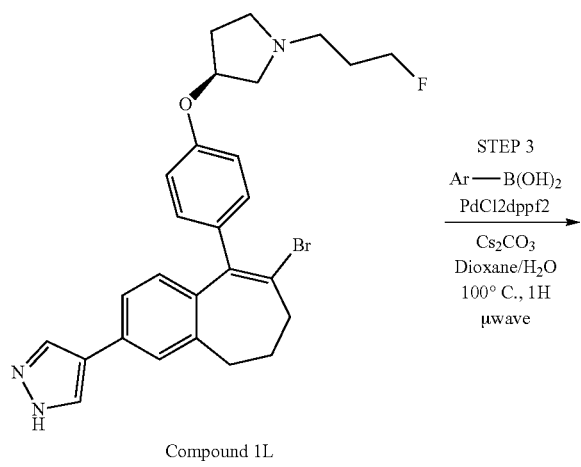

According to SCHEME 1f, in which Ar is defined as described above, compound 1J (prepared according to WO2017140669), can be converted in STEP 1 to compound 1K, for example with (1-(ter-butoxycarbonyl)-1H-pyrazol-4-yl)boronic acid, Pd(dppf)Cl₂, Cs₂CO₃, for example in a mixture of 1,4-dioxane and water at 100° C. in a microwave apparatus. Compound 1K can be brominated in STEP 2 to compound 1L with pyridinium tribromide in THF, at room temperature. Compound 1L can be converted in STEP 3 to compound 1M in Suzuki conditions, with boronic acid derivatives, Pd(dppf)Cl₂, Cs₂CO₃, in a mixture of 1,4-dioxane and water at 100° C. in a microwave apparatus.

Said procedure may be used for obtaining further compounds of formula (I) wherein R3 is a —X—Z group, wherein X is a bond, by using alternative starting materials in STEP 1, i.e. alternative boronic acid derivatives, the corresponding adaptations falling within the skills of to the man skilled in the art.

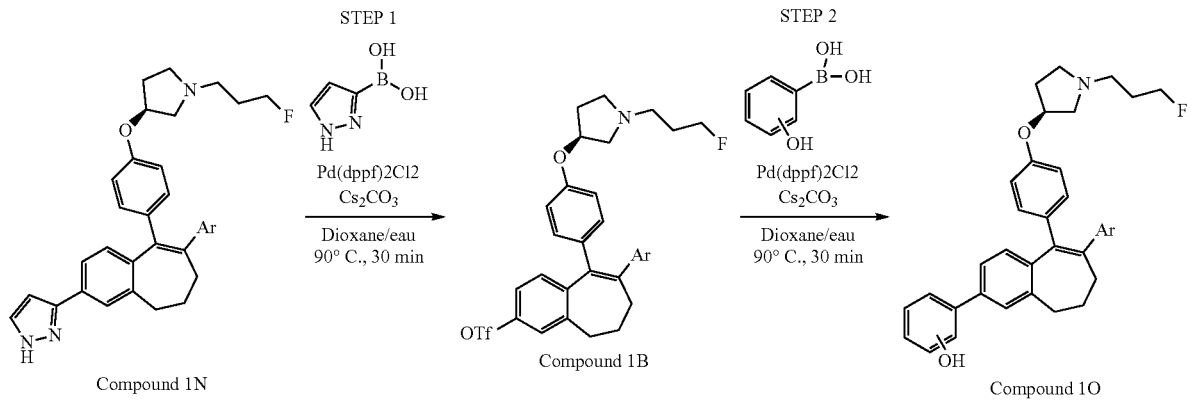

-continued

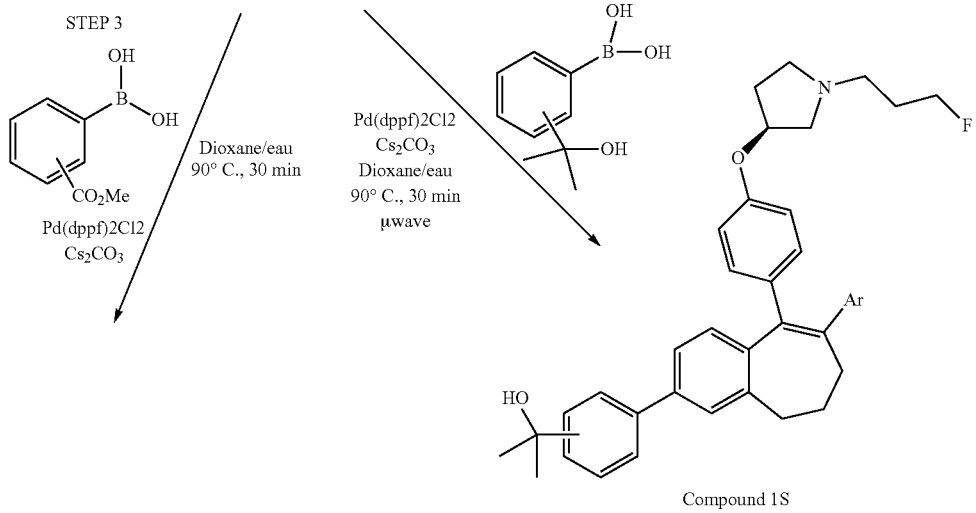

Compound 1S

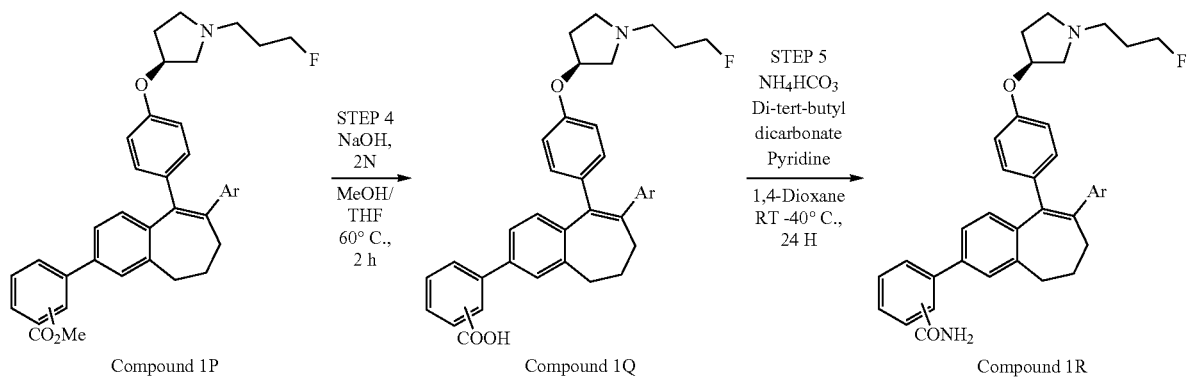

Compound 1P          Compound 1Q          Compound 1R

According to SCHEME 1g, in which Ar is defined as described above, compound 1B (prepared according to WO2017140669), can be converted in STEP 1 to compound 1N, with 3-pyrazole boronic acid in Suzuki conditions. Compound 1B, can be converted in STEP 2 to compound 1O, with hydroxyphenyl boronic acid in Suzuki conditions. Compound 1B, can be converted in STEP 3 to compound 1P, with methoxycarbonylphenyl boronic acid in Suzuki conditions. Compound 1P can be converted to compound 1Q in STEP 4 with NaOH in a mixture of MeOH and THF, at 60° C. Compound 1Q can be converted in STEP 5 to compound 1R by treatment for example with NH₄HCO₃ and di-tert-butyl dicarbonate, in presence of a base such as pyridine, in solution in 1,4-dioxane at room temperature or above. Compounds 1B can be converted in STEP 6 to compound 1S, with the corresponding boronic acid in Suzuki conditions.

SCHEME 1h: Preparation of compounds of the formula (I) - General process

STEP 1

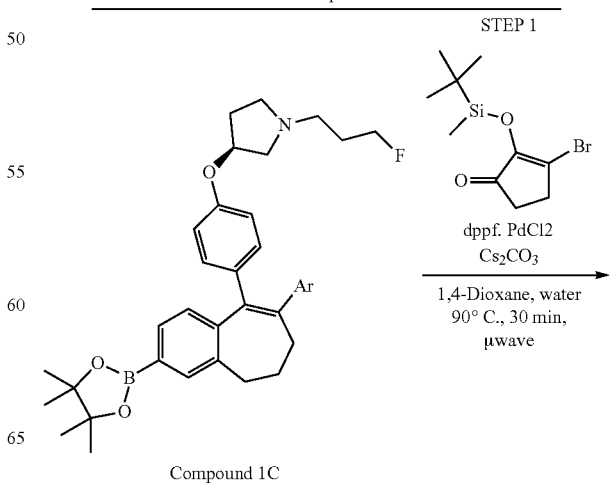

Compound 1C

27
-continued

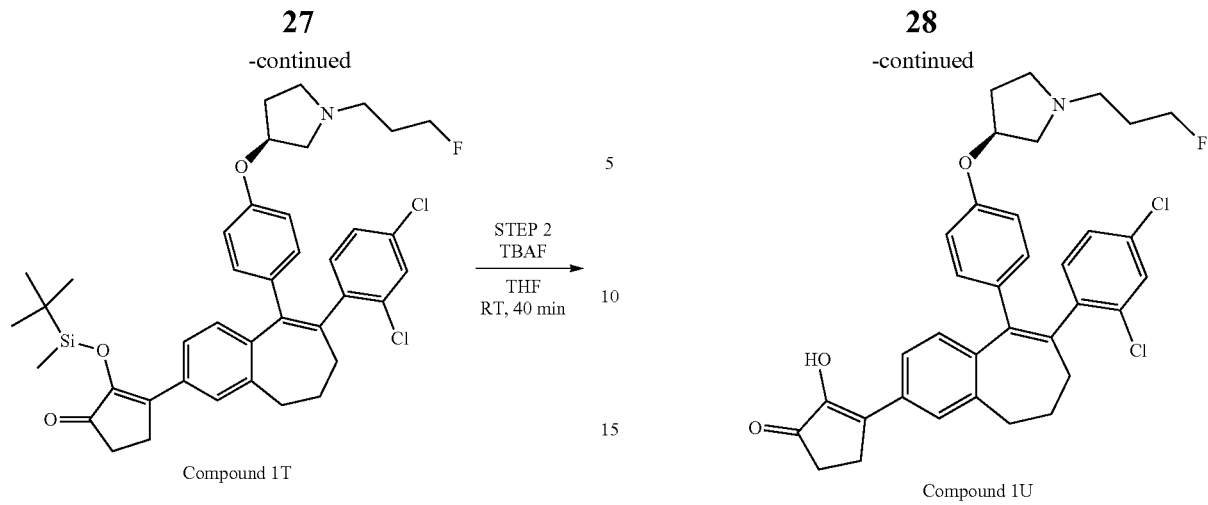

Compound 1T

28
-continued

Compound 1U

According to SCHEME 1 h, in which Ar is defined as described above, compound 1C (Scheme 1a), can be converted in STEP 1 to the corresponding compound 1T, by treatment with 3-bromo-2-((tert-butyldimethylsilyl)oxy)cyclopent-2-en-1-one, in Suzuki conditions. This intermediate can be converted in STEP 2 to compound 1U by treatment with TBAF, in THF at room temperature.

SCHEME 1h: Preparation of compounds of the formula (I) - General process

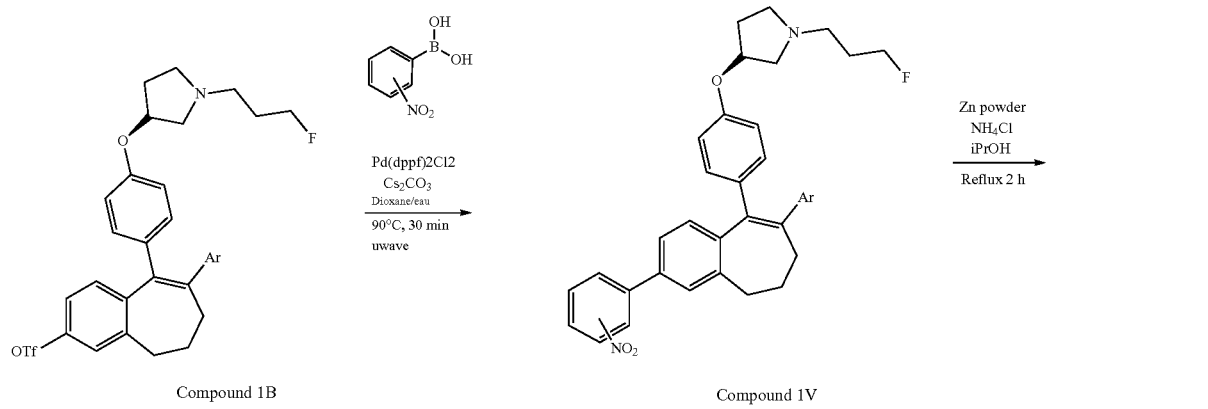

Compound 1B

Compound 1V

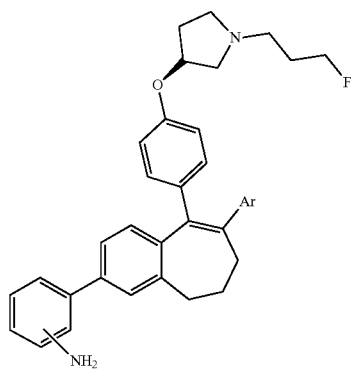

Compound 1W

According to SCHEME 1i, in which Ar is defined as described above, compound 1B (prepared according to WO2017140669), can be converted in STEP 1 to compound 1V, for example with nitro boronic acid in Suzuki conditions. Compound 1V, can be converted in STEP 2 to compound 1W, for example with zinc powder and $NH_4Cl$ in iPrOH at reflux.

SCHEME 2a: Preparation of compounds of the formula (I) - General process

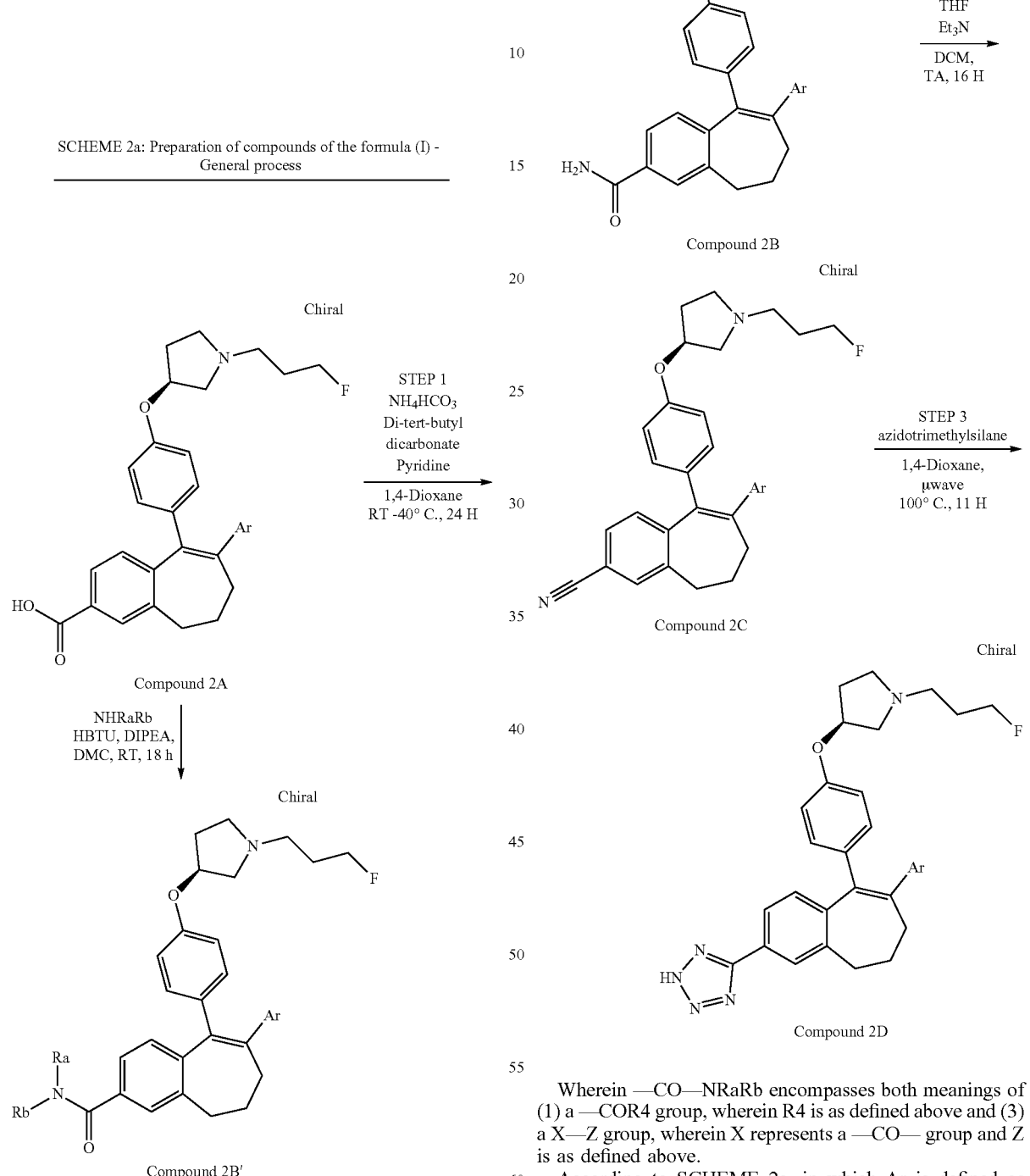

Wherein —CO—NRaRb encompasses both meanings of (1) a —COR4 group, wherein R4 is as defined above and (3) a X—Z group, wherein X represents a —CO— group and Z is as defined above.

According to SCHEME 2a, in which Ar is defined as described above, compound 2A (prepared according to WO2017140669), can be converted in STEP 1 to compound 2B, for example by treatment for example with $NH_4HCO_3$ and di-tert-butyl dicarbonate, in presence of a base such as pyridine, in solution in 1,4-dioxane at room temperature or above. compound 2A can also be converted to compound 2B' with the corresponding NHRaRb amine, in which Ra and Rb are defined as indicated above, in the presence of a coupling agent such as HBTU. Compound 2B can be converted as in STEP 2 to compound 2C, with TFA, and TEA, in DCM at room temperature for 16 hours. Compound 2C can be converted as in STEP 3 to compound 2D, with azidotrimethylsilane, in 1,4-dioxane, at 100° C. for 11 hours, in a microwave apparatus.

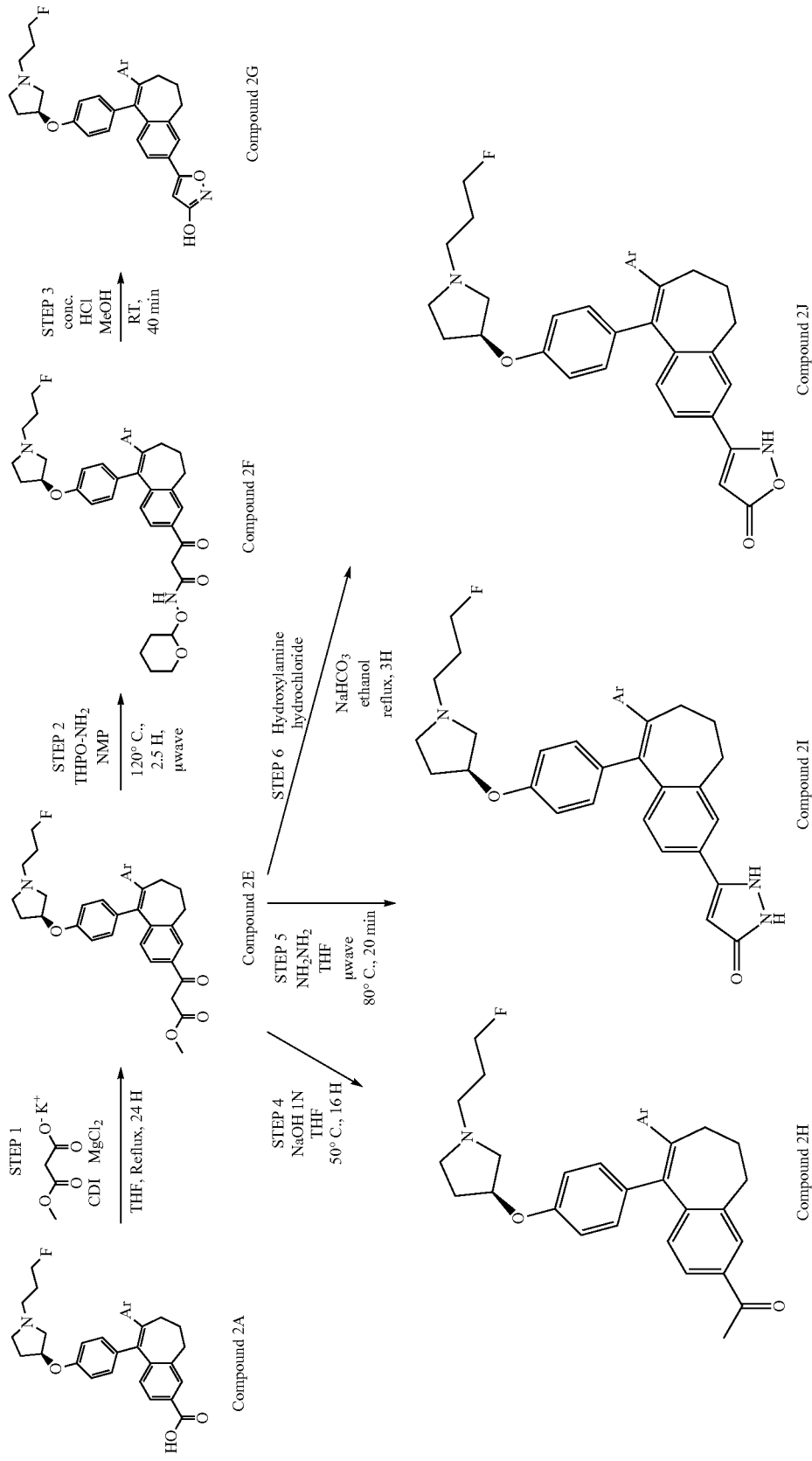

According to SCHEME 2b, in which Ar is defined as described above, compound 2A (prepared according to WO2017140669), can be converted in STEP 1 to compound 2E, for example by treatment with CDI, methyl potassium malonate, and $MgCl_2$ in THF under reflux for 24 hours. Compound 2E can be converted in STEP 2 to compound 2F with THPO-$NH_2$ (O-(tetrahydro-2H-pyran-2-yl)hydroxylamine), in NMP, at 120° C., for 2.5 hours in a microwave apparatus. Compounds 2F can be converted in STEP 3 to compound 2G, with concentrated HCl, in MeOH at room temperature. Compound 2E can also be converted in STEP 4 to compound 2H, with NaOH 1N, in THF at 50° C. Compound 2E can likewise be converted in STEP 5 to compound 2I, for example with hydrazine hydrate, in THF, at 80° C., in microwave apparatus. Compound 2E can furthermore be converted in STEP 6 to compound 2J, for example with hydroxylamine hydrochloride, in refluxing EtOH.

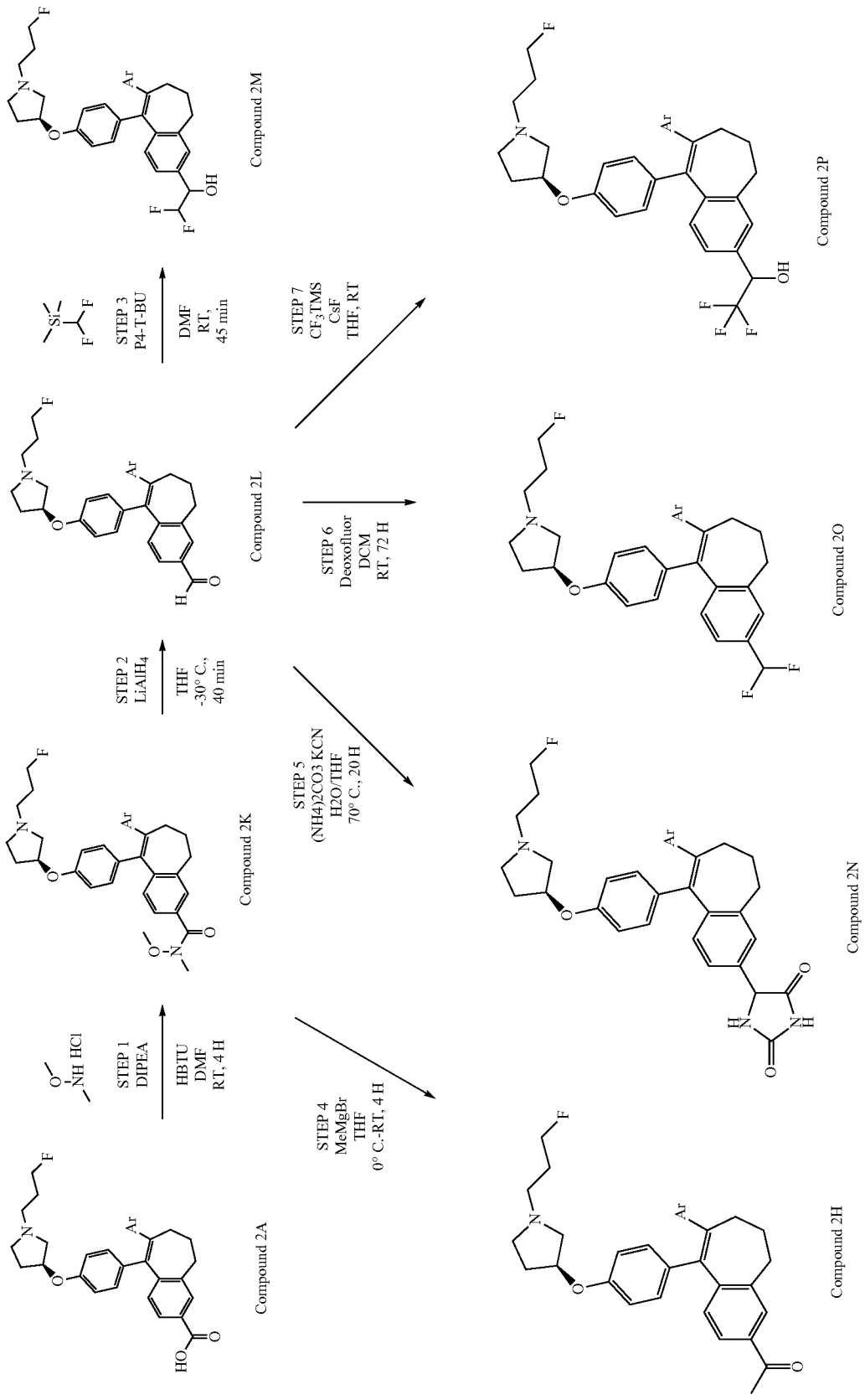

According to SCHEME 2c, in which Ar is defined as described above, compound 2A (prepared according to WO2017140669), can be converted in STEP 1 to the corresponding compound 2K, for example with N,O-dimethyl hydroxylamine hydrochloride, DIPEA, HBTU, in DMF, at room temperature for 4 hours. Compound 2K can be converted in STEP 2 to compound 2L, with $LiAlH_4$, in THF at −30° C. for 45 minutes. This compound 2L may be converted in STEP 3 to compound 2M, for example with (difluoromethyl)trimethylsilane, and P4-T-BU, in DMF at room temperature for 45 minutes. Compound 2K can be converted in STEP 4 to compound 2H, for example with a Grignard reagent, such as methylmagnesium bromide, in THF at 0° C. Compound 2L can also be converted in STEP 5 to compound 2N, for example with $NH_4CO_3$ and potassium cyanide in THF and water at 70° C. Compound 2L can likewise be converted in STEP 6 to compound 2O, for example with deoxofluor (bis(2-methoxyethyl)aminosulfur trifluoride), in DCM, at room temperature for 24 hours. Compound 2L can furthermore be converted in STEP 7 to compound 2P, for example with trifluoromethyl trimethylsilane, and cesium fluoride in THF at room temperature.

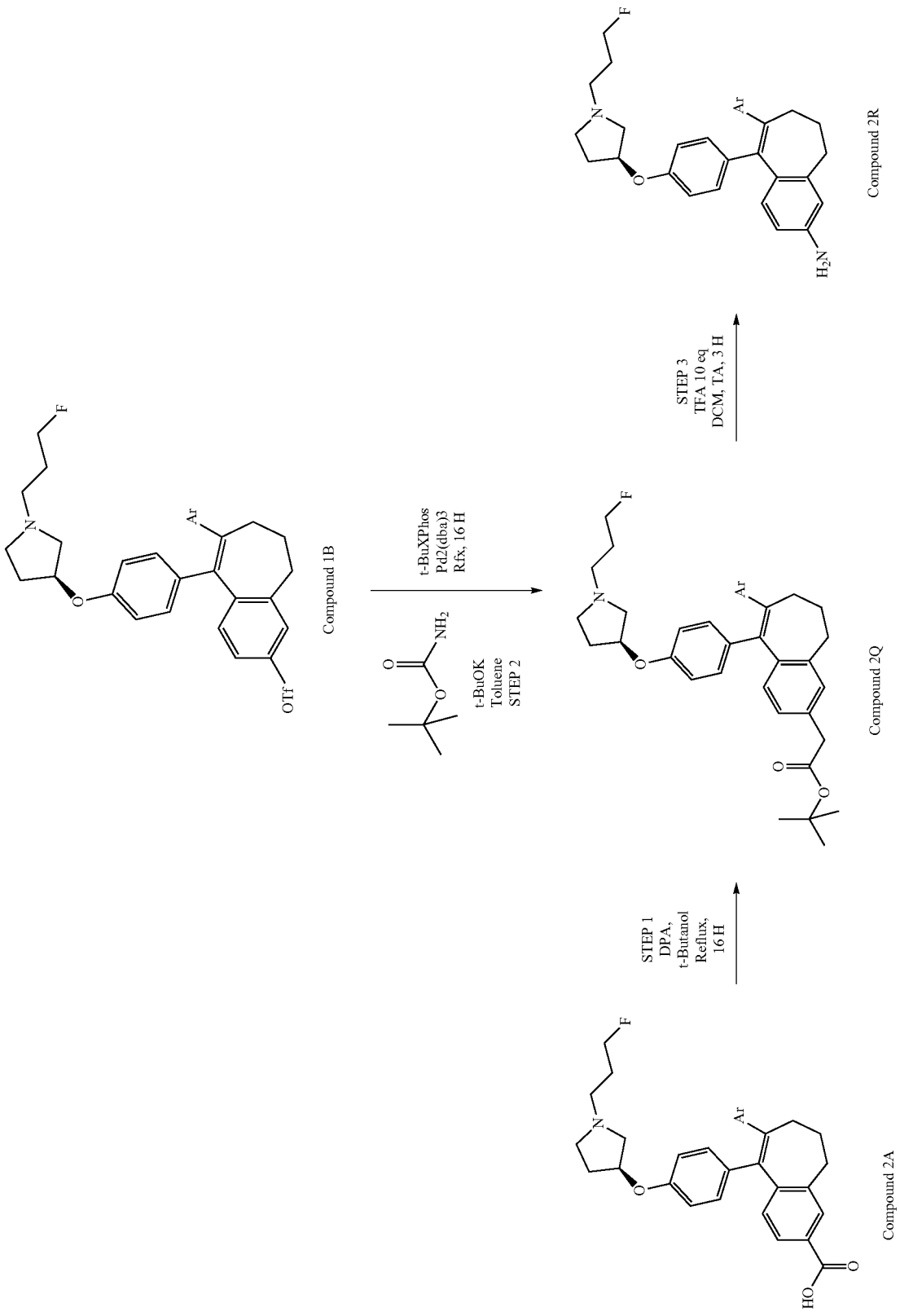

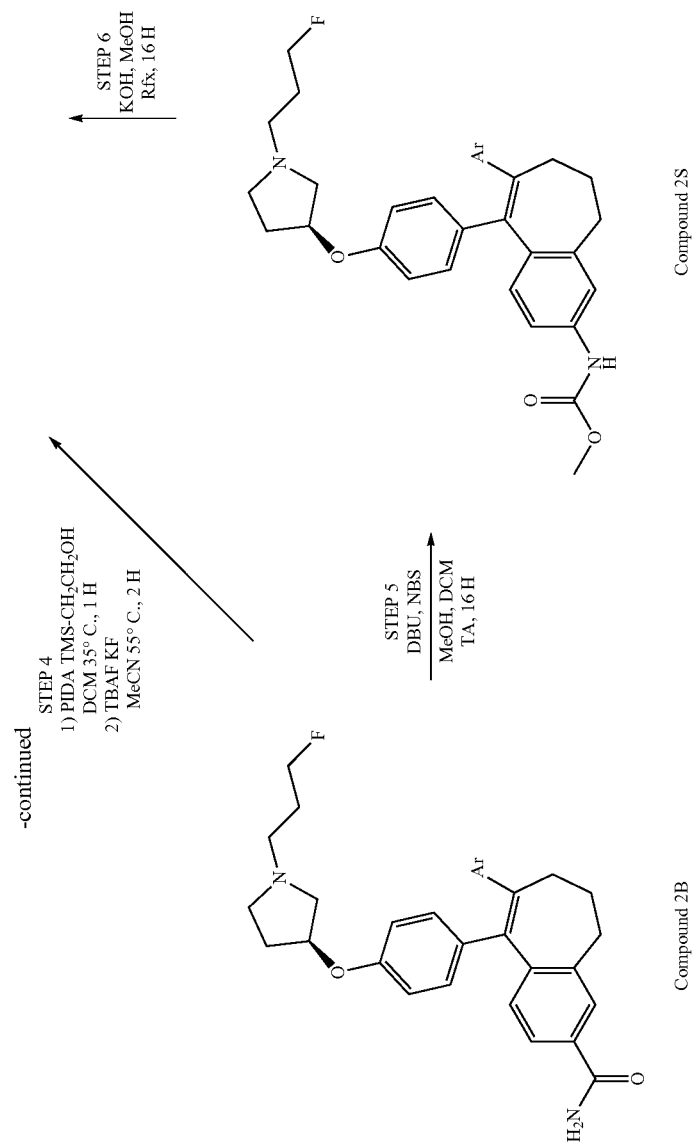

According to SCHEME 2d, in which Ar is defined as described above, compound 2Q can be obtained in STEP 1 from compound 2A (prepared according to WO2017140669), for example with DPA, in refluxing tert-butanol, for 16 hours. Compound 2Q can also be obtained from compound 1B in STEP 2, for example with tert-butyl carbamate, potassium tert-butoxide, tBuXPhos, $Pd_2(dba)_3$, in refluxing toluene. Compound 2Q can be converted in STEP 3 to compound 2R, for example in acidic conditions such as TFA, in DCM at room temperature. Compound 2R can also be obtained from compound 2B in STEP 4, reacting first with PIDA, 2-(trimethylsilyl)ethanol, in DCM at 35° C., then with TBAF, and potassium fluoride in MeCN, at 55° C. Compound 2B can also be converted in STEP 5 to compound 2S, for example with DBU, NBS, in a mixture of solvents such as MeOH, and DCM at room temperature. Compound 2S can be converted in STEP 6 to compound 2R, for example with potassium hydroxide in refluxing MeOH.

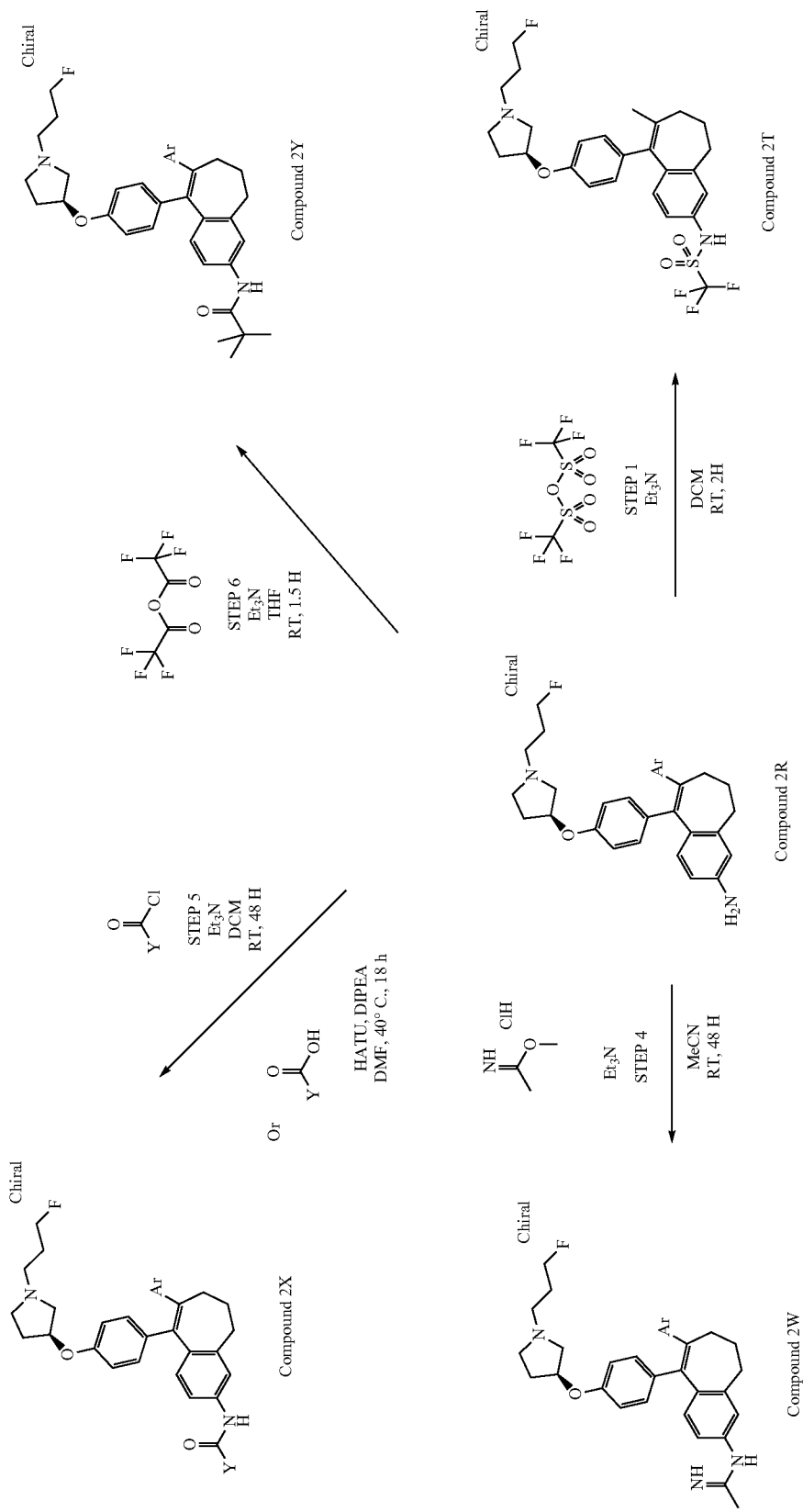

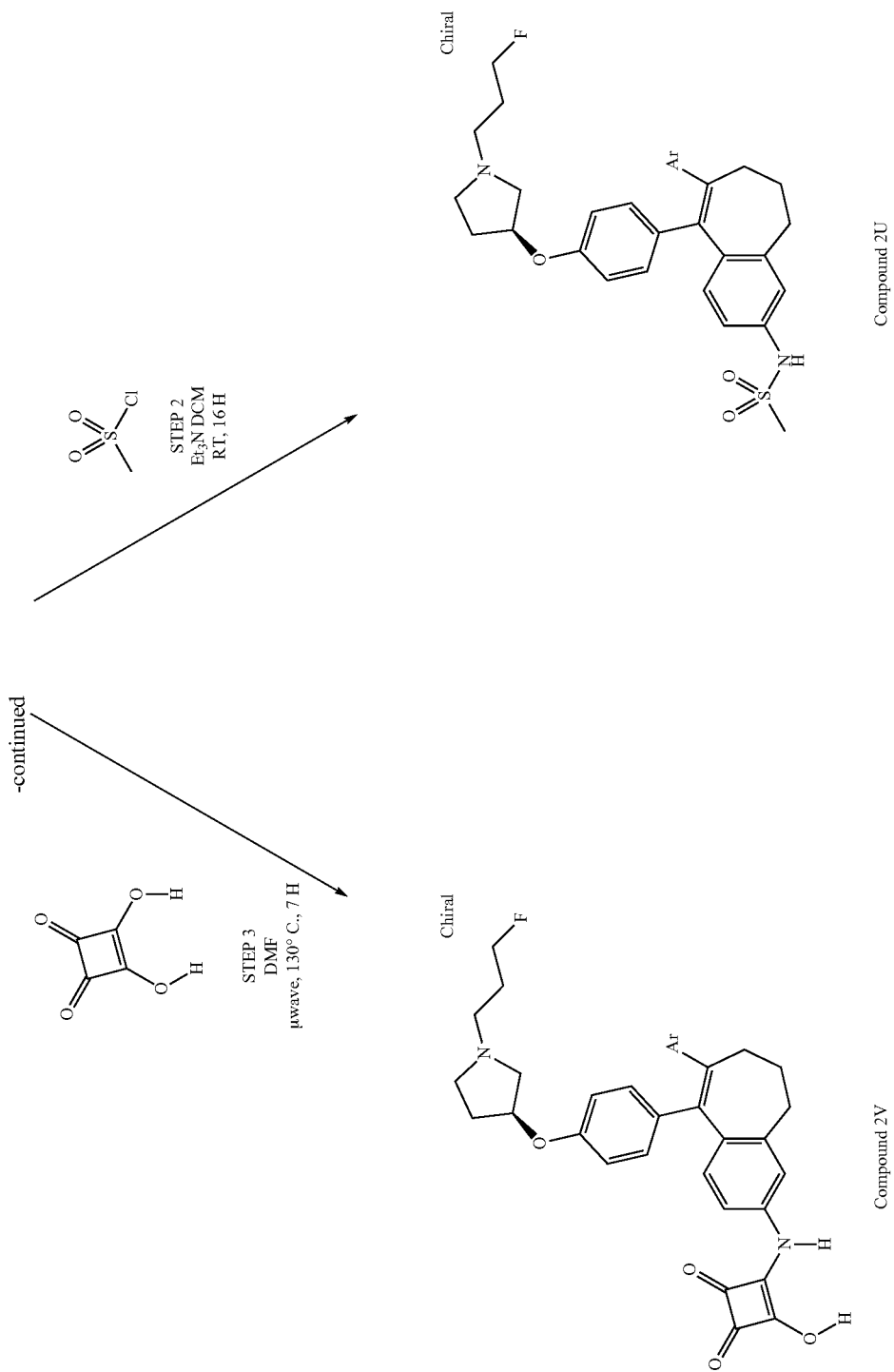

Wherein the —NH—COY group encompasses both meanings of (3) a X—Z group, wherein X represents a —NHCO and Z is as defined above and (8) a —NH—COR9 group, wherein R9 is as defined above.

According to SCHEME 2e, in which Ar is defined as described above, compound 2R can be converted in STEP 1 to compound 2T, for example with trifluoromethane sulfonic anhydride, in the presence of TEA, in DCM at room temperature. Compound 2R can be converted in STEP 2 to compound 2U, for example with sulfonic chloride, in the presence of TEA, in DCM at room temperature. Compound 2R can be converted in STEP 3 to compound 2V, for example with squaric acid, in DMF, at 130° C. in microwave apparatus. Compound 2R can be converted in STEP 4 to compound 2W, for example with methyl acetimidate hydrochloride, in the presence of TEA, in MeCN at room temperature. Compound 2R can be converted in STEP 5 to compound 2X, with for example an alcoyl chloride where Z and R9 are defined as described above, in the presence of TEA, in DCM at room temperature, or with a carboxylic acid where Z and R9 are defined as described above in presence of a coupling agent such as HATU, or EDAC in presence of a tertiary amine in DMF. Compound 2R can be converted in STEP 6 to compound 2Y, for example with trifluoracetic anhydride, in the presence of TEA, in THF at room temperature.

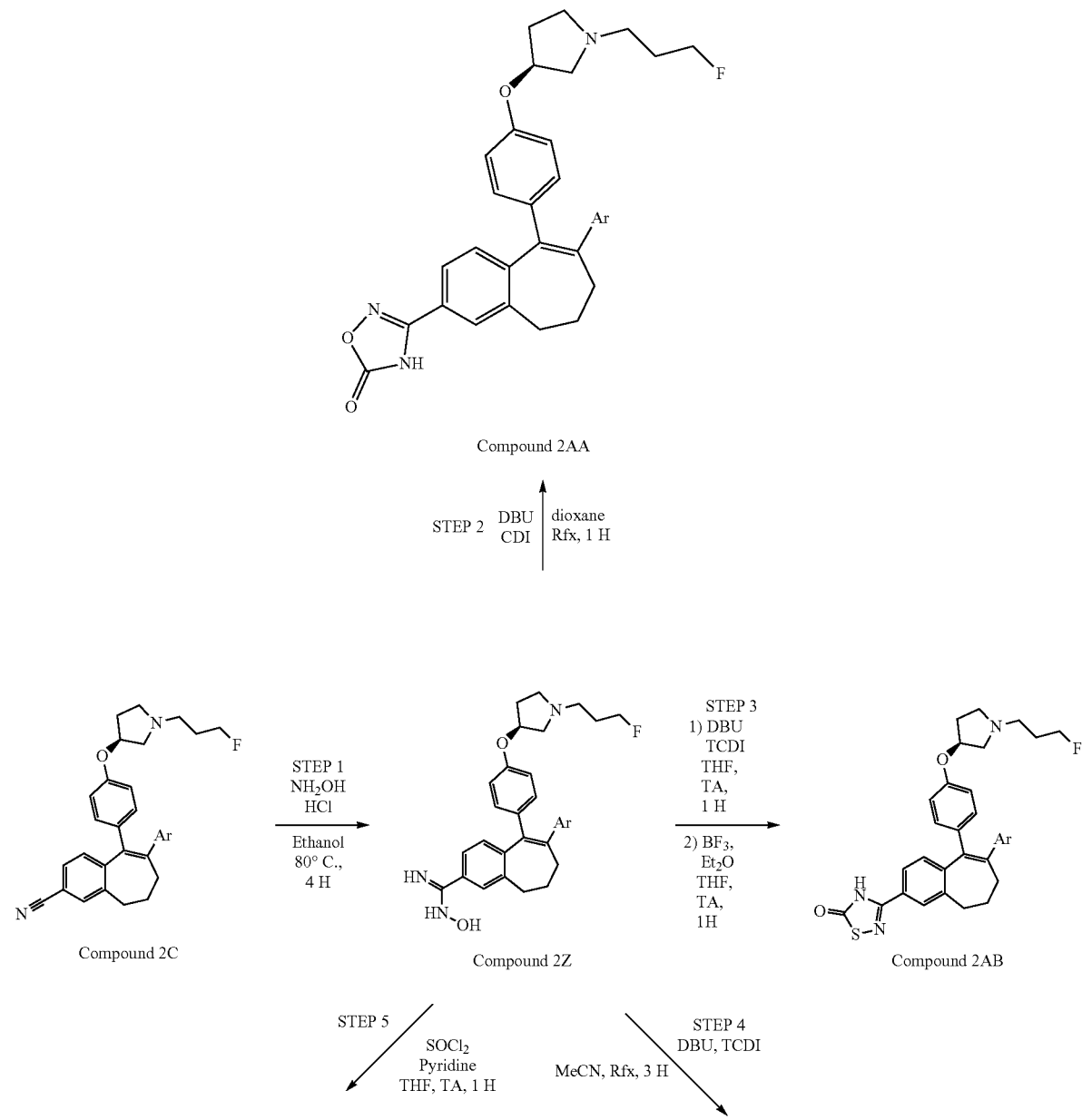

SCHEME 2f: Preparation of compounds of the formula (I) - General process

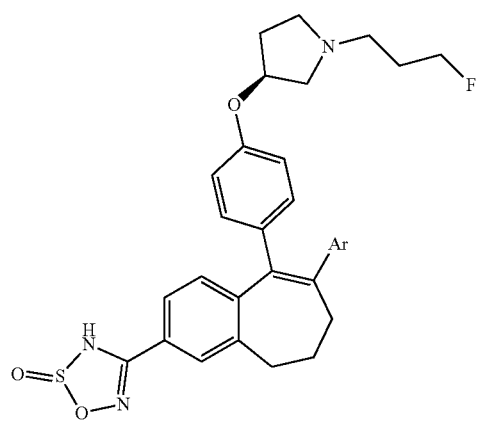

Compound 2AD

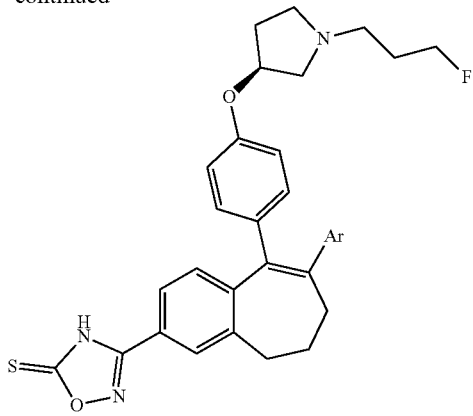

Compound 2AC

According to SCHEME 2f, in which Ar is defined as described above, compound 2C can be converted in STEP 1 to compound 2Z, with hydroxylamine hydrochloride, in EtOH at 80° C. Compound 2Z can be converted in STEP 2 to compound 2AA, with DBU, and CDI, at refluxing 1,4-dioxane. Compound 2Z can be converted in STEP 3 to compound 2AB, treating first with DBU, and TCDI, in THF at room temperature, then adding boron trifluoride-diethyl etherate. Compound 2Z can be converted in STEP 4 to compound 2AC, treating with DBU, and TCDI, in refluxing MeCN. Compound 2Z can be converted in STEP 5 to compound 2AD, treating with thionyl chloride, in presence of pyridine, in THF at room temperature.

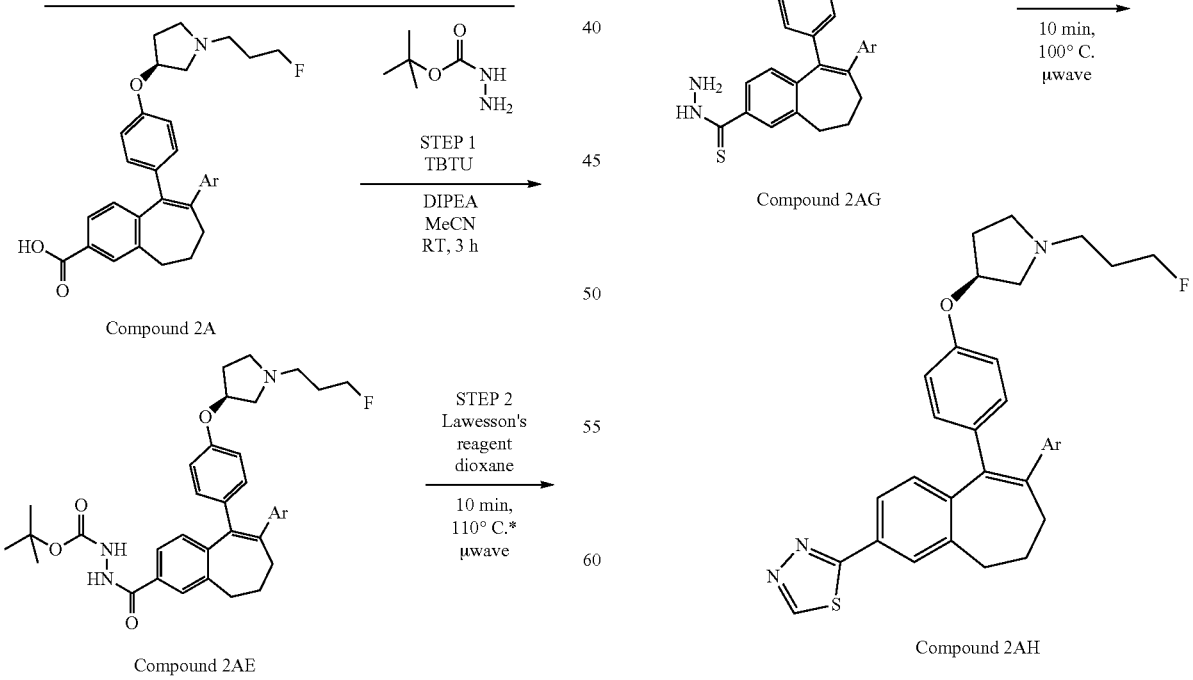

According to SCHEME 2g, in which Ar is defined as described above, compound 2A (prepared according to WO2017140669), can be converted in STEP 1 to compound 2AE, with tert-Butyl carbazate, TBTU, and DIPEA in MeCN at room temperature. Compound 2AE can be converted in STEP 2 to compound 2AF, with Lawesson' reagent in 1,4-dioxane, at 110° C., in a microwave apparatus.

Compound 2AF can be converted in STEP 3 to compound 2AG, with hydrochloric acid 4N in 1,4-dioxane, at room temperature. Compound 2AG can be converted in STEP 4 to compound 2AH, with triethyl orthoformate, at 100° C., in a microwave apparatus.

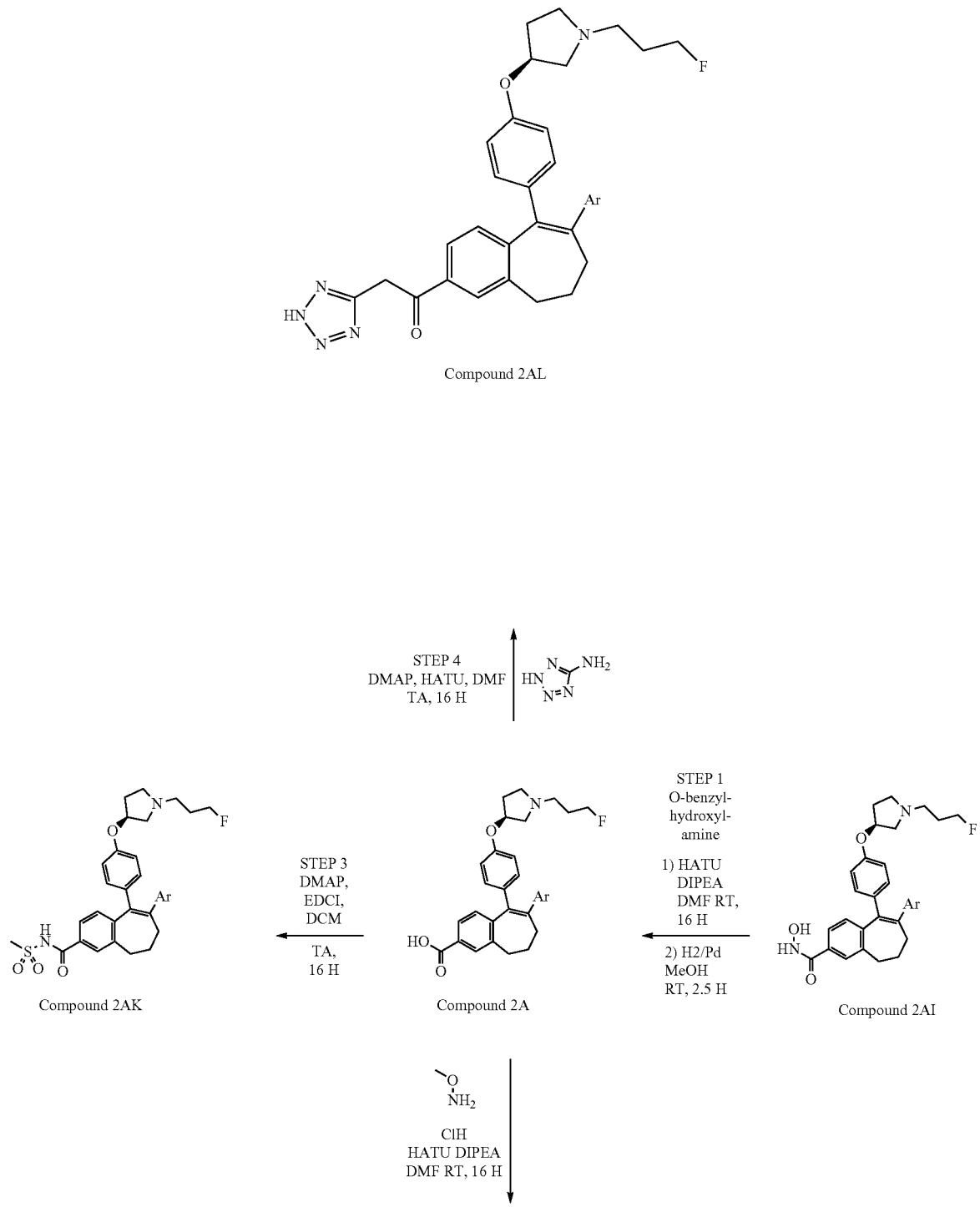

SCHEME 2h: Preparation of compounds of the formula (I)-General process

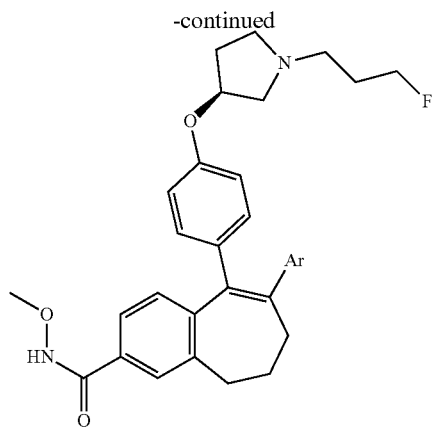

Compound 2AJ

According to SCHEME 2 h, in which Ar is defined as described above, compound 2A (prepared according to WO2017140669), can be converted in STEP 1 to compound 2AI, reacting first with O-benzylhydroxylamine, HATU, and DIPEA in DMF, for 16 hours, and hydrogenating with palladium on carbon in MeOH at room temperature. Compound 2A can be converted in STEP 2 to compound 2AJ, with O-methylhydroxylamine hydrochloride, HATU, and DIPEA in DMF, at room temperature. Compound 2A can be converted in STEP 3 to compound 2AK, with DMAP and EDCI in DCM, at room temperature. Compound 2A can be converted in STEP 4 to compound 2AL, with amino tetrazole, HATU, and DMAP in DMF, at room temperature.

SCHEME 2i: Preparation of compounds of the formula (I) - General process

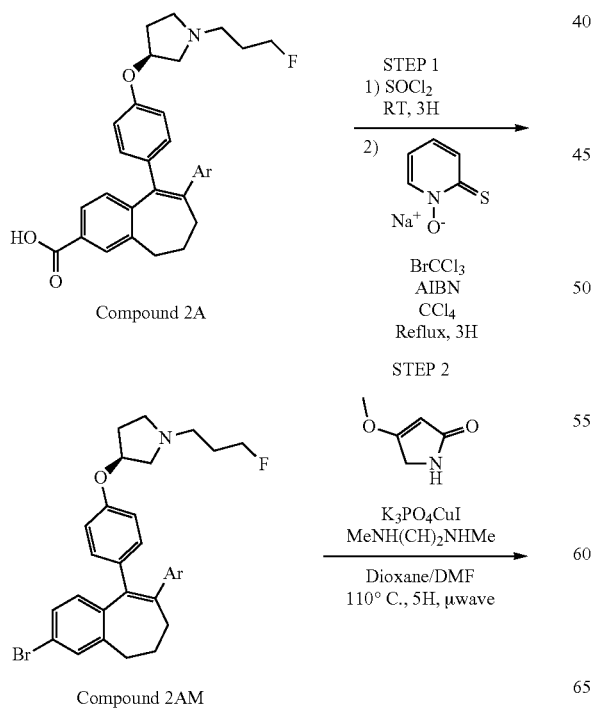

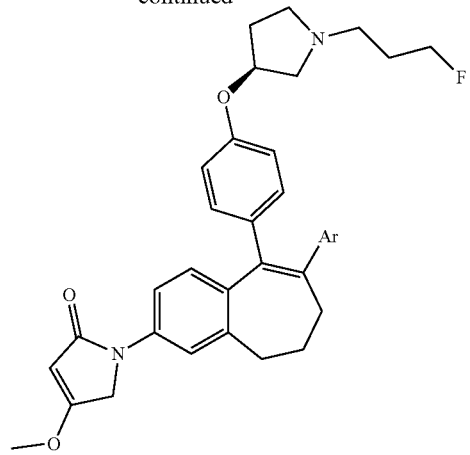

Compound 2AN

According to SCHEME 2i, in which Ar is defined as described above, compound 2A (prepared according to WO2017140669), can be converted in STEP 1 to compound 2AM, using Barton's conditions, reacting first with thionyl chloride at room temperature for 3 hours, followed by 2-mercaptopyridine N-oxide sodium salt, and AIBN (2,2'-azobisisobutyronitrile), in a mixture of bromotrichloromethane and carbon tetrachloride at reflux temperature for 3 hours. Compound 2AM can be converted in STEP 2 to compound 2AN, in Ullmann's condition with 4-methoxy-3-pyrrolin-2-one, potassium phosphate, copper iodide, N,N'-dimethyl ethylene diamine, in a mixture of 1,4-dioxane, and DMF, at 110° C. in a microwave apparatus.

SCHEME 2j: Preparation of compounds of the formula (I) - General process
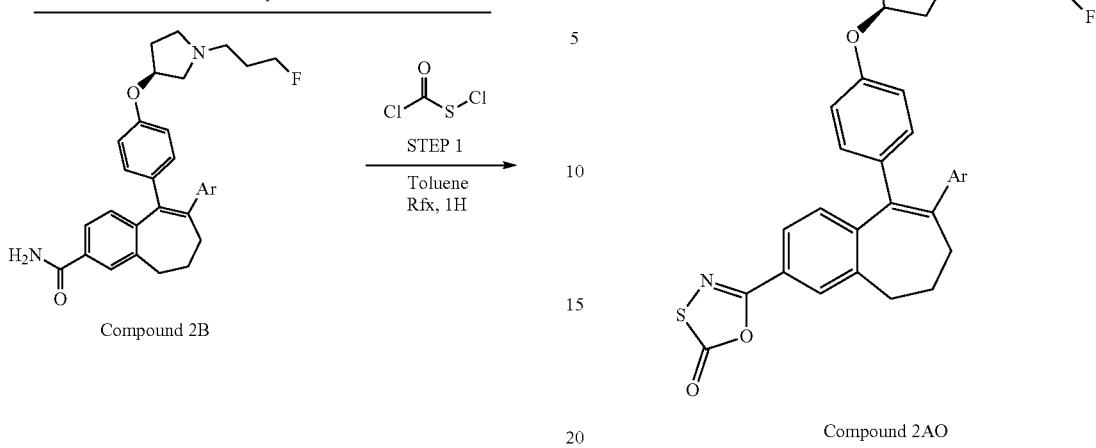
According to SCHEME 2j, in which Ar is defined as described above, compound 2B can be converted in STEP 1 to compound 2AO with chlorocarbonylsulfenyl chloride, in refluxing toluene.
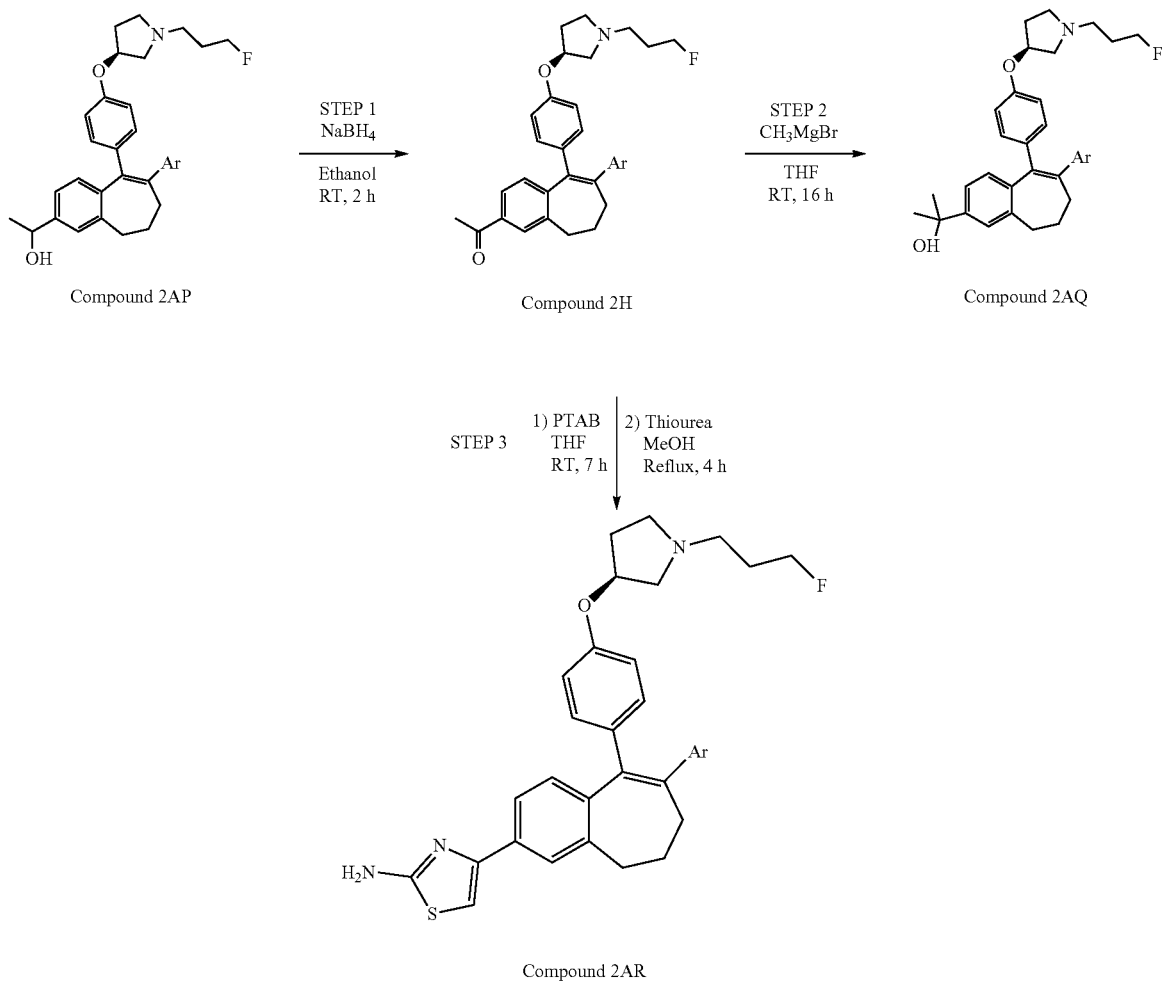

According to SCHEME 2k, in which Ar is defined as described above, compound 2H (Scheme 2c), can be converted in STEP 1 to the corresponding compound 2AP with NaBH₄, in EtOH, at room temperature. Compound 2H (Scheme 2c), can be converted in STEP 2 to the corresponding compound 2AQ with MeMgBr, in THF, at room temperature. Compound 2H (Scheme 2c), can be converted in STEP 3 to the corresponding compound 2AR treating first with PTAB, in THF, at room temperature, and followed by reacting with thiourea in refluxing MeOH.

SCHEME 2l: Preparation of compounds of the formula (I) - General process

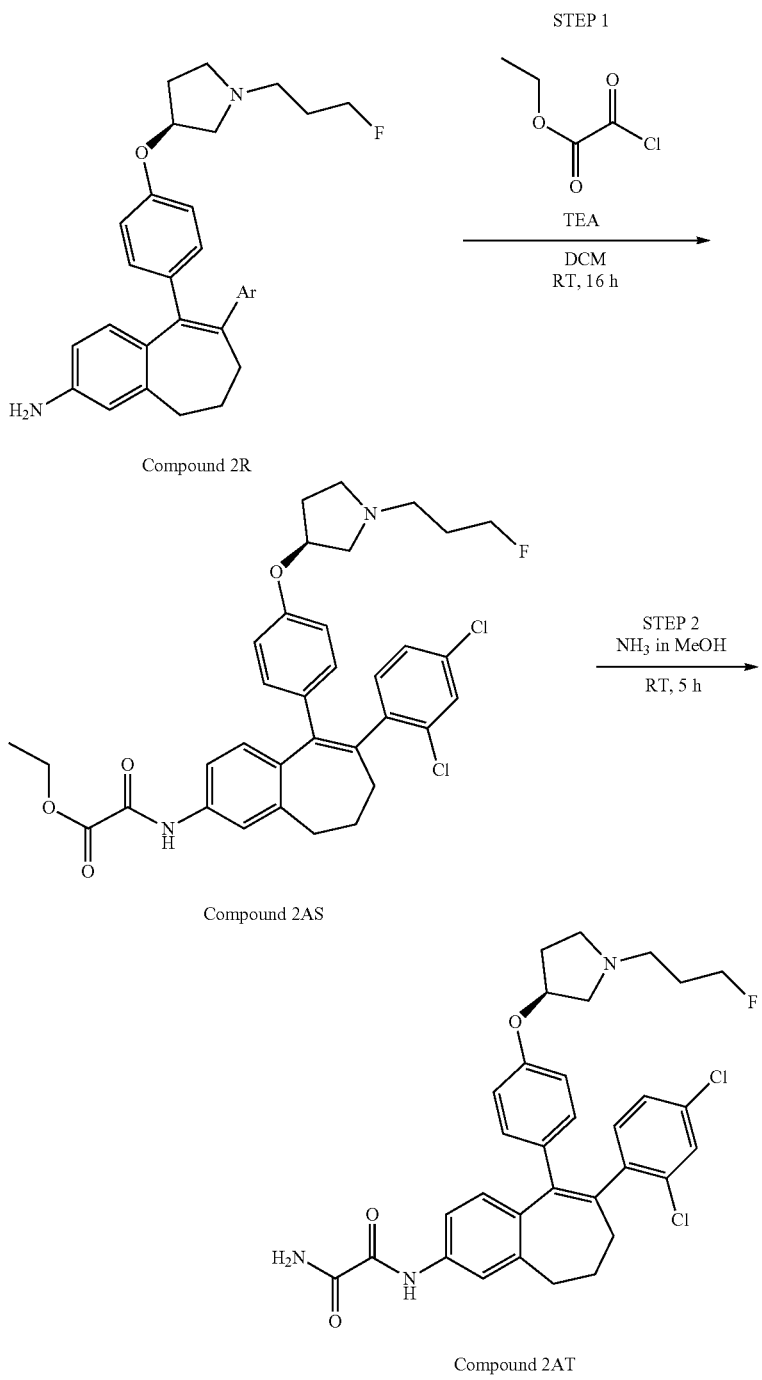

According to SCHEME 2l, in which Ar is defined as described above, compound 2R (Scheme 2d), can be converted in STEP 1 to the corresponding compound 2AS with ethyloxalyl chloride, and TEA in DCM, at room temperature. compound 2AS, can be converted in STEP 2 to the corresponding compound 2AT with ammonia, in MeOH, at room temperature.

SCHEME 2m: Preparation of compounds of the formula (I) - General process

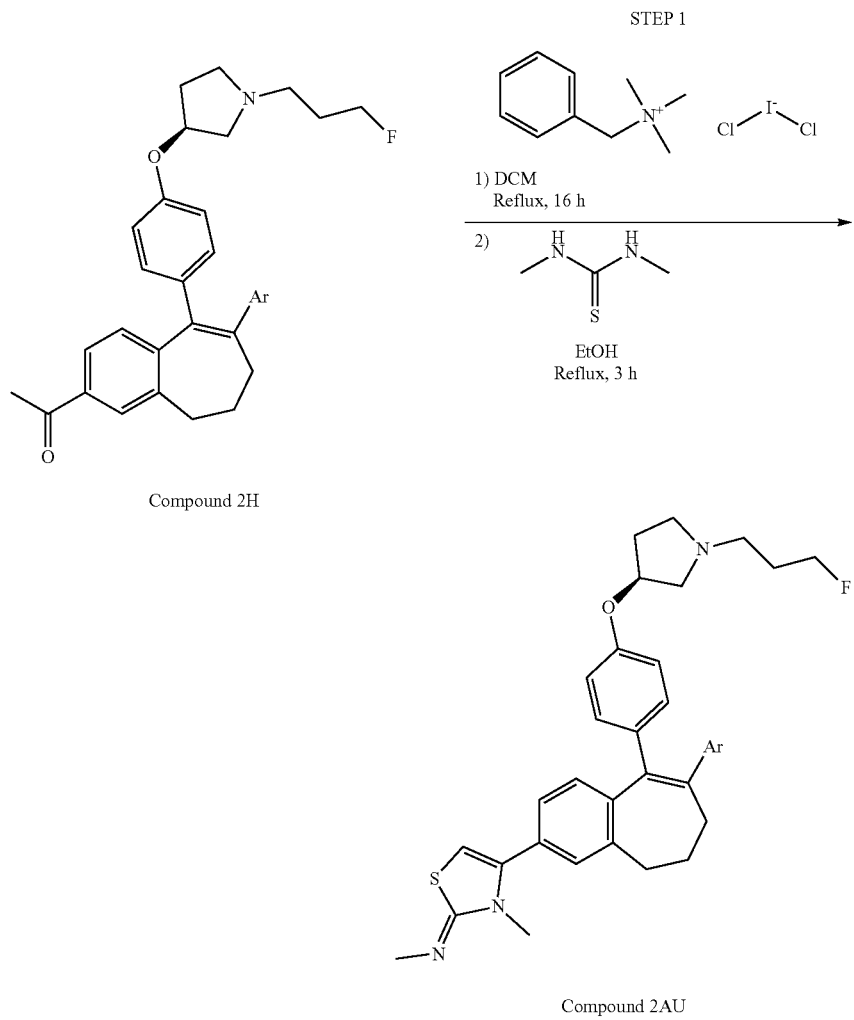

Compound 2H

Compound 2AU

According to SCHEME 2m, in which Ar is defined as described above, compound 2H (Scheme 2c), can be converted in STEP 1 to the corresponding compound 2AU treating first with benzyltrimethylammonium dichloroiodate, in refluxing DCM for 16 hours, then with N,N'-dimethylthiourea in refluxing EtOH for 3 hours.

SCHEME 2n: Preparation of compounds of the formula (I) - General process

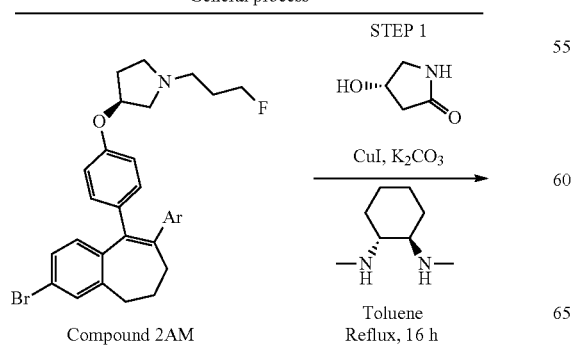

Compound 2AM

-continued

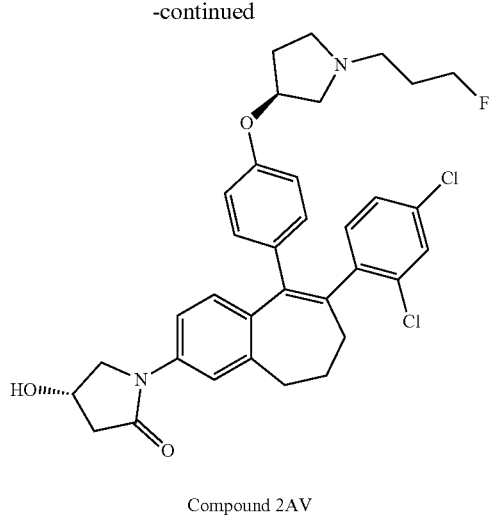

Compound 2AV

According to SCHEME 2n, in which Ar is defined as described above, compound 2AM (Scheme 2i), can be converted in STEP 1 to compound 2AV, using (S) hydroxy-2-pyrrolidinone, (1R,2R)—N,N'-dimethyl-1,2-cyclohexanediamine, cuprous iodide, potassium carbonate in refluxing toluene for 16 hours.
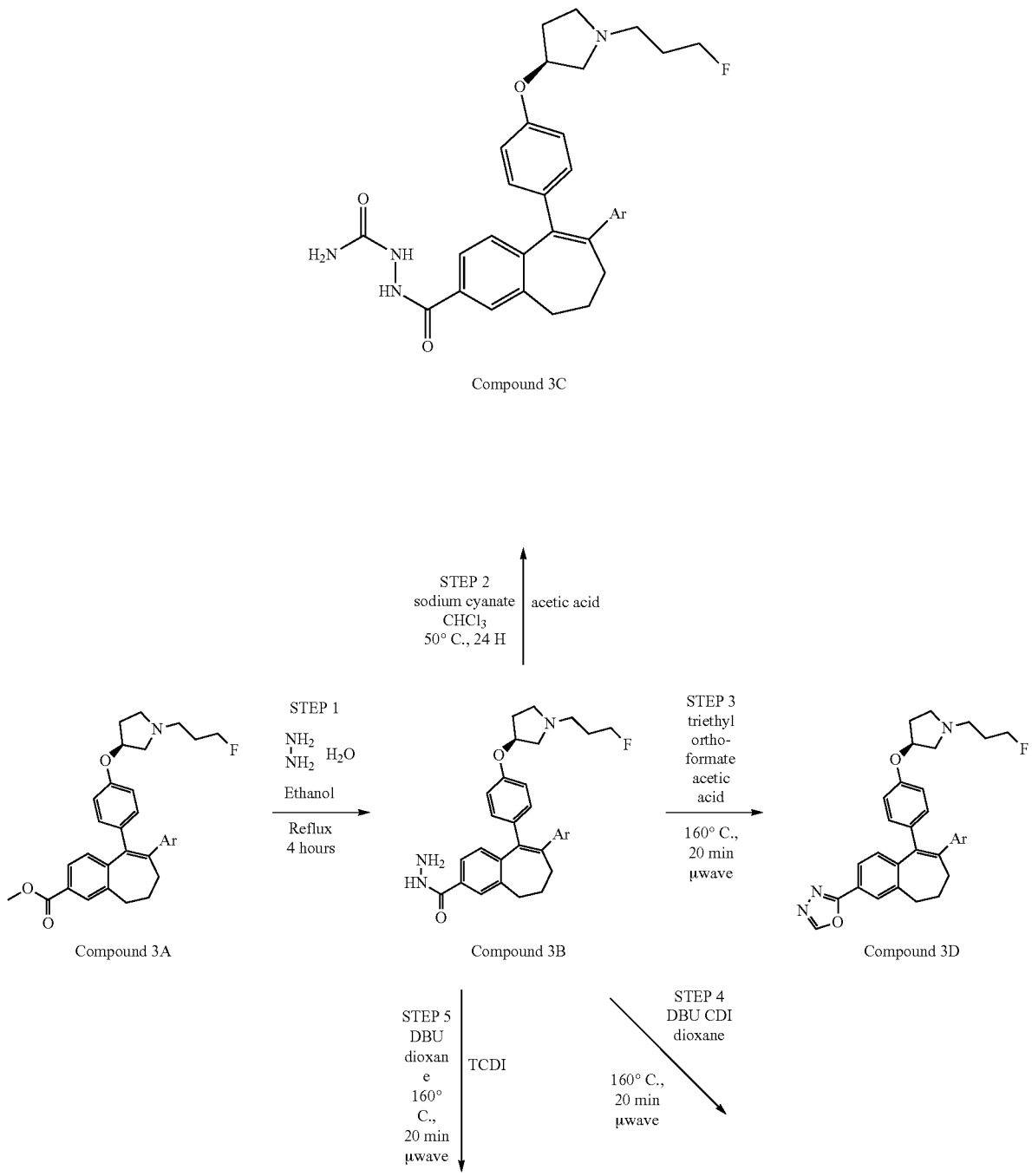
SCHEME 3a: Preparation of compounds of the formula (I) - General process

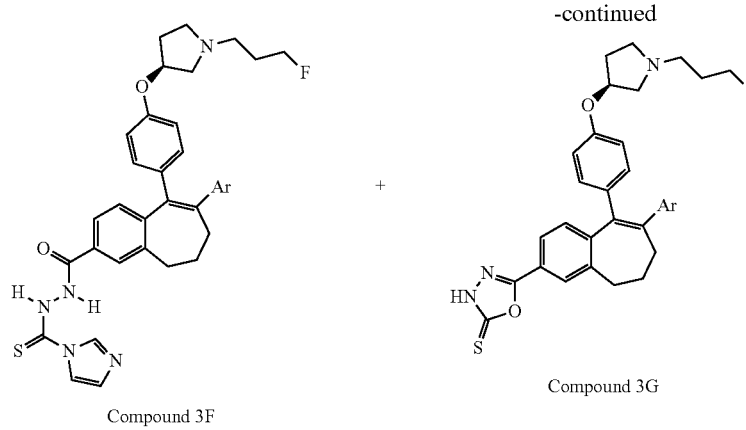

Compound 3F

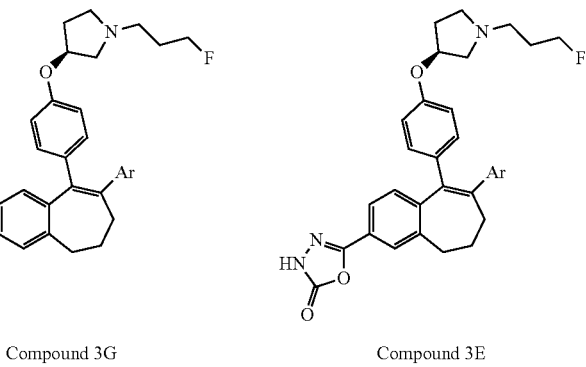

Compound 3G              Compound 3E

According to SCHEME 3a, in which Ar is defined as described above, compound 3A (prepared according to WO2017140669), can be converted in STEP 1 to the corresponding compound 3B, with hydrazine hydrate in EtOH at reflux for 4 hours. Compound 3B can be converted in STEP 2 to compound 3C, with sodium cyanate and acetic acid in a solvent such as chloroform at 50° C., for 24 hours. Compound 3B can be converted in STEP 3 to compound 3D, with triethyl orthoformate, in solution in acetic acid, at 160° C., for 20 minutes in a microwave apparatus. Compound 3B can be converted in STEP 4 to compound 3E, with DBU, and CDI, in 1,4-dioxane, at 160° C., for 20 minutes in a microwave apparatus. Compound 3B can be converted in STEP 5 to compound 3F, and compound 3G with DBU, and TCDI, in 1,4-dioxane, at 160° C., for 20 minutes in a microwave apparatus.

SCHEME 3b: Preparation of compounds of the formula (I) - General process

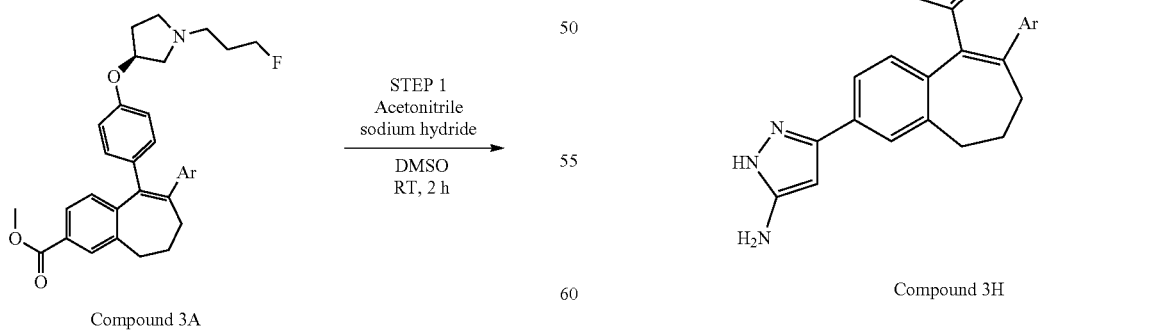

According to SCHEME 3b, in which Ar is defined as described above, compound 3A can be converted in STEP 1 to compound 3G with MeCN and sodium hydride, in DMSO at room temperature. Compound 3G can be converted to compound 3H with hydrazine hydrate in EtOH at reflux.

SCHEME 4: Preparation of compounds of the formula (I) - General process
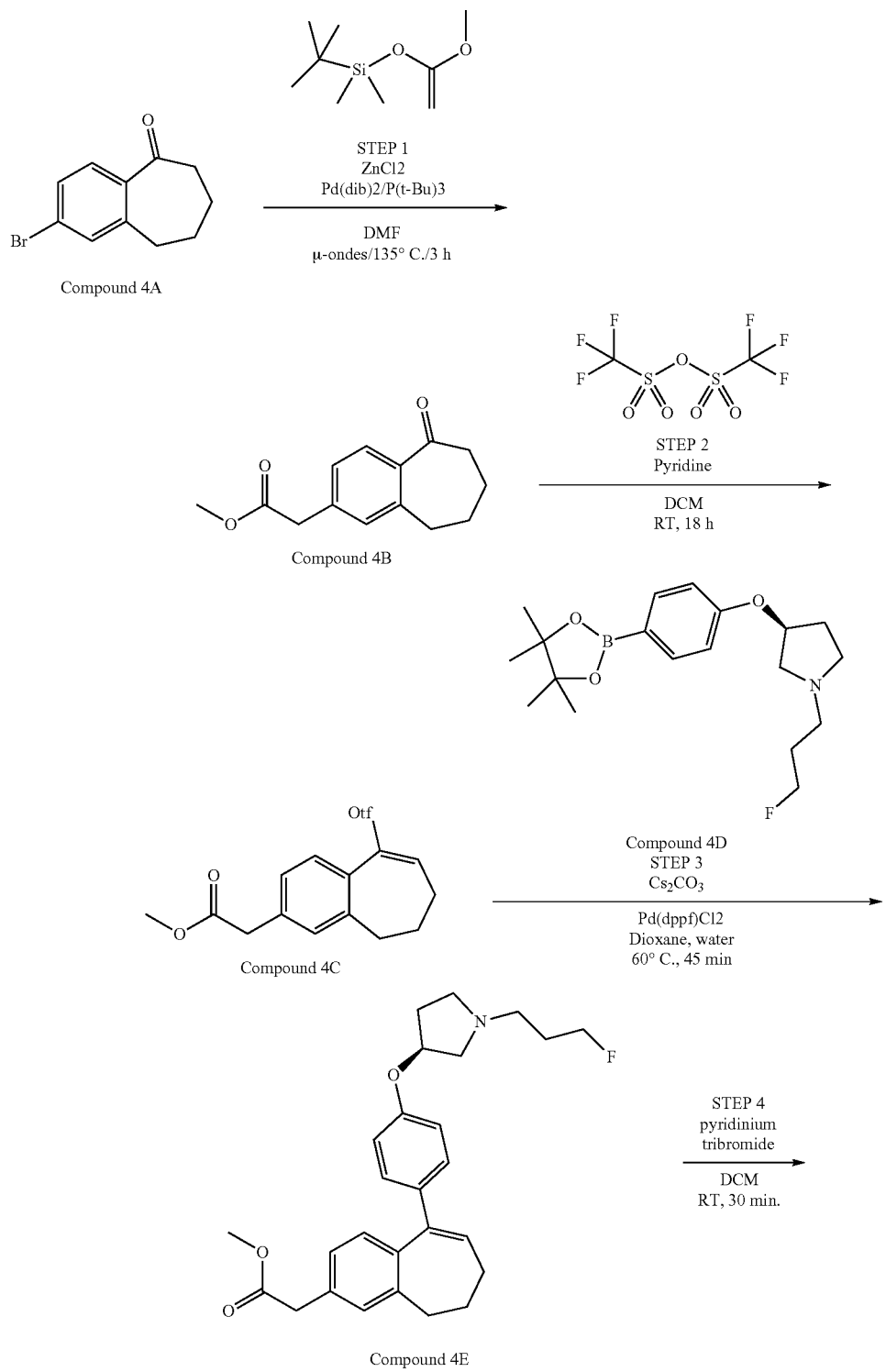

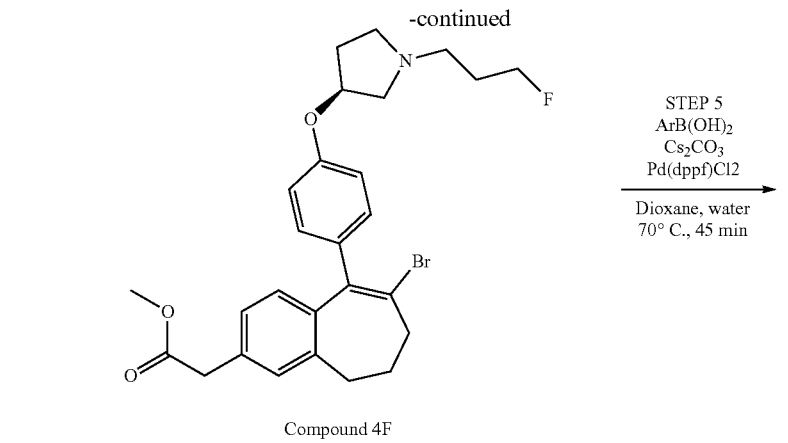

Compound 4F

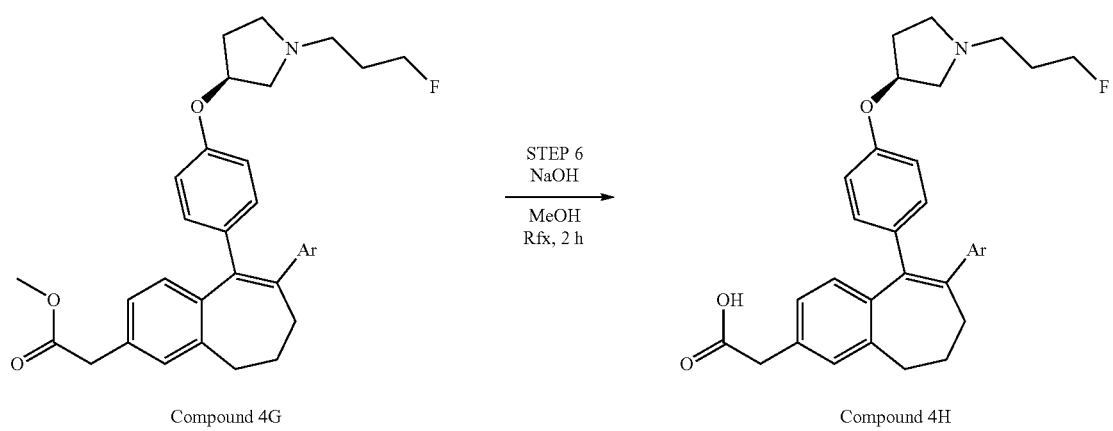

Compound 4G

Compound 4H

According to SCHEME 4, in which Ar is defined as described above, compound 4A can be converted in STEP 1 to the corresponding compound 4B with 1-(tert-butyldimethylsilyloxy)-1-methoxyethene in presence of zinc chloride and Pd(dib)2/P(t-Bu)3, in DMF at 135° C. for 3 hours in a microwave apparatus. Compound 4B can be converted to compound 4C with triflic anahydride and pyridiine in DCM at room temperature. Compound 4C can be converted to compound 4E with compound 4D (prepared according to WO2017140669), in Suzuki conditions. Compound 4E can be converted to compound 4F with pyridinium tribromide in DCM at room temperature. Compound 4F can be converted to compound 4G with an arylboronic acid in Suzuki conditions. Compound 4G can be converted to compound 4H with NaOH in MeOH under reflux.

The examples with numbers indicated in bold in Table 1 are further detailed hereafter.

The $^1$H NMR

Spectra at 400 and 500 MHz were performed on a Bruker Avance DRX-400 and Bruker Avance DPX-500 spectrometer, respectively, with the chemical shifts (δ in ppm) in the solvent dimethyl sulfoxide-d6 (d6-DMSO) referenced at 2.5 ppm at a temperature of 303 K. Coupling constants (J) are given in Hertz.

The liquid chromatography/mass spectra (LC/MS) were obtained on a UPLC Acquity Waters instrument, light scattering detector Sedere and SQD Waters mass spectrometer using UV detection DAD 210<1<400 nm and column Acquity UPLC CSH C18 1.7 μm, dimension 2.1×30 mm, mobile phase $H_2O$+0.1% $HCO_2H$/$CH_3CN$+0.1% $HCO_2H$.

TABLE 1

| Examples | Structure | Name | NMR | MASS: LC/MS (m/z, MH+): |
|---|---|---|---|---|
| 1 | | (S)-3-(4-(8-(2,4-dichlorophenyl)-3-(4,4,5,5-tetramethyl-1,3,2-dioxaborolan-2-yl)-6,7-dihydro-5H-benzo[7]annulen-9-yl)phenoxy)-1-(3-fluoropropyl)pyrrolidine | $^1$H NMR (400 MHz, DMSO-d6, δ ppm): 1.30 (s, 12 H); 1.63-1.86 (m, 3 H); 2.04-2.26 (m, 5 H); 2.31-2.69 (m, 5 H); 2.79 (m, 1 H); 2.87 (m, 2 H); 4.46 (td, J = 6.1 and 47.5 Hz, 2 H); 4.74 (m, 1 H); 6.64 (d, J = 8.9 Hz, 2 H); 6.71 (d, J = 8.9 Hz, 2 H); 6.79 (d, J = 7.8 Hz, 1 H); 7.18 (d, J = 8.4 Hz, 1 H); 7.27 (dd, J = 2.2 and 8.4 Hz, 1 H); 7.49 (dd, J = 1.2 and 7.8 Hz, 1 H); 7.58 (d, J = 2.2 Hz, 1 H); 7.63 (d, J = 1.2 Hz, 1 H) | 636 |
| 2 | | (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)boronic acid | $^1$H NMR (400 MHz, DMSO-d6, δ ppm): 1.65-1.86 (m, 3 H); 2.07-2.27 (m, 5 H); 2.35-2.92 (m, 8 H); 4.46 (td, J = 6.1 and 47.6 Hz, 2 H); 4.75 (m, 1 H); 6.63 (d, J = 8.7 Hz, 2 H); 6.70-6.75 (m, 3 H); 7.15-7.28 (m, 2 H); 7.55-7.76 (m, 3 H); 8.01 (s, 2 H) | 554 |
| 3 | | (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide | $^1$H NMR (400 MHz, DMSO-d6, δ ppm): 1.63-1.86 (m, 3 H); 2.10-2.25 (m, 5 H); 2.34-2.66 (m, 5 H); 2.78 (m, 1 H); 2.90 (m, 2 H); 4.46 (td, J = 6.1 and 47.5 Hz, 2 H); 4.74 (m, 1 H); 6.65 (d, J = 8.8 Hz, 2 H); 6.73 (d, J = 8.8 Hz, 2 H); 6.82 (d, J = 8.0 Hz, 1 H); 7.20 (d, J = 8.4 Hz, 1 H); 7.28 (dd, J = 2.2 and 8.4 Hz, 1 H); 7.32 (s, 1 H); 7.59 (d, J = 2.2 Hz, 1 H); 7.67 (dd, J = 1.8 and 8.0 Hz, 1 H); 7.83 (d, J = 1.8 Hz, 1 H); 7.95 (s, 1 H) | 553 |

TABLE 1-continued

| Examples | Structure | Name | NMR | MASS: LC/MS (m/z, MH+): |
|---|---|---|---|---|
| 4 | | (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-3-ol | $^1$H NMR (500 MHz, DMSO-d6, δ ppm): 1.64-1.86 (m, 3 H) 2.14-2.27 (m, 5 H) 2.38-2.49 (m, 4 H) 2.60-2.72 (m, 1 H) 2.76-2.84 (m, 1 H) 2.93 (br s, 2 H) 4.42 (t, J = 5.99 Hz, 1 H) 4.52 (t, J = 5.99 Hz, 1 H) 4.72-4.79 (m, 1 H) 6.53 (s, 1 H) 6.66 (d, J = 8.80 Hz, 2 H) 6.73-6.80 (d, J = 8.76 Hz, 2 H) 6.89 (d, J = 8.07 Hz, 1 H) 7.18-7.25 (d, J = 7.95 Hz, 1 H) 7.25-7.33 (d, J = 7.82 Hz, 1 H) 7.55-7.65 (m, 2 H) 7.79 (d, J = 1.47 Hz, 1 H) | 593 |
| 5 | | 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2-difluoroethan-1-ol | $^1$H NMR (500 MHz, DMSO-d6, δ ppm): 7.59 (d, J = 2.08 Hz, 1 H) 7.39 (br d, J = 4.28 Hz, 1 H) 7.15-7.30 (m, 3 H) 6.78 (d, J = 8.04 Hz, 1 H) 6.73 (d, J = 8.84 Hz, 2 H) 6.65 (d, J = 8.84 Hz, 2 H) 6.17-6.21 (m, 1 H) 6.04 (td,, J = 54.66, 4.10 Hz, 1 H) 4.68-4.81 (m, 2 H) 4.46 (dt, J = 47.43, 6.06 Hz, 2 H) 2.75-2.93 (m, 3 H) 2.59-2.69 (m, 1 H) 2.42-2.56 (m conceal, 3 H) 2.31-2.42 (m, 1 H) 2.06-2.27 (m, 5 H) 1.60-1.89 (m, 3 H) | 590 |
| 6 | | (S)-8-(2,4-dichlorophenyl)-9-(4-((1-(3-fluoropropyl)pyrrolidin-3-yl)oxy)phenyl)-6,7-dihydro-5H-benzo[7]annulene-3-carbohydrazide | $^1$H NMR (400 MHz, DMSO-d6, δ ppm): 1.63-1.86 (m, 3 H); 2.09-2.25 (m, 5 H); 2.33-2.67 (m, 5 H); 2.79 (m, 1 H); 2.89 (m, 2 H); 4.46 (td, J = 6.2 and 47.5 Hz, 2 H); 4.48 (m broad, 2 H); 4.74 (m, 1 H); 6.65 (d, J = 8.9 Hz, 2 H); 6.74 (d, J = 8.9 Hz, 2 H); 6.82 (d, J = 8.1 Hz, 1 H); 7.19 (d, J = 8.4 Hz, 1 H); 7.28 (dd, J = 2.1 and 8.4 Hz, 1 H); 7.59 (d, J = 2.2 Hz, 1 H); 7.62 (dd, J = 1.9 and 8.1 Hz, 1 H); 7.79 (d, J = 1.9 Hz, 1 H); 9.73 (m broad, 1 H) | 568 |

TABLE 1-continued

| Examples | Structure | Name | NMR | MASS: LC/MS (m/z, MH+): |
|---|---|---|---|---|
| 7 | | (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole | ¹H NMR (400 MHz, DMSO-d6, δ ppm): 1.63-1.86 (m, 3 H); 2.13-2.25 (m, 5 H); 2.33-2.67 (m, 5 H); 2.79 (m, 1 H); 2.99 (m, 2 H); 4.46 (td, J = 6.0 and 47.5 Hz, 2 H); 4.74 (m, 1 H); 6.67 (d, J = 8.9 Hz, 2 H); 6.77 (d, J = 8.9 Hz, 2 H); 6.99 (d, J = 8.1 Hz, 1 H); 7.22 (d, J = 8.4 Hz, 1 H); 7.29 (dd, J = 2.2 and 8.4 Hz, 1 H); 7.60 (d, J = 2.2 Hz, 1 H); 7.85 (dd, J = 1.9 and 8.1 Hz, 1 H); 8.02 (d, J = 1.9 Hz, 1 H); 9.35 (s, 1 H) | 578 |
| 8 | | (S)-3-(4-(8-(2,4-dichlorophenyl)-3-(difluoromethyl)-6,7-dihydro-5H-benzo[7]annulen-9-yl)phenoxy)-1-(3-fluoropropyl)pyrrolidine | ¹H NMR (400 MHz, DMSO-d6, δ ppm): 7.60 (d, J = 1.89 Hz, 1 H) 7.54 (s, 1 H) 7.39 (br d, J = 8.17 Hz, 1 H) 7.28 (dd, J = 8.17, 1.89 Hz, 1 H) 7.20 (d, J = 8.17 Hz, 1 H) 7.03 (t, J = 56.15 Hz, 1 H) 6.91 (d, J = 8.17 Hz, 1 H) 6.74 (d, J = 8.62 Hz, 2 H) 6.65 (d, J = 8.62 Hz, 2 H) 4.69-4.79 (m, 1 H) 4.47 (dt, J = 47.40, 6.10 Hz, 2 H) 2.87-2.98 (m, 2 H) 2.74-2.83 (m, 1 H) 2.59-2.70 (m, 1 H) 2.42-2.58 (m conceal, 3 H) 2.30-2.42 (m, 1 H) 2.04-2.28 (m, 5 H) 1.60-1.89 (m, 3 H) | 560 |
| 9 | | (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-thiadiazole | ¹H NMR (400 MHz, DMSO-d6, δ ppm): 1.64-1.87 (m, 3 H) 2.10-2.31 (m, 5 H) 2.35-2.48 (m, 3 H) 2.52-2.57 (m, 1 H) 2.60-2.66 (m, 1 H) 2.72-2.87 (m, 1 H) 2.90-3.06 (m, 2 H) 4.40 (t, J = 6.02 Hz, 1 H) 4.52 (t, J = 6.02 Hz, 1 H) 4.68-4.82 (m, 1 H) 6.61-6.70 (d, J = 8.82 Hz 2 H) 6.74-6.82 (d, J = 8.82 Hz 2 H) 6.95 (d, J = 8.03 Hz, 1 H) 7.18-7.24 (d, J = 8.22 Hz, 1H) 7.25-7.31 (dd, J = 8.22, 1.00 Hz, 1H) 7.59 (d, J = 2.26 Hz, 1 H) 7.84 (dd, J = 8.03, 2.01 Hz, 1 H) 8.00 (d, J = 2.01 Hz, 1 H) 9.63 (s, 1 H) | 594 |

TABLE 1-continued

| Examples | Structure | Name | NMR | MASS: LC/MS (m/z, MH+): |
|---|---|---|---|---|
| 10 | | 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol | ¹H NMR (400 MHz, DMSO-d6, δ ppm): 7.59 (d, J = 1.90 Hz, 1 H) 7.45 (br d, J = 2.61 Hz, 1 H) 7.23-7.36 (m, 2 H) 7.17 (d, J = 8.24 Hz, 1 H) 6.78-6.86 (m, 2 H) 6.73 (d, J = 8.44 Hz, 2 H) 6.65 (d, J = 8.44 Hz, 2 H) 5.07-5.23 (m, 1 H) 4.66-4.82 (m, 1 H) 4.45 (dt, J = 47.40, 6.10 Hz, 2 H) 2.76-2.96 (m, 3 H) 2.59-2.70 (m, 1 H) 2.43-2.58 (m conceal, 3 H) 2.31-2.42 (m, 1 H) 2.06-2.26 (m, 5 H) 1.62-1.90 (m, 3 H) | 608 |
| 11 | | (S)-3-(4-(3-bromo-8-(2,4-dichlorophenyl)-6,7-dihydro-5H-benzo[7]annulen-9-yl)phenoxy)-1-(3-fluoropropyl)pyrrolidine | ¹H NMR (400 MHz, DMSO-d6, δ ppm): 7.588 (dd, J = 8.10, 2.10 Hz, 2H); 7.385 (dd, J = 8.25, 2.15 Hz, 1H); 7.214 (br. d, J = 8 Hz, 1H); 7.190 (br. d, J = 8.25 Hz, 1H); 6.736 (d, J = 8.75 Hz, 2H); 6.713 (d, J = 8.30 Hz, 1H); 6.654 (d, J = 8.75 Hz, 2H); 4.754 (br. m, 1H); 4.468 (dt, J = 47.42, 6.00 Hz, 2H); 2.855 (m, 2H); 2.812 (br. m, 1H); 2.660 (br. m, 1H); 2.545 (br. m, 1H); 2.477 (br. m, 2H); 2.400 (br. m, 1H); 2.260-2.080 (br. m, 5H); 1.799 (dtt, J = 25.00, 6.70, 6.50 Hz, 2H); 1.695 (br. m, 1H) | 588 |
| 12 | | (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2-dihydro-3H-pyrazol-3-one | 1H NMR (400 MHz, DMSO-d6, δ ppm): 1.64-1.87 (m, 3 H) 2.10-2.27 (m, 5 H) 2.35-2.44 (m, 2 H) 2.53-2.69 (m, 3 H) 2.76-2.94 (m, 3 H) 4.40 (t, J = 6.02 Hz, 1 H) 4.52 (t, J = 6.02 Hz, 1 H) 4.70-4.79 (m, 1 H) 5.89 (br s, 1 H) 6.62-6.68 (d, J = 8.71 Hz, 2 H) 6.72-6.81 (m, 3 H) 7.17-7.22 (d, J = 8.38 Hz, 1 H) 7.24-7.30 (dd, J = 8.88, 1.81 Hz, 1 H) 7.47 (dd, J = 8.03, 1.76 Hz, 1 H) 7.58 (d, J = 2.01 Hz, 1 H) 7.63 (d, J = 1.51 Hz, 1 H) 9.31-9.96 (m, 1 H) 11.73-12.34 (m, 1 H) | 592 |

TABLE 1-continued

| Examples | Structure | Name | NMR | MASS: LC/MS (m/z, MH+): |
|---|---|---|---|---|
| 13 | | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-5(4H)-one | 1H NMR (400 MHz, DMSO-d6, δ ppm): 1.77-1.96 (m, 3 H) 2.08-2.31 (m, 5 H) 2.74-3.17 (m, 8 H) 4.43 (t, J = 5.90 Hz, 1 H) 4.55 (t, J = 5.90 Hz, 1 H) 4.87 (br s, 1 H) 6.67-6.71 (d, J = 8.7 Hz, 2 H) 6.75-6.84 (m, 3 H) 7.21 (d, J = 8.28 Hz, 1 H) 7.27 (dd, J = 8.28, 2.01 Hz, 1 H) 7.48 (br d, J = 8.03 Hz, 1 H) 7.58 (d, J = 2.01 Hz, 1 H) 7.64 (s, 1H) | 593 |
| 14 | | (S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonyl)hydrazine-1-carboxamide | 1H NMR (400 MHz, DMSO-d6, δ ppm): 1.63-1.86 (m, 3 H); 2.10-2.24 (m, 5 H); 2.34-2.67 (m, 5 H); 2.79 (m, 1 H); 2.90 (m, 2 H); 4.46 (td, J = 6.1 and 47.6 Hz, 2 H); 4.74 (m, 1 H); 6.00 (s, 2 H); 6.65 (d, J = 8.9 Hz, 2 H); 6.73 (d, J = 8.9 Hz, 2 H); 6.85 (d, J = 8.2 Hz, 1 H); 7.21 (d, J = 8.4 Hz, 1 H); 7.28 (dd, J = 2.2 and 8.4 Hz, 1 H); 7.60 (d, J = 2.2 Hz, 1 H); 7.69 (dd, J = 2.0 and 8.2 Hz, 1 H); 7.86 (d, J = 2.0 Hz, 1 H); 7.88 (s, 1 H); 10.08 (s, 1 H) | 611 |
| 15 | | (S)-8-(2,4-dichlorophenyl)-9-(4-((1-(3-fluoropropyl)pyrrolidin-3-yl)oxy)phenyl)-(methylsulfonyl)-6,7-dihydro-5H-benzo[7]annulene-3-carboxamide | 1H NMR (400 MHz, DMSO-d6, δ ppm): 1.86-2.02 (m, 3 H); 2.10-2.22 (m, 4 H); 2.32 (m, 1 H); 2.85-3.38 (m, 8 H); 3.06 (s, 3 H); 4.50 (td, J = 5.7 and 47.2 Hz, 2 H); 4.93 (m, 1 H); 6.71 (d, J = 8.8 Hz, 2 H); 6.78 (m, 3 H); 7.21 (d, J = 8.4 Hz, 1 H); 7.28 (dd, J = 2.2 and 8.4 Hz, 1 H); 7.59 (d, J = 2.2 Hz, 1 H); 7.74 (dd, J = 1.9 and 8.1 Hz, 1 H); 7.91 (d, J = 1.9 Hz, 1 H); 10.86 (m broad, 1H) | 631 |

TABLE 1-continued

| Examples | Structure | Name | NMR | MASS: LC/MS (m/z, MH+): |
|---|---|---|---|---|
| 16 | | (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2H-tetrazole | 1H NMR (400 MHz, DMSO-d6, δ ppm): 1.70-1.90 (m, 3 H); 2.08-2.29 (m, 5 H); 2.42-2.64 (m, 4 H); 2.73 (m, 1 H); 2.80 (m, 1 H); 2.92 (m, 2 H); 4.48 (td, J = 6.1 and 47.5 Hz, 2 H); 4.80 (m, 1 H); 6.67 (d, J = 8.9 Hz, 2 H); 6.78 (d, J = 8.9 Hz, 2 H); 6.84 (d, J = 8.1 Hz, 1 H); 7.21 (d, J = 8.4 Hz, 1 H); 7.28 (dd, J = 2.1 and 8.4 Hz, 1 H); 7.58 (d, J = 2.1 Hz, 1 H); 7.80 (dd, J = 1.8 and 8.1 Hz, 1 H); 7.96 (d, J = 1.8 Hz, 1 H); 8.86 (m broad, 1 H) | 578 |
| 17 | | (S)-8-(2,4-dichlorophenyl)-9-(4-((1-(3-fluoropropyl)pyrrolidin-3-yl)oxy)phenyl)-N-(2H-tetrazol-5-yl)-6,7-dihydro-5H-benzo[7]annulene-3-carboxamide | 1H NMR (400 MHz, DMSO-d6, δ ppm): 1.67-1.92 (m, 3 H); 2.12-3.00 (m, 13 H); 4.47 (td, J = 5.9 and 47.5 Hz, 2 H); 4.78 (m, 1 H); 6.68 (d, J = 8.8 Hz, 2 H); 6.77 (d, J = 8.8 Hz, 2 H); 6.92 (d, J = 8.0 Hz, 1 H); 7.22 (d, J = 8.4 Hz, 1 H); 7.29 (dd, J = 2.2 and 8.4 Hz, 1 H); 7.61 (d, J = 2.2 Hz, 1 H); 7.89 (d broad, J = 8.0 Hz, 1 H); 8.07 (s broad, 1 H); 12.00 (m broad, 1 H) | 621 |
| 18 | | (S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboxamide | 1H NMR (400 MHz, DMSO-d6, δ ppm): 1.62-1.86 (m, 3 H); 2.08-2.25 (m, 5 H); 2.33-2.66 (m, 5 H); 2.79 (m, 1 H); 2.88 (m, 2 H); 4.46 (td, J = 6.1 and 47.6 Hz, 2 H); 4.74 (m, 1 H); 6.65 (d, J = 8.7 Hz, 2 H); 6.73 (d, J = 8.7 Hz, 2 H); 6.81 (d, J = 8.1 Hz, 1 H); 7.19 (d, J = 8.4 Hz, 1 H); 7.27 (dd, J = 2.1 and 8.4 Hz, 1 H); 7.55 (dd, J = 1.4 and 8.1 Hz, 1 H); 7.59 (d, J = 2.1 Hz, 1 H); 7.72 (d, J = 1.4 Hz, 1 H); 9.10 (m broad, 1 H); 10.90 (m broad, 1 H) | 569 |

TABLE 1-continued

| Examples | Structure | Name | NMR | MASS: LC/MS (m/z, MH+): |
|---|---|---|---|---|
| 19 | 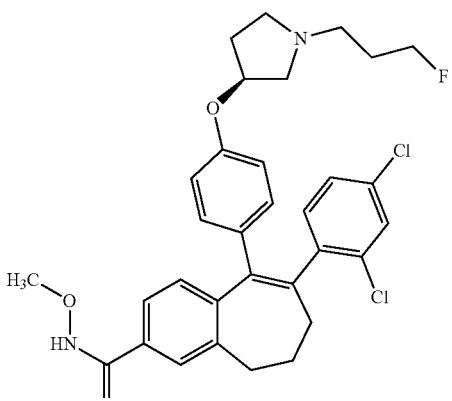 | (S)-8-(2,4-dichlorophenyl)-9-(4-((1-(3-fluoropropyl)pyrrolidin-3-yl)oxy)phenyl)-N-methoxy-6,7-dihydro-5H-benzo[7]annulene-3-carboxamide | 1H NMR (400 MHz, DMSO-d6, δ ppm): 1.62-1.87 (m, 3 H); 2.08-2.25 (m, 5 H); 2.33-2.68 (m, 5 H); 2.78 (m, 1 H); 2.90 (m, 2 H); 3.71 (s, 3 H); 4.46 (td, J = 6.1 and 47.7 Hz, 2 H); 4.74 (m, 1 H); 6.65 (d, J = 8.5 Hz, 2 H); 6.72 (d, J = 8.5 Hz, 2 H); 6.84 (d, J = 8.0 Hz, 1 H); 7.20 (d, J = 8.2 Hz, 1 H); 7.26 (d broad, J = 8.2 Hz, 1 H); 7.55 (d broad, J = 8.0 Hz, 1 H); 7.59 (s broad, 1 H); 7.72 (s broad, 1 H); 11.71 (m broad, 1 H) | 583 |
| 20 | 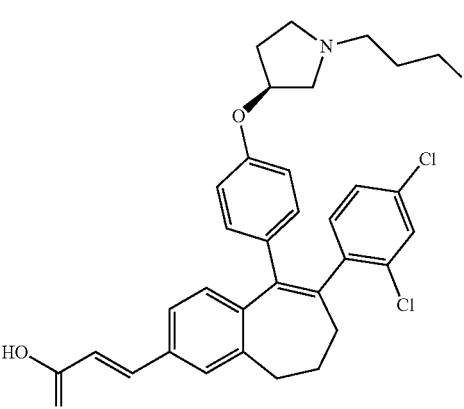 | (S,E)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)acrylic acid | 1H NMR (400 MHz, DMSO-d6, δ ppm): 1.63-1.86 (m, 3 H); 2.08-2.25 (m, 5 H); 2.33-2.67 (m, 5 H); 2.79 (m, 1 H); 2.89 (m, 2 H); 4.46 (td, J = 6.0 and 47.6 Hz, 2 H); 4.74 (m, 1 H); 6.53 (d, J = 16.0 Hz, 1 H); 6.65 (d, J = 8.8 Hz, 2 H); 6.74 (d, J = 8.8 Hz, 2 H); 6.79 (d, J = 8.0 Hz, 1 H); 7.19 (d, J = 8.4 Hz, 1 H); 7.27 (dd, J = 2.1 and 8.4 Hz, 1 H); 7.49 (dd, J = 1.6 and 8.0 Hz, 1 H); 7.57 (d, J = 16.0 Hz, 1 H); 7.59 (d, J = 2.1 Hz, 1 H); 7.66 (d, J = 1.6 Hz, 1 H); 12.36 (m broad, 1 H) | 580 |
| 21 | 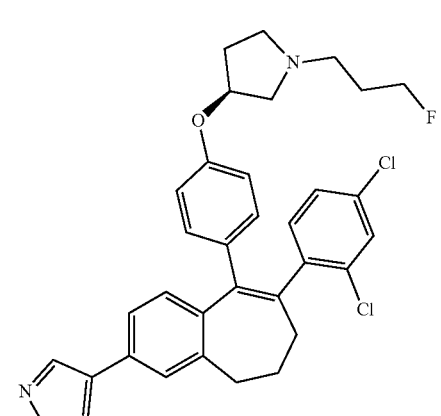 | (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazole | 1H NMR (400 MHz, DMSO-d6, δ ppm): 1.64-1.86 (m, 3 H); 2.07-2.27 (m, 5 H); 2.34-2.66 (m, 5 H); 2.79 (m, 1 H); 2.88 (m, 2 H); 4.47 (td, J = 6.1 and 47.4 Hz, 2 H); 4.75 (m, 1 H); 6.64 (d, J = 8.7 Hz, 2 H); 6.71-6.77 (m, 3 H); 7.18 (d, J = 8.4 Hz, 1 H); 7.26 (dd, J = 2.1 and 8.4 Hz, 1 H); 7.40 (dd, J = 1.8 and 8.1 Hz, 1 H); 7.58 (s broad, 2 H); 7.93 (m broad, 1 H); 8.19 (m broad, 1 H); 12.93 (m broad, 1 H) | 576 |

TABLE 1-continued

| Examples | Structure | Name | NMR | MASS: LC/MS (m/z, MH+): |
|---|---|---|---|---|
| 22 | | (S)-8-(2,4-dichlorophenyl)-9-(4-((1-(3-fluoropropyl)pyrrolidin-3-yl)oxy)phenyl)-6,7-dihydro-5H-benzo[7]annulene-3-carbonitrile | 1H NMR (400 MHz, DMSO-d6, δ ppm): 1.62-1.86 (m, 3 H); 2.11-2.24 (m, 5 H); 2.34-2.66 (m, 5 H); 2.79 (m, 1 H); 2.92 (m, 2 H); 4.46 (td, J = 6.1 and 47.6 Hz, 2 H); 4.74 (m, 1 H); 6.66 (d, J = 8.8 Hz, 2 H); 6.74 (d, J = 8.8 Hz, 2 H); 6.94 (d, J = 8.1 Hz, 1 H); 7.21 (d, J = 8.4 Hz, 1 H); 7.29 (dd, J = 2.1 and 8.4 Hz, 1 H); 7.60 (d, J = 2.1 Hz, 1 H); 7.63 (dd, J = 1.8 and 8.1 Hz, 1 H); 7.83 (d, J = 1.8 Hz, 1 H) | 535 |
| 23 | | (S)-4-(9-(4-((1-(3-fluoropropyl)pyrrolidin-3-yl)oxy)phenyl)-8-(4-(trifluoromethoxy)phenyl)-6,7-dihydro-5H-benzo[7]annulen-3-yl)-1H-pyrazole | 1H NMR (400 MHz, DMSO-d6, δ ppm): 1.65-1.86 (m, 3 H); 2.07-2.25 (m, 3 H); 2.27-2.69 (m, 7 H); 2.76-2.83 (m, 3 H); 4.46 (td, J = 6.1 and 47.6 Hz, 2 H); 4.75 (m, 1 H); 6.64 (d, J = 8.7 Hz, 2 H); 6.71-6.77 (m, 3 H); 7.17 (d, J = 8.7 Hz, 2 H); 7.26 (d, J = 8.7 Hz, 2 H); 7.40 (dd, J = 1.7 and 8.0 Hz, 1 H); 7.56 (d, J = 1.7 Hz, 1 H); 7.92 (s broad, 1 H); 8.18 (s broad, 1 H); 12.92 (s broad, 1 H) | 592 |
| 24 | | (S)-3-(4-(3-(difluoromethoxy)-8-(4-(trifluoromethoxy)phenyl)-6,7-dihydro-5H-benzo[7]annulen-9-yl)phenoxy)-1-(3-fluoropropyl)pyrrolidine | 1H NMR (400 MHz, DMSO-d6, δ ppm): 1.65-1.86 (m, 3 H); 2.06-2.29 (m, 5 H); 2.35-2.66 (m, 5 H); 2.76-2.82 (m, 3 H); 4.47 (td, J = 6.0 and 47.4 Hz, 2 H); 4.75 (m, 1 H); 6.64 (d, J = 8.9 Hz, 2 H); 6.72 (d, J = 8.9 Hz, 2 H); 6.80 (d, J = 8.6 Hz, 1 H); 6.98 (dd, J = 2.7 and 8.6 Hz, 1 H); 7.14-7.27 (m, 4 H); 7.26 (t, J = 74.3 Hz, 1 H) | 592 |

TABLE 1-continued

| Examples | Structure | Name | NMR | MASS: LC/MS (m/z, MH+): |
|---|---|---|---|---|
| 25 | | Methyl (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate | 1H NMR (400 MHz, DMSO-d6, δ ppm): 1.62-1.85 (m, 3 H); 2.03-2.25 (m, 5 H); 2.31-2.68 (m, 5 H); 2.70-2.88 (m, 3 H); 3.67 (s, 3 H); 4.46 (td, J = 6.0 and 47.4 Hz, 2 H); 4.73 (m, 1 H); 6.63 (d, J = 8.8 Hz, 2 H); 6.67 (d, J = 8.2 Hz, 1 H); 6.72 (d, J = 8.8 Hz, 2 H); 7.16 (d, J = 8.4 Hz, 1 H); 7.22-7.29 (m, 2 H); 7.41 (d, J = 2.2 Hz, 1 H); 7.57 (d, J = 2.1 Hz, 1 H); 9.67 (s, 1 H) | 583 |
| 26 | | (S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboximidamide | 1H NMR (400 MHz, DMSO-d6, δ ppm): 1.63-1.86 (m, 3 H); 2.04-2.25 (m, 5 H); 2.31-2.69 (m, 5 H); 2.74-2.94 (m, 3 H); 4.46 (td, J = 6.0 and 47.4 Hz, 2 H); 4.74 (m, 1 H); 5.78 (s, 2 H); 6.64 (d, J = 8.9 Hz, 2 H); 6.74 (d, J = 8.9 Hz, 2 H); 6.76 (d, J = 8.1 Hz, 1 H); 7.19 (d, J = 8.3 Hz, 1 H); 7.26 (dd, J = 2.1 and 8.3 Hz, 1 H); 7.48 (dd, J = 1.9 and 8.1 Hz, 1 H); 7.58 (d, J = 2.1 Hz, 1 H); 7.63 (d, J = 1.9 Hz, 1 H); 9.61 (s, 1 H) | 568 |
| 27 | | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-oxadiazol-5(4H)-one | 1H NMR (400 MHz, DMSO-d6, δ ppm): 1.57-1.94 (m, 3 H); 2.09-2.86 (m, 10 H); 2.70-2.88 (m, 3 H); 4.48 (td, J = 5.9 and 47.3 Hz, 2 H); 4.80 (m, 1 H); 6.68 (d, J = 8.9 Hz, 2H); 6.76 (d, J = 8.9 Hz, 2 H); 6.92 (d, J = 8.1 Hz, 1 H); 7.21 (d, J = 8.4 Hz, 1 H); 7.28 (dd, J = 2.2 and 8.4 Hz, 1 H); 7.60 (d, J = 2.2 Hz, 1 H); 7.62 (dd, J = 2.0 and 8.1 Hz, 1 H); 7.79 (d, J = 2.0 Hz, 1 H); 12.33 (m broad, 1H) | 594 |

TABLE 1-continued

| Examples | Structure | Name | NMR | MASS: LC/MS (m/z, MH+): |
|---|---|---|---|---|
| 28 | | (S)-8-(2,4-dichlorophenyl)-9-(4-((1-(3-fluoropropyl)pyrrolidin-3-yl)oxy)phenyl)-6,7-dihydro-5H-benzo[7]annulen-3-amine | 1H NMR (400 MHz, DMSO-d6, δ ppm): 1.56-1.91 (m, 3 H); 2.04 (m, 2 H); 2.18 (m, 3 H); 2.31-2.82 (m, 8 H); 4.46 (td, J = 6.1 and 47.4 Hz, 2 H); 4.72 (m, 1 H); 5.15 (s, 2 H); 6.35 (dd, J = 2.2 and 8.3 Hz, 1 H); 6.42 (d, J = 8.3 Hz, 1 H); 6.49 (d, J = 2.2 Hz, 1 H); 6.61 (d, J = 8.9 Hz, 2 H); 6.72 (d, J = 8.9 Hz, 2 H); 7.11 (d, J = 8.1 Hz, 1 H); 7.22 (dd, J = 2.2 and 8.1 Hz, 1 H); 7.54 (d, J = 2.2 Hz, 1 H). | 525 |
| 29 | ClH | 4-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-3H-1,2,3,5-oxathiadiazole 2-oxide hydrochloride | 1H NMR (400 MHz, DMSO-d6, δ ppm): 1.63-1.86 (m, 3 H); 2.10-2.24 (m, 5 H); 2.34-2.67 (m, 5 H); 2.79 (m, 1 H); 2.90 (m, 2 H); 4.46 (td, J = 6.1 and 47.6 Hz, 2 H); 4.74 (m, 1 H); 6.00 (s, 2 H); 6.65 (d, J = 8.9 Hz, 2 H); 6.73 (d, J = 8.9 Hz, 2 H); 6.85 (d, J = 8.2 Hz, 1 H); 7.21 (d, J = 8.4 Hz, 1 H); 7.28 (dd, J = 2.2 and 8.4 Hz, 1 H); 7.60 (d, J = 2.2 Hz, 1 H); 7.69 (dd, J = 2.0 and 8.2 Hz, 1 H); 7.86 (d, J = 2.0 Hz, 1 H); 7.88 (s, 1 H); 10.08 (s, 1 H). | 614 |
| 30 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)methane sulfonamide | 1H NMR (400 MHz, DMSO-d6, δ ppm): 1.63-1.86 (m, 3 H); 2.05-2.25 (m, 5 H); 2.31-2.68 (m, 5 H); 2.73-2.89 (m, 3 H); 3.04 (s, 3 H); 4.46 (td, J = 6.0 and 47.5 Hz, 2 H); 4.74 (m, 1 H); 6.63 (d, J = 8.9 Hz, 2 H); 6.73 (m, 3 H); 7.03 (dd, J = 2.2 and 8.4 Hz, 1 H); 7.14 (d, J = 2.2 Hz, 1 H); 7.16 (d, J = 8.4 Hz, 1 H); 7.25 (dd, J = 2.2 and 8.4 Hz, 1 H); 7.57 (d, J = 2.2 Hz, 1 H); 9.79 (s, 1 H). | 603 |

TABLE 1-continued

| Examples | Structure | Name | NMR | MASS: LC/MS (m/z, MH+): |
|---|---|---|---|---|
| 31 | | (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazol-2(3H)-one | 1H NMR (400 MHz, DMSO-d6, δ ppm): 1.64-1.86 (m, 3 H); 2.11-2.25 (m, 5 H); 2.34-2.56 (m, 4 H); 2.64 (m, 1 H); 2.80 (m, 1 H); 2.95 (m, 2 H); 4.46 (td, J = 6.0 and 47.3 Hz, 2 H); 4.74 (m, 1 H); 6.66 (d, J = 8.9 Hz, 2 H); 6.75 (d, J = 8.9 Hz, 2 H); 6.93 (d, J = 8.2 Hz, 1 H); 7.21 (d, J = 8.3 Hz, 1 H); 7.28 (dd, J = 2.2 and 8.3 Hz, 1 H); 7.60 (d, J = 2.2 Hz, 1 H); 7.62 (dd, J = 1.8 and 8.2 Hz, 1 H); 7.77 (d, J = 1.8 Hz, 1 H); 12.58 (m broad, 1H) | 594 |
| 32 | | Tert-butyl (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate | 1H NMR (400 MHz, DMSO-d6, δ ppm): 1.48 (s, 9 H); 1.62-1.86 (m, 3 H); 2.03-2.25 (m, 5 H); 2.33-2.67 (m, 5 H); 2.70-2.86 (m, 3 H); 4.46 (td, J = 6.0 and 47.4 Hz, 2 H); 4.73 (m, 1 H); 6.63 (m, 3 H); 6.71 (d, J = 8.9 Hz, 2H); 7.16 (d, J = 8.4 Hz, 1 H); 7.22-7.26 (m, 2 H); 7.46 (d, J = 2.1 Hz, 1H); 7.56 (d, J = 2.0 Hz, 1 H); 9.37 (s, 1 H) | 625 |
| 33 | | (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxathiazol-2-one | 1H NMR (400 MHz, DMSO-d6, δ ppm): 1.63-1.86 (m, 3 H); 2.10-2.25 (m, 5 H); 2.34-2.55 (m, 4 H); 2.64 (m, 1 H); 2.79 (m, 1 H); 2.97 (m, 2 H); 4.46 (td, J = 6.0 and 47.4 Hz, 2 H); 4.74 (m, 1 H); 6.66 (d, J = 8.9 Hz, 2 H); 6.75 (d, J = 8.9 Hz, 2 H); 6.97 (d, J = 8.2 Hz, 1 H); 7.22 (d, J = 8.4 Hz, 1 H); 7.29 (dd, J = 2.1 and 8.4 Hz, 1 H); 7.60 (d, J = 2.2 Hz, 1 H); 7.76 (dd, J = 1.9 and 8.1 Hz, 1 H); 7.91 (d, J = 1.9 Hz, 1 H). | 611 |

TABLE 1-continued

| Examples | Structure | Name | NMR | MASS: LC/MS (m/z, MH+): |
|---|---|---|---|---|
| 34 | | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-oxadiazole-5(4H)-thione | 1H NMR (400 MHz, DMSO-d6, δ ppm): 1.92-2.63 (m, 8 H); 2.92 (m, 2 H); 3.02-4.06 (m, 6 H); 4.52 (td, J = 5.6 and 47.1 Hz, 2 H); 4.91-5.13 (m, 1 H); 6.74 (d, J = 8.7 Hz, 2H); 6.79-6.85 (m, 2 H); 7.22 (d, J = 8.3 Hz, 1 H); 7.29 (dd, J = 2.1 and 8.3 Hz, 1 H); 7.60 (d, J = 2.1 Hz, 1 H); 7.68 (dd, J = 1.8 and 8.2 Hz, 1 H); 7.84 (d, J = 1.8 Hz, 1 H); 9.63-10.02 (m broad, 1 H); 12.30 (m broad, 1 H). | 610 |
| 35 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,1,1-trifluoro-methanesulfonamide | 1H NMR (400 MHz, DMSO-d6, δ ppm): 1.64-3.05 (m, 16 H); 4.49 (td, J = 6.0 and 47.8 Hz, 2 H); 4.84 (m broad, 1 H); 6.44 (d, J = 8.0 Hz, 1 H); 6.66 (m broad, 2 H); 6.74-6.78 (m, 3 H); 6.88 (d, J = 2.2 Hz, 1 H); 7.15 (d, J = 8.4 Hz, 1 H); 7.23 (dd, J = 2.2 and 8.4 Hz, 1 H); 7.55 (d, J = 2.2 Hz, 1 H); 9.95 (m broad, 1 H) | 657 |
| 36 | | (S)-3-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-4-hydroxycyclobut-3-ene-1,2-dione | 1H NMR (400 MHz, DMSO-d6, δ ppm): 1.64-3.05 (m, 16 H); 4.48 (td, J = 6.3 and 47.8 Hz, 2 H); 4.81 (m broad, 1 H); 6.54 (d, J = 8.0 Hz, 1 H); 6.66 (m broad, 2 H); 6.76 (d broad, J = 8.5 Hz, 2 H); 7.17 (d, J = 8.4 Hz, 1 H); 7.24 (dd, J = 2.2 and 8.4 Hz, 1 H); 7.46 (d broad, J = 8.0 Hz, 1 H); 7.55 (d, J = 2.1 Hz, 1 H); 7.58 (s broad, 1 H); 9.29 (s, 1 H) | 621 |

TABLE 1-continued

| Examples | Structure | Name | NMR | MASS: LC/MS (m/z, MH+): |
|---|---|---|---|---|
| 37 | | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-thiadiazol-5(4H)-one MODIFIER DESSIN EN ISIS DRAW OU CHEMDRAW + DECALER (F NON VISIBLE) | 1H NMR (400 MHz, DMSO-d6, δ ppm): 1.71-1.91 (m, 3 H); 2.10-2.30 (m, 5 H); 2.47-2.99 (m, 8 H); 4.48 (td, J = 6.0 and 47.5 Hz, 2 H); 4.81 (m, 1 H); 6.68 (d, J = 8.8 Hz, 2H); 6.76 (d, J = 8.8 Hz, 2 H); 6.88 (d, J = 8.1 Hz, 1 H); 7.21 (d, J = 8.3 Hz, 1 H); 7.28 (dd, J = 2.2 and 8.3 Hz, 1 H); 7.60 (d, J = 2.2 Hz, 1 H); 7.76 (dd, J = 2.0 and 8.1 Hz, 1 H); 7.94 (d, J = 2.0 Hz, 1 H); 12.68 (m broad, 1H) | 610 |
| 38 | | (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-methoxy-1,5-dihydro-2H-pyrrol-2-one | 1H NMR (400 MHz, DMSO-d6, δ ppm): 1.87-2.26 (m, 8 H) 2.74-3.24 (m, 7 H) 3.57-3.79 (m, 1 H) 3.86 (s, 3 H) 4.45 (br t, J = 5.52 Hz, 1 H) 4.50 (s, 2 H) 4.57 (t, J = 5.65 Hz, 1 H) 4.91-5.12 (m, 1 H) 5.33 (s, 1 H) 6.67-6.83 (m, 5 H) 7.16-7.21 (d, J = 8.28 Hz, 1 H) 7.23-7.29 (dd, J = 8.28, 1.08 Hz 1 H) 7.52 (dd, J = 8.53, 2.26 Hz, 1 H) 7.57 (d, J = 2.01 Hz, 1 H) 7.67 (d, J = 2.26 Hz, 1 H) | 621 |
| 39 | | (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)ethan-1-one | 1H NMR (400 MHz, DMSO-d6, δ ppm): 1.63-1.87 (m, 3 H) 2.11-2.26 (m, 5 H) 2.34-2.48 (m, 3 H) 2.54 (m, 1 H) 2.59 (s, 3 H) 2.61-2.66 (m, 1 H) 2.75-2.84 (m, 1 H) 2.95 (br s, 2 H) 4.40 (t, J = 6.02 Hz, 1 H) 4.52 (t, J = 6.02 Hz, 1 H) 4.68-4.79 (m, 1 H) 6.62-6.69 (d, J = 9.96 Hz, 2 H) 6.71-6.77 (d, J = 8.96 Hz, 2 H) 6.90 (d, J = 8.03 Hz, 1 H) 7.17-7.24 (d, J = 8.20 Hz, 1 H) 7.26-7.31 (dd, J = 8.20, 1.06 Hz 1 H) 7.59 (d, J = 2.01 Hz, 1 H) 7.77 (dd, J = 8.03, 1.76 Hz, 1 H) 7.93 (d, J = 1.76 Hz, 1 H) | 552 |

TABLE 1-continued

| Examples | Structure | Name | NMR | MASS: LC/MS (m/z, MH+): |
|---|---|---|---|---|
| 40 | 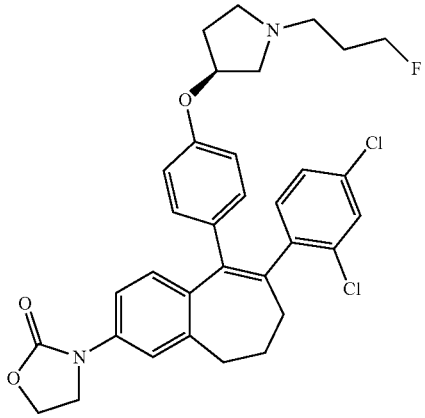 [SMILES: O=C1OCCN1c1ccc2c(c1)CCCC(c1ccc(Cl)cc1Cl)=C2c1ccc(O[C@H]2CCN(CCCF)C2)cc1] | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)oxazolidin-2-one | 1H NMR (400 MHz, DMSO-d6, δ ppm): 1.87 (m, 3 H) 2.08-2.27 (m, 5 H) 2.35-2.49 (m, 4 H) 2.51-2.72 (m, 3H) 2.75-2.96 (m, 3 H) 4.04-4.13 (m, 2 H) 4.36-4.49 (m, 2 H) 4.52 (t, J = 5.90 Hz, 1 H) 4.74 (br s, 1 H) 6.61-6.67 (d, J = 8.89 Hz 2 H) 6.70-6.82 (d, J = 8.89 Hz, 2 H) 7.16-7.21 (d, J = 8.30 Hz, 1 H) 7.23-7.29 (dd, J = 8.30, 1.12 Hz, 1 H) 7.39 (dd, J = 8.53, 2.51 Hz, 1 H) 7.56 (dd, J = 8.03, 2.26 Hz, 2H) | 595 |
| 41 | 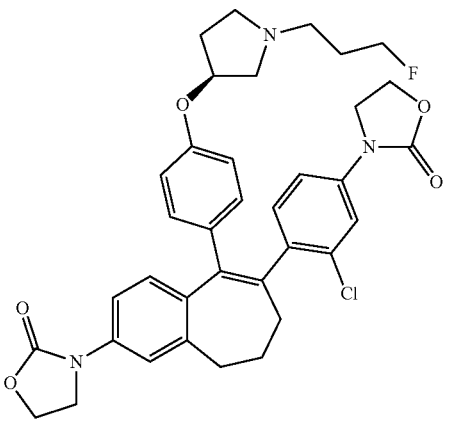 [SMILES: O=C1OCCN1c1ccc(C2=C(c3ccc(O[C@H]4CCN(CCCF)C4)cc3)c3ccc(N4CCOC4=O)cc3CCC2)c(Cl)c1] | (S)-3-(8-(2-chloro-4-(2-oxooxazolidin-3-yl)phenyl)-9-(4-((1-(3-fluoropropyl)pyrrolidin-3-yl)oxy)phenyl)-6,7-dihydro-5H-benzo[7]annulen-3-yl)oxazolidin-2-one | 1H NMR (400 MHz, DMSO-d6, δ ppm): 1.63-1.87 (m, 4 H) 2.05-2.28 (m, 6 H) 2.36-2.44 (m, 3 H) 2.52 (d, J = 1.76 Hz, 1 H) 2.76-2.97 (m, 2 H) 3.98-4.14 (m, 4 H) 4.37-4.47 (m, 5 H) 4.52 (t, J = 6.02 Hz, 1 H) 4.67-4.78 (m, 1 H) 6.62 (d, J = 8.78 Hz, 2 H) 6.72-6.82 (m, 3 H) 7.17 (d, J = 8.53 Hz, 1 H) 7.31 (dd, J = 8.41, 2.38 Hz, 1 H) 7.38 (dd, J = 8.53, 2.51 Hz, 1 H) 7.55 (d, J = 2.26 Hz, 1 H) 7.70 (d, J = 2.26 Hz, 1 H) | 646 |
| 42 | 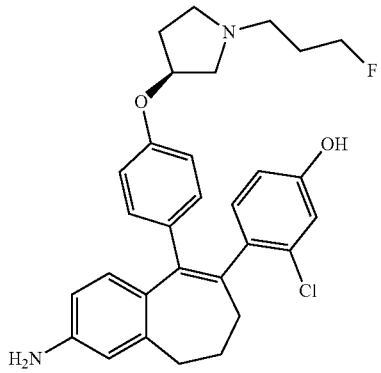 [SMILES: Nc1ccc2c(c1)CCCC(c1ccc(O)cc1Cl)=C2c1ccc(O[C@H]2CCN(CCCF)C2)cc1] | (S)-4-(3-amino-9-(4-((1-(3-fluoropropyl)pyrrolidin-3-yl)oxy)phenyl)-6,7-dihydro-5H-benzo[7]annulen-8-yl)-3-chlorophenol | 1H NMR (400 MHz, DMSO-d6, δ ppm): 1.63-1.89 (m, 3 H) 2.01-2.27 (m, 5 H) 2.35-2.47 (m, 3 H) 2.52-2.57 (m, 1 H) 2.59-2.88 (m, 4 H) 4.40 (t, J = 6.02 Hz, 1 H) 4.52 (t, J = 6.02 Hz, 1 H) 4.67-4.79 (m, 1 H) 5.19 (s, 2H) 6.30 (dd, J = 8.28, 2.26 Hz, 1 H) 6.51-6.62 (m, 5 H) 6.65-6.79 (m, 4H) 9.31 (s, 1 H) | 507 |

TABLE 1-continued

| Examples | Structure | Name | NMR | MASS: LC/MS (m/z, MH+): |
|---|---|---|---|---|
| 43 | | 5-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)imidazolidine-2,4-dione | 1H NMR (400 MHz, DMSO-d6, δ ppm): 1.63-1.87 (m, 3 H) 2.07-2.25 (m, 5 H) 2.35-2.47 (m, 3 H) 2.53-2.56 (m, 1 H) 2.60-2.66 (m, 1 H) 2.75-2.94 (m, 3 H) 4.40 (t, J = 6.02 Hz, 1 H) 4.52 (t, J = 6.02 Hz, 1 H) 4.69-4.77 (m, 1 H) 5.16 (s, 1 H) 6.61-6.67 (d, J = 8.99 Hz, 2 H) 6.70-6.75 (d, J = 8.99 Hz, 2 H) 6.80 (d, J = 8.03 Hz, 1 H) 7.10-7.21 (m, 2 H) 7.23-7.35 (m, 2 H) 7.58 (d, J = 2.26 Hz, 1 H) 8.37 (s, 1 H) 10.77 (br s, 1 H) | 608 |
| 44 | | (S)-8-(2,4-dichlorophenyl)-9-(4-((1-(3-fluoropropyl)pyrrolidin-3-yl)oxy)phenyl)-N-methoxy-N-methyl-6,7-dihydro-5H-benzo[7]annulene-3-carboxamide | 1H NMR (400 MHz, DMSO-d6, δ ppm): 7.60 (d, J = 1.93 Hz, 1 H) 7.56 (d, J = 1.54 Hz, 1 H) 7.42 (dd, J = 8.02, 1.54 Hz, 1 H) 7.28 (br d, J = 8.24 Hz, 1 H) 7.20 (d, J = 8.24 Hz, 1 H) 6.84 (d, J = 8.02 Hz, 1 H) 6.76 (d, J = 8.67 Hz, 2 H) 6.67 (d, J = 8.67 Hz, 2 H) 4.70-4.81 (m, 1 H) 4.47 (dt, J = 47.54, 6.06 Hz, 2 H) 3.59 (s, 3 H) 3.27 (s, 3 H) 2.85-2.98 (m, 2 H) 2.75-2.84 (m, 1 H) 2.61-2.69 (m, 1 H) 2.42-2.59 (m conceal, 3 H) 2.32-2.42 (m, 1 H) 2.09-2.28 (m, 5H) 1.61-1.89 (m, 3 H) | 597 |
| 45 | | (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole-2(3H)-thione | 1H NMR (400 MHz, DMSO-d6, δ ppm): 1.80-3.08 (m, 16 H); 4.49 (td, J = 5.8 and 47.3 Hz, 2 H); 4.90 (m broad, 1 H); 6.71 (d, J = 8.8 Hz, 2 H); 6.80 (d, J = 8.8 Hz, 2 H); 6.87 (d, J = 8.1 Hz, 1 H); 7.22 (d, J = 8.2 Hz, 1 H); 7.28 (dd, J = 2.0 and 8.2 Hz, 1 H); 7.60 (d, J = 2.0 Hz, 1 H); 7.63 (dd, J = 1.8 and 8.1 Hz, 1 H); 7.80 (d, J = 1.8 Hz, 1 H); 11.63 (m broad, 1 H) | 611 |

TABLE 1-continued

| Examples | Structure | Name | NMR | MASS: LC/MS (m/z, MH+): |
|---|---|---|---|---|
| 46 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetimidamide | 1H NMR (400 MHz, DMSO-d6, δ ppm): 7.56 (d, J = 1.78 Hz, 1 H) 7.25 (dd, J = 8.13, 1.78 Hz, 1 H) 7.15 (d, J = 8.13 Hz, 1 H) 6.38-6.85 (m, 8 H) 6.07-6.22 (m, 1 H) 4.69-4.80 (m, 1 H) 4.47 (dt, J = 47.54, 6.06 Hz, 2 H) 2.70-2.88 (m, 3 H) 2.59-2.69 (m, 1 H) 2.42-2.58 (m broad, 4 H) 2.31-2.42 (m, 1 H) 2.00-2.28 (m, 5H) 1.89-2.00 (m, 2 H) 1.60-1.88 (m, 3 H) | 566 |
| 47 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2,2,2-trifluoroacetamide | 1H NMR (400 MHz, DMSO-d6, δ ppm): 11.29 (s, 1 H) 9.83-10.24 (m, 1 H) 7.66 (d, J = 2.08 Hz, 1 H) 7.61 (d, J = 2.08 Hz, 1 H) 7.50 (dd, J = 8.47, 2.08 Hz, 1 H) 7.29 (J = 8.32, 2.08 Hz, 1 H) 7.21 (d, J = 8.32 Hz, 1 H) 6.71-6.85 (m, 5 H) 4.95-5.13 (m, 1 H) 4.52 (dt, J = 47.14, 5.53 Hz, 2 H) 3.61-4.09 (m, 2 H) 3.08-3.50 (m broad, 3 H) 2.78-2.97 (m, 2 H) 2.43-2.63 (m broad, 3 H) 1.92-2.26 (m, 6 H) | 621 |
| 48 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetamide | 1H NMR (400 MHz, DMSO-d6, δ ppm): 9.96 (s, 1 H) 7.53-7.62 (m, 2 H) 7.35 (br d, J = 8.31 Hz, 1 H) 7.25 (br d, J = 8.31 Hz, 1 H) 7.17 (d, J = 8.31 Hz, 1 H) 6.73 (d, J = 8.70 Hz, 2 H) 6.69 (d, J = 8.43 Hz, 1 H) 6.64 (d, J = 8.70 Hz, 2 H) 4.68-4.80 (m, 1 H) 4.45 (dt, J = 47.54, 6.06 Hz, 2 H) 2.71-2.92 (m, 3 H) 2.59-2.70 (m, 1 H) 2.42-2.58 (m conceal, 3 H) 2.30-2.42 (m, 1 H) 2.07-2.26 (m, 5H) 2.04 (s, 3 H) 1.61-1.89 (m, 3H) | 567 |

TABLE 1-continued

| Examples | Structure | Name | NMR | MASS: LC/MS (m/z, MH+): |
|---|---|---|---|---|
| 49 | | 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)ethan-1-ol | 1H NMR (400 MHz, DMSO-d6, δ ppm): 7.58 (d, J = 1.96 Hz, 1 H) 7.22-7.33 (m, 2 H) 7.10-7.21 (m, 2 H) 6.68-6.76 (m, 3 H) 6.64 (d, J = 8.90 Hz, 2 H) 5.12-5.21 (m, 1 H) 4.64-4.81 (m, 2 H) 4.45 (dt, J = 47.50, 5.90 Hz, 2 H) 2.72-2.96 (m, 3 H) 2.59-2.70 (m, 1 H) 2.42-2.57 (m broad, 3 H) 2.30-2.42 (m, 1 H) 2.03-2.28 (m, 5 H) 1.61-1.90 (m, 3 H) 1.35 (d, J = 6.48 Hz, 3 H) | 556 |
| 50 | | (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)propan-2-ol | 1H NMR (400 MHz, DMSO-d6, δ ppm): 7.59 (d, J = 2.03 Hz, 1 H) 7.43 (d, J = 1.86 Hz, 1 H) 7.22-7.31 (m, 2 H) 7.16 (d, J = 8.27 Hz, 1 H) 6.67-6.78 (m, 3 H) 6.64 (d, J = 8.89 Hz, 2 H) 5.00 (s, 1 H) 4.68-4.79 (m, 1 H) 4.46 (dt, J = 47.50, 5.94 Hz, 2 H) 2.72-2.96 (m, 3 H) 2.58-2.71 (m, 1 H) 2.42-2.56 (m broad, 3 H) 2.31-2.42 (m, 1 H) 2.04-2.29 (m, 5H) 1.61-1.89 (m, 3H) 1.45 (s, 6 H) | 570 |
| 51 | | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazole | 1H NMR (400 MHz, DMSO-d6, δ ppm): 12.69-13.53 (m, 1H) 7.48-7.89 (m, 4 H) 7.28 (d, J = 8.54 Hz, 1 H) 7.20 (d, J = 8.54 Hz, 1 H) 6.69-6.86 (m, 4 H) 6.64 (d, J = 8.68 Hz, 2 H) 4.68-4.81 (m, 1 H) 4.46 (dt, J = 47.50, 5.87 Hz, 2 H) 2.84-2.98 (m, 2 H) 2.73-2.83 (m, 1 H) 2.59-2.69 (m, 1 H) 2.42-2.58 (m broad, 3 H) 2.31-2.41 (m, 1 H) 2.07-2.28 (m, 5 H) 1.61-1.89 (m, 3H) | 578 |

TABLE 1-continued

| Examples | Structure | Name | NMR | MASS: LC/MS (m/z, MH+): |
|---|---|---|---|---|
| 52 | | (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol | 1H NMR (400 MHz, DMSO-d6, δ ppm): 9.55 (s, 1 H) 7.59 (d, J = 2.01 Hz, 1 H) 7.50-7.57 (m, 3 H) 7.40 (dd, J = 8.20, 1.88 Hz, 1 H) 7.28 (dd, J = 8.33, 2.01 Hz, 1 H) 7.19 (d, J = 8.33 Hz, 1 H) 6.85 (d, J = 8.56 Hz, 2 H) 6.74-6.82 (m, 3 H) 6.66 (d, J = 8.68 Hz, 2 H) 4.71-4.79 (m, 1 H) 4.46 (dt, J = 47.44, 6.06 Hz, 2 H) 2.86-2.97 (m, 2 H) 2.74-2.85 (m, 1 H) 2.60-2.70 (m, 1 H) 2.43-2.58 (m conceal, 3 H) 2.32-2.42 (m, 1 H) 2.07-2.27 (m, 5 H) 1.61-1.90 (m, 3 H) | 604 |
| 53 | | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol | 1H NMR (400 MHz, DMSO-d6, δ ppm): 9.51 (s, 1 H) 7.55-7.62 (m, 2 H) 7.43 (dd, J = 8.33, 2.05 Hz, 1 H) 7.23-7.31 (m, 2 H) 7.20 (d, J = 8.37 Hz, 1 H) 7.12 (d, J = 7.95 Hz, 1 H) 7.05-7.09 (m, 1 H) 6.84 (d, J = 8.33 Hz, 1 H) 6.73-6.81 (m, 3 H) 6.62-6.69 (m, 2 H) 4.70-4.80 (m, 1 H) 4.46 (dt, J = 47.44, 6.06 Hz, 2 H) 2.88-3.00 (m, 2 H) 2.75-2.84 (m, 1 H) 2.61-2.70 (m, 1 H) 2.42-2.58 (m conceal, 3 H) 2.32-2.42 (m, 1 H) 2.11-2.27 (m, 5 H) 1.62-1.89 (m, 3 H) | 604 |
| 54 | | (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol | 1H NMR (400 MHz, DMSO-d6, δ ppm): 9.53 (s, 1 H) 7.60 (d, J = 2.03 Hz, 1 H) 7.46-7.55 (m, 1 H) 7.39 (dd, J = 8.07, 1.71 Hz, 1 H) 7.23-7.33 (m, 2 H) 7.12-7.22 (m, 2 H) 6.96 (d, J = 7.54 Hz, 1 H) 6.88 (t, J = 7.54 Hz, 1 H) 6.79 (d, J = 8.68 Hz, 3 H) 6.66 (d, J = 8.68 Hz, 2 H) 4.70-4.80 (m, 1 H) 4.46 (dt, J = 47.40, 2.06 Hz, 2 H) 2.84-2.99 (m, 2 H) 2.74-2.83 (m, 1 H) 2.59-2.71 (m, 1 H) 2.42-2.58 (m conceal, 3 H) 2.30-2.42 (m, 1 H) 2.07-2.28 (m, 5 H) 1.59-1.90 (m, 3 H) | 604 |

TABLE 1-continued

| Examples | Structure | Name | NMR | MASS: LC/MS (m/z, MH+): |
|---|---|---|---|---|
| 55 | | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid | 1H NMR (400 MHz, DMSO-d6, δ ppm): 11.49-13.97 (m, 1 H) 8.24 (s, 1 H) 7.91-8.00 (m, 2 H) 7.70 (d, J = 1.77 Hz, 1 H) 7.57-7.65 (m, 2 H) 7.53 (dd, J = 8.01, 1.77 Hz, 1 H) 7.27 (dd, J = 8.02, 2.02 Hz, 1 H) 7.21 (d, J = 8.02 Hz, 1 H) 6.88 (d, J = 8.01 Hz, 1 H) 6.78 (d, J = 8.69 Hz, 2 H) 6.65 (d, J = 8.69 Hz, 2 H) 4.70-4.81 (m, 1 H) 4.47 (dt, J = 47.44, 6.06 Hz, 2 H) 2.90-3.04 (m, 2 H) 2.79-2.88 (m, 1 H) 2.64-2.75 (m, 1 H) 2.55-2.63 (m, 1 H) 2.47-2.75 (m conceal, 2 H) 2.39-2.47 (m, 1 H) 2.09-2.29 (m, 5H) 1.64-1.88 (m, 3 H) | 632 |
| 56 | | methyl (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate | 1H NMR (400 MHz, DMSO-d6, δ ppm): 8.06 (d, J = 8.44 Hz, 2 H) 7.89 (d, J = 8.44 Hz, 2 H) 7.76 (d, J = 1.83 Hz, 1 H) 7.56-7.63 (m, 2 H) 7.28 (dd, J = 8.83, 1.92 Hz, 1 H) 7.21 (d, J = 8.83 Hz, 1 H) 6.90 (d, J = 8.07 Hz, 1 H) 6.78 (d, J = 8.75 Hz, 2 H) 6.67 (d, J = 8.75 Hz, 2 H) 4.69-4.80 (m, 1 H) 4.47 (dt, J = 47.44, 6.06 Hz, 2 H) 3.89 (s, 3 H) 2.88-3.03 (m, 2 H) 2.75-2.86 (m, 1 H) 2.60-2.71 (m, 1 H) 2.43-2.60 (m conceal, 3 H) 2.32-2.43 (m, 1 H) 2.11-2.29 (m, 5 H) 1.62-1.89 (m, 3H) | 646 |
| 57 | | methyl (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate | 1H NMR (400 MHz, DMSO-d6, δ ppm): 8.21-8.27 (m, 1 H) 7.93-8.05 (m, 2 H) 7.71 (d, J = 1.82 Hz, 1 H) 7.64 (t, J = 7.98 Hz, 1 H) 7.60 (d, J = 2.16 Hz, 1 H) 7.54 (dd, J = 8.07, 1.82 Hz, 1 H) 7.27 (dd, J = 8.42, 2.20 Hz, 1 H) 7.21 (d, J = 8.42 Hz, 1 H) 6.89 (d, J = 8.07 Hz, 1 H) 6.78 (d, J = 8.68 Hz, 2 H) 6.67 (d, J = 8.68 Hz, 2 H) 4.68-4.82 (m, 1 H) 4.46 (dt, J = 47.44, 2.06 Hz, 2 H) 3.91 (s, 3 H) 2.91-3.04 (m, 2 H) 2.75-2.86 (m, 1 H) 2.60-2.70 (m, 1 H) 2.42-2.58 (m conceal, 3 H) 2.31-2.42 (m, 1 H) 2.10-2.28 (m, 5 H) 1.63-1.89 (m, 3 H) | 646 |

TABLE 1-continued

| Examples | Structure | Name | NMR | MASS: LC/MS (m/z, MH+): |
|---|---|---|---|---|
| 58 | | (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)pyrrolidin-2-one | 1H NMR (400 MHz, DMSO-d6, δ ppm): 1.66-1.92 (m, 3 H) 2.01-2.28 (m, 8 H) 2.52-2.63 (m, 6 H) 2.79-2.95 (m, 3 H) 3.86 (t, J = 7.65 Hz, 2 H) 4.47 (dt, JHF = 47.4 Hz, J = 6.0 Hz, 2H) 4.72-4.82 (m, 1 H) 6.65 (d, J = 8.97 Hz, 2 H) 6.69-6.81 (m, 3 H) 7.18 (d, J = 8.35 Hz, 1 H) 7.25 (dd, J = 8.35, 2.01 Hz, 1 H) 7.47 (dd, J = 8.53, 2.01 Hz, 1 H) 7.57 (d, J = 2.01 Hz, 1 H) 7.65 (d, J = 2.26 Hz, 1 H) | 595 |
| 59 | | (S)-8-(2,4-dichlorophenyl)-9-(4-((1-(3-fluoropropyl)pyrrolidin-3-yl)oxy)phenyl)-N'-(1H-imidazole-1-carbonothioyl)-6,7-dihydro-5H-benzo[7]annulene-3-carbohydrazide | 1H NMR (400 MHz, DMSO-d6, δ ppm): 1.89-2.05 (m, 3 H); 2.14-2.55 (m broad, 5 H); 2.89-3.46 (m broad, 8 H); 4.50 (td, J = 5.7 and 47.2 Hz, 2 H); 4.99 (m, 1 H); 6.73 (d, J = 8.9 Hz, 2 H); 6.81 (d, J = 8.9 Hz, 2 H); 6.89 (d, J = 8.1 Hz, 1 H); 6.99 (s broad, 1 H); 7.23 (d, J = 8.4 Hz, 1 H); 7.29 (dd, J = 2.2 and 8.4 Hz, 1 H); 7.61 (d, J = 2.2 Hz, 1 H); 7.62 (dd, J = 1.9 and 8.1 Hz, 1 H); 7.77 (d, J = 1.9 Hz, 1 H); 7.78 (t, J = 1.3 Hz, 1 H); 8.46 (s broad, 1 H); 10.50 (m, 1 H); 10.63 (s, 1 H) | 680 |
| 60 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)cyclopropanecarboxamide | 1H NMR (400 MHz, DMSO-d6, δ ppm): 10.22 (br s, 1 H) 7.63 (d, J = 1.93 Hz, 1 H) 7.56 (d, J = 2.07 Hz, 1 H) 7.35 (dd, J = 8.35, 1.93 Hz, 1 H) 7.26 (d, J = 8.09 Hz, 1 H) 7.17 (d, J = 8.09 Hz, 1 H) 6.73 (d, J = 8.71 Hz, 2 H) 6.69 (d, J = 8.35 Hz, 1 H) 6.64 (d, J = 8.71 Hz, 2H) 4.69-4.80 (m, 1 H) 4.46 (dt, J = 47.50, 5.98 Hz, 2 H) 2.71-2.91 (m, 3 H) 2.59-2.69 (m, 1 H) 2.43-2.58 (m broad, 3 H) 2.30-2.42 (m, 1 H) 2.02-2.27 (m, 5H) 1.62-1.89 (m, 4 H) 0.71-0.83 (m, 4 H) | 595 |

TABLE 1-continued

| Examples | Structure | Name | NMR | MASS: LC/MS (m/z, MH+): |
|---|---|---|---|---|
| 61 | | (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)thiazol-2-amine | 1H NMR (400 MHz, DMSO-d6, δ ppm): 7.76 (d, J = 1.63 Hz, 1 H) 7.55-7.65 (m, 2 H) 7.28 (dd, J = 8.38, 1.62 Hz, 1 H) 7.19 (d, J = 8.38 Hz, 1 H) 7.04-7.10 (m, 2 H) 7.02 (s, 1 H) 6.76 (d, J = 8.44 Hz, 3 H) 6.65 (d, J = 8.44 Hz, 2 H) 4.68-4.82 (m, 1 H) 4.47 (dt, J = 47.50, 5.97 Hz, 2 H) 2.72-2.99 (m, 3 H) 2.60-2.72 (m, 1 H) 2.29-2.60 (m broad, 4 H) 2.06-2.28 (m, 5 H) 1.62-1.88 (m, 3 H) | 610 |
| 62 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)pivalamide | 1H NMR (400 MHz, DMSO-d6, δ ppm): 9.23 (s, 1 H) 7.65 (d, J = 2.09 Hz, 1 H) 7.58 (d, J = 1.93 Hz, 1 H) 7.45 (dd, J = 8.35, 2.09 Hz, 1H) 7.26 (dd, J = 8.35, 1.93 Hz, 1 H) 7.19 (d, J = 8.35 Hz, 1 H) 6.67-6.78 (m, 3 H) 6.64 (d, J = 8.77 Hz, 2 H) 4.68-4.81 (m, 1 H) 4.47 (dt, J = 47.50, 5.97 Hz, 2 H) 2.71-2.92 (m, 3 H) 2.59-2.71 (m, 1 H) 2.43-2.58 (m broad, 3 H) 2.29-2.42 (m, 1 H) 2.03-2.27 (m, 5 H) 1.58-1.90 (m, 3H) 1.23 (s, 9 H) | 611 |
| 63 | | (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxamide | 1H NMR (400 MHz, DMSO-d6, δ ppm): 1.63-1.86 (m, 3 H); 2.08-2.23 (m, 5 H); 2.25 (s, 3 H); 2.31-2.68 (m broad, 4 H); 2.74-2.94 (m, 4 H); 4.46 (td, J = 6.0 and 47.4 Hz, 2 H); 4.73 (m, 1 H); 6.62 (d, J = 8.8 Hz, 2 H); 6.74 (d, J = 8.8 Hz, 2 H); 6.81 (d, J = 8.0 Hz, 1 H); 6.98 (dd, J = 1.2 and 8.0 Hz, 1 H); 7.04 (d, J = 8.0 Hz, 1 H); 7.24 (d, J = 1.2 Hz, 1 H); 7.31 (s broad, 1 H); 7.65 (dd, J = 1.8 and 8.0 Hz, 1 H); 7.83 (d, J = 1.8 Hz, 1 H); 7.94 (s broad, 1 H) | 582 |

TABLE 1-continued

| Examples | Structure | Name | NMR | MASS: LC/MS (m/z, MH+): |
|---|---|---|---|---|
| 64 | | (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carbonitrile 2,2,2-trifluoroacetate | 1H NMR (400 MHz, DMSO-d6, δ ppm): 1.83-2.21 (m broad, 8 H); 2.25 (s, 3 H); 2.92 (t, J = 6.3 Hz, 2 H); 2.97-3.90 (m broad, 6 H); 4.50 (td, J = 5.7 and 47.0 Hz, 2 H); 5.00 (m, 1 H); 6.72 (d, J = 8.8 Hz, 2 H); 6.80 (d, J = 8.8 Hz, 2 H); 6.90 (d, J = 8.0 Hz, 1 H); 6.99 (dd, J = 1.7 and 7.9 Hz, 1 H); 7.06 (d, J = 7.9 Hz, 1 H); 7.26 (d, J = 1.7 Hz, 1 H); 7.64 (dd, J = 1.9 and 8.0 Hz, 1 H); 7.84 (d, J = 1.9 Hz, 1 H); 10.02 (m broad, 1 H) | 534 |
| 65 | | 1-(8-(2-chloro-3-fluorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol | 1H NMR (400 MHz, DMSO-d6, δ ppm): 7.46 (br d, J = 2.81 Hz, 1 H) 7.28-7.35 (m, 1 H) 7.18-7.27 (m, 2 H) 6.99-7.06 (m, 1 H) 6.79-6.88 (m, 2 H) 6.73 (d, J = 8.72 Hz, 2 H) 6.64 (d, J = 8.72 Hz, 2 H) 5.09-5.21 (m, 1 H) 4.68-4.78 (m, 1 H) 4.46 (dt, J = 47.44, 6.04 Hz, 2 H) 2.83-2.95 (m, 2 H) 2.72-2.83 (m, 1 H) 2.59-2.72 (m, 1 H) 2.42-2.58 (m broad, 3 H) 2.31-2.41 (m, 1 H) 2.07-2.28 (m, 5 H) 1.60-1.89 (m, 3H) | 630 |
| 66 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-fluorocyclopropane-1-carboxamide | 1H NMR (400 MHz, DMSO-d6, δ ppm): 10.19-10.29 (m, 1 H) 7.72 (d, J = 2.08 Hz, 1 H) 7.59 (d, J = 1.96 Hz, 1 H) 7.51 (dd, J = 8.44, 2.08 Hz, 1 H) 7.27 (d, J = 8.33 Hz, 1 H) 7.18 (d, J = 8.33 Hz, 1 H) 6.70-6.77 (m, 3 H) 6.64 (d, J = 8.76 Hz, 2 H) 4.70-4.79 (m, 1 H) 4.46 (dt, J = 47.50, 5.97 Hz, 2 H) 2.72-2.93 (m, 3 H) 2.59-2.69 (m, 1 H) 2.42-2.59 (m broad, 3 H) 2.31-2.41 (m, 1 H) 2.03-2.27 (m, 5 H) 1.63-1.90 (m, 3 H) 1.36-1.49 (m, 2 H) 1.27-1.35 (m, 2 H) | 593 |

TABLE 1-continued

| Examples | Structure | Name | NMR | MASS: LC/MS (m/z, MH+): |
|---|---|---|---|---|
| 67 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-methylcyclopropane-1-carboxamide | 1H NMR (400 MHz, DMSO-d6, δ ppm): 9.19 (br s, 1 H) 7.62 (d, J = 2.07 Hz, 1 H) 7.58 (d, J = 1.88 Hz, 1 H) 7.44 (dd, J = 8.67, 2.07 Hz, 1 H) 7.26 (d, J = 8.17 Hz, 1 H) 7.17 (d, J = 8.17 Hz, 1 H) 6.72 (d, J = 8.67 Hz, 2 H) 6.69 (d, J = 8.67 Hz, 1 H) 6.64 (d, J = 8.67 Hz, 2 H) 4.68-4.80 (m, 1 H) 4.46 (dt, J = 47.44, 6.03 Hz, 2 H) 2.70-2.91 (m, 3 H) 2.59-2.70 (m, 1 H) 2.42-2.58 (m broad, 3 H) 2.31-2.42 (m, 1 H) 2.03-2.27 (m, 5H) 1.61-1.89 (m, 3 H) 1.40 (s, 3 H) 1.04-1.13 (m, 2 H) 0.57-0.69 (m, 2 H) | 613 |
| 68 | | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2-hydroxycyclopent-2-en-1-one | 1H NMR (400 MHz, DMSO-d6, δ ppm): 1.63-1.89 (m, 3 H) 2.10-2.28 (m, 5 H) 2.34-2.47 (m, 5 H) 2.51-2.58 (m, 1 H) 2.60-2.70 (m, 1 H) 2.74-3.00 (m, 5 H) 4.46 (dt, JHF = 47.4 Hz, J = 6.0 Hz, 2 H) 4.74 (m, 1 H) 6.65 (d, J = 8.60 Hz, 2 H) 6.75 (d, J = 8.60 Hz, 2 H) 6.85 (d, J = 8.28 Hz, 1 H) 7.20 (d, J = 8.60 Hz, 1 H) 7.27 (dd, J = 8.60, 2.01 Hz, 1 H) 7.58 (d, J = 2.01 Hz, 1 H) 7.73 (dd, J = 8.28, 1.76 Hz, 1 H) 7.89 (d, J = 1.76 Hz, 1 H) 9.86 (s, 1 H) | 609 |
| 69 | | (S,Z)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-N,3-dimethylthiazol-2(3H)-imine hydrochloride | 1H NMR (400 MHz, DMSO-d6, δ ppm): 1.86-2.28 (m, 7 H) 2.91-2.98 (m, 3 H) 3.07 (s, 3 H) 3.20-3.27 (m, 6 H) 3.43 (s, 3 H) 4.51 (dt, JHF = 47.4 Hz, J = 6.0 Hz, 2 H) 4.90-5.06 (m, 1 H) 6.75 (d, J = 8.58 Hz, 2 H) 6.82 (d, J = 8.58 Hz, 2 H) 6.91 (d, J = 8.03 Hz, 1 H) 7.22 (d, J = 8.44 Hz, 1 H) 7.28-7.39 (m, 2 H) 7.51 (d, J = 1.76 Hz, 1H) 7.61 (d, J = 2.01 Hz, 1 H) | 608 |

TABLE 1-continued

| Examples | Structure | Name | NMR | MASS: LC/MS (m/z, MH+): |
|---|---|---|---|---|
| 70 | | (S)-5-(8-(2-chloro-4-methylphenyl)-9-(4-((1-(3-fluoropropyl)pyrrolidin-3-yl)oxy)phenyl)-6,7-dihydro-5H-benzo[7]annulen-3-yl)-2H-tetrazole 2,2,2-trifluoroacetate | 1H NMR (400 MHz, DMSO-d6, δ ppm): 1.90-2.05 (m, 3 H); 2.11-2.24 (m, 5 H); 2.26 (s, 3 H); 2.40 (m, 1 H); 2.96 (t, J = 6.3 Hz, 2 H); 3.04-3.48 (m broad, 6 H); 4.51 (td, J = 5.7 and 47.0 Hz, 2 H); 4.98 (m, 1 H); 6.72 (d, J = 8.8 Hz, 2 H); 6.83 (d, J = 8.8 Hz, 2 H); 6.94 (d, J = 8.2 Hz, 1 H); 7.00 (dd, J = 1.7 and 7.9 Hz, 1 H); 7.07 (d, J = 7.9 Hz, 1 H); 7.26 (d, J = 1.7 Hz, 1 H); 7.85 (dd, J = 2.1 and 8.2 Hz, 1 H); 8.02 (d, J = 2.1 Hz, 1 H) | 674 |
| 71 | | tert-butyl (S)-(9-(4-((1-(3-fluoropropyl)pyrrolidin-3-yl)oxy)phenyl)-8-phenyl-6,7-dihydro-5H-benzo[7]annulen-3-yl)carbamate | 1H NMR (400 MHz, DMSO-d6, δ ppm): 1.49 (s, 9 H); 1.62-1.88 (m, 3 H); 2.01-2.83 (m broad, 13 H); 4.47 (td, J = 6.1 and 47.6 Hz, 2 H); 4.74 (m, 1 H); 6.60 (d, J = 8.8 Hz, 2 H); 6.64 (d, J = 8.5 Hz, 1 H); 6.72 (d, J = 8.8 Hz, 2 H); 7.07-7.24 (m, 6 H); 7.44 (s broad, 1 H); 9.35 (s, 1 H) | 670 |
| 72 | | (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid | 1H NMR (400 MHz, DMSO-d6, δ ppm): 12.45-13.34 (m, 1 H) 8.04 (d, J = 8.44 Hz, 2 H) 7.86 (d, J = 8.44 Hz, 2 H) 7.73-7.79 (m, 1 H) 7.61 (d, J = 2.01 Hz, 1 H) 7.58 (dd, J = 8.06, 1.92 Hz, 1 H) 7.30 (dd, J = 8.36, 2.16 Hz, 1 H) 7.23 (d, J = 8.36 Hz, 1 H) 6.88 (d, J = 8.07 Hz, 1 H) 6.83 (d, J = 8.78 Hz, 2 H) 6.76 (d, J = 8.78 Hz, 2 H) 4.98-5.07 (m, 1 H) 4.54 (dt, J = 47.20, 5.72 Hz, 2 H) 3.06-3.78 (m, 6 H) 2.88-3.04 (m, 2 H) 2.48-2.53 (m broad, 1 H) 2.01-2.32 (m, 7 H) | 673 |

TABLE 1-continued

| Examples | Structure | Name | NMR | MASS: LC/MS (m/z, MH+): |
|---|---|---|---|---|
| 73 | | (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazol-5-amine | 1H NMR (400 MHz, DMSO-d6, δ ppm): 11.10-12.26 (m, 1 H) 7.62 (s, 1 H) 7.59 (d, J = 1.96 Hz, 1 H) 7.46 (dd, J = 8.01, 1.28 Hz, 1 H) 7.27 (dd, J = 8.30, 1.96 Hz, 1 H) 7.20 (d, J = 8.30 Hz, 1 H) 6.76 (d, J = 8.56 Hz, 3 H) 6.65 (d, J = 8.56 Hz, 2 H) 5.72-5.82 (m, 1 H) 4.67-4.90 (m, 3 H) 4.47 (dt, J = 47.37, 5.95 Hz, 2 H) 2.75-2.96 (m, 3 H) 2.60-2.72 (m, 1 H) 2.31-2.60 (m broad, 4 H) 2.07-2.29 (m, 5 H) 1.63-1.90 (m, 3 H) | 558 |
| 74 | | (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)(3-hydroxyazetidin-1-yl)methanone | 1H NMR (400 MHz, DMSO-d6, δ ppm): 7.57-7.63 (m, 2 H) 7.43 (dd, J = 8.03, 1.79 Hz, 1 H) 7.28 (d, J = 8.21 Hz, 1 H) 7.20 (d, J = 8.21 Hz, 1 H) 6.83 (d, J = 8.03 Hz, 1 H) 6.75 (d, J = 8.78 Hz, 2 H) 6.66 (d, J = 8.78 Hz, 2 H) 5.75 (d, J = 5.97 Hz, 1 H) 4.71-4.81 (m, 1 H) 4.37-4.57 (m, 4 H) 4.20-4.32 (m, 1 H) 4.01-4.12 (m, 1 H) 3.75-3.83 (m, 1 H) 2.86-2.97 (m, 2 H) 2.74-2.85 (m, 1 H) 2.60-2.70 (m, 1 H) 2.42-2.57 (m broad, 3 H) 2.35-2.42 (m, 1 H) 2.08-2.30 (m, 5H) 1.62-1.89 (m, 3 H) | 627 |
| 75 | | (S)-8-(2,4-dichlorophenyl)-9-(4-((1-(3-fluoropropyl)pyrrolidin-3-yl)oxy)phenyl)-N-(oxetan-3-yl)-6,7-dihydro-5H-benzo[7]annulene-3-carboxamide | 1H NMR (400 MHz, DMSO-d6, δ ppm): 9.11 (d, J = 6.53 Hz, 1 H) 7.86 (d, J = 1.69 Hz, 1 H) 7.69 (dd, J = 8.20, 1.69 Hz, 1 H) 7.61 (d, J = 1.93 Hz, 1 H) 7.29 (dd, J = 8.40, 1.93 Hz, 1 H) 7.21 (d, J = 8.40 Hz, 1 H) 6.87 (d, J = 8.20 Hz, 1 H) 6.74 (d, J = 8.85 Hz, 2 H) 6.66 (d, J = 8.85 Hz, 2 H) 4.95-5.08 (m, 1 H) 4.71-4.82 (m, 3 H) 4.61 (t, J = 6.48 Hz, 2 H) 4.47 (dt, J = 47.48, 5.93 Hz, 2 H) 2.86-2.99 (m, 2 H) 2.73-2.85 (m, 1 H) 2.60-2.72 (m, 1 H) 2.34-2.60 (m broad, 4 H) 2.10-2.28 (m, 5 H) 1.60-1.89 (m, 3 H) | 632 |

TABLE 1-continued

| Examples | Structure | Name | NMR | MASS: LC/MS (m/z, MH+): |
|---|---|---|---|---|
| 76 | | ethyl (S)-2-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-2-oxoacetate | 1H NMR (400 MHz, DMSO-d6, δ ppm): 10.79 (s, 1 H) 7.72 (d, J = 2.08 Hz, 1 H) 7.58 (d, J = 2.15 Hz, 1 H) 7.54 (dd, J = 8.47, 2.08 Hz, 1 H) 7.26 (d, J = 8.22 Hz, 1 H) 7.18 (d, J = 8.22 Hz, 1 H) 6.69-6.79 (m, 3 H) 6.64 (d, J = 8.79 Hz, 2 H) 4.68-4.79 (m, 1 H) 4.46 (dt, J = 47.56, 5.99 Hz, 2 H) 4.31 (q, J = 7.12 Hz, 2 H) 2.72-2.94 (m, 3 H) 2.58-2.70 (m, 1 H) 2.41-2.58 (m broad, 3 H) 2.28-2.40 (m, 1 H) 2.03-2.26 (m, 5 H) 1.61-1.88 (m, 3 H) 1.32 (t, J = 7.12 Hz, 3H) | 593 |
| 77 | | (S)-N1-(8-(2,4-dichlorophenyl)-9-(4-((1-(3-fluoropropyl)pyrrolidin-3-yl)oxy)phenyl)-6,7-dihydro-5H-benzo[7]annulen-3-yl)oxalamide | 1H NMR (400 MHz, DMSO-d6, δ ppm): 10.49 (s, 1 H) 8.18-8.26 (m, 1 H) 7.90-7.96 (m, 1 H) 7.74 (d, J = 2.16 Hz, 1 H) 7.55 (dd, J = 8.57, 2.16 Hz, 1 H) 7.52 (d, J = 2.09 Hz, 1 H) 7.19 (d, J = 8.25 Hz, 1 H) 7.11 (d, J = 8.25 Hz, 1 H) 6.66 (d, J = 7.46 Hz, 3 H) 6.57 (d, J = 8.80 Hz, 2 H) 4.61-4.74 (m, 1 H) 4.40 (dt, J = 47.52, 5.99 Hz, 2 H) 2.65-2.85 (m, 3 H) 2.53-2.63 (m, 1 H) 2.35-2.52 (m broad, 3 H) 2.28-2.34 (m, 1 H) 1.99-2.22 (m, 5 H) 1.54-1.81 (m, 3H) | 594 |
| 78 | | (S)-8-(2-chloro-4-methylphenyl)-9-(4-((1-(3-fluoropropyl)pyrrolidin-3-yl)oxy)phenyl)-6,7-dihydro-5H-benzo[7]annulen-3-amine | 1H NMR (400 MHz, DMSO-d6, δ ppm): 1.63-1.85 (m, 3 H); 1.97-2.07 (m, 2 H); 2.13-2.20 (m, 3 H); 2.23 (s, 3 H); 2.33-2.82 (m broad, 8 H); 4.46 (td, J = 6.1 and 47.4 Hz, 2 H); 4.71 (m, 1 H); 5.11 (s, 2 H); 6.35 (dd, J = 2.4 and 8.3 Hz, 1 H); 6.41 (d, J = 8.3 Hz, 1 H); 6.48 (d, J = 2.4 Hz, 1 H); 6.57 (d, J = 8.9 Hz, 2 H); 6.73 (d, J = 8.9 Hz, 2 H); 6.92 (dd, J = 1.9 and 8.0 Hz, 1 H); 6.96 (d, J = 8.0 Hz, 1 H); 7.20 (d, J = 1.9 Hz, 1 H) | 631 |

TABLE 1-continued

| Examples | Structure | Name | NMR | MASS: LC/MS (m/z, MH+): |
|---|---|---|---|---|
| 79 | | (S)-8-(6-ethoxy-2-fluoropyridin-3-yl)-9-(4-((1-(3-fluoropropyl)pyrrolidin-3-yl)oxy)phenyl)-6,7-dihydro-5H-benzo[7]annulene-3-carboxamide | 1H NMR (400 MHz, DMSO-d6, δ ppm): 1.28 (t, J = 7.1 Hz, 3 H); 1.65-1.86 (m, 3 H); 2.09-2.25 (m, 5 H); 2.38 (m, 1 H); 2.43-2.57 (m broad, 3 H); 2.65 (m, 1 H); 2.76-2.85 (m, 3 H); 4.19 (q, J = 7.1 Hz, 2 H); 4.46 (td, J = 6.1 and 47.5 Hz, 2 H); 4.76 (m, 1 H); 6.63 (dd, J = 1.2 and 8.2 Hz, 1 H); 6.67 (d, J = 8.9 Hz, 2 H); 6.74 (d, J = 8.9 Hz, 2 H); 6.81 (d, J = 8.1 Hz, 1 H); 7.32 (s broad, 1 H); 7.63 (dd, J = 8.2 and 10.1 Hz, 1 H); 7.67 (dd, J = 2.0 and 8.1 Hz, 1 H); 7.83 (d, J = 2.0 Hz, 1 H); 7.94 (s broad, 1 H) | 611 |
| 80 | | (S)-8-(6-ethoxy-2-fluoropyridin-3-yl)-9-(4-((1-(3-fluoropropyl)pyrrolidin-3-yl)oxy)phenyl)-6,7-dihydro-5H-benzo[7]annulene-3-carbonitrile 2,2,2-trifluoroacetate | 1H NMR (400 MHz, DMSO-d6, δ ppm): 1.28 (t, J = 7.1 Hz, 3 H); 1.94-2.58 (m broad, 8 H); 2.84 (t, J = 6.5 Hz, 1 H); 3.11-3.50 (m broad, 4 H); 3.64-4.00 (m, 2 H); 4.19 (q, J = 7.1 Hz, 2 H); 4.53 (td, J = 5.6 and 47.1 Hz, 2 H); 4.99-5.12 (m, 1 H); 6.65 (dd, J = 1.2 and 8.2 Hz, 1 H); 6.78 (d, J = 9.0 Hz, 2 H); 6.81 (d, J = 9.0 Hz, 2 H); 6.90 (d, J = 8.1 Hz, 1 H); 7.64 (dd, J = 1.9 and 8.1 Hz, 1 H); 7.68 (dd, J = 8.2 and 10.2 Hz, 1 H); 7.85 (d, J = 1.9 Hz, 1H); 9.90-10.12 (m, 1 H) | 645 |
| 81 | | (S)-4-(8-(2,4-dichlorophenyl)-9-(4-((1-(3-fluoropropyl)pyrrolidin-3-yl)oxy)phenyl)-6,7-dihydro-5H-benzo[7]annulen-yl)benzamide | 1H NMR (400 MHz, DMSO-d6, δ ppm): 8.01-8.07 (m, 1 H) 7.98 (d, J = 8.46 Hz, 2 H) 7.81 (d, J = 8.46 Hz, 2 H) 7.74 (d, J = 1.87 Hz, 1 H) 7.60 (d, J = 2.08 Hz, 1 H) 7.57 (dd, J = 8.07, 1.87 Hz, 1 H) 7.37-7.44 (m, 1 H) 7.28 (dd, J = 8.28, 2.08 Hz, 1 H) 7.21 (d, J = 8.28 Hz, 1 H) 6.88 (d, J = 8.07 Hz, 1 H) 6.78 (d, J = 8.68 Hz, 2 H) 6.67 (d, J = 8.80 Hz, 2 H) 4.71-4.80 (m, 1 H) 4.47 (dt, J = 47.48, 5.98 Hz, 2 H) 2.90-3.01 (m, 2 H) 2.74-2.84 (m, 1 H) 2.60-2.70 (m, 1 H) 2.43-2.59 (m broad, 3 H) 2.32-2.42 (m, 1 H) 2.12-2.29 (m, 5 H) 1.62-1.89 (m, 3 H) | 611 |

TABLE 1-continued

| Examples | Structure | Name | NMR | MASS: LC/MS (m/z, MH+): |
|---|---|---|---|---|
| 82 | | (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)methanol | 1H NMR (400 MHz, DMSO-d6, δ ppm): 1.62-1.88 (m, 3 H) 2.07-2.25 (m, 6 H) 2.35-2.42 (m, 1 H) 2.43-2.49 (m, 2 H) 2.60-2.71 (m, 1 H) 2.75-2.93 (m, 3 H) 4.36-4.57 (m, 4 H) 4.68-4.83 (m, 1 H) 5.15 (t, J = 5.77 Hz, 1H) 6.63 (d, J = 8.66 Hz, 2 H) 6.69-6.76 (m, 3 H) 7.12 (dd, J = 8.18, 0.94 Hz, 1 H) 7.17 (d, J = 8.18 Hz, 1H) 7.23-7.32 (m, 2 H) 7.57 (d, J = 2.26 Hz, 1 H) | 627 |
| 83 | | methyl (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate | 1H NMR (400 MHz, DMSO-d6, δ ppm): 7.74 (dd, J = 7.72, 1.20 Hz, 1 H) 7.58-7.67 (m, 2 H) 7.46-7.55 (m, 2 H) 7.18-7.32 (m, 3 H) 7.13 (dd, J = 7.95, 1.92 Hz, 1 H) 6.83 (d, J = 7.95 Hz, 1 H) 6.79 (d, J = 8.72 Hz, 2 H) 6.67 (d, J = 8.72 Hz, 2 H) 4.71-4.81 (m, 1 H) 4.47 (dt, J = 47.55, 6.02 Hz, 2 H) 3.60 (s, 3 H) 2.84-2.98 (m, 2 H) 2.76-2.84 (m, 1 H) 2.59-2.69 (m, 1 H) 2.42-2.58 (m broad, 3 H) 2.34-2.42 (m, 1 H) 2.09-2.29 (m, 5 H) 1.63-1.88 (m, 3 H) | 598 |
| 84 | | (S)-N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-hydroxycyclopropane-1-carboxamide formate | 1H NMR (400 MHz, DMSO-d6, δ ppm): 9.75 (s, 1 H) 8.13 (s, 1 H) 7.74 (d, J = 2.08 Hz, 1 H) 7.58 (d, J = 2.08 Hz, 1 H) 7.51 (dd, J = 8.45, 2.08 Hz, 1 H) 7.26 (dd, J = 8.45, 2.08 Hz, 1 H) 7.17 (d, J = 8.45 Hz, 1 H) 6.74 (br d, J = 8.70 Hz, 2 H) 6.62-6.70 (m, 3 H) 6.49-6.60 (m, 1 H) 4.69-4.85 (m, 1 H) 4.47 (dt, J = 47.40, 5.95 Hz, 2 H) 2.70-3.01 (m, 5 H) 2.39-2.64 (m broad, 3 H) 2.02-2.30 (m, 5 H) 1.63-1.95 (m, 3 H) 1.12-1.18 (m, 2 H) 0.94-0.99 (m, 2 H) | 506 |

TABLE 1-continued

| Examples | Structure | Name | NMR | MASS: LC/MS (m/z, MH+): |
|---|---|---|---|---|
| 85 | | (S)-1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-4-hydroxypyrrolidin-2-one | 1H NMR (400 MHz, DMSO-d6, δ ppm): 1.63-1.87 (m, 3 H) 2.07-2.26 (m, 5 H) 2.28-2.47 (m, 5 H) 2.58-2.66 (m, 1 H) 2.75-2.93 (m, 4 H) 3.58-3.72 (m, 1 H) 3.94-4.15 (m, 1 H) 4.36-4.57 (m, 3 H) 4.70-4.79 (m, 1 H) 5.32 (d, J = 3.76 Hz, 1 H) 6.63 (d, J = 9.16 Hz, 2 H) 6.70-6.79 (m, 3 H) 7.18 (d, J = 8.58 Hz 1 H) 7.26 (dd, J = 8.53 Hz, 1.17 Hz 1 H) 7.47 (dd, J = 8.53, 2.01 Hz, 1 H) 7.57 (d, J = 2.01 Hz, 1 H) 7.66 (d, J = 2.26 Hz, 1 H) | 549 |
| 86 | | (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid | 1H NMR (400 MHz, DMSO-d6, δ ppm): 11.89-13.41 (m, 1 H) 7.71 (d, J = 7.22 Hz, 1 H) 7.53-7.62 (m, 2 H) 7.41-7.49 (m, 2 H) 7.31 (d, J = 1.59 Hz, 1H) 7.27 (br d, J = 8.32 Hz, 1 H) 7.20 (d, J = 8.32 Hz, 1 H) 7.16 (dd, J = 7.95, 1.59 Hz, 1H) 6.79 (m, J = 8.80 Hz, 3 H) 6.67 (d, J = 8.81 Hz, 2 H) 4.70-4.81 (m, 1 H) 4.47 (dt, J = 47.40, 5.95 Hz, 2 H) 2.79-2.98 (m, 3 H) 2.62-2.72 (m, 1 H) 2.54-2.61 (m, 1 H) 2.46-2.54 (m broad, 2 H) 2.38-2.46 (m, 1 H) 2.08-2.28 (m, 5 H) 1.63-1.89 (m, 3 H) | 605 |
| 87 | | N-(8-(2,4-dichlorophenyl)-9-(4-((S)-1-(3-fluoropropyl)pyrrolidin-3-yl)oxy)phenyl)-6,7-dihydro-5H-benzo[7]annulen-3-yl)-2,2-difluorocyclopropane-1-carboxamide | 1H NMR (400 MHz, DMSO-d6, δ ppm): 10.48 (s, 1 H) 7.61 (d, J = 1.71 Hz, 1 H) 7.58 (d, J = 2.08 Hz, 1 H) 7.35 (dd, J = 8.44, 1.71 Hz, 1 H) 7.26 (dd, J = 8.31, 2.08 Hz, 1 H) 7.17 (d, J = 8.31 Hz, 1H) 6.70-6.76 (m, 3 H) 6.63 (d, J = 8.82 Hz, 2 H) 4.69-4.79 (m, 1 H) 4.46 (dt, J = 47.59, 5.99 Hz, 2 H) 2.71-2.92 (m, 4 H) 2.57-2.68 (m, 1 H) 2.41-2.56 (m broad, 3 H) 2.31-2.40 (m, 1 H) 2.06-2.26 (m, 5 H) 1.91-2.05 (m, 2 H) 1.62-1.87 (m, 3 H) | 645 |

TABLE 1-continued

| Examples | Structure | Name | NMR | MASS: LC/MS (m/z, MH+): |
|---|---|---|---|---|
| 88 | | (S)-3-((8-(2-chloro-4-methylphenyl)-9-(4-((1-(3-fluoropropyl)pyrrolidin-3-yl)oxy)phenyl)-6,7-dihydro-5H-benzo[7]annulen-3-yl)amino)-4-hydroxycyclobut-3-ene-1,2-dione | 1H NMR (400 MHz, DMSO-d6, δ ppm): 1.17 (t, J = 7.3 Hz, 9 H); 1.65-1.95 (m, 3 H); 2.01-2.11 (m, 2 H); 2.16-2.22 (m, 3 H); 2.24 (s, 3 H); 2.33-2.87 (m broad, 8 H); 3.09 (m, 6 H); 4.47 (td, J = 6.1 and 47.5 Hz, 2 H); 4.77 (m, 1 H); 6.53 (d, J = 8.3 Hz, 1 H); 6.61 (d broad, J = 9.0 Hz, 2 H); 6.75 (d broad, J = 9.0 Hz, 2 H); 6.95 (dd, J = 1.8 and 7.8 Hz, 1 H); 7.00 (d, J = 7.8 Hz, 1 H); 7.22 (d, J = 1.8 Hz, 1 H); 7.44 (dd, J = 2.3 and 8.3 Hz, 1 H); 7.58 (d, J = 2.3 Hz, 1 H); 8.85 (m, 1 H); 9.25 (s, 1 H); 9.90 (m, 1 H) | 625 |
| 89 | | (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-amine | 1H NMR (400 MHz, DMSO-d6, δ ppm): 1.62-1.85 (m, 3 H); 2.05 (m, 2 H); 2.13-2.24 (m, 3 H); 2.33-2.54 (m broad, 4 H); 2.59-2.82 (m, 4 H); 4.46 (td, J = 6.1 and 47.5 Hz, 2 H); 4.72 (m, 1 H); 5.16 (s, 2 H); 6.35 (dd, J = 2.4 and 8.4 Hz, 1 H); 6.43 (d, J = 8.4 Hz, 1 H); 6.49 (d, J = 2.4 Hz, 1 H); 6.59 (d, J = 8.9 Hz, 2 H); 6.72 (d, J = 8.9 Hz, 2 H); 6.94-6.98 (m, 1 H); 7.14-7.20 (m, 2 H) | 625 |
| 90 | | (S)-N-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)methanesulfonamide | 1H NMR (400 MHz, DMSO-d6, δ ppm): 1.62-1.86 (m, 3 H); 2.04-2.24 (m, 5 H); 2.39-2.89 (m broad, 8 H); 3.03 (s, 3 H); 4.46 (td, J = 6.1 and 47.4 Hz, 2 H); 4.73 (m, 1 H); 6.63 (d, J = 9.0 Hz, 2 H); 6.73 (m, 3 H); 6.99-7.05 (m, 2 H); 7.17 (d, J = 2.4 Hz, 1 H); 7.19-7.23 (m, 2 H); 9.80 (s, 1 H) | 574 |

TABLE 1-continued

| Examples | Structure | Name | NMR | MASS: LC/MS (m/z, MH+): |
|---|---|---|---|---|
| 91 | | (S)-1-(3-fluoropropyl)-3-(4-(8-phenyl-3-(4,4,5,5-tetramethyl-1,3,2-dioxaborolan-2-yl)-6,7-dihydro-5H-benzo[7]annulen-9-yl)phenoxy)pyrrolidine | 1H NMR (400 MHz, DMSO-d6, δ ppm): 1.30 (s, 12 H); 1.69-1.93 (m, 3 H); 2.09 (m, 2 H); 2.14-3.03 (m broad, 7 H); 2.25 (t, J = 6.7 Hz, 2 H); 2.79 (t, J = 6.7 Hz, 2 H); 4.47 (td, J = 6.0 and 47.3 Hz, 2 H); 4.80 (m, 1 H); 6.63 (d, J = 8.8 Hz, 2 H); 6.72 (d, J = 8.8 Hz, 2 H); 6.78 (d, J = 7.6 Hz, 1 H); 7.10-7.22 (m, 5 H); 7.47 (dd, J = 1.3 and 7.6 Hz, 1 H); 7.61 (d, J = 1.3 Hz, 1 H); 9.93 (m, 1 H) | 631 |
| 92 | | (S)-(9-(4-((1-(3-fluoropropyl)pyrrolidin-3-yl)oxy)phenyl)-8-phenyl-6,7-dihydro-5H-benzo[7]annulen-3-yl)boronic acid | 1H NMR (400 MHz, DMSO-d6, δ ppm): 1.73-2.00 (m, 3 H); 2.03-3.50 (m broad, 9 H); 2.26 (t, J = 6.7 Hz, 2 H); 2.78 (t, J = 6.7 Hz, 2 H); 4.49 (td, J = 6.0 and 47.6 Hz, 2 H); 4.86 (m, 1 H); 6.64 (d broad, J = 8.8 Hz, 2 H); 6.71 (d, J = 8.1 Hz, 1 H); 6.75 (d broad, J = 8.8 Hz, 2 H); 7.09-7.23 (m, 5 H); 7.57 (d, J = 8.1 Hz, 1 H); 7.71 (s, 1 H); 7.98 (s, 2 H); 9.91 (m, 1 H) | 542 |
| 93 | | (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetic acid | 1H NMR (400 MHz, DMSO-d6, δ ppm): 1.63-1.86 (m, 3 H); 2.06-2.25 (m, 5 H); 2.34-2.90 (m broad, 8 H); 3.55 (s, 2 H); 4.47 (td, J = 6.2 and 47.6 Hz, 2 H); 4.73 (m, 1 H); 6.63 (d, J = 8.9 Hz, 2 H); 6.69-6.74 (m, 3 H); 7.07 (dd, J = 1.9 and 8.1 Hz, 1 H); 7.17 (d, J = 8.4 Hz, 1 H); 7.21 (d, J = 1.9 Hz, 1 H); 7.25 (dd, J = 2.2 and 8.4 Hz, 1 H); 7.57 (d, J = 2.2 Hz, 1 H); 12.23 (m broad, 1 H) | 646 |

TABLE 1-continued

| Examples | Structure | Name | NMR | MASS: LC/MS (m/z, MH+): |
|---|---|---|---|---|
| 94 | | (S)-2-(3-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol | 1H NMR (400 MHz, DMSO-d6, δ ppm): 7.79 (s, 1 H) 7.63 (s, 1 H) 7.60 (d, J = 1.59 Hz, 1 H) 7.35-7.55 (m, 4 H) 7.28 (d, J = 8.35 Hz, 1 H) 7.21 (d, J = 8.35 Hz, 1 H) 6.86 (d, J = 8.08 Hz, 1 H) 6.79 (d, J = 8.61 Hz, 2 H) 6.67 (d, J = 8.61 Hz, 2 H) 5.08 (s, 1 H) 4.73-4.82 (m, 1 H) 4.47 (dt, J = 47.38, 5.85 Hz, 2 H) 2.90-3.00 (m, 2 H) 2.32-2.89 (m, 6 H) 2.11-2.31 (m, 5 H) 1.64-1.94 (m, 3 H) 1.49 (s, 6 H) | 657 |
| 95 | | (S)-2-(4-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol | 1H NMR (400 MHz, DMSO-d6, δ ppm): 7.61-7.67 (m, 3 H) 7.60 (d, J = 2.08 Hz, 1 H) 7.56 (d, J = 8.42 Hz, 2 H) 7.47 (dd, J = 8.07, 1.90 Hz, 1 H) 7.28 (dd, J = 8.30, 2.08 Hz, 1 H) 7.20 (d, J = 8.30 Hz, 1 H) 6.84 (d, J = 8.07 Hz, 1 H) 6.78 (d, J = 8.74 Hz, 2 H) 6.67 (d, J = 8.74 Hz, 2 H) 5.02-5.10 (m, 1 H) 4.70-4.80 (m, 1 H) 4.47 (dt, J = 47.41, 6.05 Hz, 2 H) 2.88-2.99 (m, 2 H) 2.75-2.87 (m, 1 H) 2.59-2.71 (m, 1 H) 2.53-2.58 (m, 1 H) 2.44-2.50 (m, 2 H) 2.34-2.43 (m, 1 H) 2.08-2.28 (m, 5 H) 1.63-1.89 (m, 3H) 1.48 (s, 6 H) | 611 |
| 96 | | (S)-3-(4-(8-(2-chloro-3-fluorophenyl)-3-(3-nitrophenyl)-6,7-dihydro-5H-benzo[7]annulen-9-yl)phenoxy)-1-(3-fluoropropyl)pyrrolidine | 1H NMR (400 MHz, DMSO-d6, δ ppm): 8.51 (t, J = 1.90 Hz, 1 H) 8.19-8.27 (m, 2 H) 7.75-7.85 (m, 2 H) 7.64 (dd, J = 8.07, 2.02 Hz, 1 H) 7.19-7.28 (m, 2 H) 7.03-7.11 (m, 1 H) 6.93 (d, J = 8.07 Hz, 1 H) 6.78 (d, J = 8.78 Hz, 2 H) 6.66 (d, J = 8.78 Hz, 2 H) 4.69-4.81 (m, 1 H) 4.47 (dt, J = 47.44, 5.97 Hz, 2 H) 2.94-3.04 (m, 2 H) 2.74-2.85 (m, 1 H) 2.59-2.71 (m, 1 H) 2.42-2.58 (m, 3 H) 2.32-2.42 (m, 1 H) 2.14-2.30 (m, 5 H) 1.60-1.89 (m, 3 H) | 734 |

TABLE 1-continued

| Examples | Structure | Name | NMR | MASS: LC/MS (m/z, MH+): |
|---|---|---|---|---|
| 97 | | (S)-3-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)aniline | 1H NMR (400 MHz, DMSO-d6, δ ppm): 7.51-7.56 (m, 1 H) 7.39 (dd, J = 8.01, 1.74 Hz, 1 H) 7.19-7.29 (m, 2 H) 7.11 (t, J = 7.68 Hz, 1 H) 7.01-7.07 (m, 1 H) 6.90 (s, 1 H) 6.88-6.87 (m, 2 H) 6.78 (d, J = 8.68 Hz, 2 H) 6.65 (d, J = 8.68 Hz, 2 H) 6.55-6.60 (m, 1 H) 5.11-5.21 (m, 2 H) 4.69-4.80 (m, 1 H) 4.47 (dt, J = 47.57, 5.99 Hz, 2 H) 2.89-2.99 (m, 2 H) 2.74-2.85 (m, 1 H) 2.60-2.70 (m, 1 H) 2.42-2.58 (m, 3 H) 2.33-2.42 (m, 1 H) 2.08-2.29 (m, 5 H) 1.61-1.89 (m, 3 H) | 632 |
| 98 | | (S)-2-(4-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)phenyl)propan-2-ol | 1H NMR (400 MHz, DMSO-d6, δ ppm): 7.68-7.61 (m, 3 H) 7.57 (d, J = 8.43 Hz, 2 H) 7.48 (dd, J = 8.20, 1.86 Hz, 1 H) 7.17-7.28 (m, 2 H) 7.00-7.08 (m, 1 H) 6.85 (d, J = 8.20 Hz, 1 H) 6.77 (d, J = 8.74 Hz, 2 H) 6.66 (d, J = 8.74 Hz, 2 H) 4.93-5.24 (m, 1 H) 4.67-4.80 (m, 1 H) 4.47 (dt, J = 47.54, 5.88 Hz, 2 H) 2.90-3.02 (m, 2 H) 2.76-2.87 (m, 1 H) 2.59-2.74 (m, 1 H) 2.44-2.60 (m, 3 H) 2.33-2.43 (m, 1 H) 2.08-2.31 (m, 5 H) 1.59-1.91 (m, 3 H) 1.47 (s, 6 H) | 631 |

The examples which follow describe the preparation of some compounds in accordance with the invention. The numbers of the compounds exemplified below match those given in the Table 1 above. All reactions are performed under inert atmosphere, unless otherwise stated.

In the following examples, when the source of the starting products is not specified, it should be understood that said products are known compounds.

EXAMPLES

Example 1. (S)-3-(4-(8-(2,4-dichlorophenyl)-3-(4,4,5,5-tetramethyl-1,3,2-dioxaborolan-2-yl)-6,7-dihydro-5H-benzo[7]annulen-9-yl)phenoxy)-1-(3-fluoropropyl)pyrrolidine

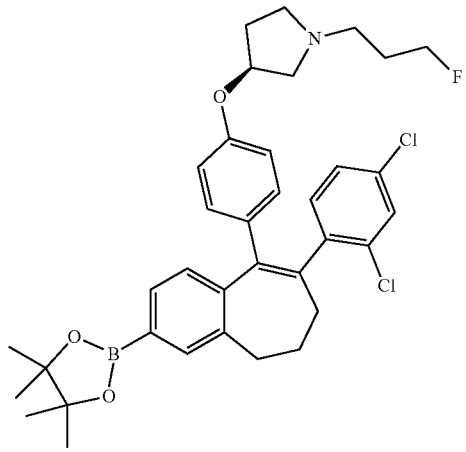 [SMILES: CC1(C)OB(c2ccc3c(c2)CCCC(c2ccc(Cl)cc2Cl)=C3c2ccc(O[C@H]3CCN(CCCF)C3)cc2)OC1(C)C]

Step 1: (S)-8-(2,4-dichlorophenyl)-9-(4-((1-(3-fluoropropyl)pyrrolidin-3-1)oxy)phenyl)-6,7-dihydro-5H-benzo[7]annulen-3-yl trifluoromethanesulfonate

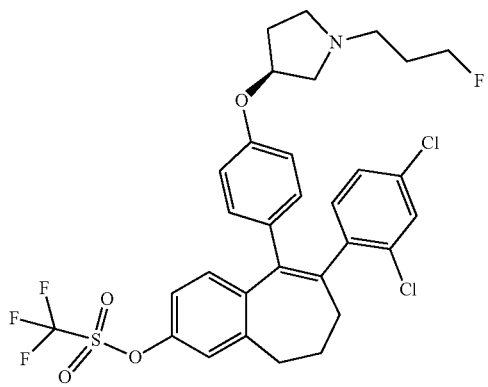 [SMILES: O=S(=O)(Oc1ccc2c(c1)CCCC(c1ccc(Cl)cc1Cl)=C2c1ccc(O[C@H]2CCN(CCCF)C2)cc1)C(F)(F)F]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulen-3-ol [WO2017140669] (141 mg, 267.82 μmol), in DCM (2 ml) and pyridine (35 μl, 429 μmol) was added trifluoromethanesulfonic anhydride (96 μl, 568 μmol). The reaction mixture was stirred at room temperature for 15 minutes. Cold water (5 ml) and DCM (10 ml) was added. After decantation, the organic phase was dried over MgSO$_4$, filtered and evaporated under reduced pressure to give 203 mg of (S)-8-(2,4-dichlorophenyl)-9-(4-((1-(3-fluoropropyl)pyrrolidin-3-1)oxy)phenyl)-6,7-dihydro-5H-benzo[7]annulen-3-yltrifluoromethanesulfonate.

LC/MS (m/z, MH+): 558

Step 2: (S)-3-(4-(8-(2,4-dichlorophenyl)-3-(4,4,5,5-tetramethyl-1,3,2-dioxaborolan-2-yl)-6,7-dihydro-5H-benzo[7]annulen-9-yl)phenoxy)-1-(3-fluoropropyl)pyrrolidine

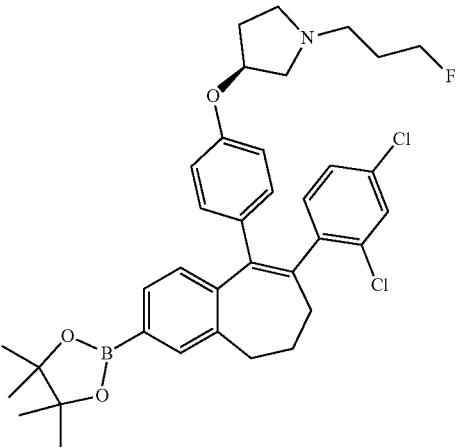 [SMILES: CC1(C)OB(c2ccc3c(c2)CCCC(c2ccc(Cl)cc2Cl)=C3c2ccc(O[C@H]3CCN(CCCF)C3)cc2)OC1(C)C]

A mixture of (S)-8-(2,4-dichlorophenyl)-9-(4-((1-(3-fluoropropyl)pyrrolidin-3-1)oxy)phenyl)-6,7-dihydro-5H-benzo[7]annulen-3-yl trifluoromethanesulfonate (89 mg, 81 μmol), 1,4-dioxane (0.9 ml), 4,4,4',4',5,5,5',5'-octamethyl-2,2'-bi(1,3,2-dioxaborolane) (55 mg, 216.59 μmol), bis(triphenylphosphine)palladium(II)chloride (7 mg, 10 μmol) and sodium acetate (45 mg, 543 μmol) was microwaved at 130° C. for 5 hours. Water (5 ml) and DCM (10 ml) was added. After hydrophobe column decantation, the organic phase was concentrated under reduced pressure and the residue was purified by flash chromatography eluting with a gradient of MeOH in DCM (100/0 to 95/05, v/v) to give 18 mg (34%) of tert-butyl (S)-3-(4-(8-(2,4-dichlorophenyl)-3-(4,4,5,5-tetramethyl-1,3,2-dioxaborolan-2-yl)-6,7-dihydro-5H-benzo[7]annulen-9-yl)phenoxy)-1-(3-fluoropropyl)pyrrolidine.

Example 2. (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)boronic acid

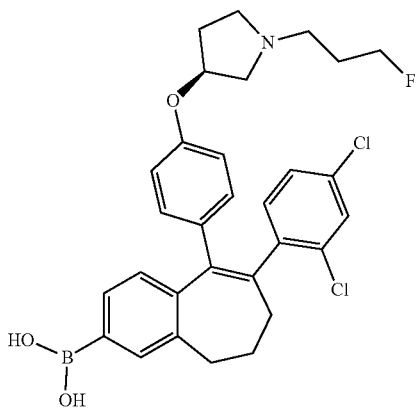 [SMILES: OB(O)c1ccc2c(c1)CCCC(c1ccc(Cl)cc1Cl)=C2c1ccc(O[C@H]2CCN(CCCF)C2)cc1]

A mixture of tert-butyl (S)-3-(4-(8-(2,4-dichlorophenyl)-3-(4,4,5,5-tetramethyl-1,3,2-dioxaborolan-2-yl)-6,7-dihydro-5H-benzo[7]annulen-9-yl)phenoxy)-1-(3-fluoropropyl)pyrrolidine [Example 1] (159 mg, 250 µmol), in THF (1.6 ml), water (0.4 ml) and NaIO₄ (160 mg, 749 µmol) was stirred at room temperature for 35 minutes. Hydrochloric acid 1M (0.17 ml, 170 µmol) was added. The reaction mixture was stirred at room temperature for 3 hours. Water (10 ml) and DCM (10 ml) was added. After hydrophobe column decantation, the organic phase was evaporated under reduced pressure and the residue was purified by reverse phase HPLC to give 23 mg (17%) of (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)boronic acid.

Example 3. (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide

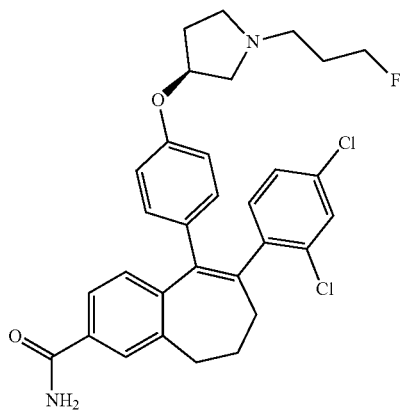 [SMILES: NC(=O)c1ccc2c(c1)CCCC(c1ccc(Cl)cc1Cl)=C2c1ccc(O[C@H]2CCN(CCCF)C2)cc1]

A mixture of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (511 mg, 921.58 µmol), pyridine (0.05 ml, 594.68 µmol), di-tert-butyl dicarbonate (105 mg, 460.79 µmol) and NH₄HCO₃ (112 mg, 1.38 mmol) in 1,4-dioxane (2.5 ml) was stirred at 40° C. for 5 hours and room temperature for 18 hours. Water (10 ml) and DCM (10 ml) was added. After hydrophobe column decantation, the organic phase was concentrated under reduced pressure and the residue was purified by flash chromatography eluting with a gradient of MeOH in DCM (100/0 to 90/10, v/v) to give 236 mg (46%) of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide.

Example 4. (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-3-ol

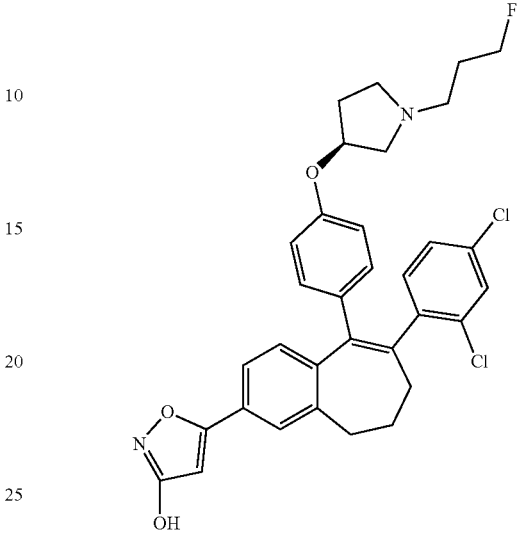

Step 1: Methyl (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-oxopropanoate

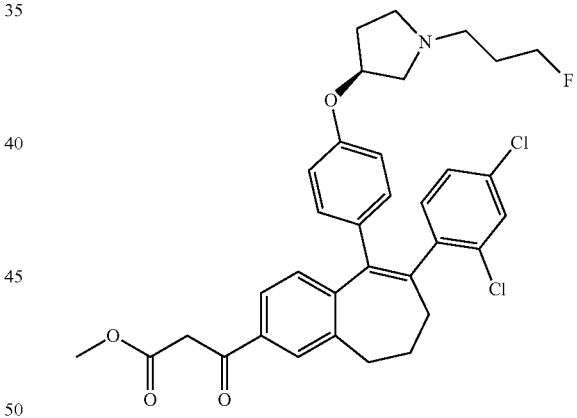

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (300 mg, 541.04 µmol), in THF (10 ml), was added CDI (164.50 mg, 811.57 µmol), and the reaction mixture was heated at reflux for 3 hours. A suspension of potassium 3-methoxy-3-oxopropanoate (352.08 mg, 2.16 mmol) and magnesium chloride (208, 12 mg, 2.16 mmol) in THF (4 ml) was added and the resulting reaction mixture was heated at reflux for 16 hours. The solvent was evaporated under reduced pressure and the residue partitioned between EtOAc and water, the organic phase was washed with water, dried over MgSO₄, filtered and evaporated under reduced pressure. The residue was purified by flash chromatography eluting with a mixture of DCM, EtOAc, and MeOH (50/45/5, v/v/v) to give 0.56 g (85%) methyl (S)-3-(8-(2,4-dichlorophenyl)-9-(4-((1-(3- fluoropropyl)pyrrolidin-3-yl)oxy)phenyl)-6,7-dihydro-5H-benzo[7]annulen-3-yl)-3-oxopropanoate.
LC/MS (m/z, MH+): 610

Step 2: 3-(8-(2,4-Dichlorophenyl)-9-(4-(((S)-1-(3-fluoropropyl)pyrrolidin-3-yl)oxy)phenyl)-6,7-dihydro-5H-benzo[7]annulen-3-yl)-3-oxo-N-((tetrahydro-2H-pyran-2-yl)oxy)propanamide

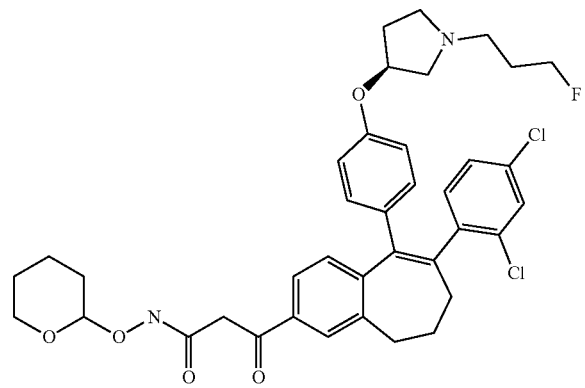 [SMILES: O=C(CC(=O)c1ccc2c(c1)CCCC(c1ccc(Cl)cc1Cl)=C2c1ccc(O[C@H]2CCN(CCCF)C2)cc1)NOC1CCCCO1]

A mixture of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-oxopropanoate (100 mg, 163.79 µmol), o-(tetrahydro-2h-pyran-2-yl)hydroxylamine (60.59 mg, 491.36 µmol) and 4-dimethylaminopyridine (54 mg, 442.23 µmol) in 1-methyl-2-pyrrolidinone (2 ml) was microwaved at 120° C. for 2 hours. The reaction mixture was diluted with EtOAc, washed with water, brine, dried over MgSO₄, filtered and evaporate under reduced pressure. The residue was purified by flash chromatography eluting with a mixture of DCM, EtOAc, and MeOH (50/45/5, v/v/v) to give 42 mg (37%) of 3-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-3-oxo-N-((tetrahydro-2H-pyran-2-yl)oxy)propanamide.
LC/MS (m/z, MH+): 695

Step 3: (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-3-ol

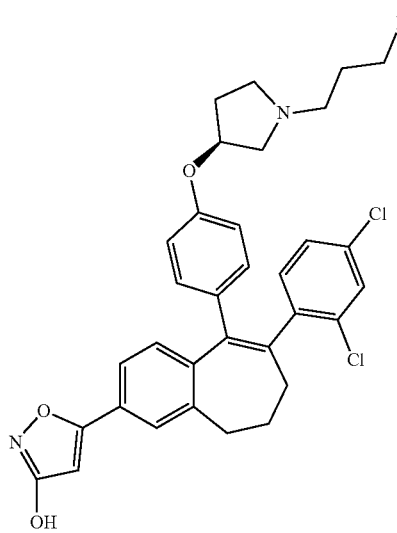

To a solution of 3-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-3-oxo-N-((tetrahydro-2H-pyran-2-yl)oxy)propanamide (42 mg, 60.37 µmol) in MeOH (2 ml), was added conc. HCl (0.5 ml, 6.25 mmol), and the reaction mixture was stirred at room temperature for 40 minutes. Saturated NaHCO₃ solution and EtOAc was added and the organic phase washed with water, dried over MgSO₄, filtered and evaporated under reduced pressure. The residue was purified by flash chromatography eluting with a mixture of DCM, EtOAc, and MeOH (50/45/5, v/v/v) to give 21 mg (59%) of (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-3-ol.

Example 5. 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2-difluoroethan-1-ol

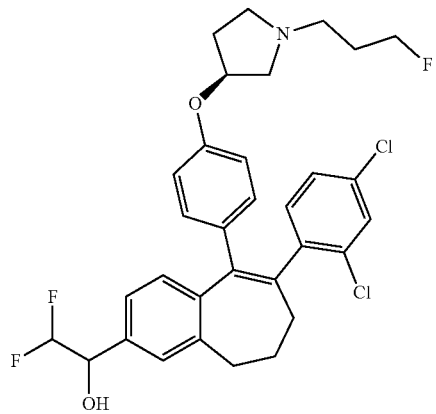 [SMILES: OC(c1ccc2c(c1)CCCC(c1ccc(Cl)cc1Cl)=C2c1ccc(O[C@H]2CCN(CCCF)C2)cc1)C(F)F]

Step 1: (S)-8-(2,4-dichlorophenyl)-9-(4-((1-(3-fluoropropyl)pyrrolidin-3-yl)oxy)phenyl)-6,7-dihydro-5H-benzo[7]annulene-3-carbaldehyde

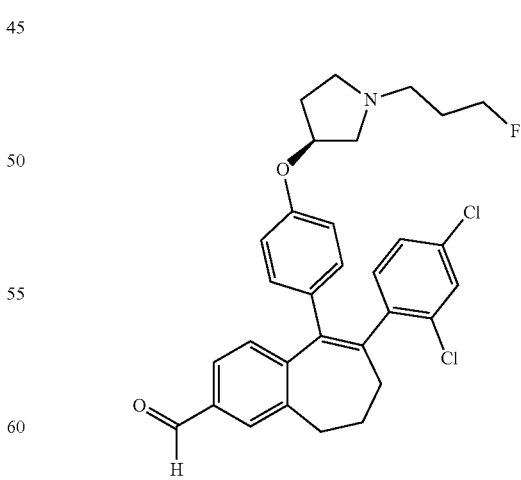

To a mixture of (S)-8-(2,4-dichlorophenyl)-9-(4-((1-(3-fluoropropyl)pyrrolidin-3-yl)oxy)phenyl)-N-methoxy-N-methyl-6,7-dihydro-5H-benzo[7]annulene-3-carboxamide [Example 44] (3.3 g, 5.52 mmol) in THF (150 ml) cooled at –40° C., was added dropwise LiAlH₄ (4.14 ml, 8.28 mmol). The reaction mixture was stirred for 30 minutes at –30° C., and quenched with water (4 ml), NaOH 5N (4 ml) and again water (12 ml). The precipitate formed was filtered, washed with EtOAc and then, the organic layer was washed with brine. The organic phase was dried over MgSO₄, filtered and evaporated under reduced pressure. The residue was purified by flash chromatography, eluting with a gradient of MeOH in DCM (100/0 to 95/05, v/v) to give 2.7 g (91%) of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbaldehyde LC/MS (m/z, MH⁺): 538.

Step 2: 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2-difluoroethan-1-ol

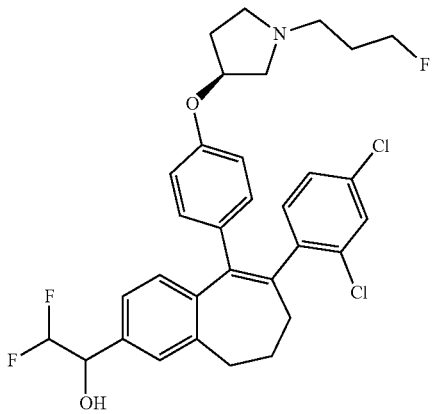 [SMILES: OC(c1ccc2c(c1)CCCC(c1ccc(Cl)cc1Cl)=C2c1ccc(O[C@H]2CCN(CCCF)C2)cc1)C(F)F]

To a mixture of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbaldehyde (100 mg, 185.71 μmol) in DMF (3 ml), was added (difluoromethyl)trimethylsilane (34.60 mg, 278.56 μmol) and phosphazene base P4-t-Bu 0.8M in hexane (46.43 μl, 37.14 μmol). The reaction mixture was stirred for 1 hour at room temperature. Then, water (2 ml) was added followed by a solution of HCl 5N to reach pH 2. The reaction mixture was stirred for 1 hour at room temperature. Water (5 ml) was added followed by a saturated aqueous solution of K₂CO₃ to reach pH 10. The mixture was extracted twice with EtOAc and the organic layers were gathered and washed with brine. The organic phase was dried over MgSO₄, filtered and evaporated under reduced pressure. The residue was purified by flash chromatography, eluting with a gradient of MeOH in DCM (100/0 to 95/05, v/v) to give 20 mg (18%) of 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2-difluoroethan-1-ol.

Example 6. (S)-8-(2,4-dichlorophenyl)-9-(4-((1-(3-fluoropropyl)pyrrolidin-3-yl)oxy)phenyl)-6,7-dihydro-5H-benzo[7]annulene-3-carbohydrazide

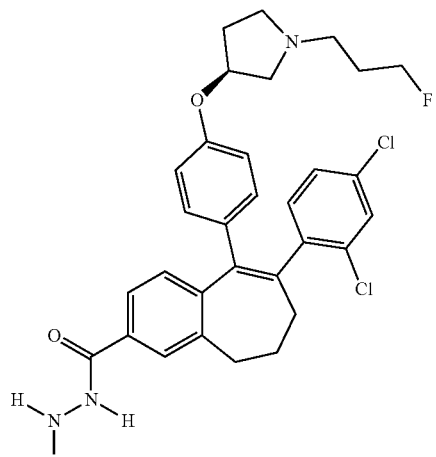

To a solution of methyl (S)-8-(2,4-dichlorophenyl)-9-(4-((1-(3-fluoropropyl)pyrrolidin-3-yl]oxy)phenyl)-6,7-dihydro-5H-benzo[7]annulene-3-carboxylate [WO2017140669] (849 mg, 1.49 mmol) in EtOH (15 ml), was added hydrazine hydrate (724.94 μl, 14.93 mmol). The reaction mixture was heated at reflux for 16 hours, and partitioned between EtOAc and water. The organic phase was washed with water and brine, dried over MgSO₄, filtered and evaporated under reduced pressure. The residue was purified by flash chromatography eluting with a mixture of DCM and MeOH (95/05, v/v) to give 200 mg (23.6%) of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbohydrazide.

Example 7. (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole

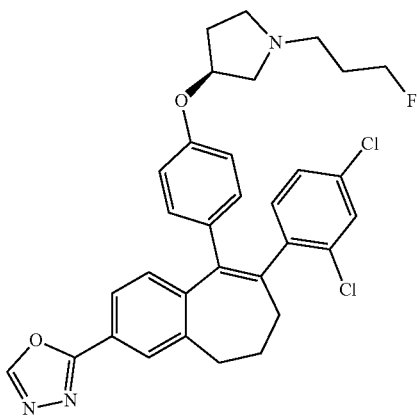 [SMILES: FCCCN1CC[C@H](Oc2ccc(C3=C(c4ccc(Cl)cc4Cl)CCCc4cc(-c5nnco5)ccc43)cc2)C1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbohydrazide [Example 6] (160 mg, 281.44 μmol) in acetic acid (1 ml), was added triethyl orthoformate (1 ml, 5.83 mmol). The reaction mixture was microwaved at 160° C. for 20 minutes, and evaporated under reduced pressure. The residue was purified by flash chromatography eluting with a mixture of DCM and MeOH (98/02, v/v) to give 127 mg (78%) of (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole.

Example 8. (S)-3-(4-(8-(2,4-dichlorophenyl)-3-(difluoromethyl)-6,7-dihydro-5H-benzo[7]annulen-9-yl)phenoxy)-1-(3-fluoropropyl)pyrrolidine

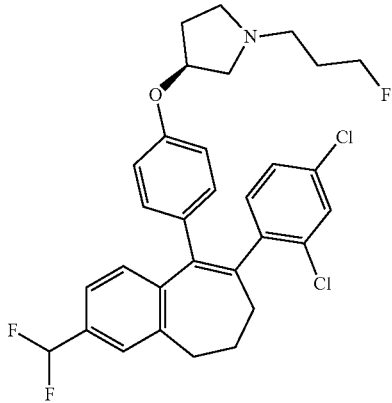 [SMILES: FCCCN1CC[C@H](Oc2ccc(C3=C(c4ccc(Cl)cc4Cl)CCCc4cc(C(F)F)ccc43)cc2)C1]

To a mixture of ((S)-8-(2,4-dichlorophenyl)-9-(4-((1-(3-fluoropropyl)pyrrolidin-3-yl)oxy)phenyl)-6,7-dihydro-5H-benzo[7]annulene-3-carbaldehyde [Example 5, Step 1] (300 mg, 557.12 µmol) in DCM (5 ml), was added bis(2-methoxyethyl)aminosulfur trifluoride 2.7M in toluene (2.06 ml, 5.57 mmol). The reaction mixture was stirred for 72 hours at room temperature. Water was added and the mixture was extracted with DCM. The organic layer was washed with brine. The organic phase was dried over MgSO$_4$, filtered and evaporated under reduced pressure. The residue was purified by flash chromatography, eluting with a gradient of MeOH in DCM (100/0 to 95/05, v/v) to give 80 mg (26%) of S)-3-(4-(8-(2,4-dichlorophenyl)-3-difluoromethyl)-6,7-dihydro-5H-benzo[7]annulen-9-yl)phenoxy)-1-(3-fluoropropyl)pyrrolidine Example 9. (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-thiadiazole

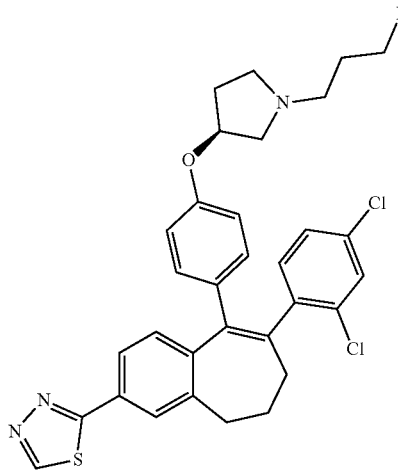

Step 1: Tert-butyl (S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonyl)hydrazine-1-carboxylate

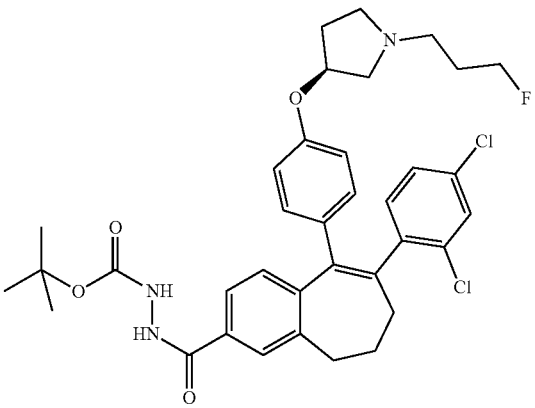 [SMILES: CC(C)(C)OC(=O)NNC(=O)c1ccc2c(c1)CCCC(c1ccc(Cl)cc1Cl)=C2c1ccc(O[C@H]2CCN(CCCF)C2)cc1]

To a suspension of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (400 mg, 721.39 µmol) in MeCN (10 ml) was added DIPEA (377.99 µl, 2.16 mmol), tert-butyl carbazate (129 mg, 937.81 µmol), and TBTU (354.53 mg, 1.08 mmol). The reaction mixture was stirred at room temperature for 3 hours, partitioned between water and EtOAc, and the organic phase washed with water, dried over MgSO$_4$, filtered and evaporated under reduced pressure. The residue was purified by flash chromatography eluting with a mixture of DCM and MeOH (95/5, v/v) to give 450 mg (93%) of tert-butyl (S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonyl)hydrazine-1-carboxylate.

LC/MS (m/z, MH+): 668

Step 2: Tert-butyl (S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonothioyl)hydrazine-1-carboxylate

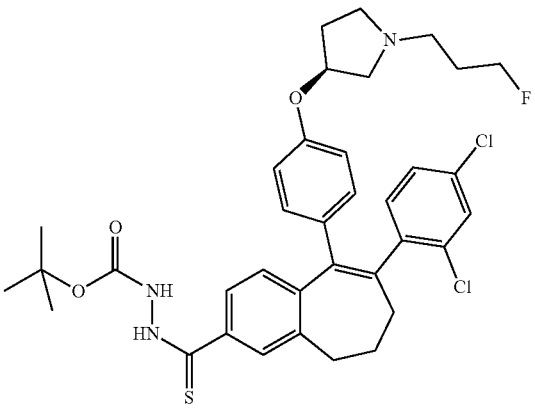 [SMILES: CC(C)(C)OC(=O)NNC(=S)c1ccc2c(c1)CCCC(c1ccc(Cl)cc1Cl)=C2c1ccc(O[C@H]2CCN(CCCF)C2)cc1]

To a solution of tert-butyl (S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonyl)hydrazine-1-carboxylate (100 mg, 149.56 µmol) in 1,4-dioxane (1.5 ml), was added lawesson's reagent (62 mg, 149.56 µmol), and the reaction mixture was microwaved at 100° C. for 10 minutes.

The reaction mixture was partitioned between water and EtOAc, and the organic phase washed with water, brine, dried over MgSO₄, filtered and evaporated under reduced pressure. The residue was purified by flash chromatography eluting with a mixture of DCM and MeOH (95/5; v/v) to give 40 mg (39%) of tert-butyl (S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonothioyl)hydrazine-1-carboxylate LC/MS (m/z, MH+): 684

Step 3: (S)-8-(2,4-dichlorophenyl)-9-(4-((1-(3-fluoropropyl)pyrrolidin-3-yl)oxy)phenyl)-6,7-dihydro-5H-benzo[7]annulene-3-carbothiohydrazide

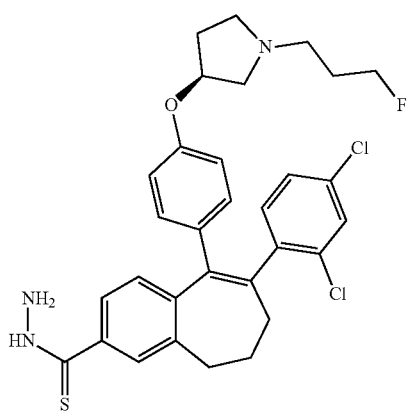 [SMILES: NNC(=S)c1ccc2c(c1)CCCC(c1ccc(Cl)cc1Cl)=C2c1ccc(O[C@H]2CCN(CCCF)C2)cc1]

A mixture of tert-butyl (S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonothioyl)hydrazine carboxylate (225 mg, 328.61 µmol), and HCl 4N in 1,4-dioxane (1 ml, 4.00 mmol), was stirred at room temperature for 1 hour. The solvent was evaporated under reduced pressure to give 150 mg (78%) of crude (S)-8-(2,4-dichlorophenyl)-9-(4-((1-(3-fluoropropyl)pyrrolidin-3-yl)oxy)phenyl)-6,7-dihydro-5H-benzo[7]annulene carbothiohydrazide.

LC/MS (m/z, MH+): 584

Step 4: (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole

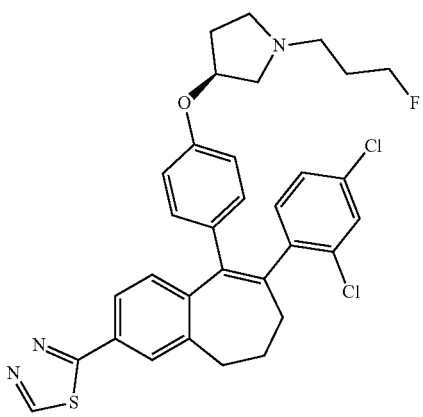 [SMILES: N=CSC(=N)c1ccc2c(c1)CCCC(c1ccc(Cl)cc1Cl)=C2c1ccc(O[C@H]2CCN(CCCF)C2)cc1]

A suspension of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbothiohydrazide (150 mg, 256.59 µmol) in triethyl orthoformate (1.5 ml), was microwaved at 100° C. for 10 minutes. The reaction mixture was partitioned between water and EtOAc, and the organic phase washed with water, brine, dried over MgSO₄, filtered and evaporated under reduced pressure. The residue was purified by flash chromatography eluting with a mixture of DCM, EtOAc, and MeOH (50/45/5; v/v/v) to give 43.7 mg (33%) of (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole.

Example 10. 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol

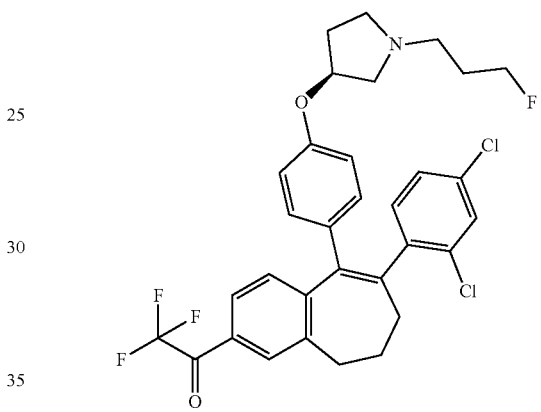

To a mixture of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbaldehyde [Example 5, Step 1] (160 mg, 297.13 µmol) in THF (5 ml), was added (trifluoromethyl)trimethylsilane (58 µl, 0.392 mmol) and cesium fluoride (22 mg, 0.145 mmol). The reaction mixture was stirred for 1 hour at room temperature. Then, water (2 ml) was added followed by a solution of HCl 5N to reach pH 2. The reaction mixture was stirred for 1 hour at room temperature. Water (5 ml) was added followed by a saturated aqueous solution of K₂CO₃ to reach pH 10. The mixture was extracted twice with EtOAc and the organic layers were collected and washed with brine. The organic phase was dried over MgSO₄, filtered and evaporated under reduced pressure. The residue was purified by flash chromatography with a gradient of MeOH in DCM (100/0 to 95/05, v/v) to give 44 mg (25%) of 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol.

Example 11. (S)-3-(4-(3-bromo-8-(2,4-dichlorophenyl)-6,7-dihydro-5H-benzo[7]annulen-9-yl)phenoxy)-1-(3-fluoropropyl)pyrrolidine

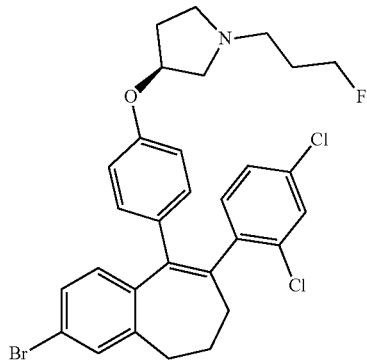 [SMILES: FCCCN1CC[C@H](Oc2ccc(C3=C(c4ccc(Cl)cc4Cl)CCCc4cc(Br)ccc43)cc2)C1]

Step 1: (S)-8-(2,4-dichlorophenyl)-9-(4-((1-(3-fluoropropyl)pyrrolidin-3-yl)oxy)phenyl)-6,7-dihydro-5H-benzo[7]annulene-3-carbonyl chloride

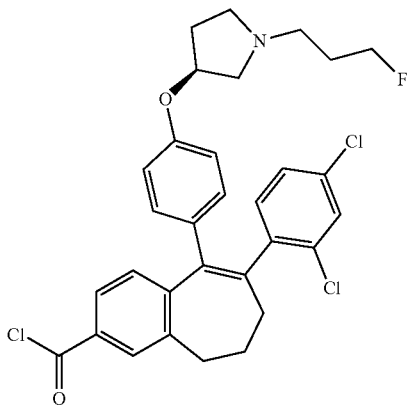 [SMILES: O=C(Cl)c1ccc2c(c1)CCCC(c1ccc(Cl)cc1Cl)=C2c1ccc(O[C@H]2CCN(CCCF)C2)cc1]

To (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (300 mg, 541 μmol) was added thionyl chloride (3 mL) at 0° C. under an inert atmosphere, the reaction mixture was stirred at room temperature for 3 h. The thionyl chloride was evaporated under reduced pressure to afford 308 mg (99.4%) of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbonyl chloride which was engaged in the next step without further purification.

Step 2: (S)-3-(4-bromo-8-(2,4-dichlorophenyl)-6,7-dihydro-5H-benzo[7]annulen-9-yl)phenoxy)-1-(3-fluoropropyl)pyrrolidine

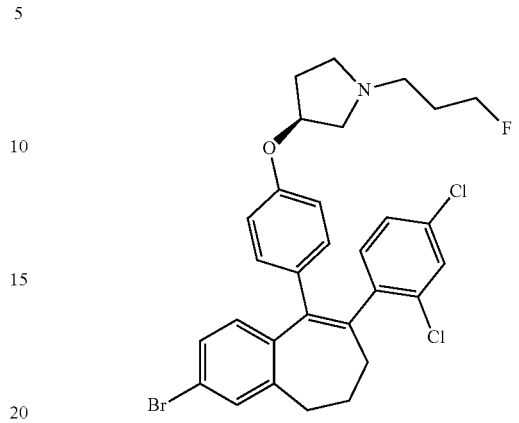

To a suspension of 2-mercaptopyridine N-oxide sodium salt (136 mg, 876 μmol) in refluxing bromotrichloromethane (5 mL) at 105° C., was added dropwise (5 min) a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbonyl chloride (308 mg, 537 μmol) and AIBN (22.5 mg, 134 μmol) in bromotrichloromethane (8 mL) under an inert atmosphere. After heating for 3 hours the reaction mixture was concentrated under reduced pressure and the residue was purified by flash chromatography eluting with EtOAc to give 134 mg (42%) of (S)-3-(4-bromo-8-(2,4-dichlorophenyl)-6,7-dihydro-5H-benzo[7]annulen-9-yl)phenoxy)-1-(3-fluoropropyl)pyrrolidine.

Example 12. (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2-dihydro-3H-pyrazol-3-one

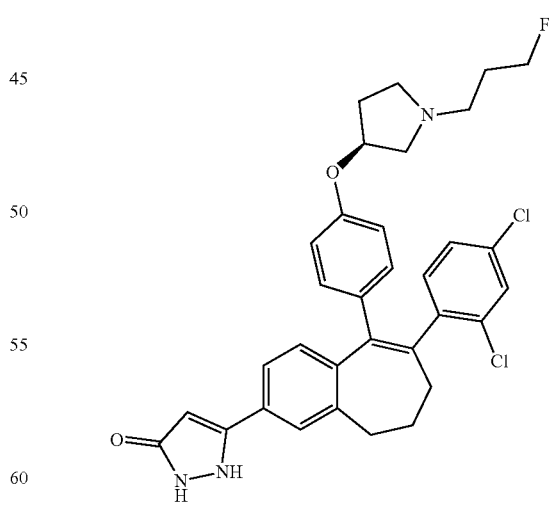

A solution of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-oxopropanoate [Example 4, Step 1] (117 mg, 191.63 μmol), in EtOH (10 ml), THF (1 ml), and hydrazine hydrate (12 mg, 191.63 μmol) was microwaved at 80° C. for 20 minutes. The reaction mixture was partitioned between water and EtOAc, and the organic phase washed with water, brine, dried over MgSO$_4$, filtered and evaporated under reduced pressure. The residue was purified by flash chromatography eluting with a mixture of DCM, EtOAc, and MeOH (50/45/5, v/v/v) to give 19 mg (16%) of (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2-dihydro-3H-pyrazol-3-one.

Example 13. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-5(4H)-one

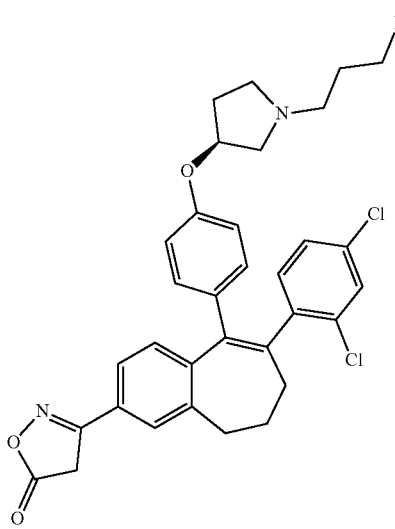

A mixture of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-oxopropanoate oxopropanoate [Example 4, step 1] (80 mg, 131.03 μmol), in EtOH (4 ml), hydroxylamine hydrochloride (23.47 mg, 327.57 μmol) and NaHCO3 (22 mg, 262.06 μmol), was heated under reflux for 3 hours. The reaction mixture was partitioned between water and EtOAc, and the organic phase was washed with water, brine, dried over MgSO$_4$, filtered and evaporated under reduced pressure. The residue was purified by flash chromatography eluting with a mixture of DCM and MeOH (95/5, v/v) to give 20.8 mg (27%) of S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-5(4H)-one.

Example 14. (S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonyl)hydrazine-1-carboxamide

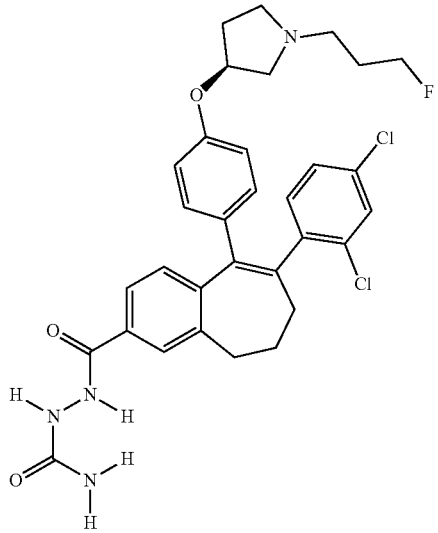 [SMILES: NC(=O)NNC(=O)c1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbohydrazide [Example 6] (200 mg, 351.79 μmol) in chloroform (10 ml), was added acetic acid (20.74 μl, 351.79 μmol), and sodium cyanate (35.36 mg, 529.69 μmol). The reaction mixture was heated at 50° C. for 24 hours, and the solvent removed under reduced pressure. The residue was partitioned between DCM and water, the organic phase was washed with water and brine, dried over MgSO$_4$, filtered and evaporated under reduced pressure. The residue was purified by flash chromatography eluting with a mixture of DCM and MeOH (90/10, v/v) to give 47.5 mg (22.1%) of (S)-2-(8-(2,4-dichlorophenyl)-9-(4-((1-(3-fluoropropyl)pyrrolidin-3-yl)oxy)phenyl)-6,7-dihydro-5H-benzo[7]annulene-3-carbonyl)hydrazine-1-carboxamide.

Example 15. (S)-8-(2,4-dichlorophenyl)-9-(4-((1-(3-fluoropropyl)pyrrolidin-3-yl)oxy)phenyl)-(methylsulfonyl)-6,7-dihydro-5H-benzo[7]annulene-3-carboxamide

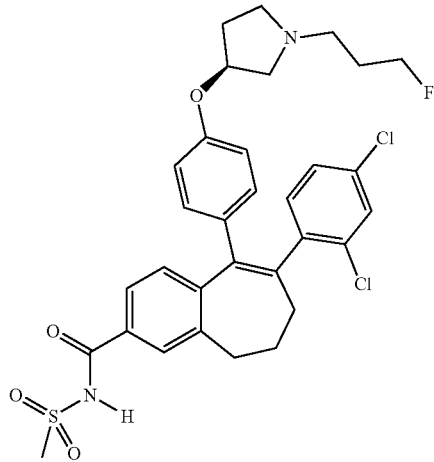 [SMILES: CS(=O)(=O)NC(=O)c1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl]oxy)phenyl)-6,7-dihydro-5H-benzo[7]annulene-3-carboxylic acid [WO2017140669] (150 mg, 270 µmol) in DCM (10 ml), was added 1-ethyl-3-(3-dimethylaminopropyl) carbodiimide hydrochloride (108 mg, 541 µmol), 4-dimethylaminopyridine (68.85 mg, 541 µmol), and methanesulfonamide (53 mg, 541 µmol). The reaction mixture was stirred at room temperature for 16 hours, and partitioned between DCM and water. The organic phase was washed with water and brine, dried over MgSO$_4$, filtered and evaporated under reduced pressure. The residue was purified by flash chromatography eluting with a mixture of DCM and MeOH (95/05, v/v) to give 17.6 mg (10.3%) of (S)-8-(2,4-dichlorophenyl)-9-(4-((1-(3-fluoropropyl)pyrrolidin-3-yl)oxy)phenyl)-(methylsulfonyl)-6,7-dihydro-5H-benzo[7]annulene-3-carboxamide.

Example 16. (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2H-tetrazole

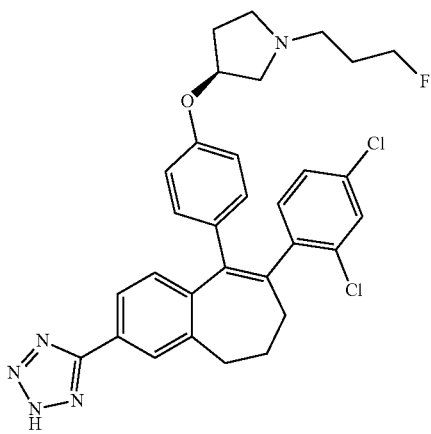 [SMILES: FCCCN1CC[C@H](Oc2ccc(C3=C(c4ccc(Cl)cc4Cl)CCCc4cc(-c5nn[nH]n5)ccc43)cc2)C1]

A mixture of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbonitrile [Example 22] (43 mg, 66 µmol), dibutyltin oxide (5 mg, 20.47 µmol) and azidotrimethylsilane (36 µl, 260 µmol) in 1,4-dioxane (0.6 ml) was microwaved at 100° C. for 6 hours. After cooling and LCMS control, addition of dibutyltin oxide (5 mg, 20.47 µmol) and azidotrimethylsilane (36 µl, 260 µmol) and the mixture was microwaved for additional 5 hours at 100° C. After cooling, water (5 ml) and DCM (10 ml) was added. After hydrophobe column decantation, the organic phase was concentrated under reduced pressure and the residue was purified by Supercritical fluid chromatography (SFC) method, phase: 2-Ethylpyridine (Princeton), 5 µm, 250×30 mm; eluent: CO2 65%/MeOH (+0.1% TEA) 35% during 3 min, then CO2 60%/MeOH (+0.1% TEA) 40%; flow: 120 ml/min; Pinlet: 160 bars; Poutlet:100 bars; Temp oven: 40° C.; λ=254 nm to give 20 mg (53%) of (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2H-tetrazole.

Example 17. (S)-8-(2,4-dichlorophenyl)-9-(4-((1-(3-fluoropropyl)pyrrolidin-3-yl)oxy)phenyl)-N-(2H-tetrazol-5-yl)-6,7-dihydro-5H-benzo[7]annulene-3-carboxamide

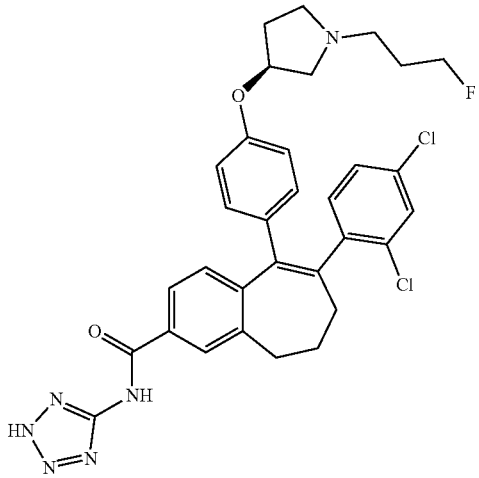 [SMILES: O=C(Nc1nn[nH]n1)c1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl]oxy)phenyl)-6,7-dihydro-5H-benzo[7]annulene-3-carboxylic acid [WO2017140669] (150 mg, 270 µmol) in DMF (15 ml), was added (1-[bis(dimethylamino) methylene]-1H-1,2,3-triazolo[4,5-b]pyridinium 3-oxid hexafluorophosphate (HATU, 114.29 mg, 5297.57 µmol), 4-dimethylaminopyridine (1.72 mg, 13.53 µmol), TEA (112.1 µl, 811.57 µmol), and amino tetrazole (23 mg, 270.52 µmol). The reaction mixture was stirred at room temperature for 16 hours, and partitioned between DCM and water. The organic phase was washed with water and brine, dried over MgSO$_4$, filtered and evaporated under reduced pressure. The residue was purified by flash chromatography eluting with a mixture of DCM and MeOH (95/05; v/v) to give 22.5 mg (13.4%) of (S)-8-(2,4-dichlorophenyl)-9-(4-((1-(3-fluoropropyl)pyrrolidin-3-yl)oxy)phenyl)-N-(2H-tetrazol-5-yl)-6,7-dihydro-5H-benzo[7]annulene-3-carboxamide.

Example 18. (S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboxamide

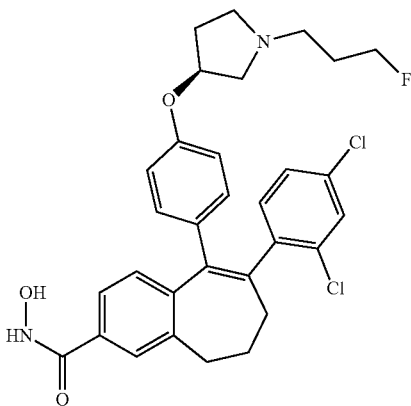 [SMILES: O=C(NO)c1ccc2c(c1)CCCC(c1ccc(Cl)cc1Cl)=C2c1ccc(O[C@H]2CCN(CCCF)C2)cc1]

Step 1: (S)—N-(benzyloxy)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide

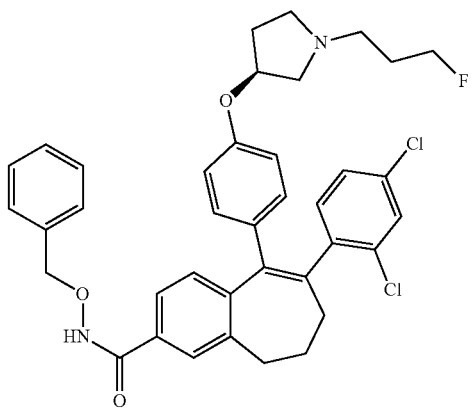 [SMILES: O=C(NOCc1ccccc1)c1ccc2c(c1)CCCC(c1ccc(Cl)cc1Cl)=C2c1ccc(O[C@H]2CCN(CCCF)C2)cc1]

To a solution of (R)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (277 mg, 500 µmol) in DMF (6 ml) was added O-benzylhydroxylamine (96 mg, 90.94 µmol), HATU (333 mg, 850 µmol) and DIPEA (464 µl, 2.5 mmol). The reaction mixture was stirred at room temperature for 4 hours. Cold water (25 ml) and a mixture of DCM/MeOH 80/20 (30 ml) was added. After decantation, the organic phase was dried over MgSO$_4$, filtered and evaporated under reduced pressure and the residue was purified by flash chromatography eluting with DCM, MeOH, and MeCN (96/2/2, v/v/v) to give 230 mg (69%) of (S)—N-(benzyloxy)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide.

LC/MS (m/z, MH+): 659

Step 2: (S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboxamide

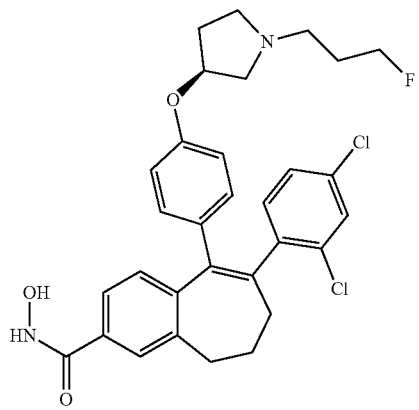 [SMILES: O=C(NO)c1ccc2c(c1)CCCC(c1ccc(Cl)cc1Cl)=C2c1ccc(O[C@H]2CCN(CCCF)C2)cc1]

In an autoclave, a mixture of (S)—N-(benzyloxy)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide (150 mg, 227 µmol) and Pd/C 10% (15 mg) in MeOH (6 ml) was hydrogenated (H2, 2 bars) for 2.5 hours at 20° C. The reaction mixture was filtered, the filtrate was evaporated under reduced pressure and the residue was purified by flash chromatography eluting with DCM, MeOH, and MeCN (98/1/1, v/v/v) to give 69 mg (53%) of (S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboxamide.

Example 19. (S)-8-(2,4-dichlorophenyl)-9-(4-((1-(3-fluoropropyl)pyrrolidin-3-yl)oxy)phenyl)-N-methoxy-6,7-dihydro-5H-benzo[7]annulene-3-carboxamide

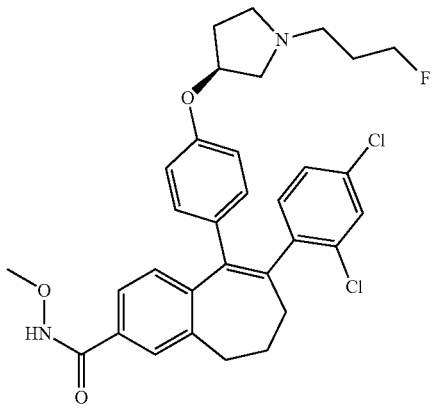 [SMILES: CONC(=O)c1ccc2c(c1)CCCC(c1ccc(Cl)cc1Cl)=C2c1ccc(O[C@H]2CCN(CCCF)C2)cc1]

To a solution of (R)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (110 mg, 198 µmol) in DMF (2.5 ml) was added O-methylhydroxylamine hydrochloride (25 mg, 297 µmol), HATU (132 mg, 337 µmol) and DIPEA (184 µl, 992 µmol). The reaction mixture was stirred at room temperature for 4 hours. Cold water (25 ml) and a mixture of DCM/MeOH 80/20 (30 ml) was added. After decantation, the organic phase was dried over MgSO$_4$, filtered and evaporated under reduced pressure and the residue was purified by flash chromatography eluting with DCM/MeOH/MeCN (96/2/2, v/v/v) to give 63 mg (54%) of (S)-8-(2,4-dichlorophenyl)-9-(4-((1-(3-fluoropropyl)pyrrolidin-3-yl)oxy)phenyl)-N-methoxy-6,7-dihydro-5H-benzo[7]annulene-3-carboxamide.

Example 20. (S,E)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)acrylic acid

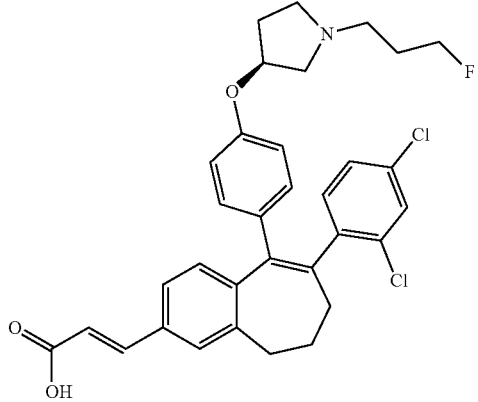 [SMILES: O=C(O)/C=C/c1ccc2c(c1)CCCC(c1ccc(Cl)cc1Cl)=C2c1ccc(O[C@H]2CCN(CCCF)C2)cc1]

Step 1: Tert-butyl (S,E)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)acrylate

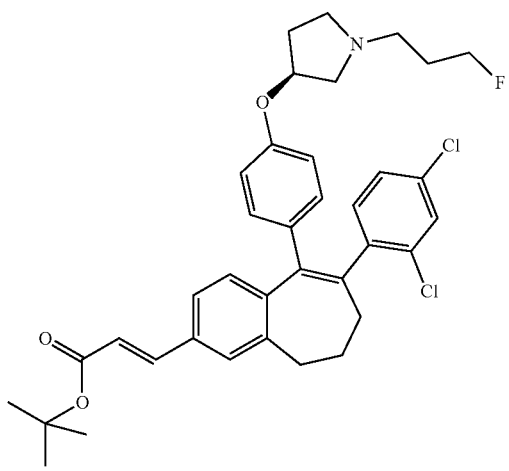 [SMILES: CC(C)(C)OC(=O)/C=C/c1ccc2c(c1)CCCC(c1ccc(Cl)cc1Cl)=C2c1ccc(O[C@H]2CCN(CCCF)C2)cc1]

A mixture of (S)-8-(2,4-dichlorophenyl)-9-(4-((1-(3-fluoropropyl)pyrrolidin-3-1)oxy)phenyl)-6,7-dihydro-5H-benzo[7]annulen-3-yl trifluoromethanesulfonate [Example 1, step 1] (203 mg, 308 µmol), DMF (3 ml), ter-butyl acrylate (305 µl, 308 µmol), bis(triphenylphosphine)palladium(II)chloride (48 mg, 68 µmol) and TEA (382 µl, 308 µmol) was microwaved at 120° C. for 1 hour. Water (5 ml) and EtOAc (10 ml) was added. After decantation, the organic phase was dried over MgSO₄, filtered and evaporated under reduced pressure and the residue was purified by flash chromatography eluting with DCM/MeOH (99/1, v/v) to give 83 mg (42%) of tert-butyl (S,E)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)acrylate.

Step 2. (S,E)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)acrylic acid

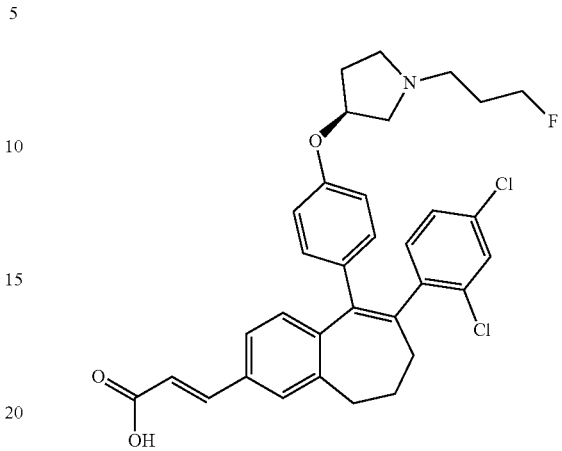

A mixture of tert-butyl (S,E)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)acrylate (83 mg, 130 µmol) and hydrochloric acid (2.2 ml, 4N in 1,4-dioxane) was stirred at room temperature for 6 hours. The reaction mixture was evaporated under reduced pressure and the residue was treated on SCX (strong cation exchange) column to give 39 mg (52%) of (S,E)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)acrylic acid.

Example 21. (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazole

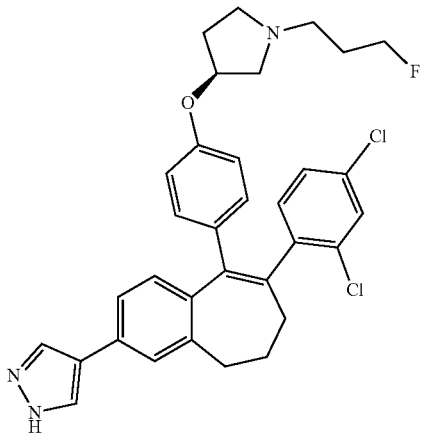 [SMILES: FCCCN1CC[C@H](Oc2ccc(C3=C(c4ccc(Cl)cc4Cl)CCCc4cc(-c5cn[nH]c5)ccc43)cc2)C1]

Step 1: (S)-4-(9-(4-((1-(3-fluoropropyl)pyrrolidin-3-yl)oxy)phenyl)-6,7-dihydro-5H-benzo[7]annulen-3-yl)-1H-pyrazole

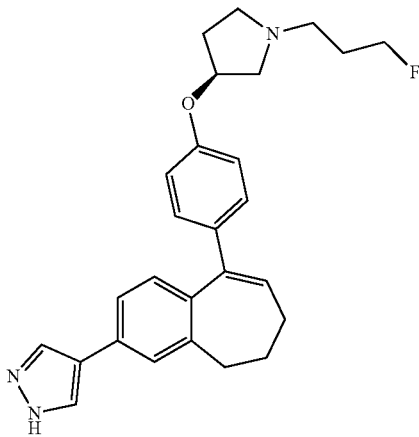 [SMILES: FCCCN1CC[C@H](Oc2ccc(C3=CCCCc4cc(-c5cn[nH]c5)ccc43)cc2)C1]

A mixture of (S)-9-(4-((1-(3-fluoropropyl)pyrrolidin-3-yl)oxy)phenyl)-6,7-dihydro-5H-benzo[7]annulen-3-yl trifluoromethanesulfonate [WO2017140669] (500 mg, 973 µmol), 1,4-dioxane (12 ml), water (2 ml), $Cs_2CO_3$ (666 mg, 2.04 mmol) and (1-(ter-butoxycarbonyl)-1H-pyrazol-4-yl)boronic acid (207 mg, 974 µmol), and $Pd(dppf)Cl_2$ (43 mg, 58.42 µmol), was microwaved at 100° C. for 1 hour. After cooling to room temperature, the reaction mixture was concentrated under reduced pressure. To the residue, addition of DCM (50 ml) and water (50 ml). After decantation, the organic phase was dried over $MgSO_4$, filtered and evaporated under reduced pressure and the residue was purified by flash chromatography eluting with DCM/MeOH/MeCN (94/3/3, v/v/v) to give 275 mg (66%) of (S)-4-(9-(4-((1-(3-fluoropropyl)pyrrolidin-3-yl)oxy)phenyl)-6,7-dihydro-5H-benzo[7]annulen-3-yl)-1H-pyrazole.

LC/MS (m/z, MH+): 432

Step 2: (S)-4-(8-bromo-9-(4-((1-(3-fluoropropyl)pyrrolidin-3-yl)oxy)phenyl)-6,7-dihydro-5H-benzo[7]annulen-3-yl)-1H-pyrazole

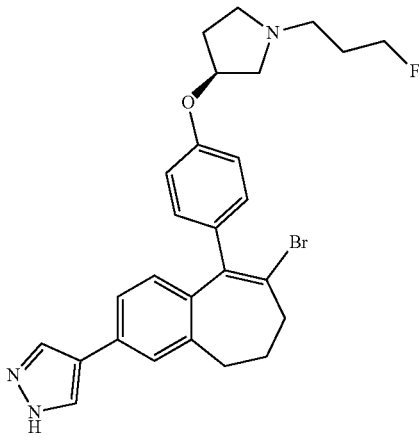 [SMILES: FCCCN1CC[C@H](Oc2ccc(C3=C(Br)CCCc4cc(-c5cn[nH]c5)ccc43)cc2)C1]

A mixture of (S)-4-(9-(4-((1-(3-fluoropropyl)pyrrolidin-3-yl)oxy)phenyl)-6,7-dihydro-5H-benzo[7]annulen-3-yl)-1H-pyrazole (170 mg, 394 µmol), THF (15 ml) and pyridinium bromide perbromide (133 mg, 414 µmol) was stirred at room temperature for 2 hours. Water (20 ml) and DCM (100 ml) was added, followed by a saturated solution of $NaHCO_3$ to reach pH 7. After decantation, the organic phase was dried over $MgSO_4$, filtered and evaporated under reduced pressure to give 160 mg (80%) of (S)-4-(8-bromo-9-(4-((1-(3-fluoropropyl)pyrrolidin-3-1)oxy)phenyl)-6,7-dihydro-5H-benzo[7]annulen-3-yl)-1H-pyrazole.

LC/MS (m/z, MH+): 510

Step 3: (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazole

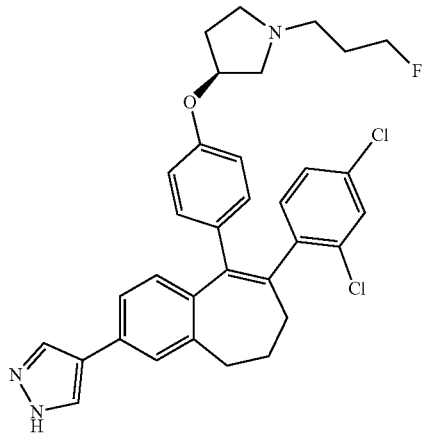 [SMILES: FCCCN1CC[C@H](Oc2ccc(C3=C(c4ccc(Cl)cc4Cl)CCCc4cc(-c5cn[nH]c5)ccc43)cc2)C1]

A mixture of (S)-4-(8-bromo-9-(4-((1-(3-fluoropropyl)pyrrolidin-3-yl)oxy)phenyl)-6,7-dihydro-5H-benzo[7]annulen-3-yl)-1H-pyrazole (90 mg, 176 µmol), 1,4-dioxane (8 ml), Pd(dppf)Cl2 (9 mg, 11 µmol), water (1.5 ml), $Cs_2CO_3$ (121 mg, 370 µmol) and (2,4-dichlorophenyl)boronic acid (37 mg, 194 µmol) was microwaved at 100° C. for 50 minutes. After cooling to room temperature, the reaction mixture was concentrated under reduced pressure, and the residue partitioned between DCM (50 ml) and water (50 ml). After decantation, the organic phase was dried over $MgSO_4$, filtered and evaporated under reduced pressure and the residue was purified by flash chromatography eluting with DCM/MeOH/MeCN (90/5/5, v/v/v) to give 55 mg (52%) of (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazole.

Example 22. (S)-8-(2,4-dichlorophenyl)-9-(4-((1-(3-fluoropropyl)pyrrolidin-3-yl)oxy)phenyl)-6,7-dihydro-5H-benzo[7]annulene-3-carbonitrile

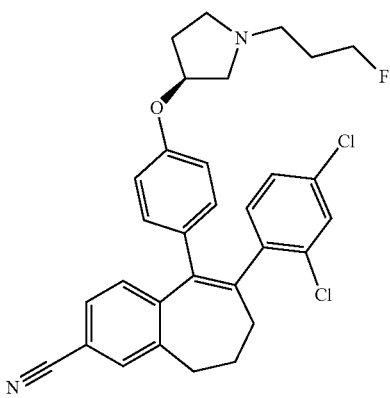 [SMILES: N#Cc1ccc2c(c1)CCCC(c1ccc(Cl)cc1Cl)=C2c1ccc(O[C@H]2CCN(CCCF)C2)cc1]

To a mixture of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide [Example 3] (100 mg, 180.67 µmol) in THF (1 ml) cooled at 0° C., was added TEA (33 µl, 235 µmol) and TFAA (28 µl, 199 µmol). The reaction mixture was stirred for 15 minutes at 0° C. and 45 minutes at room temperature. NH₄Cl solution (5 ml) and DCM (10 ml) was added. After hydrophobe column decantation, the organic phase was concentrated under reduced pressure and the residue was purified by flash chromatography eluting with a gradient of MeOH in DCM (100/0 to 95/05, v/v) to give 97 mg (85%) of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbonitrile as trifluoroacetate salt.

Example 23. (S)-4-(9-(4-((1-(3-fluoropropyl)pyrrolidin-3-yl)oxy)phenyl)-8-(4-(trifluoromethoxy)phenyl)-6,7-dihydro-5H-benzo[7]annulen-3-yl)-1H-pyrazole

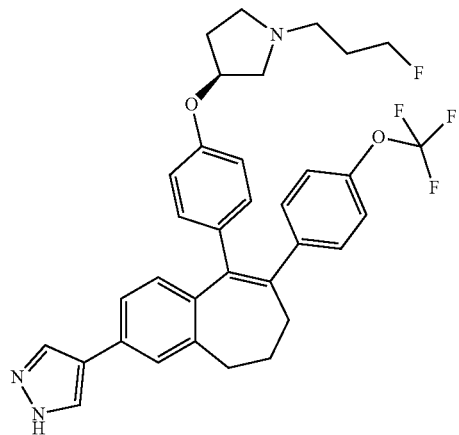 [SMILES: FCCCN1CC[C@H](Oc2ccc(C3=C(c4ccc(OC(F)(F)F)cc4)CCCc4cc(-c5cn[nH]c5)ccc43)cc2)C1]

A mixture of tert-butyl (S)-4-(8-bromo-9-(4-((1-(3-fluoropropyl)pyrrolidin-3-yl)oxy)phenyl)-6,7-dihydro-5H-benzo[7]annulen-3-yl)-1H-pyrazole [Example 21, step 2] (160 mg, 285 µmol) 1,4-dioxane (8 ml), Pd(dppf)Cl2 (14 mg, 17 µmol), water (1.5 ml), Cs₂CO₃ (195 mg, 599 µmol) and (4-trifluoromethoxy)phenyl)boronic acid (65 mg, 314 µmol) was microwaved at 100° C. for 50 minutes. After cooling to room temperature, the reaction mixture was concentrated under reduced pressure. To the residue, addition of DCM (50 ml) and water (50 ml). After decantation, the organic phase was dried over MgSO₄, filtered and evaporated under reduced pressure and the residue was purified by flash chromatography eluting with DCM/MeOH/MeCN (90/5/5, v/v/v) to give 43 mg (26%) of (S)-4-(9-(4-((1-(3-fluoropropyl)pyrrolidin-3-yl)oxy)phenyl)-8-(4-(trifluoromethoxy)phenyl)-6,7-dihydro-5H-benzo[7]annulen-3-yl)-1H-pyrazole.

Example 24. (S)-3-(4-(3-(difluoromethoxy)-8-(4-(trifluoromethoxy)phenyl)-6,7-dihydro-5H-benzo[7]annulen-9-yl)phenoxy)-1-(3-fluoropropyl)pyrrolidine

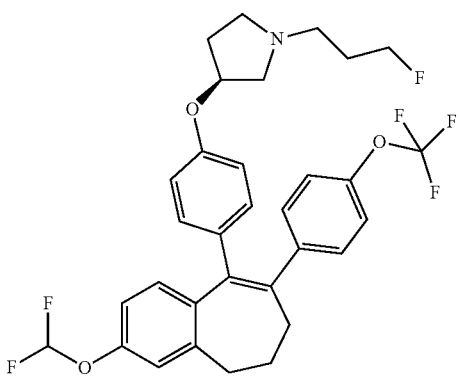 [SMILES: FCCCN1CC[C@H](Oc2ccc(C3=C(c4ccc(OC(F)(F)F)cc4)CCCc4cc(OC(F)F)ccc43)cc2)C1]

To a solution of (S)-9-(4-((1-(3-fluoropropyl)pyrrolidin-3-yl)oxy)phenyl)-8-(4-(trifluoromethoxy)phenyl)-6,7-dihydro-5H-benzo[7]annulen-3-ol [WO2017140669] (100 mg, 184.64 µmol) in MeCN (1.5 ml) cooled at 0° C., was added, KOH (122 mg, 1.85 mmol) in solution in water (0.5 ml) and diethyl (bromodifluoromethyl)phosphonate (54 µl, 295 µmol). The reaction mixture was stirred at 0° C. for 2 hours. Addition of water (10 ml) and DCM (25 ml). After hydrophobe column decantation, the organic phase was concentrated under reduced pressure and the residue was purified by flash chromatography eluting with DCM/MeOH (95/05, v/v) to give 17 mg (16%) of (S)-3-(4-(3-(difluoromethoxy)-8-(4-(trifluoromethoxy)phenyl)-6,7-dihydro-5H-benzo[7]annulen-9-yl)phenoxy)-1-(3-fluoropropyl)pyrrolidine.

Example 25. Methyl (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate

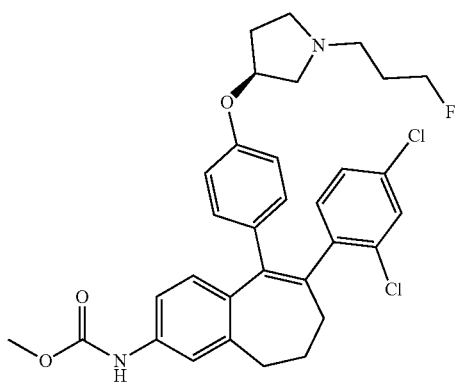 [SMILES: COC(=O)Nc1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide [Example 3] (200 mg, 361.34 µmol) in DCM (5 ml), and MeOH (5 ml), at −78° C., was added 1,8-diazabicycloundec-7-ene (170.65 µl, 1.08 mmol), and N-bromosuccinimide (65.63 mg, 361.34 µmol). The reaction mixture was allowed to reach room temperature overnight, and the solvent removed under reduced pressure. The residue was partitioned between DCM and water, the organic phase was washed with water and brine, dried over MgSO$_4$, filtered and evaporated under reduced pressure. The residue was purified by flash chromatography eluting with a mixture of DCM and MeOH (90/10; v/v) to give 47.5 mg (22.1%) of (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate.

Example 26. (S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboximidamide

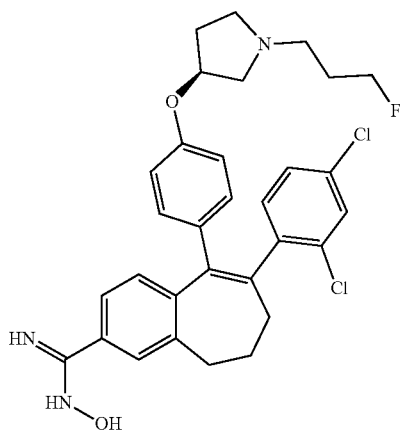 [SMILES: N=C(NO)c1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbonitrile [Example 22] (526 mg, 809.84 µmol) in EtOH (10 ml), was added hydroxylamine hydrochloride (84.41 mg, 1.21 mmol), and DIPEA (418.68 mg, 3.24 mmol). The reaction mixture was heated at 80° C. for 4 hours, and the solvent removed under reduced pressure to give 344 mg (74.7%) of (S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboximidamide.

Example 27. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-oxadiazol-5(4H)-one

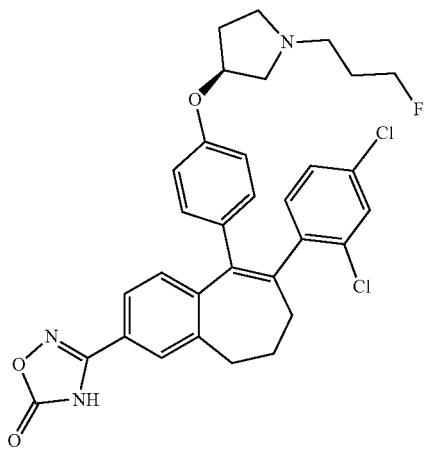 [SMILES: O=c1[nH]c(-c2ccc3c(c2)CCCC(c2ccc(Cl)cc2Cl)=C3c2ccc(O[C@H]3CCN(CCCF)C3)cc2)no1]

To a solution of (S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboximidamide [Example 26] (175 mg, 307.82 µmol) in 1,4-dioxane (5 ml), was added 1,8-diazabicycloundec-7-ene (53.30 µl, 338.60 µmol), and CDI (76.40 mg, 461.73 µmol). The reaction mixture was heated at reflux for 1 hour, and the solvent removed under reduced pressure. The residue was partitioned between DCM and water, the organic phase was washed with water and brine, dried over MgSO$_4$, filtered and evaporated under reduced pressure. The residue was purified by flash chromatography eluting with a mixture of DCM and MeOH (95/05; v/v) to give 102.5 mg (56%) of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-oxadiazol-5(4H)-one.

Example 28. (S)-8-(2,4-dichlorophenyl)-9-(4-((1-(3-fluoropropyl)pyrrolidin-3-yl)oxy)phenyl)-6,7-dihydro-5H-benzo[7]annulen-3-amine

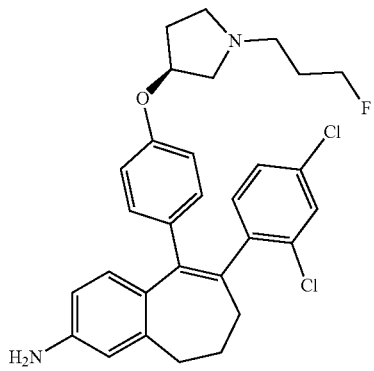 [SMILES: Nc1ccc2c(c1)CCCC(c1ccc(Cl)cc1Cl)=C2c1ccc(O[C@H]2CCN(CCCF)C2)cc1]

To a solution of (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate [Example 25] (70 mg, 119.96 µmol) in MeOH (5 ml), was added potassium hydroxide solution 7N in MeOH (2 ml, 14 mmol). The reaction mixture was heated at reflux overnight, and diluted with EtOAc.

The organic phase was washed with water and brine, dried over MgSO₄, filtered and evaporated under reduced pressure. The residue was purified by flash chromatography eluting with a mixture of DCM and MeOH (95/05, v/v) to give 14 mg (22.2%) of ((S)-8-(2,4-dichlorophenyl)-9-(4-((1-(3-fluoropropyl)pyrrolidin-3-yl)oxy)phenyl)-6,7-dihydro-5H-benzo[7]annulen-3-amine.

Example 29. 4-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-3H-1,2,3,5-oxathiadiazole 2-oxide hydrochloride

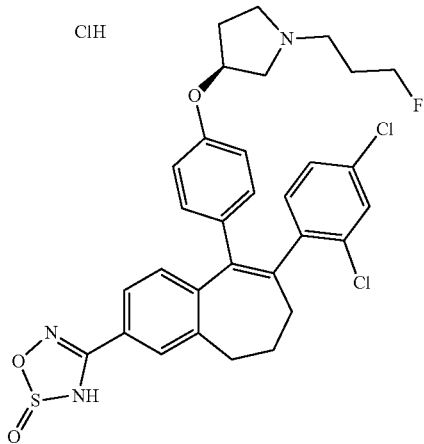 [SMILES: O=S1NC(c2ccc3c(c2)CCCC(c2ccc(Cl)cc2Cl)=C3c2ccc(O[C@H]3CCN(CCCF)C3)cc2)=NO1 ; Cl]

To a solution of (S)-8-(2,4-dichlorophenyl)-9-(4-((1-(3-fluoropropyl)pyrrolidin-3-yl)oxy)phenyl)-N-hydroxy-6,7-dihydro-5H-benzo[7]annulene-3-carboximidamide [Example 26] (1.2 g, 2.11 mmol) in THF (5 ml), was added at 0° C., pyridine (343.49 µl, 4.22 mmol), and thionyl chloride (230 µl, 3.17 mmol) in solution in DCM (1 ml). The reaction mixture was stirred at room temperature overnight, and the solvent removed under reduced pressure. The residue was partitioned between DCM and water, the organic phase was washed with water and brine, dried over MgSO₄, filtered and evaporated under reduced pressure. The residue was purified by flash chromatography eluting with a mixture of DCM and MeOH (95/05, v/v) to give 173.8 mg (13%) of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-oxadiazol-5(4H)-one hydrochloride.

Example 30. (S)—N-(8-(2,4-dichlorophenyl)-9-(4-((1-(3-fluoropropyl) pyrrolidin-3-yl)oxy)phenyl)-6,7-dihydro-5H-benzo[7]annulen-3-yl)methane sulfonamide

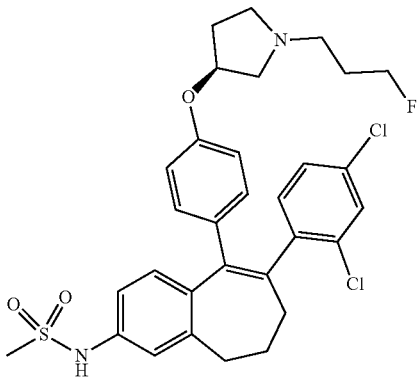 [SMILES: CS(=O)(=O)Nc1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (200 mg, 380.60 µmol) in DCM (10 ml), was added methanesulfonyl chloride (33 µl, 418.66 µmol), and TEA (59 µl, 418.66 µmol). The reaction mixture was stirred at room temperature overnight, and washed with water and brine, dried over MgSO₄, filtered and evaporated under reduced pressure. The residue was purified by flash chromatography eluting with a mixture of DCM and MeOH (98/02; v/v) to give 67.3 mg (22.2%) of (S)—N-(8-(2,4-dichlorophenyl)-9-(4-((1-(3-fluoropropyl) pyrrolidin-3-yl)oxy)phenyl)-6,7-dihydro-5H-benzo[7]annulen-3-yl)methane sulfonamide.

Example 31. (S)-5-(8-(2,4-dichlorophenyl)-9-(4-((1-(3-fluoropropyl) pyrrolidin-3-yl)oxy)phenyl)-6,7-dihydro-5H-benzo[7]annulen-3-yl)-1,3,4-oxadiazol-2(3H)-one

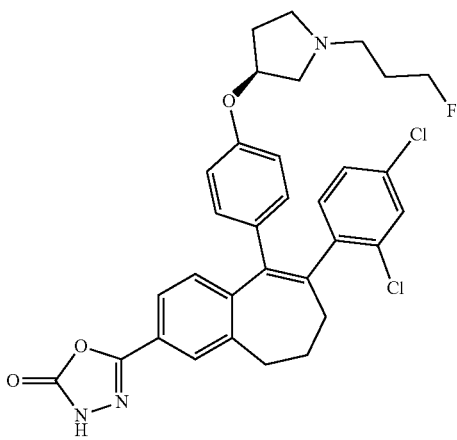 [SMILES: O=c1[nH]nc(-c2ccc3c(c2)CCCC(c2ccc(Cl)cc2Cl)=C3c2ccc(O[C@H]3CCN(CCCF)C3)cc2)o1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbohydrazide [Example 6] (141 mg, 248.01 µmol) in 1,4-dioxane (5 ml) was added 1,8-diazabicycloundec-7-ene (43.72 mg, 272.82 µmol), and CDI (61.56 mg, 372.02 µmol). The reaction mixture was microwaved at 160° C. for 20 minutes, and evaporated under reduced pressure. The residue was purified by flash chromatography eluting with a mixture of DCM and MeOH (98/02, v/v) to give 27 mg (18.3%) of (S)-5-(8-(2,4-dichlorophenyl)-9-(4-((1-(3-fluoropropyl) pyrrolidin-3-yl)oxy)phenyl)-6,7-dihydro-5H-benzo[7]annulen-3-yl)-1,3,4-oxadiazol-2(3H)-one.

Example 32. Tert-butyl (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate

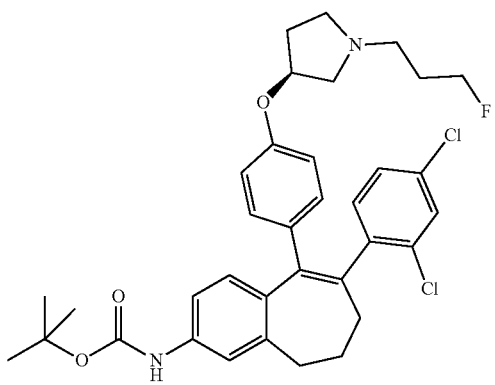 [SMILES: CC(C)(C)OC(=O)Nc1ccc2c(c1)CCCC(c1ccc(Cl)cc1Cl)=C2c1ccc(O[C@H]2CCN(CCCF)C2)cc1]

Triethylamine (5.59 ml, 39.68 mmol), was added to solid (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (10 g, 18.03 mmol) and the mixture was stirred at room temperature for 1 hour. Diphenyl phosphoryl azide (DPPA) (4.81 ml, 21.64 mmol) was added to the slurry, followed by tert-butyl alcohol (27 ml). The reaction mixture was stirred at 90° C. for 2 hours. The reaction mixture was poured onto ice (250 g), and stirred at room temperature overnight. White fine solid formed which was filtered on Büchner, rinsed with water and dried. The crude compound was purified by flash chromatography eluting with EtOAc to give 5.8 g (51%) of tert-butyl (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate.

Alternative Method:

To a solution of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, Step 1] (500 mg, 0.85 mmol), tert-butyl carbamate (127 mg, 1.06 mmol), and sodium tert-butoxide (147 mg, 1.51 mmol), in anhydrous toluene (5 ml), under argon, was added tBuXPhos (2-di-tert-butylphosphino-2',4',6'-triisopropylbiphenyl, 151 mg, 0.31 mmol), and Pd2(dba)3 (tris(dibenzylideneacetone)dipalladium(0), 108 mg, 0.13 mmol). The reaction mixture was heated in a sealed tube at 110° C. for 3 hours, diluted with EtOAc, washed with water, and brine, dried over Na2SO4, filtered and evaporated under reduced pressure. The residue was purified by flash chromatography eluting with a mixture of heptane and EtOAc (70/30; v/v) to give 50 mg (52.6%) of tert-butyl (S)-(8-(2,4-dichlorophenyl)-9-(4-((1-(3-fluoropropyl) pyrrolidin-3-yl)oxy)phenyl)-6,7-dihydro-5H-benzo[7]annulen-3-yl)carbamate.

Example 33. (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxathiazol-2-one

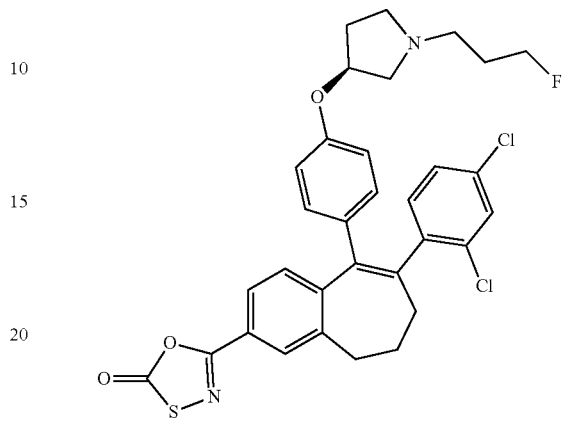

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide [Example 3] (200 mg, 361.34 µmol) in toluene (5 ml), was added chlorocarbonylsulfenyl chloride (57 mg, 433.60 µmol). The reaction mixture was refluxed for 1 hour, diluted with EtOAc and washed successively with water, brine, dried over MgSO4, filtered and evaporated under reduced pressure. The residue was purified first by flash chromatography eluting with a mixture of DCM and MeOH (99/01; v/v) and then by reverse phase HPLC to give 121.5 mg (55%) of (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole.

Example 34. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-oxadiazole-5(4H)-thione

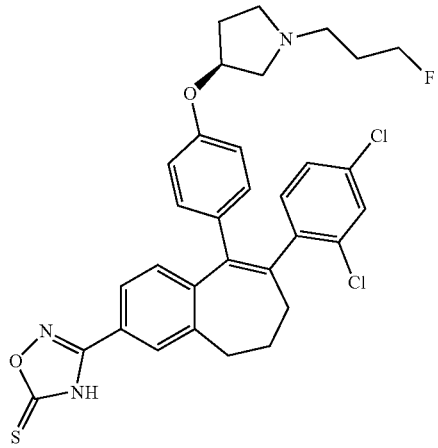 [SMILES: FCCCN1CC[C@H](Oc2ccc(C3=C(c4ccc(Cl)cc4Cl)CCCc4cc(-c5noc(=S)[nH]5)ccc43)cc2)C1]

To a solution of (S)-8-(2,4-dichlorophenyl)-9-(4-((1-(3-fluoropropyl)pyrrolidin-3-yl)oxy)phenyl)-N-hydroxy-6,7- dihydro-5H-benzo[7]annulene-3-carboximidamide [Example 26] (218 mg, 383.46 µmol) in 1,4-dioxane (5 ml), was added 1,8-diazabicycloundec-7-ene (482 µl, 3 mmol), and TCDI (108 mg, 575.18 µmol). The reaction mixture was heated at reflux for 2 hours, and the solvent removed under reduced pressure. The residue was partitioned between DCM and water, the organic phase was washed with water and brine, dried over MgSO$_4$, filtered and evaporated under reduced pressure. The residue was first purified by flash chromatography eluting with a mixture of DCM and MeOH (98/02; v/v) and then by reverse phase HPLC to give 124 mg (53%) of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-oxadiazole-5(4H)-thione.

Example 35. (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,1,1-trifluoromethanesulfonamide

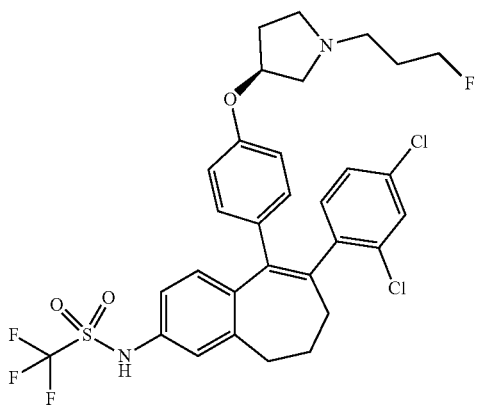 [SMILES: O=S(=O)(Nc1ccc2c(c1)CCCC(c1ccc(Cl)cc1Cl)=C2c1ccc(O[C@H]2CCN(CCCF)C2)cc1)C(F)(F)F]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (200 mg, 380.60 µmol) in DCM (10 ml), was added trifluoromethane sulfonic anhydride (70 µl, 418.66 µmol), and TEA (59 µl, 418.66 µmol). The reaction mixture was stirred at room temperature for 2 hours, and washed with water and brine, dried over MgSO$_4$, filtered and evaporated under reduced pressure. The residue was first purified by flash chromatography eluting with a mixture of DCM and MeOH (98/02; v/v) and by reverse phase HPLC to give 52 mg (20.8%) of (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,1,1-trifluoromethanesulfonamide.

Example 36. (S)-3-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-4-hydroxycyclobut-3-ene-1,2-dione To a solution of (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (200 mg, 380.60 µmol) in DMF (10 ml), was added 3,4-dihydrocyclobuty-3-ene-1,2-dione (48 mg, 418.66 µmol). The reaction mixture was stirred at room temperature for 1 hour, and microwaved at 130° C. for 7 hours. The residue was diluted with EtOAc, washed with water and brine, dried over MgSO$_4$, filtered and evaporated under reduced pressure. The residue was first purified by flash chromatography eluting with a mixture of DCM and MeOH (98/02, v/v) and by reverse phase HPLC to give 52 mg (20.8%) of (S)-3-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-4-hydroxycyclobut-3-ene-1,2-dione.

Example 37. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-thiadiazol-5(4H)-one

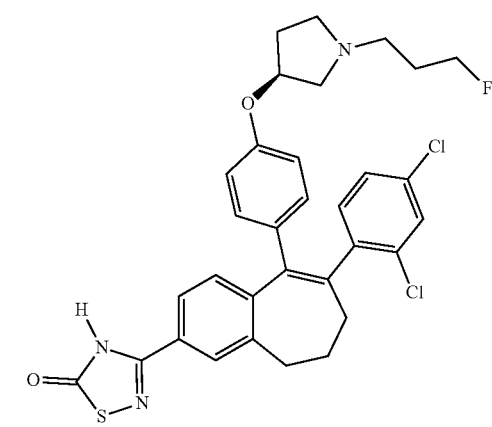 [SMILES: O=c1[nH]c(-c2ccc3c(c2)CCCC(c2ccc(Cl)cc2Cl)=C3c2ccc(O[C@H]3CCN(CCCF)C3)cc2)ns1]

To a solution of (S)-8-(2,4-dichlorophenyl)-9-(4-((1-(3-fluoropropyl)pyrrolidin-3-yl)oxy)phenyl)-N-hydroxy-6,7- dihydro-5H-benzo[7]annulene-3-carboximidamide [Example 26] (324 mg, 569.91 μmol) in THF (10 ml), was added TCDI (128 mg, 683.89 μmol). The reaction mixture was stirred at room temperature for 1 hour, and partitioned between EtOAc and water, the organic phase was washed with water and brine, dried over MgSO$_4$, filtered and evaporated under reduced pressure. The residue was dissolved in THF (10 ml), cooled to 0° C., and boron trifluoride diethyl etherate (412.68 mg; 2.85 mmol) was added. The reaction mixture was stirred at room temperature for 1 hour, and partitioned between EtOAc and water, the organic phase was washed with water and brine, dried over MgSO$_4$, filtered and evaporated under reduced pressure. The residue was first purified by flash chromatography eluting with a mixture of DCM and MeOH (95/05; v/v) and then by reverse phase HPLC to give 180 mg (53%) of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,2,4-thiadiazol-5(4H)-one.

Example 38. (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-methoxy-1,5-dihydro-2H-pyrrol-2-one

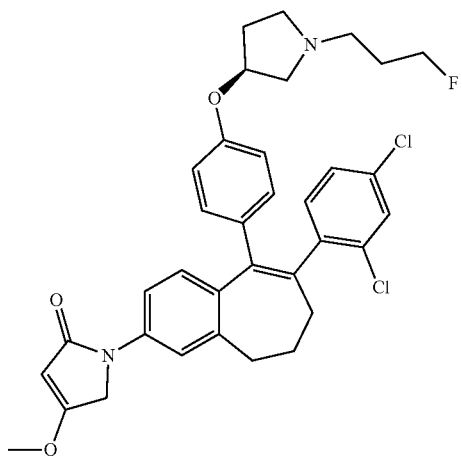 [SMILES: COC1=CC(=O)N(c2ccc3c(c2)CCCC(c2ccc(Cl)cc2Cl)=C3c2ccc(O[C@H]3CCN(CCCF)C3)cc2)C1]

To a solution of (S)-3-(4-(3-bromo-8-(2,4-dichlorophenyl)-6,7-dihydro-5H-benzo[7]annulen-9-yl)phenoxy)-1-(3-fluoropropyl)pyrrolidine [Example 11] (50 mg, 0.084 mmol), in 1,4-dioxane (1.5 ml) and DMF (0.25 ml), was added 4-methoxy-3-pyrrolin-2-one (30 mg, 0.25 mmol), potassium phosphate (22 mg, 0.11 mmol), cuprous iodide (25 mg, 0.14 mmol), and N,N'-dimethylethylenediamine (0.02 ml, 0.17 mmol), under argon. The reaction mixture was microwaved at 100° C. for 5 hours, diluted with EtOAc, washed with water, and brine, dried over MgSO$_4$, filtered and evaporated under reduced pressure. The residue was first purified by flash chromatography eluting with EtOAc, and then by reverse phase HPLC to give 6 mg (6%) of (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-methoxy-1,5-dihydro-2H-pyrrol-2-one.

Example 39. (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)ethan-1-one

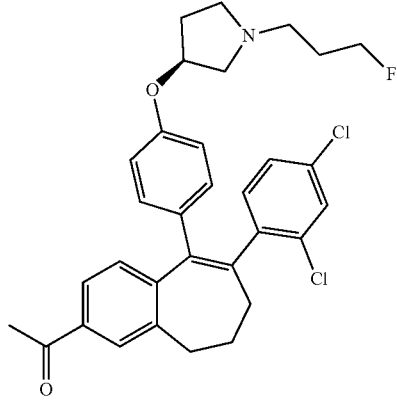 [SMILES: CC(=O)c1ccc2c(c1)CCCC(c1ccc(Cl)cc1Cl)=C2c1ccc(O[C@H]2CCN(CCCF)C2)cc1]

To a solution of methyl (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-oxopropanoate [Example 4, Step 1] (300 mg, 491.36 μmol) in THF (10 ml) was added NaOH solution (1N, 3 ml). The reaction mixture was stirred at 50° C. for 16 hours, poured into water and extracted with EtOAc, dried over MgSO$_4$, filtered and evaporated under pressure to give 229 mg (84%) of (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)ethan-1-one.

Alternative Method:

To a solution of (S)-8-(2,4-dichlorophenyl)-9-(4-((1-(3-fluoropropyl)pyrrolidin-3-yl)oxy)phenyl)-N-methoxy-N-methyl-6,7-dihydro-5H-benzo[7]annulene-3-carboxamide [Example 44] (500 mg, 836.75 μmol) in THF (10 ml), was added methylmagnesium bromide 2.5M solution in THF (1.7 ml, 5 mmol) at 0° C. The reaction mixture was stirred at room temperature for 4 hours. A saturated solution of NH4Cl was added, and the mixture was extracted with EtOAc, and the organic phase washed with water, brine, dried over MgSO$_4$, filtered and evaporated under reduced pressure to give 350 mg (76%) of (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)ethan-1-one.

Example 40. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)oxazolidin-2-one

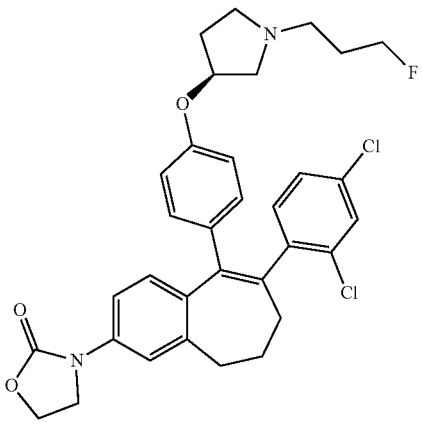 [SMILES: O=C1OCCN1c1ccc2c(c1)CCCC(c1ccc(Cl)cc1Cl)=C2c1ccc(O[C@H]2CCN(CCCF)C2)cc1]

To a mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, Step 1] (100 mg, 0.151 mmol), 2-oxazolidone (27.3 mg, 0.30 mmol), and sodium tert-butoxide (30 mg, 0.304 mmol) in anhydrous toluene (2 ml), under argon, was added tBuXPhos (2-di-tert-butylphosphino-2',4',6'-triisopropylbiphenyl, 20 mg, 0.050 mmol), and Pd2(dba)3 (tris(dibenzylideneacetone)dipalladium(0), (29 mg, 0.030 mmol). The reaction mixture was stirred at room temperature for 48 hours in a sealed tube, diluted with EtOAc, washed with water, dried over MgSO₄, filtered and evaporated under reduced pressure. The residue was purified by flash chromatography eluting with a mixture of EtOAc, heptane, and MeOH (75/20/5, v/v/v) to give 45 mg (50%) of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)oxazolidin-2-one.

Example 41. (S)-3-(8-(2-chloro-4-(2-oxooxazolidin-3-yl)phenyl)-9-(4-((1-(3-fluoropropyl)pyrrolidin-3-yl)oxy)phenyl)-6,7-dihydro-5H-benzo[7]annulen-3-yl)oxazolidin-2-one

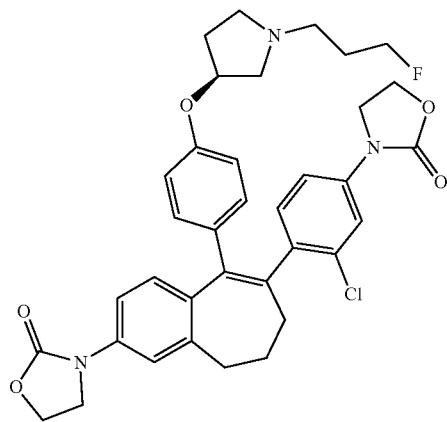 [SMILES: O=C1OCCN1c1ccc(C2=C(c3ccc(O[C@H]4CCN(CCCF)C4)cc3)c3ccc(N4CCOC4=O)cc3CCC2)c(Cl)c1]

To a mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, Step 1] (100 mg, 0.151 mmol), 2-oxazolidone (19 mg, 0.212 mmol), and sodium tert-butoxide (43 mg, 0.432 mmol) in anhydrous toluene (2 ml), under argon, was added tBuXPhos (2-di-tert-butylphosphino-2',4',6'-triisopropylbiphenyl (20 mg, 0.050 mmol), and Pd2(dba)3 (tris(dibenzylideneacetone)dipalladium(0), (29 mg, 0.030 mmol). The reaction mixture was stirred at 110° C. for 48 hours in a sealed tube, diluted with EtOAc, washed with water, dried over MgSO₄, filtered and evaporated under reduced pressure. The residue was purified first by flash chromatography eluting with a mixture of EtOAc, and MeOH (97/3; v/v) and then by reverse phase HPLC to give 8 mg (8.2%) of (S)-3-(8-(2-chloro-4-(2-oxooxazolidin-3-yl)phenyl)-9-(4-((1-(3-fluoropropyl)pyrrolidin-3-yl)oxy)phenyl)-6,7-dihydro-5H-benzo[7]annulen-3-yl)oxazolidin-2-one.

Example 42. (S)-4-(3-amino-9-(4-((1-(3-fluoropropyl)pyrrolidin-3-yl)oxy)phenyl)-6,7-dihydro-5H-benzo[7]annulen-8-yl)-3-chlorophenol

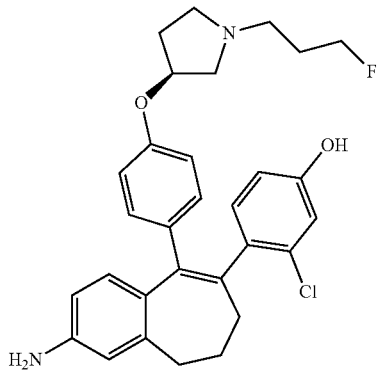 [SMILES: Nc1ccc2c(c1)CCCC(c1ccc(O)cc1Cl)=C2c1ccc(O[C@H]2CCN(CCCF)C2)cc1]

Step 1: Tert-butyl (S)-(8-(2-chloro-4-hydroxyphenyl)-9-(4-((1-(3-fluoropropyl)pyrrolidin-3-yl)oxy)phenyl)-6,7-dihydro-5H-benzo[7]annulen-3-yl)carbamate

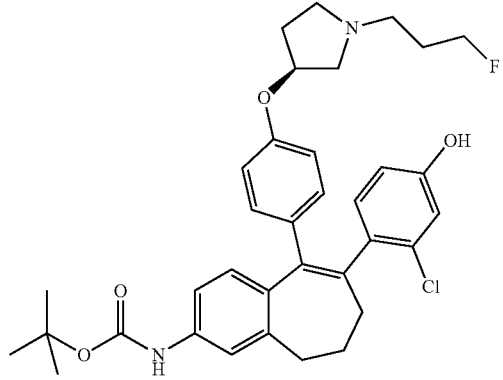 [SMILES: CC(C)(C)OC(=O)Nc1ccc2c(c1)CCCC(c1ccc(O)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, Step 1] (500 mg, 0.85 mmol), tert-butyl carbamate (127 mg, 1.06 mmol), and sodium tert-butoxide (147 mg, 1.51 mmol), in anhydrous toluene (5 ml), under argon, was added tBuXPhos (2-di-tert-butylphosphino-2',4',6'-triisopropylbiphenyl, 151 mg, 0.31 mmol), and Pd2(dba)3 (tris(dibenzylideneacetone)dipalladium(0), 108 mg, 0.13 mmol). The reaction mixture was heated in a sealed tube at 110° C. for 16 hours, diluted with EtOAc, washed with water, and brine, dried over Na₂SO₄, filtered and evaporated under reduced pressure. The residue was purified by flash chromatography eluting with a mixture of heptane and EtOAc (70/30, v/v) to give 400 mg (86.8%) of tert-butyl (S)-(8-(2-chloro-4-hydroxyphenyl)-9-(4-((1-(3-fluoropropyl)pyrrolidin-3-yl)oxy)phenyl)-6,7-dihydro-5H-benzo[7]annulen-3-yl)carbamate. LC/MS (m/z, MH+): 607

Step 2: (S)-4-(3-amino-9-(4-((1-(3-fluoropropyl) pyrrolidin-3-yl)oxy)phenyl)-6,7-dihydro-5H-benzo [7]annulen-8-yl)-3-chlorophenol

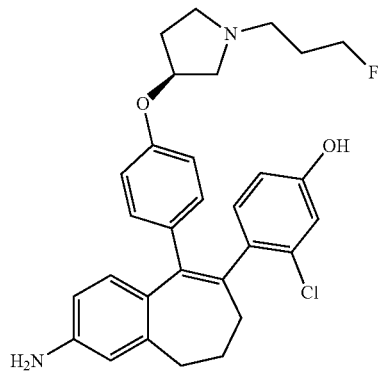 [SMILES: Nc1ccc2c(c1)CCCC(c1ccc(O)cc1Cl)=C2c1ccc(O[C@H]2CCN(CCCF)C2)cc1]

To a solution of tert-butyl(S)-(8-(2-chloro-4-hydroxyphenyl)-9-(4-((1-(3-fluoropropyl)pyrrolidin-3-yl)oxy)phenyl)-6,7-dihydro-5H-benzo[7]annulen-3-yl)carbamate (100 mg, 0.16 mmol) in anhydrous DCM (2 ml) was added TFA (trifluoroacetic acid, 0.2 ml). The reaction mixture was stirred for 16 hours, diluted with EtOAc, washed with saturated sodium bicarbonate solution, dried over $Na_2SO_4$, filtered and evaporated under reduced pressure to give 70 mg (86.4%) of (S)-4-(3-amino-9-(4-((1-(3-fluoropropyl) pyrrolidin-3-yl)oxy)phenyl)-6,7-dihydro-5H-benzo[7]annulen-8-yl)-3-chlorophenol.

Example 43. 5-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)imidazolidine-2,4-dione

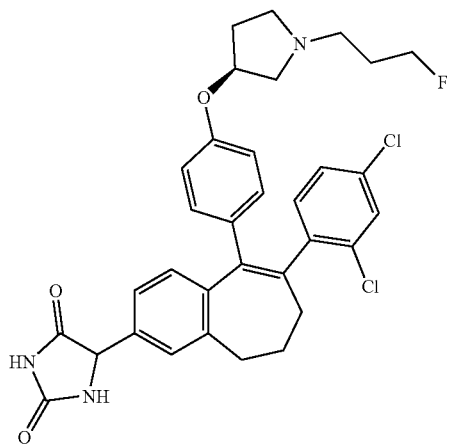 [SMILES: O=C1NC(=O)C(c2ccc3c(c2)CCCC(c2ccc(Cl)cc2Cl)=C3c2ccc(O[C@H]3CCN(CCCF)C3)cc2)N1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbaldehyde [Example 5, step 1] (200 mg, 371.41 µmol) in MeOH (2 ml), was added $NH_4CO_3$ (107.06 mg, 1.11 mmol), potassium cyanide (26.60 mg, 408.55 µmol), water (2 ml), and THF (1 ml). The reaction mixture was heated in a sealed tube at 70° C. for 20 hours, poured into water and extracted with EtOAc. The organic phase was washed with water, brine, dried over $Na_2SO_4$, filtered and evaporated under reduced pressure. The residue was purified by reverse phase HPLC to give 16 mg (7%) of 5-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)imidazolidine-2,4-dione.

Example 44. (S)-8-(2,4-dichlorophenyl)-9-(4-((1-(3-fluoropropyl)pyrrolidin-3-yl)oxy)phenyl)-N-methoxy-N-methyl-6,7-dihydro-5H-benzo[7]annulene-3-carboxamide

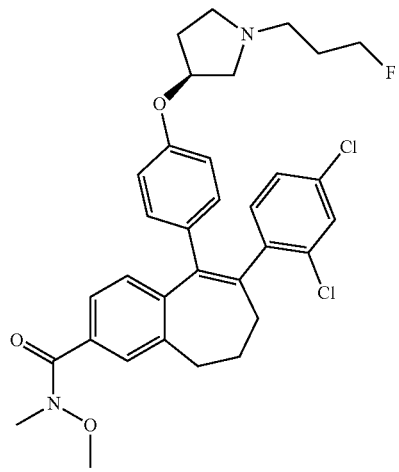 [SMILES: CON(C)C(=O)c1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (3 g, 5.41 mmol) in DMF (100 ml) was added DIPEA (2.83 ml, 16.23 mmol), HBTU (3 g, 7.75 mmol) and N,O-dimethylhydroxylamine hydrochloride (604.71 mg, 5.95 mmol). The reaction mixture was stirred at room temperature for 4 hours. The reaction mixture was concentrated under reduced pressure and then, EtOAc was added. The organic layer was washed twice with water and once with brine. The organic layers were collected, dried over $MgSO_4$ and concentrated under reduced pressure. The crude product obtained was purified by flash chromatography eluting with a gradient of EtOAc in heptane (5% EtOAc to 100% EtOAc, v/v) to give 3.2 g (99%) of (S)-8-(2,4-dichlorophenyl)-9-(4-((1-(3-fluoropropyl)pyrrolidin-3-yl)oxy)phenyl)-N-methoxy-N-methyl-6,7-dihydro-5H-benzo[7]annulene-3-carboxamide.

Example 45. (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole-2(3H)-thione

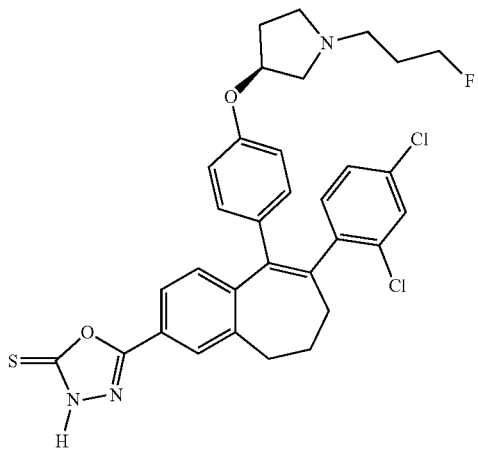 [SMILES: FCCCN1CC[C@H](Oc2ccc(C3=C(c4ccc(Cl)cc4Cl)CCCc4cc(-c5n[nH]c(=S)o5)ccc43)cc2)C1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carbohydrazide [Example 6] (386 mg, 678.96 µmol) in 1,4-dioxane (10 ml), was added DBU (120 mg, 746.86 mol), and TCDI (191 mg, 178.03 mol). The reaction mixture was refluxed for 1 hour, and evaporated under reduced pressure. The residue was partitioned between DCM and water, and the organic phase washed with brine, dried over MgSO₄, filtered and evaporated under reduced pressure. The residue was purified by flash chromatography eluting with a mixture of DCM and MeOH (90/10, v/v) to give 28 mg (6.8%) of (S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole-2(3H)-thione.

Example 46. (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetimidamide

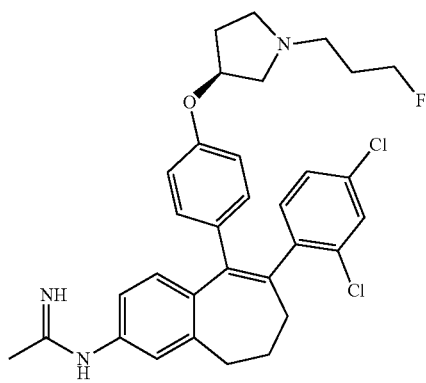

To a mixture of methyl acetimidate hydrochloride (375.26 mg, 3.43 mmol) in MeCN (10 ml), was added TEA (480.94 µl, 3.43 mmol). The reaction mixture was stirred for 15 minutes at room temperature. Then, (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (600 mg, 1.14 mmol) was added and the reaction mixture was stirred at room temperature overnight. The solid was filtered off, and washed with EtOAc (200 ml). The organic phase was washed twice with water, once with brine, dried over MgSO₄ and concentrated under reduced pressure. The crude product obtained was purified by flash chromatography eluting in a first time with a gradient of MeOH in DCM (100/0 to 90/10, v/v) and in second time with a gradient of (MeOH/10% NH3-MeOH 2N) in DCM (90/10 to 75/25, v/v) to give 200 mg (31%) of (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetimidamide.

Example 47. (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2,2,2-trifluoroacetamide

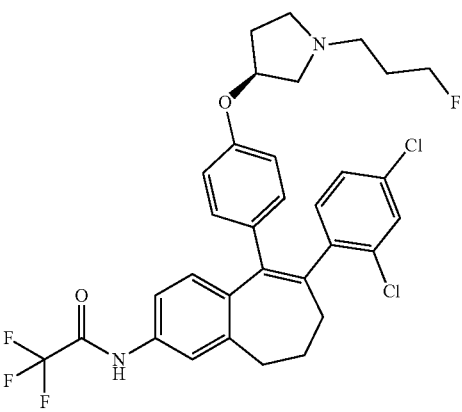 [SMILES: O=C(Nc1ccc2c(c1)CCCC(c1ccc(Cl)cc1Cl)=C2c1ccc(O[C@H]2CCN(CCCF)C2)cc1)C(F)(F)F]

To a mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (180 mg, 342.54 µmol) in THF (5 ml), was added TEA (57.71 µl, 411.05 µmol) and TFAA (57.75 µl, 411.05 µmol). The reaction mixture was stirred for 2 hours at room temperature. Water was added and the mixture was extracted twice with EtOAc. The organic layers were collected, washed with brine, dried over MgSO₄, filtered and evaporated under reduced pressure. The residue was purified by flash chromatography eluting with a gradient of MeOH in DCM (100/0 to 90/10, v/v) to give 200 mg (79%) of (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2,2,2-trifluoroacetamide.

Example 48. (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetamide

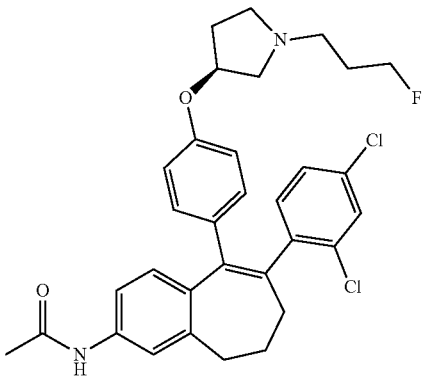 [SMILES: CC(=O)Nc1ccc2c(c1)CCCC(c1ccc(Cl)cc1Cl)=C2c1ccc(O[C@H]2CCN(CCCF)C2)cc1]

To a mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (100 mg, 190.30 μmol) in DCM (5 ml), was added at 0° C. TEA (58.94 μl, 418.66 μmol) and acetyl chloride (33.26 μl, 456.72 μmol). The reaction mixture was stirred for 48 hours at room temperature. Water was added and the mixture was extracted twice with DCM. The organic layers were collected, washed with brine, dried over MgSO₄, filtered and evaporated under reduced pressure. The residue was purified by flash chromatography eluting with a gradient of MeOH in DCM (100/0 to 90/10, v/v) to give 86 mg (80%) of (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetamide.

Example 49. 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)ethan-1-ol

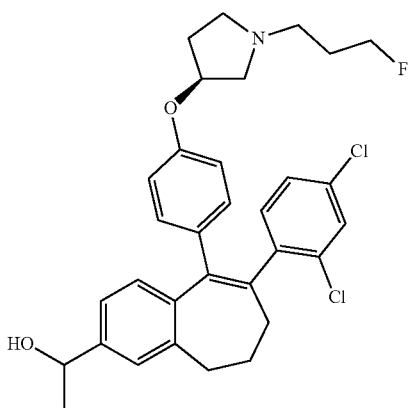 [SMILES: CC(O)c1ccc2c(c1)CCCC(c1ccc(Cl)cc1Cl)=C2c1ccc(O[C@H]2CCN(CCCF)C2)cc1]

To a mixture of (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)ethan-1-one [Example 39] (200 mg, 361.98 μmol) in EtOH (20 ml), was added at 0° C. NaBH₄ (27.39 mg, 723.97 μmol). The reaction mixture was stirred 2 hours at room temperature. Then, water was added and the mixture was extracted twice with EtOAc. The organic layers were collected, washed with brine, dried over MgSO₄, filtered and evaporated under reduced pressure. The residue was purified twice by flash chromatography eluting first with a gradient of EtOAc in heptane (95/5 to 0/100, v/v) and with a solution of EtOAc in MeOH (95/5, v/v) to give 140 mg (70%) of 1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)ethan-1-ol.

Example 50. (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)propan-2-ol

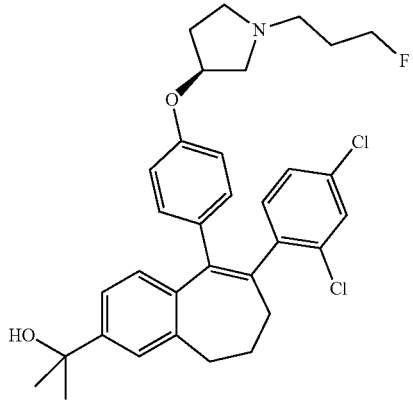

To a mixture of (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)ethan-1-one [Example 39] (200 mg, 361.98 μmol) in anhydrous THF (10 ml), was added at 0° C. methyl magnesium bromide (361.98 μl, 1.09 mmol). The reaction mixture was stirred 2 hours at room temperature. Then, water was added and the mixture was extracted twice with EtOAc. The organic layers were collected, washed with brine, dried over MgSO₄, filtered and evaporated under reduced pressure. The residue was purified twice by flash chromatography eluting first with a gradient of EtOAc in heptane (95/5 to 0/100, v/v) and with a solution of EtOAc in MeOH (95/5, v/v) to give 70 mg (22%) of (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)propan-2-ol.

Example 51. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazole

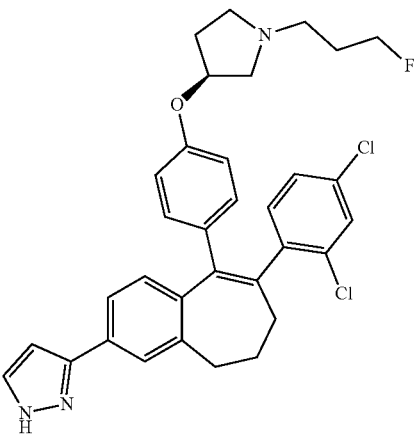 [SMILES: FCCCN1CC[C@H](Oc2ccc(C3=C(c4ccc(Cl)cc4Cl)CCCc4cc(-c5cc[nH]n5)ccc43)cc2)C1]

A mixture of (S)-8-(2,4-dichlorophenyl)-9-(4-((1-(3-fluoropropyl)pyrrolidin-3-yl)oxy)phenyl)-6,7-dihydro-5H- benzo[7]annulen-3-yl trifluoromethanesulfonate [Example 1, step 1] (350 mg, 478.34 µmol), 1,4-dioxane (13 ml), Pd(dppf)$_2$Cl$_2$ (21 mg, 28.70 µmol), water (3 ml), Cs$_2$CO$_3$ (389.63 mg, 1.20 mmol) and 1H-Pyrazole-3-boronic acid pinacol ester (136.78 mg, 669.67 µmol) was microwaved at 90° C. for 30 minutes. After cooling to room temperature, the reaction mixture was concentrated under reduced pressure. Water was added and the mixture was extracted twice with EtOAc. The organic layers were collected, washed with brine, dried over MgSO$_4$, filtered and evaporated under reduced pressure. The residue was purified by flash chromatography with a gradient of MeOH in DCM (100/0 to 90/10, v/v) to give 140 mg (51%) of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazole.

Example 52. (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol

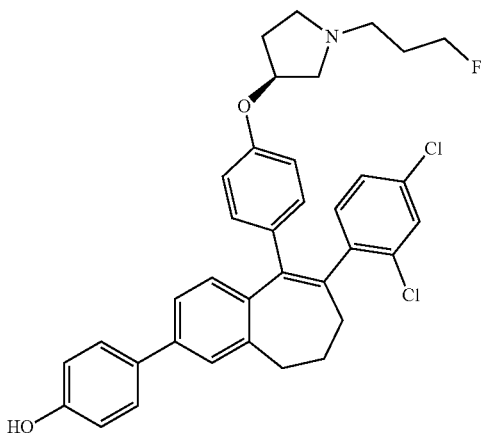 [SMILES: Oc1ccc(-c2ccc3c(c2)CCCC(c2ccc(Cl)cc2Cl)=C3c2ccc(O[C@H]3CCN(CCCF)C3)cc2)cc1]

A mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, step 1] (300 mg, 410 mol), 1,4-dioxane (13 ml), Pd(dppf)$_2$Cl$_2$ (18 mg, 24.60 mol), water (3 ml), Cs$_2$CO$_3$ (333.97 mg, 1.03 mmol) and (4-hydroxyphenyl)boronic acid (71.43 mg, 492.01 µmol) was microwaved at 90° C. for 45 minutes. After cooling to room temperature, the reaction mixture was concentrated under reduced pressure. Water was added and the mixture was extracted twice with EtOAc. The organic layers were collected, washed with brine, dried over MgSO$_4$, filtered and evaporated under reduced pressure. The residue was purified by flash chromatography eluting with a gradient of EtOAc in heptane (95/5 to 0/100, v/v) to give 140 mg (57%) of (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol.

Example 53. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol

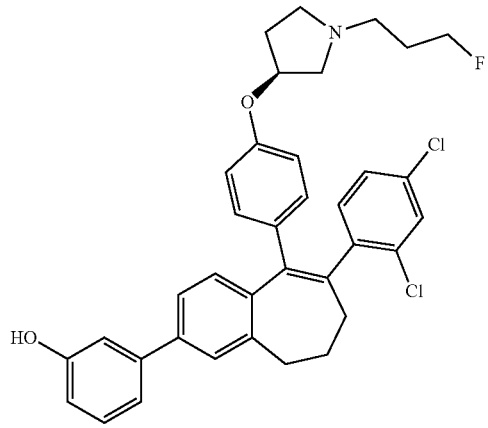 [SMILES: Oc1cccc(-c2ccc3c(c2)CCCC(c2ccc(Cl)cc2Cl)=C3c2ccc(O[C@H]3CCN(CCCF)C3)cc2)c1]

A mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, step 1] (300 mg, 410 mol), 1,4-dioxane (13 ml), Pd(dppf)$_2$Cl$_2$ (18 mg, 24.60 µmol), water (3 ml), Cs$_2$CO$_3$ (333.97 mg, 1.03 mmol) and (3-hydroxyphenyl)boronic acid (79.17 mg, 574.01 µmol) was microwaved at 90° C. for 45 minutes. After cooling to room temperature, the reaction mixture was concentrated under reduced pressure. Water was added and the mixture was extracted twice with EtOAc. The organic layers were collected, washed with brine, dried over MgSO$_4$, filtered and evaporated under reduced pressure. The crude product obtained was purified by flash chromatography eluting with a gradient of EtOAc in heptane (95/5 to 0/100, v/v) to give 150 mg (61%) of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol.

Example 54. (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol

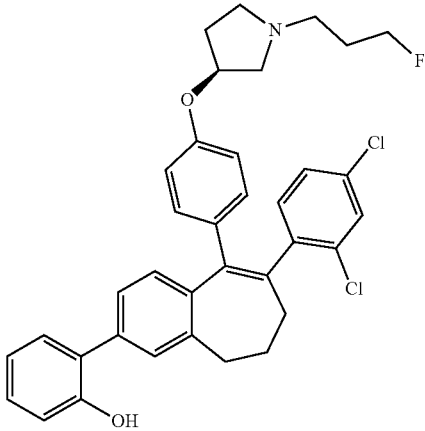 [SMILES: Oc1ccccc1-c1ccc2c(c1)CCCC(c1ccc(Cl)cc1Cl)=C2c1ccc(O[C@H]2CCN(CCCF)C2)cc1]

A mixture of (S)-8-(2,4-dichlorophenyl)-9-(4-((1-(3-fluoropropyl)pyrrolidin-3-yl)oxy)phenyl)-6,7-dihydro-5H- benzo[7]annulen-3-yl trifluoromethanesulfonate [Example 1, step 1] (300 mg, 410 mol), 1,4-dioxane (13 ml), Pd(dppf)$_2$Cl$_2$ (18 mg, 24.60 mol), water (3 ml), Cs$_2$CO$_3$ (333.97 mg, 1.03 mmol) and (2-hydroxyphenyl)boronic acid (67.86 mg, 492.01 µmol) was microwaved at 90° C. for 45 minutes. After cooling to room temperature, the reaction mixture was concentrated under reduced pressure. Water was added and the mixture was extracted twice with EtOAc. The organic layers were collected, washed with brine, dried over MgSO$_4$, filtered and evaporated under reduced pressure. The crude product obtained was purified twice by flash chromatography eluting first with a gradient of EtOAc in heptane (95/5 to 0/100, v/v) and with a solution of EtOAc in MeOH (95/5, v/v) to give 170 mg (69%) of (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenol Example 55. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid

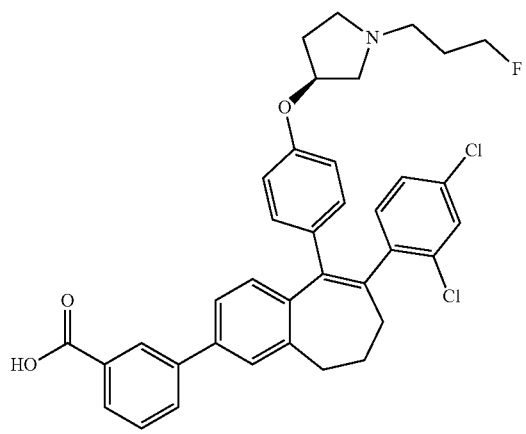 [SMILES: O=C(O)c1cccc(-c2ccc3c(c2)CCCC(c2ccc(Cl)cc2Cl)=C3c2ccc(O[C@H]3CCN(CCCF)C3)cc2)c1]

To a mixture of methyl (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate [Example 57] (280 mg, 434.37 µmol) in MeOH (20 ml) and THF (10 ml), was added a solution of NaOH 2M (10 ml, 434.37 µmol). The reaction mixture was stirred for 2 hours at 60° C. After cooling to room temperature, the reaction mixture was concentrated under reduced pressure. Water was added, followed by a solution of HCl 5N until pH 5. The mixture was extracted twice with EtOAc and the organic layers were collected and washed with brine. The organic phase was dried over MgSO$_4$, filtered and evaporated under reduced pressure to give 175 mg (64%) of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid.

Example 56. Methyl (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate

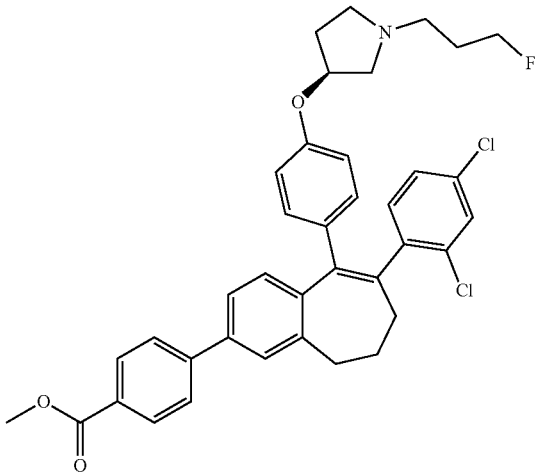 [SMILES: COC(=O)c1ccc(-c2ccc3c(c2)CCCC(c2ccc(Cl)cc2Cl)=C3c2ccc(O[C@H]3CCN(CCCF)C3)cc2)cc1]

A mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, step 1] (400 mg, 546.67 µmol), 1,4-dioxane (13 ml), Pd(dppf)$_2$Cl$_2$ (24 mg, 32.80 µmol), water (3 ml), Cs$_2$CO$_3$ (445.29.63 mg, 1.37 mmol) and 4-methoxycarbonylphenyl boronic acid (142 mg, 765.34 µmol) was microwaved at 90° C. for 30 minutes. After cooling to room temperature, the reaction mixture was concentrated under reduced pressure. Water was added and the mixture was extracted twice with EtOAc. The organic layers were collected, washed with brine, dried over MgSO$_4$, filtered and evaporated under reduced pressure. The crude product obtained was purified by flash chromatography eluting with a gradient of EtOAc in heptane (95/5 to 0/100, v/v) to give 220 mg (62%) of methyl (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate.

Example 57. Methyl (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate

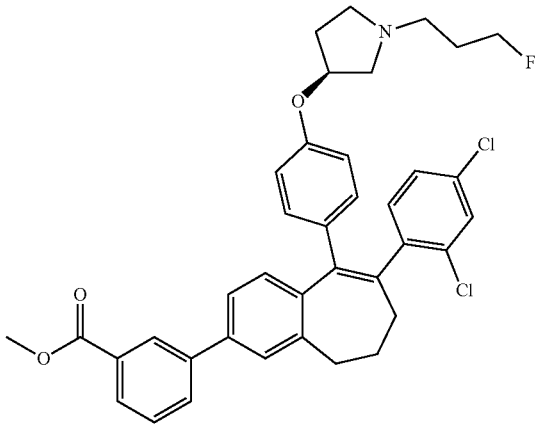 [SMILES: COC(=O)c1cccc(-c2ccc3c(c2)CCCC(c2ccc(Cl)cc2Cl)=C3c2ccc(O[C@H]3CCN(CCCF)C3)cc2)c1]

A mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, step 1] (400 mg, 546.67 μmol), 1,4-dioxane (13 ml), Pd(dppf)₂Cl₂ (24 mg, 32.80 μmol), water (3 ml), Cs₂CO₃ (445.29 mg, 1.37 mmol) and 3-methoxycarbonylphenyl boronic acid (118 mg, 656.01 μmol) was microwaved at 90° C. for 30 minutes. After cooling to room temperature, the reaction mixture was concentrated under reduced pressure. Water was added and the mixture was extracted twice with EtOAc. The organic layers were collected, washed with brine, dried over MgSO₄, filtered and evaporated under reduced pressure. The crude product obtained was purified by flash chromatography eluting with a gradient of EtOAc in heptane (95/5 to 0/100, v/v) to give 310 mg (88%) of methyl (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate.

Example 58. (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)pyrrolidin-2-one

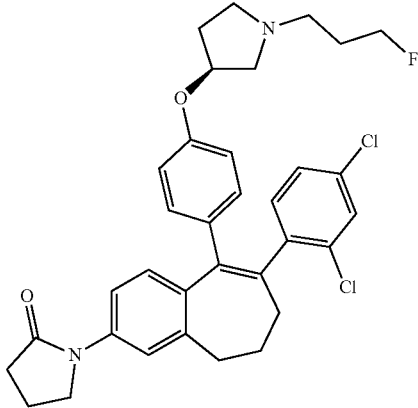 [SMILES: O=C1CCCN1c1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoro-methanesulfonate [Example 1, step 1] (100 mg, 0.216 mmol), 2-oxazolidone (27 mg, 0.302 mmol), and sodium tert-butoxide (43 mg, 0.432 mmol), in anhydrous toluene (2 ml) in a microwave-vessel, under argon, was added t-Bu-XPhos (28 mg, 0.065 mmol), and Pd₂(dba)₃ (41 mg, 0.043 mmol). After degassing 5 minutes with argon the tube was sealed and stirred at room temperature for 16 hours. The reaction mixture was diluted with EtOAc, the organic phase was washed with water and brine, dried over Na₂SO₄, filtered and evaporated under reduced pressure. The residue was purified by flash chromatography eluting with a mixture of EtOAc and MeOH (97/03, v/v) to give 30 mg of a crude product. Further purification by preparative reverse phase high performance liquid chromatography at 20° C. by using a CSH 50×250 mm, 5 μm column applying the following gradient with A: H2O/0.1% formic acid and B: CH3CN/0.1% formic acid: 30% of B at t=0 min, 30% of B at t=5 min, 50% of B at t=25 min and subsequent lyophilization provided 5 mg (4%) of a white solid of (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)pyrrolidin-2-one.

Example 59. (S)-8-(2,4-dichlorophenyl)-9-(4-((1-(3-fluoropropyl)pyrrolidin-3-yl)oxy)phenyl)-N'-(1H-imidazole-1-carbonothioyl)-6,7-dihydro-5H-benzo[7]annulene-3-carbohydrazide

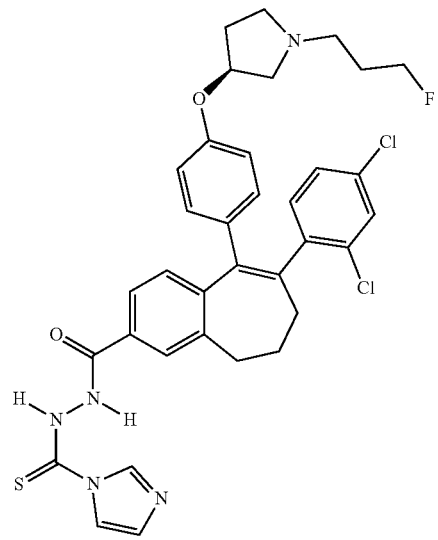 [SMILES: O=C(NNC(=S)n1ccnc1)c1ccc2c(c1)CCCC(c1ccc(Cl)cc1Cl)=C2c1ccc(O[C@H]2CCN(CCCF)C2)cc1]

The procedure followed is described in Example 45, The residue was further purified by flash chromatography eluting with a mixture of DCM and MeOH (90/10, v/v) to give 238 mg (51.7%) of (S)-8-(2,4-dichlorophenyl)-9-(4-((1-(3-fluoropropyl)pyrrolidin-3-yl)oxy)phenyl)-N'-(1H-imidazole-1-carbonothioyl)-6,7-dihydro-5H-benzo[7]annulene carbohydrazide.

Example 60. (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)cyclopropanecarboxamide

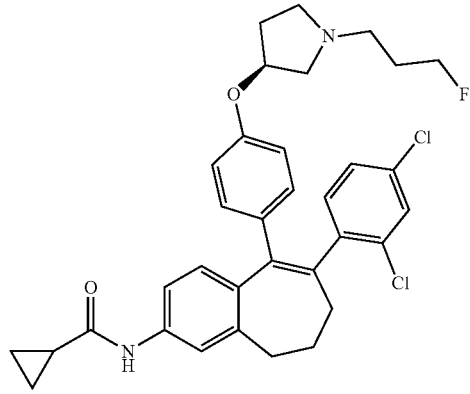 [SMILES: O=C(Nc1ccc2c(c1)CCCC(c1ccc(Cl)cc1Cl)=C2c1ccc(O[C@H]2CCN(CCCF)C2)cc1)C1CC1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (600 mg, 1.14 mmol) in DCM (60 ml) was added TEA (138.65 mg, 1.37 mmol) and cyclopropanecarbonyl chloride (127.09 μl, 1.37 mmol). The reaction mixture was stirred 16 hours at room temperature. The reaction mixture was concentrated under reduced pressure and then, EtOAc was added. The organic layer was washed twice with a saturated aqueous solution of K₂CO₃ and once with brine. The organic layers were collected, dried over MgSO₄ and concentrated under reduced pressure. The crude product obtained was purified by flash chromatography eluting with a gradient of EtOAc in heptane (5% EtOAc to 100% EtOAc, v/v) to give 480 mg (71%) of (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)cyclopropanecarboxamide.

Example 61. (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)thiazol-2-amine

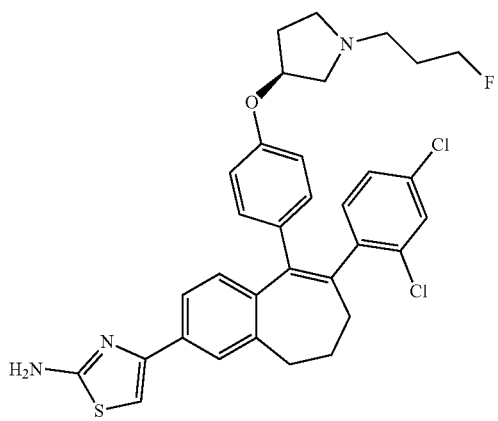 [SMILES: Nc1nc(-c2ccc3c(c2)CCCC(c2ccc(Cl)cc2Cl)=C3c2ccc(O[C@H]3CCN(CCCF)C3)cc2)cs1]

To a mixture of (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)ethan-1-one [Example 39] (150 mg, 271.49 µmol) in anhydrous THF (20 ml), was added phenyltrimethylammonium tribromide (244.94 mg, 651.58 µmol), and the reaction mixture was stirred 7 hours at room temperature. The precipitate formed was filtered and washed three times with THF, and the organic phase was collected and evaporated under reduced pressure. The crude residue was taken up in MeOH (30 ml) and thiourea (22.73 mg, 298.64 µmol) was added. The reaction mixture was stirred at reflux during 4 hours. The reaction mixture was evaporated under reduce pressure and the crude residue was diluted in EtOAc. The organic layer was washed twice with brine, dried over MgSO₄, filtered and evaporated under reduced pressure. The crude product obtained was purified by flash chromatography eluting in a first time with a gradient of EtOAc in heptane (95/5 to 0/100, v/v) and in second time with a solution of EtOAc in MeOH (95/5, v/v) to give 45 mg (27%) of (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)thiazol-2-amine.

Example 62. (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)pivalamide

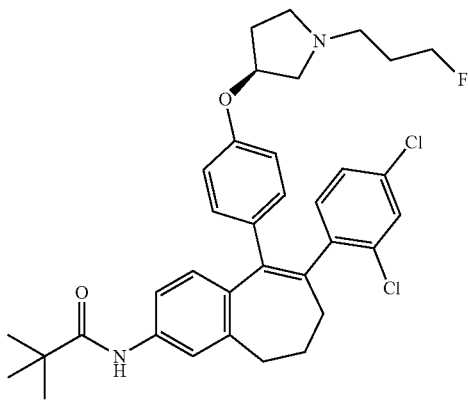 [SMILES: CC(C)(C)C(=O)Nc1ccc2c(c1)CCCC(c1ccc(Cl)cc1Cl)=C2c1ccc(O[C@H]2CCN(CCCF)C2)cc1]

To a mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (600 mg, 1.14 mmol) in DCM (60 ml), was added at 0° C. TEA (138.65 mg, 1.37 mmol) and pivaloyl chloride (165.21 mg, 1.37 mmol). The reaction mixture was stirred for 4 hours at room temperature. Water was added and the mixture was extracted twice with DCM. The organic layers were collected, washed with brine, dried over MgSO₄, filtered and evaporated under reduced pressure. The residue was purified by with a gradient of EtOAc in heptane (95/5 to 0/100, v/v) to give 500 mg (72%) of (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)pivalamide.

Example 63. (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxamide

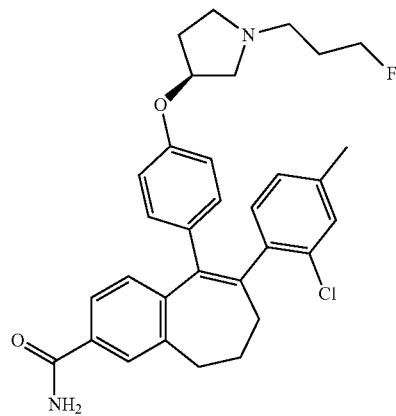 [SMILES: Cc1ccc(C2=C(c3ccc(O[C@H]4CCN(CCCF)C4)cc3)c3ccc(C(N)=O)cc3CCC2)c(Cl)c1]

Obtained from (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxylic acid [WO2017140669] in 81% yield by an analogous method to Example 3.

Example 64. (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carbonitrile, 2,2,2-trifluoroacetate

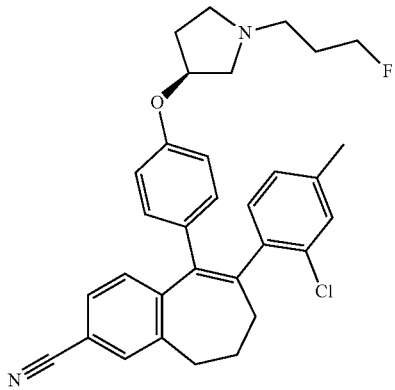 [SMILES: Cc1ccc(C2=C(c3ccc(O[C@H]4CCN(CCCF)C4)cc3)c3ccc(C#N)cc3CCC2)c(Cl)c1]

Obtained from (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxamide [Example 63] in 44% yield by an analogous method to Example 22.

Example 65. 1-(8-(2-chloro-3-fluorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol

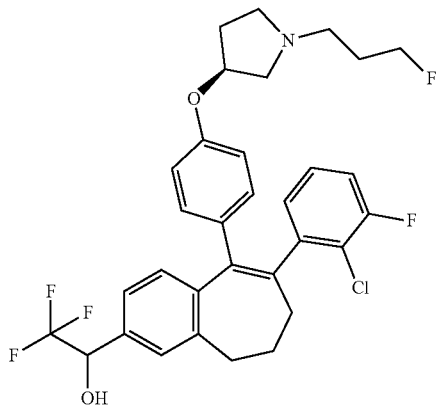 [SMILES: OC(c1ccc2c(c1)CCCC(c1cccc(F)c1Cl)=C2c1ccc(O[C@H]2CCN(CCCF)C2)cc1)C(F)(F)F]

Step 1: (S)-8-(2-chloro-3-fluorophenyl)-9-(4-((1-(3-fluoropropyl)pyrrolidin-3-yl)oxy)phenyl)-N-methoxy-N-methyl-6,7-dihydro-5H-benzo[7]annulene-3-carboxamide

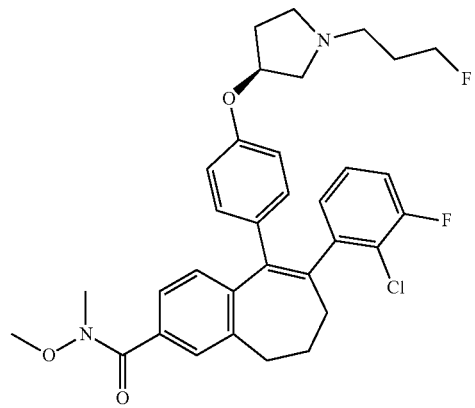 [SMILES: CON(C)C(=O)c1ccc2c(c1)CCCC(c1cccc(F)c1Cl)=C2c1ccc(O[C@H]2CCN(CCCF)C2)cc1]

This compound has been prepared as described in Example 44 starting from (S)-8-(2-chloro-3-fluorophenyl)-9-(4-((1-(3-fluoropropyl)pyrrolidin-3-yl)oxy)phenyl)-6,7-dihydro-5H-benzo[7]annulene-3-carboxylic acid [WO2017140669] (440 mg, 818 μmol) to give 300 mg (63%) of (S)-8-(2-chloro-3-fluorophenyl)-9-(4-((1-(3-fluoropropyl)pyrrolidin-3-yl)oxy)phenyl)-N-methoxy-N-methyl-6,7-dihydro-5H-benzo[7]annulene-3-carboxamide.
LC/MS (m/z, MH$^+$): 581

Step 2: (S)-8-(2-chloro-3-fluorophenyl)-9-(4-((1-(3-fluoropropyl)pyrrolidin-3-yl)oxy)phenyl)-6,7-dihydro-5H-benzo[7]annulene-3-carbaldehyde

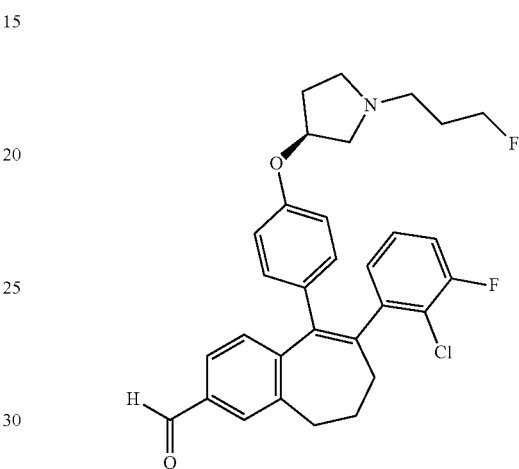

This compound has been prepared as described in Example 5, Step 1, starting from (S)-8-(2-chloro-3-fluorophenyl)-9-(4-((1-(3-fluoropropyl)pyrrolidin-3-yl)oxy)phenyl)-N-methoxy-N-methyl-6,7-dihydro-5H-benzo[7]annulene-3-carboxamide (300 mg, 516 μmol) to give 240 mg (89%) of (S)-8-(2-chloro-3-fluorophenyl)-9-(4-((1-(3-fluoropropyl)pyrrolidin-3-yl)oxy)phenyl)-6,7-dihydro-5H-benzo[7]annulene-3-carbaldehyde.
LC/MS (m/z, MH$^+$): 522

Step 3: 1-(8-(2-chloro-3-fluorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol

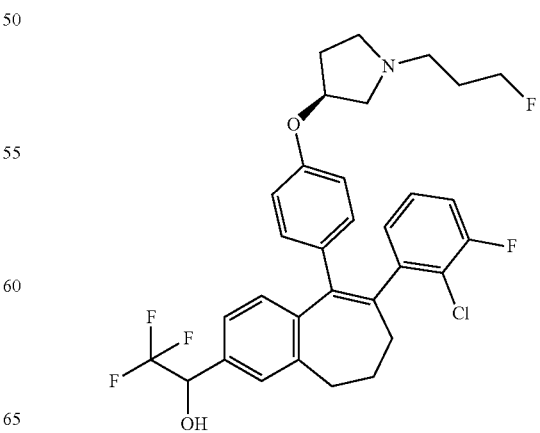

This compound has been prepared as described in Example 10 starting from (S)-8-(2-chloro-3-fluorophenyl)-9-(4-((1-(3-fluoropropyl)pyrrolidin-3-yl)oxy)phenyl)-6,7-dihydro-5H-benzo[7]annulene-3-carbaldehyde (240 mg, 459.74 μmol) to give 120 mg (44%) of 1-(8-(2-chloro-3-fluorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol.

Example 66. (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-fluorocyclopropane-1-carboxamide

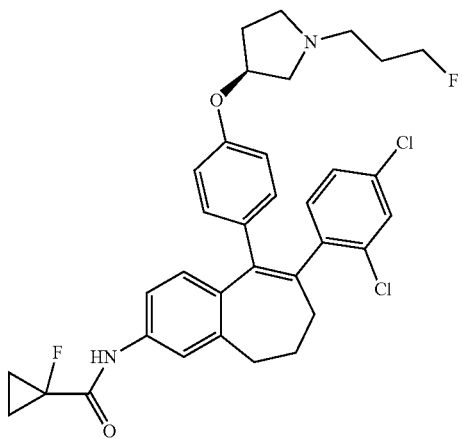 [SMILES: CC1(C(=O)Nc2ccc3c(c2)CCCC(c2ccc(Cl)cc2Cl)=C3c2ccc(O[C@H]3CCN(CCCF)C3)cc2)CC1]

To a solution of 1-fluorocyclopropane-1-carboxylic acid (10.01 mg, 91.34 μmol) in DCM (5 ml) was added 1(3-dimethylaminopropyl)-3-ethylcarbodiimide hydrochloride (17.87 mg, 91.34 μmol) and 4-dimethylaminopyridine (11.27 mg, 91.34 μmol). The reaction mixture was stirred 10 minutes at room temperature and (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (40 mg, 76.12 μmol) was added. The reaction mixture was stirred overnight at room temperature. The reaction mixture was concentrated under reduced pressure, and EtOAc was added. The organic layer was washed twice with a saturated aqueous solution of $K_2CO_3$ and once with brine. The organic layers were collected, dried over $MgSO_4$ and concentrated under reduced pressure. The crude product obtained was purified by flash chromatography eluting with a gradient of EtOAc in heptane (5% EtOAc to 100% EtOAc, v/v) to give 42 mg (90%) of (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl) fluorocyclopropane-1-carboxamide.

Example 67. (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-methylcyclopropane-1-carboxamide

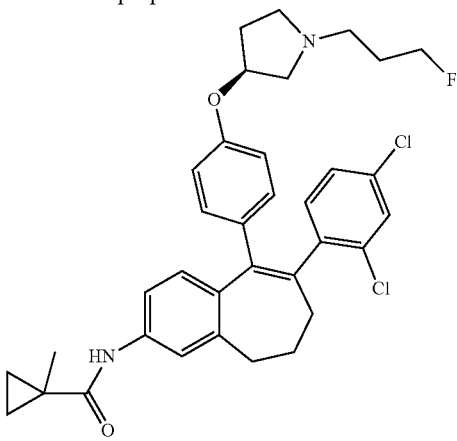

To a solution of 1-methylcyclopropane-1-carboxylic acid (58.32 mg, 570.90 μmol) in DCM (5 ml) was added 1(3-dimethylaminopropyl)-3-ethylcarbodiimide hydrochloride (111.68 mg, 570.90 μmol) and 4-dimethylaminopyridine (70.45 mg, 570.90 μmol). The reaction mixture was stirred 10 minutes at room temperature and (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (100 mg, 190.30 μmol) was added. The reaction mixture was stirred overnight at room temperature. The reaction mixture was concentrated under reduced pressure, and EtOAc was added. The organic phase was washed twice with a saturated aqueous solution of $K_2CO_3$ and once with brine. The organic phase was dried over $MgSO_4$ and concentrated under reduced pressure. The crude product obtained was purified by flash chromatography eluting with a gradient of EtOAc in heptane (5% EtOAc to 100% EtOAc, v/v) to give 54 mg (47%) of (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-methylcyclopropane carboxamide.

Example 68. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2-hydroxycyclopent-2-en-1-one

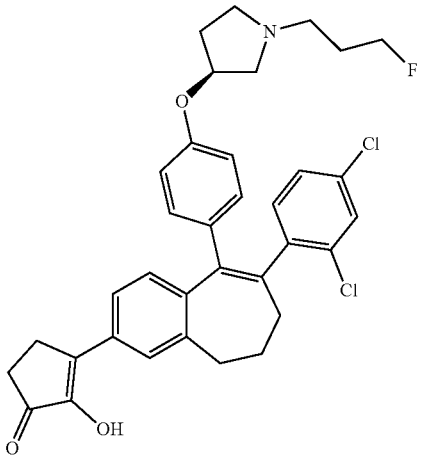 [SMILES: O=C1CCC(c2ccc3c(c2)CCCC(c2ccc(Cl)cc2Cl)=C3c2ccc(O[C@H]3CCN(CCCF)C3)cc2)=C1O]

Step 1: (S)-2-((tert-butyldimethylsilyl)oxy)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)cyclopent-2-en-1-one

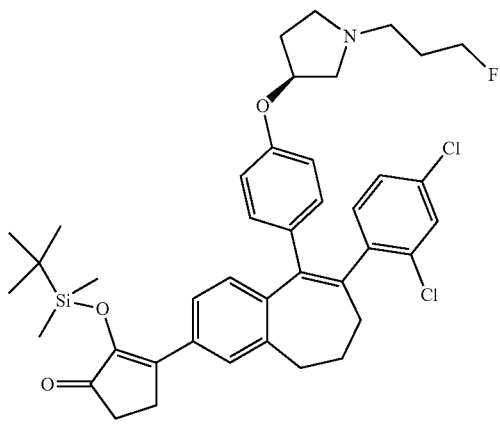 [SMILES: CC(C)(C)[Si](C)(C)OC1=C(c2ccc3c(c2)CCCC(c2ccc(Cl)cc2Cl)=C3c2ccc(O[C@H]3CCN(CCCF)C3)cc2)CCC1=O]

A solution of 3-bromo-2-((tert-butyldimethylsilyl)oxy)cyclo-pent-2-en-1-one (91.53 mg, 314 µmol), (S)-3-(4-(8-(2,4-dichlorophenyl)-3-(4,4,5,5-tetramethyl-1,3,2-dioxaborolan-2-yl)-6,7-dihydro-5H-benzo[7]annulen-9-yl)phenoxy)-1-(3-fluoropropyl)-pyrrolidine [Example 1] (200 mg, 314 µmol), Cs$_2$CO$_3$ (256 mg, 785 µmol), and Pd(dppf)Cl$_2$ (13.8 mg, 18.9 µmol) in 1,4-dioxane (2 ml), and water (2 ml) was microwaved 30 minutes at 90°. The reaction mixture was poured into water, extracted with EtOAc, the organic phase was washed with water and brine, dried over Na$_2$SO$_4$, filtered and evaporated under reduced pressure to give 225 mg of crude (S)-2-((tert-butyldimethylsilyl)oxy)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)cyclopent-2-en-1-one (85% LCMS purity) which was used without further purification in the next step.

Step 2: (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2-hydroxycyclopent-2-en-1-one

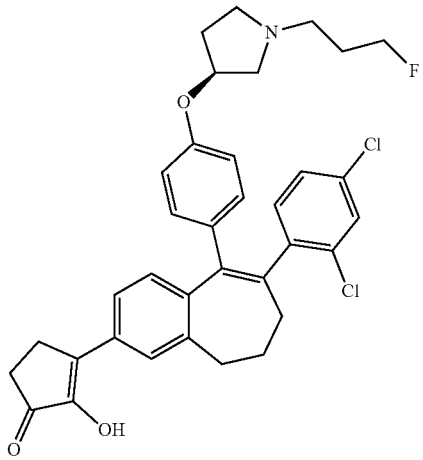 [SMILES: O=C1CCC(c2ccc3c(c2)CCCC(c2ccc(Cl)cc2Cl)=C3c2ccc(O[C@H]3CCN(CCCF)C3)cc2)=C1O]

To a solution of crude (S)-2-((tert-butyldimethylsilyl)oxy)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)cyclopent-2-en-1-one (225 mg, 314 µmol) in THF (2 ml) was added at 0° C. TBAF 1M in THF (625 µl, 625 µmol). The reaction mixture was stirred at room temperature for 40 minutes, and diluted with EtOAc. The organic phase was washed with water and brine, dried over Na$_2$SO$_4$, filtered and evaporated under reduced pressure. The brownish oil was purified by flash chromatography eluting with a mixture of DCM and MeOH (95/05, v/v) to give 134 mg (70%) of a beige solid of (S)-3-(8-(2,4-dichlorophenyl)-9-(4-((1-(3-fluoropropyl)-pyrrolidin-3-yl)oxy)phenyl)-6,7-dihydro-5H-benzo[7]annulen-3-yl)-2-hydroxycyclopent-2-en-1-one.

Example 69. (S,Z)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-N,3-dimethylthiazol-2(3H)-imine hydrochloride

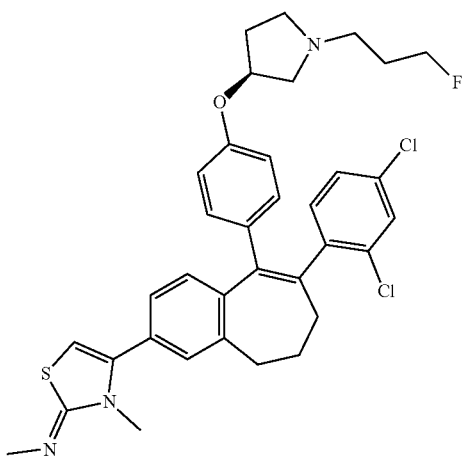 [SMILES: C/N=c1\scc(-c2ccc3c(c2)CCCC(c2ccc(Cl)cc2Cl)=C3c2ccc(O[C@H]3CCN(CCCF)C3)cc2)n1C]

To a solution of (S)-1-(8-(2,4-dichlorophenyl)-9-(4-((1-(3-fluoropropyl)pyrrolidin-3-yl)oxy)phenyl)-6,7-dihydro-5H-benzo[7]annulen-3-yl)ethan-1-one [Example 39] (100 mg, 181 µmol) in DCM (4 ml) was added benzyltrimethylammonium dichloroiodate (200 mg, 557 µmol). The reaction mixture was stirred under reflux for 16 hours. EtOH (10 ml) and N,N'-dimethylthiourea (19.9 mg, 181 µmol) was added, the mixture was heated to 80° C. under a stream of nitrogen in order to evaporate the DCM and then heated under reflux for 3 h. After addition of water the mixture was extracted with EtOAc, the organic phase was washed with water and brine, dried over Na$_2$SO$_4$, filtered and evaporated under reduced pressure. The residue was purified by flash chromatography eluting with a mixture of DCM and MeOH (70/30, v/v) to give 12 mg (10%) of (S,Z)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-N,3-dimethylthiazol-2(3H)-imine as a beige-colored solid.

Example 70. (S)-5-(8-(2-chloro-4-methylphenyl)-9-(4-((1-(3-fluoropropyl)pyrrolidin-3-yl)oxy)phenyl)-6,7-dihydro-5H-benzo[7]annulen-3-yl)-2H-tetrazole, 2,2,2-trifluoroacetate

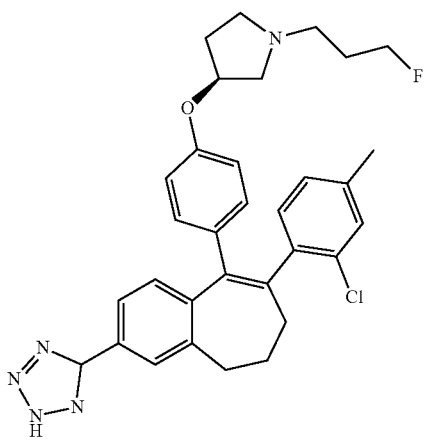 [SMILES: Cc1ccc(C2=C(c3ccc(O[C@H]4CCN(CCCF)C4)cc3)c3ccc(C4N=NNN4)cc3CCC2)c(Cl)c1]

Obtained from (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carbonitrile [Example 64] in 35% yield by an analogous method to Example 16.

Example 71. tert-butyl (S)-(9-(4-((1-(3-fluoropropyl)pyrrolidin-3-yl)oxy)phenyl)-8-phenyl-6,7-dihydro-5H-benzo[7]annulen-3-yl)carbamate

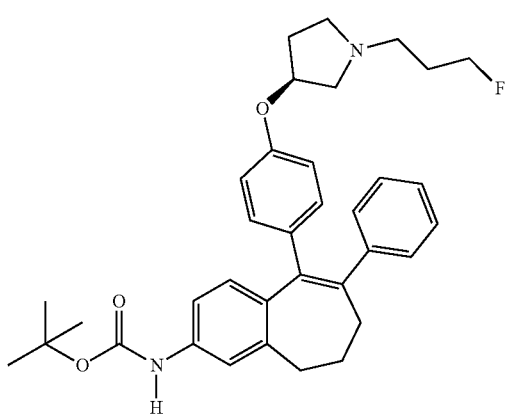 [SMILES: CC(C)(C)OC(=O)Nc1ccc2c(c1)CCCC(c1ccccc1)=C2c1ccc(O[C@H]2CCN(CCCF)C2)cc1]

Step 1: (S)-9-(4-((1-(3-fluoropropyl)pyrrolidin-3-yl)oxy)phenyl)-8-phenyl-6,7-dihydro-5H-benzo[7]annulen-3-yl trifluoromethanesulfonate

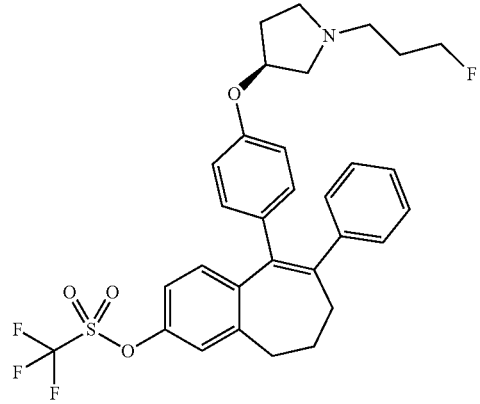 [SMILES: O=S(=O)(Oc1ccc2c(c1)CCCC(c1ccccc1)=C2c1ccc(O[C@H]2CCN(CCCF)C2)cc1)C(F)(F)F]

To a solution of (S)-9-(4-((1-(3-fluoropropyl)pyrrolidin-3-yl)oxy)phenyl)-8-phenyl-6,7-dihydro-5H-benzo[7]annulen-3-ol [WO2017140669] (2 g, 4.37 mmol), in DCM (200 ml) and pyridine (536 µl, 6.6 mmol) was added dropwise at 0° C., trifluoromethanesulfonic anhydride (1.8 ml, 8.7 mmol) dropwise. The reaction mixture was stirred at room temperature for 18 hours. Cold water (5 ml) and saturated NaHCO3 (10 ml) was added. After decantation, the organic phase was dried over MgSO₄, filtered and evaporated under reduced pressure to give 2.6 g (100%) of crude (S)-9-(4-((1-(3-fluoropropyl)pyrrolidin-3-yl)oxy)phenyl)-8-phenyl-6,7-dihydro-5H-benzo[7]annulen-3-yltrifluoromethanesulfonate.

LC/MS (m/z, MH⁺): 590.

Step 2: Tert-butyl (S)-(9-(4((1-(3-fluoropropyl)pyrrolidin-3-yl)oxy)phenyl)-8-phenyl-6,7-dihydro-5H-benzo[7]annulen-3-yl)carbamate To a mixture of (S)-9-(4-((1-(3-fluoropropyl)pyrrolidin-3-yl)oxy)phenyl)-8-phenyl-6,7-dihydro-5H-benzo[7]annulen-3-yl trifluoromethanesulfonate (170 mg, 288 µmol), in toluene (1 ml), was added tert-butyl-carbamate (43 mg, 360 µmol), tri(dibenzilideneacetone)dipalladium(0) (41 mg, 43 µmol), 2-di-tert-butylphosphino-2',4',6'-triisopropylbiphenyl (18 mg, 43 µmol), and sodium tert-butoxide (50 mg, 519

µmol). The reaction mixture was microwaved at 100° C. for 1 hour. The reaction mixture was partitioned between EtOAc and water, the organic phase was washed with brine, dried over MgSO₄, filtered and evaporated under reduced pressure. The residue was purified by flash chromatography eluting with a mixture of DCM and MeOH (95/5, v/v) to give 36 mg (22%) of tert-butyl (S)-(9-(4-((1-(3-fluoropropyl)pyrrolidin-3-yl)oxy)phenyl)-8-phenyl-6,7-dihydro-5H-benzo[7]annulen-3-yl)carbamate.

Example 72. (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid

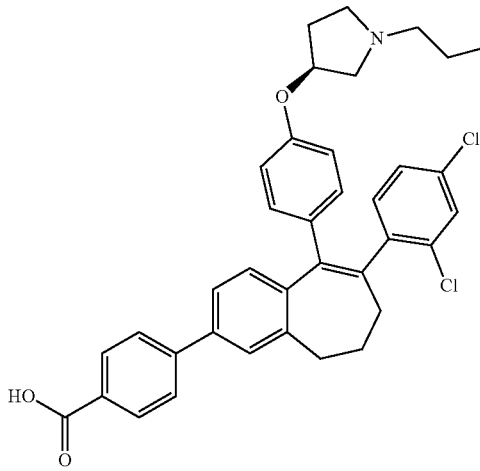

To a mixture of methyl (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate [Example 56] (180 mg, 279.24 µmol) in MeOH (20 ml) and THF (10 ml), was added a solution of NaOH 2M (1 ml, 1 mmol). The reaction mixture was stirred for 2 hours at 60° C. After cooling to room temperature, the reaction mixture was concentrated under reduced pressure. Water was added, followed by a solution of HCl 5N to reach pH 5. The mixture was extracted twice with EtOAc and the organic phase was washed with brine, dried over MgSO₄, filtered and evaporated under reduced pressure to give 120 mg (68%) of (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid.

Example 73. (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazol-5-amine

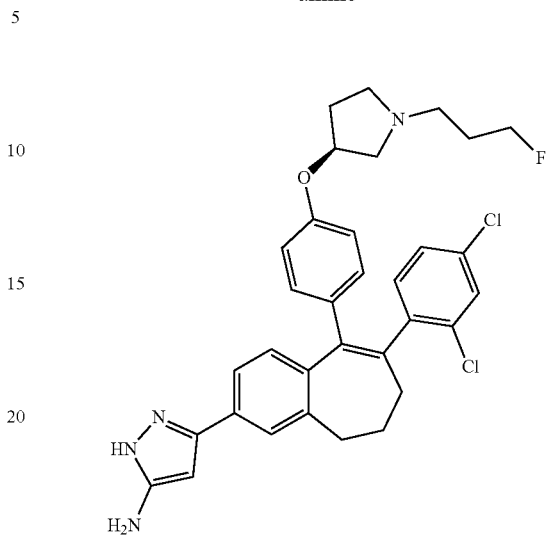

Step 1: (S)-3-(8-(2,4-dichlorophenyl)-9-(4-((1-(3-fluoropropyl)pyrrolidin-3-1)oxy)phenyl)-6,7-dihydro-5H-benzo[7]annulen-3-yl)-3-oxopropanenitrile

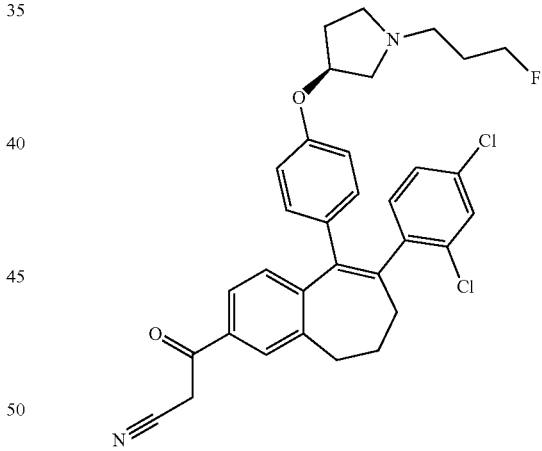

To a mixture of DMSO (3 ml) and MeCN (138.83 µl, 2.64 mmol), was added sodium hydride (70.35 mg, 1.76 mmol), and the reaction mixture was stirred at room temperature for 20 minutes, before adding methyl (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylate [WO2017140669] (500 mg, 879.49 µmol). The reaction mixture was stirred for 2 hours at room temperature, and water was slowly added, and the aqueous phase extracted with ethylacetate. The organic phase was washed with brine, dried over MgSO₄, filtered and evaporated under reduced pressure. The residue was purified by flash chromatography eluting with a mixture of DCM in MeOH (95/5; v/v) to give 430 m (75%) of (S)-3-(8-(2,4-dichlorophenyl)-9-(4-((1-(3- fluoropropyl)pyrrolidin-3-1)oxy)phenyl)-6,7-dihydro-5H-benzo[7]annulen-3-yl)-3-oxopropanenitrile. LC/MS (m/z, MH+): 577.

Step 2: (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazol-5-amine

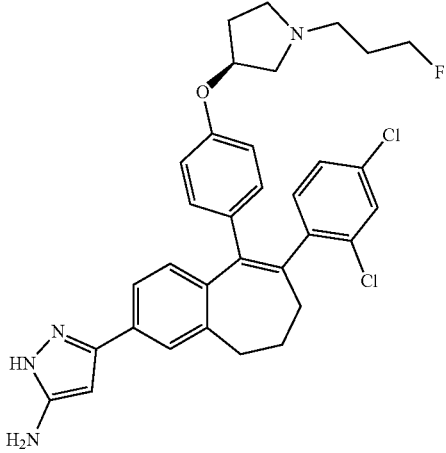 [SMILES: Nc1cc(-c2ccc3c(c2)CCCC(c2ccc(Cl)cc2Cl)=C3c2ccc(O[C@H]3CCN(CCCF)C3)cc2)n[nH]1]

To a solution of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-3-oxopropanenitrile (150 mg, 259.73 μmol) in EtOH (1.5 ml) was added hydrazine hydrate (59.70 mg, 1.17 mmol). The reaction mixture was stirred at 100° C. for 3 hours. The reaction mixture was concentrated under reduced pressure, and EtOAc was added. The organic layer was washed twice with water and once with brine. The organic layers were collected, dried over MgSO4 and concentrated under reduced pressure. The residue was purified by flash chromatography with a gradient of MeOH in DCM (100/0 to 90/10, v/v) to give 70 mg (46%) of (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1H-pyrazol-5-amine.

Example 74. (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)(3-hydroxyazetidin-1-yl)methanone

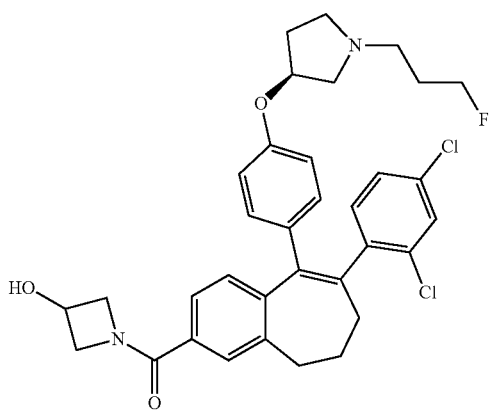 [SMILES: O=C(c1ccc2c(c1)CCCC(c1ccc(Cl)cc1Cl)=C2c1ccc(O[C@H]2CCN(CCCF)C2)cc1)N1CC(O)C1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (100 mg, 180.35 μmol) in DCM (10 ml) was added DIPEA (94.39 μl, 541.04 μmol), HBTU (75.24 mg, 198.38 μmol) and 3-hydroxyazetidine hydrochloride (20.37 mg, 180.35 μmol). The reaction mixture was stirred at room temperature overnight. The reaction mixture was concentrated under reduced pressure, and EtOAc was added. The organic layer was washed twice with a saturated aqueous solution of K2CO3 and once with brine. The organic phase was dried over MgSO4 and concentrated under reduced pressure. The residue was purified by flash chromatography eluting with a gradient of EtOAc in heptane (5% EtOAc to 100% EtOAc, v/v) to give 82 mg (75%) of (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)(3-hydroxyazetidin-1-yl)methanone.

Example 75. (S)-8-(2,4-dichlorophenyl)-9-(4-((1-(3-fluoropropyl)pyrrolidin-3-yl)oxy)phenyl)-N-(oxetan-3-yl)-6,7-dihydro-5H-benzo[7]annulene-3-carboxamide

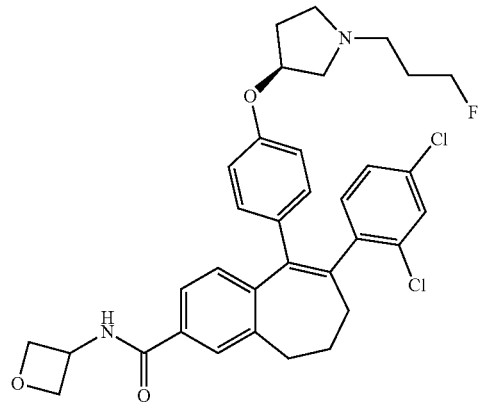 [SMILES: O=C(NC1COC1)c1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid [WO2017140669] (100 mg, 180.35 μmol) in DCM (10 ml) was added DIPEA (94.39 μl, 541.04 μmol), HBTU (75.24 mg, 198.38 μmol) and 3-oxetamine (13.59 mg, 180.35 μmol). The reaction mixture was stirred at room temperature overnight. The reaction mixture was concentrated under reduced pressure, and EtOAc was added. The organic layer was washed twice with a saturated aqueous solution of K2CO3 and once with brine. The organic phase was dried over MgSO4 and concentrated under reduced pressure. The residue was purified by flash chromatography eluting with a gradient of EtOAc in heptane (5% EtOAc to 100% EtOAc, v/v) to give 100 mg (91%) of (S)-8-(2,4-dichlorophenyl)-9-(4-((1-(3-fluoropropyl)pyrrolidin-3-yl)oxy)phenyl)-N-(oxetan-3-yl)-6,7-dihydro-5H-benzo[7]annulene-3-carboxamide.

Example 76. ethyl (S)-2-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-2-oxoacetate

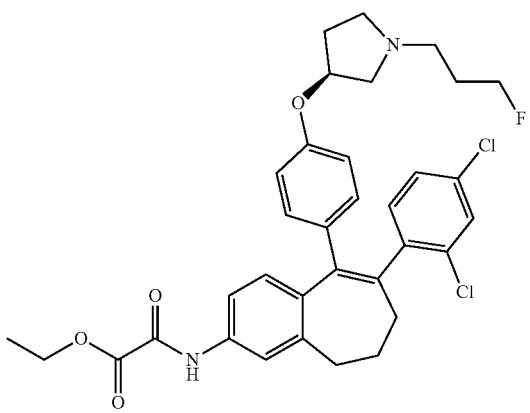 [SMILES: CCOC(=O)C(=O)Nc1ccc2c(c1)CCCC(c1ccc(Cl)cc1Cl)=C2c1ccc(O[C@H]2CCN(CCCF)C2)cc1]

To a solution of (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (100 mg, 190.30 µmol) in DCM (10 ml) was added at 0° C., TEA (66.98 µl, 475.5 µmol) and ethyloxalyl chloride (32.60 µl, 285.45 µmol). The reaction mixture was stirred at room temperature overnight, and concentrated under reduced pressure. EtOAc was added, and the organic phase was washed twice with a saturated aqueous solution of $K_2CO_3$ and once with brine.

The organic phase was dried over $MgSO_4$ and concentrated under reduced pressure. The residue was purified by flash chromatography eluting with a gradient of MeOH in DCM (100/0 to 90/10, v/v) to give 50 mg (42%) of ethyl (S)-2-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-2-oxoacetate.

Example 77. (S)—N1-(8-(2,4-dichlorophenyl)-9-(4-((1-(3-fluoropropyl)pyrrolidin-3-yl)oxy)phenyl)-6,7-dihydro-5H-benzo[7]annulen-3-yl)oxalamide To a solution of ethyl (S)-2-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-2-oxoacetate [example 76] (40 mg, 63.94 µmol) in MeOH (1 ml) was added ammonia 7M in MeOH (18.27 µl, 127.88 µmol).The reaction mixture was stirred 5 hours at room temperature. The reaction mixture was concentrated under reduced pressure, and EtOAc was added. The organic layer was washed twice with a saturated aqueous solution of $K_2CO_3$ and once with brine. The organic layers were collected, dried over $MgSO_4$ and concentrated under reduced pressure. The residue was purified by flash chromatography eluting with a gradient of MeOH in DCM (100/0 to 90/10, v/v) to give 30 mg (79%) of ethyl (S)—N1-(8-(2,4-dichlorophenyl)-9-(4-((1-(3-fluoropropyl)pyrrolidin-3-yl)oxy)phenyl)-6,7-dihydro-5H-benzo[7]annulen-3-yl)oxalamide.

Example 78. (S)-8-(2-chloro-4-methylphenyl)-9-(4-((1-(3-fluoropropyl)pyrrolidin-3-yl)oxy)phenyl)-6,7-dihydro-5H-benzo[7]annulen-3-amine Step 1: Methyl (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxylate To a solution of methyl (S)-8-bromo-9-(4-((1-(3-fluoropropyl)pyrrolidin-3-yl)oxy)phenyl)-6,7-dihydro-5H-benzo[7]annulene-3-carboxylate hydrobromide [WO2017140669] (6.3 g, 10.80 mmol), in 1,4-dioxane (50 ml), was added 2-chloro-4-methylphenylboronic acid (2.01 g, 11.45 mmol), $Cs_2CO_3$ (11.27 g, 34.56 mmol) in water (20 ml) and [1,1'-bis(diphenylphosphino)ferrocene]dichloropalladium(ii) (499 mg, 648.00 µmol). The reaction mixture was heated at 70° C. for 1 hour, poured onto water, and extracted with DCM. The organic extracts were washed with water, filtered on hyflo, and evaporated under reduced pressure. The residue was purified by flash chromatography eluting with a mixture of DCM and MeOH (97/3, v/v) to give 2.92 g (49.3%) of methyl (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxylate. LC/MS (m/z, MH$^+$): 548.

Step 2: (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxylic acid

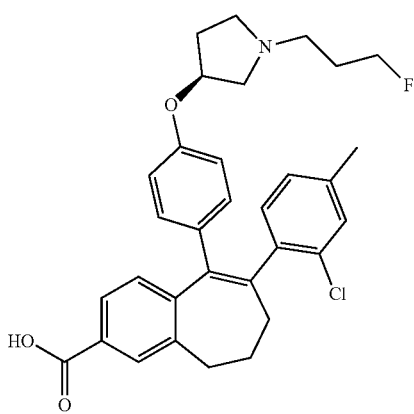 [SMILES: Cc1ccc(C2=C(c3ccc(O[C@H]4CCN(CCCF)C4)cc3)c3ccc(C(=O)O)cc3CCC2)c(Cl)c1]

To a solution of methyl (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxylate (1 g, 1.82 mmol), in MeOH (15 ml), was added NaOH solution (2M, 3 ml, 6 mmol). The reaction mixture was refluxed for 1 hour, and hydrochloric acid 1N was added to reach pH 6-7. The aqueous phase was extracted with DCM, and the organic extracts dried over MgSO$_4$, filtered and evaporated under reduced pressure to give 963 mg (99%) of crude (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxylic acid. LC/MS (m/z, MH$^+$): 534.

Step 3: (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxamide

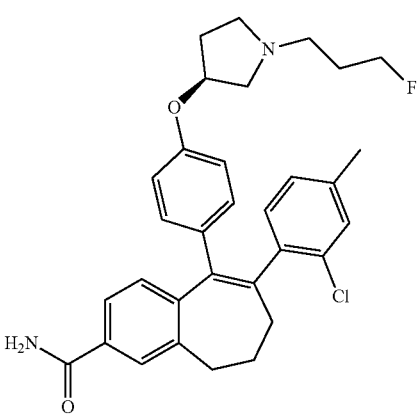 [SMILES: Cc1ccc(C2=C(c3ccc(O[C@H]4CCN(CCCF)C4)cc3)c3ccc(C(N)=O)cc3CCC2)c(Cl)c1]

The synthesis was performed as in Example 3, replacing (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxylic acid with (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxylic acid (963 mg, 1.8 mmol) to give 571 mg (59%) of (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxamide. LC/MS (m/z, MH$^+$): 533.

Step 4: methyl (S)-(8-(2-chloro-4-methylphenyl)-9-(4-((1-(3-fluoropropyl)pyrrolidin-3-yl)oxy)phenyl)-6,7-dihydro-5H-benzo[7]annulen-3-yl)carbamate

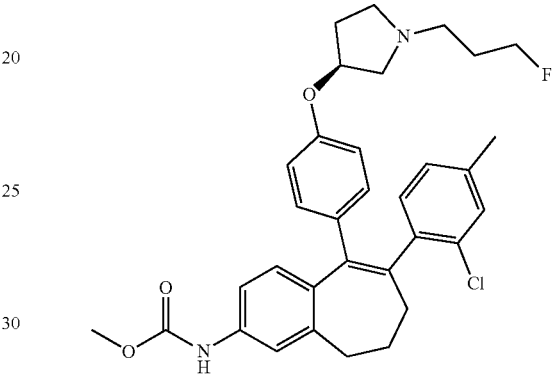

The synthesis was performed as in Example 25, replacing (S)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide with (S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxamide (571 mg, 1.07 mmol) to give 407 mg (67.5%) of methyl (S)-(8-(2-chloro-4-methylphenyl)-9-(4-((1-(3-fluoropropyl)pyrrolidin-3-yl)oxy)phenyl)-6,7-dihydro-5H-benzo[7]annulen-3-yl)carbamate. LC/MS (m/z, MH$^+$): 563.

Step 5: (S)-8-(2-chloro-4-methylphenyl)-9-(4-((1-(3-fluoropropyl)pyrrolidin-3-yl)oxy)phenyl)-6,7-dihydro-5H-benzo[7]annulen-3-amine

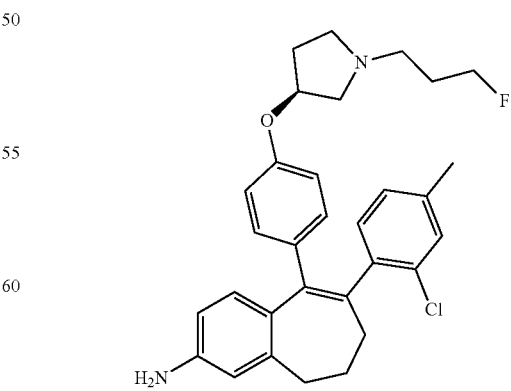

The synthesis was performed as in Example 28, replacing (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate with (S)-(8-(2-chloro-4-methylphenyl)-9-(4-((1-(3-fluoropropyl)pyrrolidin-3-yl)oxy)phenyl)-6,7-dihydro-5H-benzo[7]annulen-3-yl)carbamate (407 mg, 723 µmol) to give 247 mg (67.7%) of (S)-8-(2-chloro-4-methylphenyl)-9-(4-((1-(3-fluoropropyl)pyrrolidin-3-yl)oxy)phenyl)-6,7-dihydro-5H-benzo[7]annulen-3-amine.

Example 79. (S)-8-(6-ethoxy-2-fluoropyridin-3-yl)-9-(4-((1-(3-fluoropropyl)pyrrolidin-3-yl)oxy)phenyl)-6,7-dihydro-5H-benzo[7]annulene-3-carboxamide

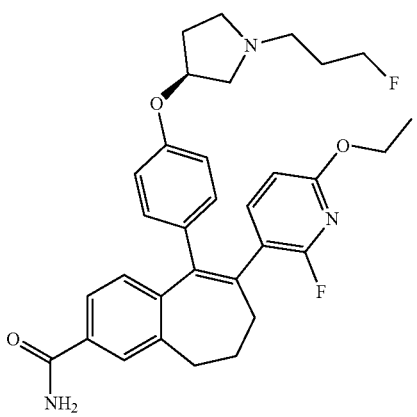 [SMILES: CCOc1ccc(C2=C(c3ccc(O[C@H]4CCN(CCCF)C4)cc3)c3ccc(C(N)=O)cc3CCC2)c(F)n1]

Obtained from methyl (S)-8-bromo-9-(4-((1-(3-fluoropropyl)pyrrolidin-3-yl)oxy)phenyl)-6,7-dihydro-5H-benzo[7]annulene-3-carboxylate hydrobromide [WO2017140669] in 85% yield by an analogous method to Example 78, Steps 1, 2, 3.

Example 80. (S)-8-(6-ethoxy-2-fluoropyridin-3-yl)-9-(4-((1-(3-fluoropropyl)pyrrolidin-3-yl)oxy)phenyl)-6,7-dihydro-5H-benzo[7]annulene-3-carbonitrile 2,2,2-trifluoroacetate

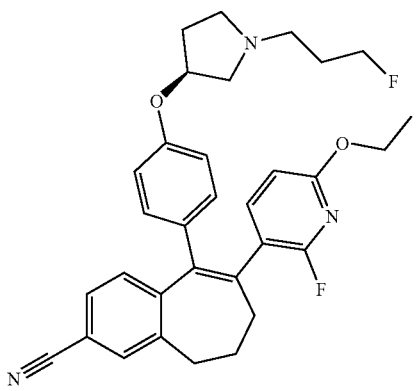 [SMILES: CCOc1ccc(C2=C(c3ccc(O[C@H]4CCN(CCCF)C4)cc3)c3ccc(C#N)cc3CCC2)c(F)n1]

Obtained from (S)-8-(6-ethoxy-2-fluoropyridin-3-yl)-9-(4-((1-(3-fluoropropyl)pyrrolidin-3-yl)oxy)phenyl)-6,7-dihydro-5H-benzo[7]annulene-3-carboxamide [Example 79] in 70% yield by an analogous method to Example 22.

Example 81. (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzamide

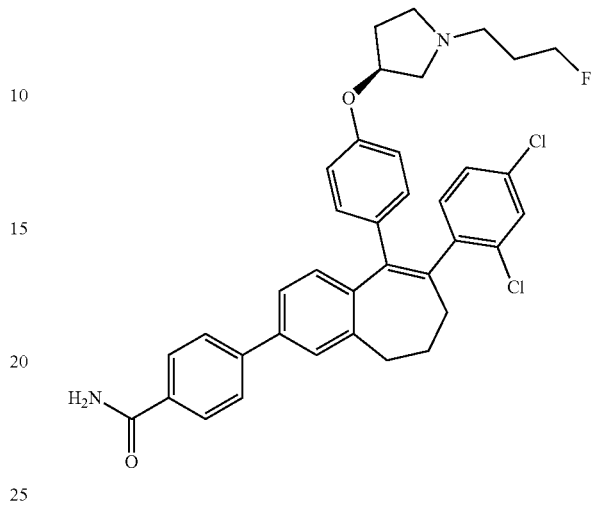

A mixture of (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid [Example 72] (200 mg, 279.11 µmol), pyridine (57.40 mg, 725.68 µmol), di-tert-butyl dicarbonate (91.37 mg, 418.66 µmol) and NH$_4$HCO$_3$ (33.10 mg, 418.66 µmol) in 1,4-dioxane (40 ml) was stirred at room temperature for 48 hours. The reaction mixture was concentrated under reduced pressure and then, EtOAc was added. The organic layer was washed twice with water and once with brine. The organic layers were collected, dried over MgSO$_4$ and concentrated under reduced pressure. The residue was purified by flash chromatography eluting with a gradient of MeOH in DCM (100/0 to 90/10, v/v) to give 70 mg (40%) of (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzamide.

Example 82. (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)methanol

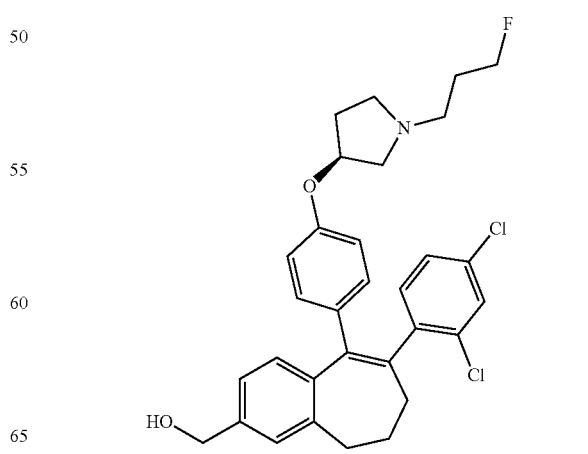

To a solution of (S)-8-(2,4-dichlorophenyl)-9-(4-((1-(3-fluoropropyl)-pyrrolidin-3-yl)oxy)phenyl)-6,7-dihydro-5H-benzo[7]annulene-3-carboxylic acid [WO2017140669] (200 mg, 361 µmol) in THF (4 ml) was added at 0° C. borane dimethyl sulfide complex 2M in THF (1.08 ml, 2.16 mmol). The reaction mixture was stirred 16 h at room temperature and cooled again to 0° C. A saturated aqueous solution of $KH_2PO_4$ (4 ml) was added thoroughly and stirred for 20 min at room temperature. After addition of EtOAc the organic phase was washed with water and brine, dried over $Na_2SO_4$, filtered and evaporated under reduced pressure. The residue was purified by flash chromatography eluting with a mixture of DCM and MeOH (90/10, v/v) to give 115 mg (21%) of a white solid. This compound was refluxed for 6 h in THF (decomposition of boron-complex) and evaporated under reduced pressure. The residue was purified by flash chromatography eluting with a mixture of DCM and MeOH (95/5, v/v) to give 68 mg (33%) of (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)methanol as a white solid.

Example 83. methyl (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate

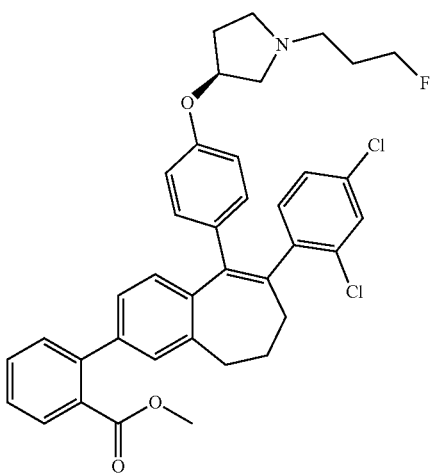 [SMILES: COC(=O)c1ccccc1-c1ccc2c(c1)CCCC(c1ccc(Cl)cc1Cl)=C2c1ccc(O[C@H]2CCN(CCCF)C2)cc1]

A mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, Step 1] (350 mg, 478.34 µmol), Pd(dppf)$_2$Cl$_2$ (21 mg, 28.70 µmol), Cs$_2$CO$_3$ (389.63 mg, 1.20 mmol), and 2-methoxycarbonylphenyl boronic acid (124.25 mg, 669.67 µmol) in 1,4-dioxane (13 ml), and water (3 ml), was microwaved at 90° C. for 30 minutes. After cooling to room temperature, the reaction mixture was concentrated under reduced pressure. Water was added and the mixture was extracted twice with EtOAc. The organic phase was washed with brine, dried over MgSO$_4$, filtered and evaporated under reduced pressure. The residue was purified by flash chromatography eluting with a gradient of EtOAc in heptane (95/5 to 0/100, v/v) to give 70 mg (23%) of methyl (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate.

Example 84. (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-hydroxycyclopropane-1-carboxamide formate

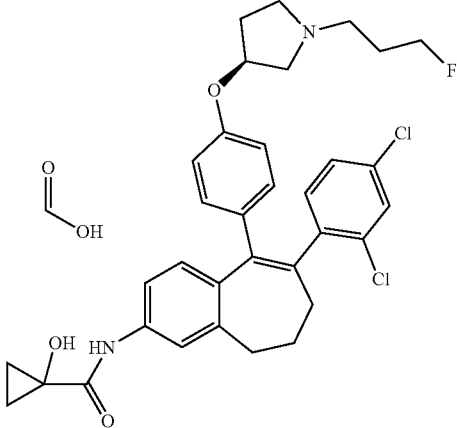 [SMILES: O=C(Nc1ccc2c(c1)CCCC(c1ccc(Cl)cc1Cl)=C2c1ccc(O[C@H]2CCN(CCCF)C2)cc1)C1(O)CC1 ; O=CO]

To a solution of 1-hydroxycyclopropane-1-carboxylic acid (58.28 mg, 570.90 µmol) in dimethylformamide (5 ml) was added HATU (160.80 mg, 418.66 µmol) and TEA (161.28 µl, 1.14 mmol). The reaction mixture was stirred at room temperature for 10 minutes and, (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (200 mg, 380.60 µmol) was added. The reaction mixture was stirred overnight at 40° C. The reaction mixture was concentrated under reduced pressure, and EtOAc was added. The organic layer was washed twice with a saturated aqueous solution of K$_2$CO$_3$ and once with brine. The organic layers were collected, dried over MgSO$_4$ and concentrated under reduced pressure. The residue was purified by flash chromatography eluting with a gradient of EtOAc in heptane (5% EtOAc to 100% EtOAc, v/v) to give 13 mg (5%) of (S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-hydroxycyclopropane-1-carboxamide formate.

Example 85. (S)-1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-4-hydroxypyrrolidin-2-one

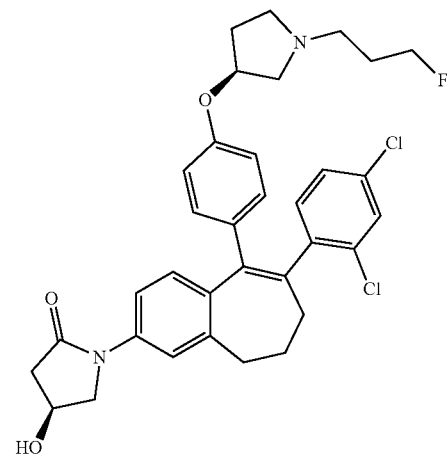 [SMILES: O=C1C[C@H](O)CN1c1ccc2c(c1)CCCC(c1ccc(Cl)cc1Cl)=C2c1ccc(O[C@H]2CCN(CCCF)C2)cc1]

A solution of (S)-3-(4-(3-bromo-8-(2,4-dichlorophenyl)-6,7-dihydro-5H-benzo[7]annulen-9-yl)phenoxy)-1-(3-fluoropropyl)pyrrolidine [Example 11], (135 mg, 229 µmol), (S)-4-hydroxy-2-pyrrolidi-none (28.36 mg, 275 µmol), (1R,2R)—N,N'-dimethyl-1,2-cyclohexanedi-amine, (3.4 mg, 22.9 µmol), cuprous iodide (2.2 mg, 11.45 µmol), and K₂CO₃ (63 mg, 458 µmol) in 3 ml toluene was placed in a sealed 5 ml micro-wave vessel. After 1 minute of ultrasonication the mixture was heated in an oil bath at 110° C. for 16 h. After addition of water the mixture was extracted with EtOAc, the organic phase was washed with water and brine, dried over Na₂SO₄, filtered and evaporated under reduced pressure. The residue was purified by flash chromatography eluting with a mixture of DCM and MeOH (90/10, v/v) to give 30 mg (21%) of a beige solid of (S)-1-(8-(2,4-dichlorophenyl)-9-(4-(((S)-1-(3-fluoropropyl)pyrrolidin-3-yl)oxy)phenyl)-6,7-dihydro-5H-benzo-[7]annulen-3-yl)-4-hydroxypyrrolidin-2-one.

Example 86. (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid

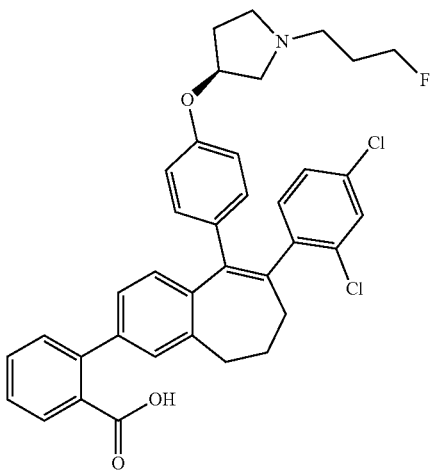 [SMILES: O=C(O)c1ccccc1-c1ccc2c(c1)CCCC(c1ccc(Cl)cc1Cl)=C2c1ccc(O[C@H]2CCN(CCCF)C2)cc1]

To a mixture of methyl (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate [Example 83] (240 mg, 372.32 µmol) in MeOH (15 ml) and THF (15 ml), was added a solution of NaOH 2M (2 ml, 4 mmol). The reaction mixture was stirred at 60° C. for 2 hours. After cooling to room temperature, the reaction mixture was concentrated under reduced pressure. Water was added, followed by a solution of HCl 5N to reach pH 5. The mixture was extracted twice with EtOAc and the organic layers were collected and washed with brine. The organic phase was dried over MgSO₄, filtered and evaporated under reduced pressure to give 170 mg (72%) of (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoic acid

Example 87. N-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2-difluorocyclopropane-1-carboxamide

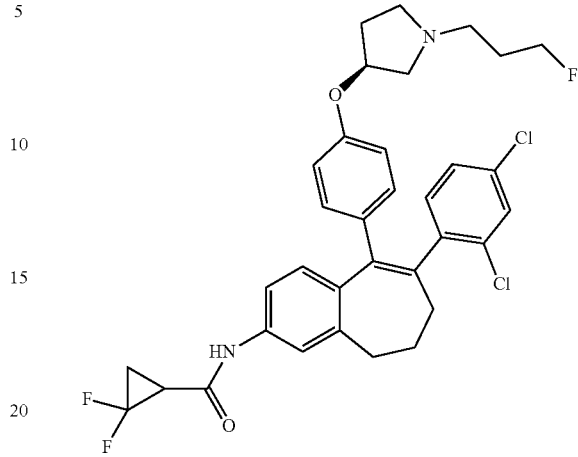

To a solution of 2,2-difluorocyclopropane-1-carboxylic acid (48.91 mg, 380.60 µmol) in DMF (5 ml) was added HATU (80.40 mg, 209.33 µmol) and TEA (80.64 µl, 570.90 µmol). The reaction mixture was stirred at room temperature 10 minutes and, (S)-8-(2,4-dichlorophenyl)-9-(4-((1-(3-fluoropropyl)pyrrolidin-3-yl)oxy)phenyl)-6,7-dihydro-5H-benzo[7]annulen-3-amine [Example 28] (100 mg, 190.30 µmol) was added. The reaction mixture was stirred overnight at room temperature. The reaction mixture was concentrated under reduced pressure, and EtOAc was added. The organic layer was washed twice with a saturated aqueous solution of K₂CO₃ and once with brine. The organic layers were collected, dried over MgSO₄ and concentrated under reduced pressure. The crude product obtained was purified twice by flash chromatography eluting first with a gradient of EtOAc in heptane (95/5 to 0/100, v/v) and with a gradient of MeOH in DCM (100/0 to 90/10, v/v) to give 40 mg (33%) of N-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2-difluorocyclopropane-1-carboxamide.

Example 88. (S)-3-((8-(2-chloro-4-methylphenyl)-9-(4-((1-(3-fluoropropyl)pyrrolidin-3-yl)oxy)phenyl)-6,7-dihydro-5H-benzo[7]annulen-3-yl)amino)-4-hydroxycyclobut-3-ene-1,2-dione

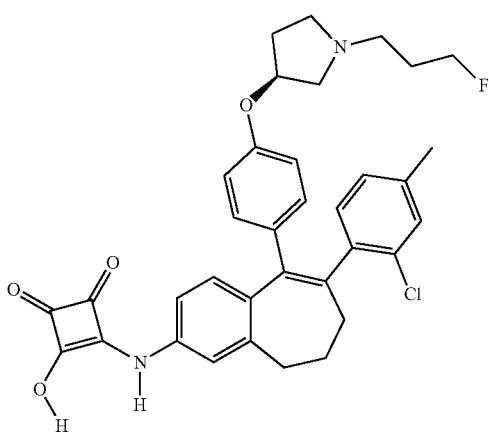 [SMILES: Cc1ccc(C2=C(c3ccc(O[C@H]4CCN(CCCF)C4)cc3)c3ccc(Nc4c(O)c(=O)c4=O)cc3CCC2)c(Cl)c1]

The compounds was prepared as in Example 36, replacing (S)-8-(2,4-dichlorophenyl)-9-(4-((1-(3-fluoropropyl)pyrrolidin-3-yl)oxy)phenyl)-6,7-dihydro-5H-benzo[7]annulen-3-amine with (S)-8-(2-chloro-4-methylphenyl)-9-(4-((1-(3-fluoropropyl)pyrrolidin-3-yl)oxy)phenyl)-6,7-dihydro-5H-benzo[7]annulen-3-amine [Example 78] (233 mg, 461.32 µmol) to give 100 mg of (S)-3-((8-(2-chloro-4-methylphenyl)-9-(4-((1-(3-fluoropropyl)pyrrolidin-3-yl)oxy)phenyl)-6,7-dihydro-5H-benzo[7]annulen-3-yl)amino) hydroxycyclobut-3-ene-1,2-dione.

Example 89. (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-amine

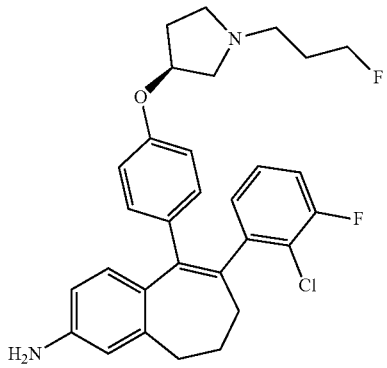 [SMILES: Nc1ccc2c(c1)CCCC(c1cccc(F)c1Cl)=C2c1ccc(O[C@H]2CCN(CCCF)C2)cc1]

The compound was prepared as in Example 78, Steps 3, 4, 5, but starting from (S)-8-(2-chloro-3-fluorophenyl)-9-(4-((1-(3-fluoropropyl)pyrrolidin-3-yl)oxy)phenyl)-6,7-dihydro-5H-benzo[7]annulene-3-carboxylic acid [WO2017140669] (1 g, 1.81 mmol), to give 68 mg (34%) of (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-amine.

Example 90. (S)—N-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)methanesulfonamide

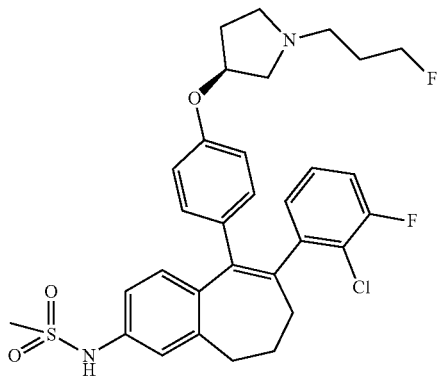 [SMILES: CS(=O)(=O)Nc1ccc2c(c1)CCCC(c1cccc(F)c1Cl)=C2c1ccc(O[C@H]2CCN(CCCF)C2)cc1]

To a solution of (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-amine (58 mg, 114 µmol) [Example 89] in DCM (10 ml), was added methanesulfonyl chloride (10 µl, 126 µmol), and TEA (18 µl, 126 µmol). The reaction mixture was left at room temperature overnight and washed with water, brine, dried over MgSO₄, filtered and evaporated under reduced pressure. The residue was purified by preparative SFC to give 22 mg (63%) of (S)—N-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)methanesulfonamide.

Example 91. (S)-1-(3-fluoropropyl)-3-(4-(8-phenyl-3-(4,4,5,5-tetramethyl-1,3,2-dioxaborolan-2-yl)-6,7-dihydro-5H-benzo[7]annulen-9-yl)phenoxy)pyrrolidine

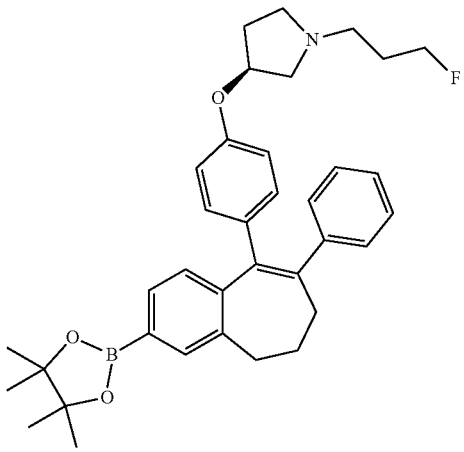 [SMILES: CC1(C)OB(c2ccc3c(c2)CCCC(c2ccccc2)=C3c2ccc(O[C@H]3CCN(CCCF)C3)cc2)OC1(C)C]

The compound was prepared as in Example 1, Steps 1 and 2 but replacing (S)-8-(2,4-dichlorophenyl)-9-(4-((1-(3-fluoropropyl)pyrrolidin-3-yl)oxy)phenyl)-6,7-dihydro-5H-benzo[7]annulen-3-ol with (S)-9-(4-((1-(3-fluoropropyl)pyrrolidin-3-yl)oxy)phenyl)-8-phenyl-6,7-dihydro-5H-benzo[7]annulen-3-ol [WO2017140669] (2 g, 4.37 mmol) to give 45 mg (31.3%) of (S)-1-(3-fluoropropyl)-3-(4-(8-phenyl-3-(4,4,5,5-tetramethyl-1,3,2-dioxaborolan-2-yl)-6,7-dihydro-5H-benzo[7]annulen-9-yl)phenoxy)pyrrolidine.

Example 92. (S)-(9-(4-((1-(3-fluoropropyl)pyrrolidin-3-yl)oxy)phenyl)-8-phenyl-6,7-dihydro-5H-benzo[7]annulen-3-yl)boronic acid

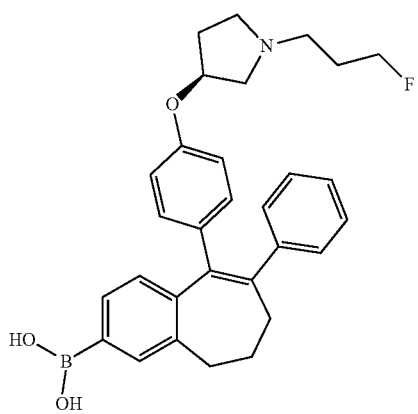 [SMILES: OB(O)c1ccc2c(c1)CCCC(c1ccccc1)=C2c1ccc(O[C@H]2CCN(CCCF)C2)cc1]

Obtained in Example 91 as a by product to give 19 mg (16%) of (S)-(9-(4-((1-(3-fluoropropyl)pyrrolidin-3-yl)oxy)phenyl)-8-phenyl-6,7-dihydro-5H-benzo[7]annulen-3-yl)boronic acid.

Example 93. (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetic acid

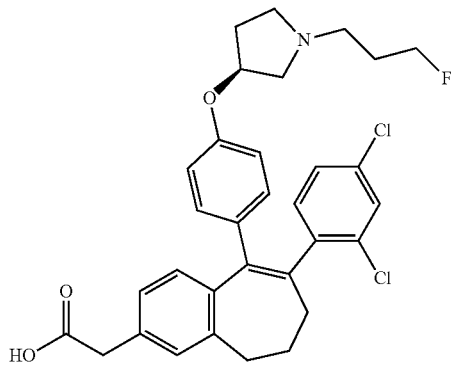 [SMILES: O=C(O)Cc1ccc2c(c1)CCCC(c1ccc(Cl)cc1Cl)=C2c1ccc(O[C@H]2CCN(CCCF)C2)cc1]

Step 1: Methyl 2-(5-oxo-6,7,8,9-tetrahydro-5H-benzo[7]annulen-2-yl)acetate

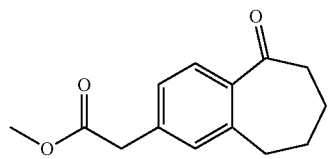 [SMILES: COC(=O)Cc1ccc2c(c1)CCCCC2=O]

To a solution of 2-bromo-6,7,8,9-tetrahydro-5H-benzo[7]-annulen-5-one (1.2 g, 5.02 mmol) in DMF (10 ml), was added 1-(tert-butyldimethylsilyloxy)-1-methoxyethene (2.1 g, 10.59 mmol), zinc chloride (342 mg, 2.51 mmol), bis(dibenzylideneacetone)palladium (149 mg, 251 μmol) and tri-tert-butylphosphine (63 mg, 301 μmol). The reaction mixture was heated at 130° C. for 3 hours. After cooling to room temperature, the reaction mixture was evaporated under reduced pressure and the residue was purified by flash chromatography eluting with isopropylether to give 411 mg (35%) of methyl 2-(5-oxo-6,7,8,9-tetrahydro-5H-benzo[7]annulen-2-yl)acetate. (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-yl trifluoromethanesulfonate

Step 2: Methyl 2-(9-(((trifluoromethyl)sulfonyl)oxy)-6,7-dihydro-5H-benzo[7]annulen-3-yl)acetate

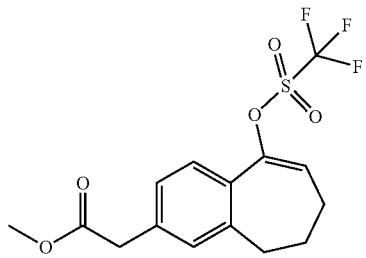 [SMILES: COC(=O)Cc1ccc2c(c1)CCCC=C2OS(=O)(=O)C(F)(F)F]

To a solution of 2-(5-oxo-6,7,8,9-tetrahydro-5H-benzo[7]annulen-2-yl)acetate (650 mg, 2.8 mmol), DCM (20 ml) and pyridine (338 μl, 4.2 mmol) was added dropwise trifluoromethanesulfonic anhydride (0.94 ml, 5.6 mmol). The reaction mixture was stirred at room temperature for 18 hours. Cold water (5 ml) and saturated NaHCO$_3$ (10 ml) was added. After decantation, the organic phase was dried over MgSO$_4$, filtered and evaporated under reduced pressure to give 1 g (98%) of methyl 2-(9-(((trifluoromethyl)sulfonyl)oxy)-6,7-dihydro-5H-benzo[7]annulen-3-yl)acetate. LC/MS (m/z, MH$^+$): 365.

Step 3: Methyl (S)-2-(9-(4-((1-(3-fluoropropyl)pyrrolidin-3-yl)oxy)phenyl)-6,7-dihydro-5H-benzo[7]annulen-3-yl)acetate

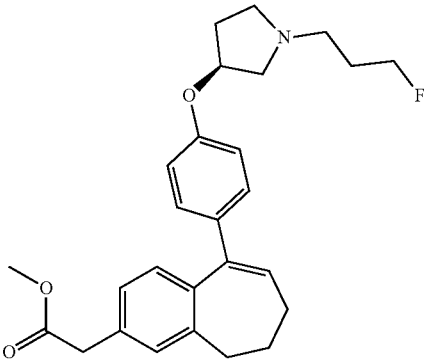 [SMILES: COC(=O)Cc1ccc2c(c1)CCCC=C2c1ccc(O[C@H]2CCN(CCCF)C2)cc1]

To a solution of methyl 2-(9-(((trifluoromethyl)sulfonyl)oxy)-6,7-dihydro-5H-benzo[7]annulen-3-yl)acetate (1.05 g, 2.88 mmol) in 1,4-dioxane (25 ml), was added (S)-1-(3-fluoropropyl)-3-(4-(4,4,5,5-tetramethyl-1,3,2-dioxaborolan-2-yl)phenoxy)pyrrolidine (1.11 g, 3.17 mmol) [WO2017140669], Cs$_2$CO$_3$ (1.88 g, 5.76 mmol), Pd(dppf)Cl$_2$ (222 mg, 288 μmol) and water (5 ml). The reaction mixture was heated at 60° C. for 45 minutes, and partitioned between water (40 ml) and DCM (40 ml). The organic phase was dried over MgSO$_4$, filtered and concentrated under reduced pressure. The residue was purified by column chromatography eluting with DCM/MeOH/NH4OH 28% (37/18/2; V/V/V) to give 1.2 g (95%) of methyl methyl (S)-2-(9-(4-((1-(3-fluoropropyl)pyrrolidin-3-yl)oxy)phenyl)-6,7-dihydro-5H-enzo [7]annulen-3-yl)acetate. LC/MS (m/z, MH$^+$): 438.

Step 4: Methyl (S)-2-(8-bromo-9-(4-((1-(3-fluoropropyl)pyrrolidin-3-yl)oxy)phenyl)-6,7-dihydro-5H-benzo[7]annulen-3-yl)acetate hydrobromide

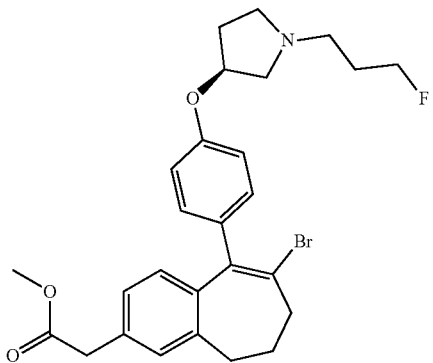 [SMILES: COC(=O)Cc1ccc2c(c1)CCCC(Br)=C2c1ccc(O[C@H]2CCN(CCCF)C2)cc1]

To a solution of methyl (S)-2-(9-(4-((1-(3-fluoropropyl)pyrrolidin-3-yl)oxy)phenyl)-6,7-dihydro-5H-enzo[7]annulen-3-yl)acetate (900 mg, 2.06 mmol) in DCM (30 ml), was added pyridinium tribromide (888 mg, 2.78 mmol). The reaction mixture was stirred at room temperature for 30 minutes. Water (30 ml) was added and pH was adjusted to 7 with concentrated solution of NaHCO$_3$. After decantation, the organic phase was dried over MgSO$_4$, filtered and concentrated under reduced pressure. The residue was purified by column chromatography eluting with a gradient of MeOH in DCM (1 to 3%, V/V) to give 1 g (81%) of methyl (S)-2-(8-bromo-9-(4-((1-(3-fluoropropyl)pyrrolidin-3-yl)oxy)phenyl)-6,7-dihydro-5H-benzo[7]annulen-3-yl)acetate hydrobromide. LC/MS (m/z, MH$^+$): 596.

Step 5: Methyl (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetate

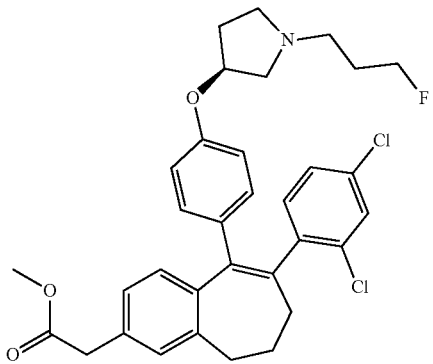 [SMILES: COC(=O)Cc1ccc2c(c1)CCCC(c1ccc(Cl)cc1Cl)=C2c1ccc(O[C@H]2CCN(CCCF)C2)cc1]

To a solution of methyl (S)-2-(8-bromo-9-(4-((1-(3-fluoropropyl)pyrrolidin-3-yl)oxy)phenyl)-6,7-dihydro-5H-benzo[7]annulen-3-yl)acetate hydrobromide (300 mg, 502 µmol) in 1,4-dioxane (5 ml), was added (2,4-dichlorophenyl)boronic acid (115 mg, 603 µmol), Pd(dppf)Cl$_2$ (23 mg, 30 µmol) and a solution of 1.5M of Cs$_2$CO$_3$ (670 µl, 1 mmol). The reaction mixture was heated at 70° C. for 45 minutes. After cooling to room temperature, the reaction mixture was concentrated under reduced pressure, and the residue was purified by column chromatography eluting with isopropyl ether/MeOH (95/05; V/V/V) to give 110 mg (38%) of methyl (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetate. LC/MS (m/z, MH$^+$): 582.

Step 6: (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetic acid

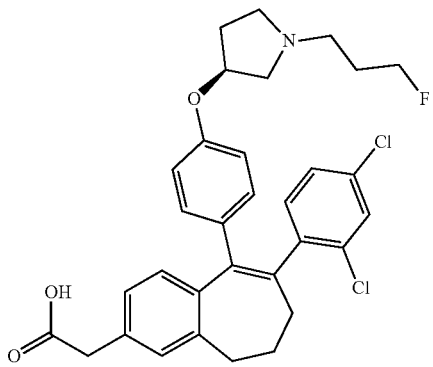 [SMILES: O=C(O)Cc1ccc2c(c1)CCCC(c1ccc(Cl)cc1Cl)=C2c1ccc(O[C@H]2CCN(CCCF)C2)cc1]

To a solution of methyl (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetate (110 mg, 188 µmol) in MeOH (5 ml), was added NaOH 5N (151 µl, 755 µmol). The reaction mixture was heated at reflux for 2 hours. After cooling to room temperature, the solvent was removed under reduced pressure. The residue was taken up in water (10 ml) and aqueous HCl (5 M) added to reach pH 5. The slurry was extracted with DCM, dried over MgSO$_4$ and concentrated under reduced pressure. The residue obtained was purified on strong cation exchange (SCX) column to give 65 mg (60%) of (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetic acid. LC/MS (m/z, MH$^+$): 568.

Example 94. (S)-2-(3-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol

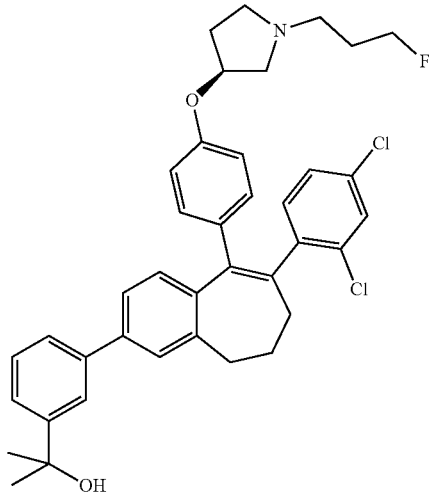 [SMILES: CC(C)(O)c1cccc(-c2ccc3c(c2)CCCC(c2ccc(Cl)cc2Cl)=C3c2ccc(O[C@H]3CCN(CCCF)C3)cc2)c1]

A mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, Step 1] (250 mg, 379.63 µmol), 1,4-dioxane (13 ml), Pd(dppf)$_2$Cl$_2$ (16.67 mg, 22.78 µmol), water (3 ml), Cesium carbonate (272.12 mg, 835.19 µmol) and (3-(2-hydroxypropan-2-yl)phenyl)boronic acid (100.71 mg, 531.49 µmol) was mirowaved at 90° C. for 30 minutes. After cooling to room temperature, the reaction mixture was concentrated under reduced pressure. Water was added and the mixture was extracted twice with ethyl acetate. The organic layers were collected, washed with saturated aqueous solution of NaCl, dried over magnesium sulfate, filtered and evaporated under reduced pressure. The crude product obtained was purified by flash chromatography eluting with a gradient of ethyl acetate in heptane (95/5 to 0/100, v/v) to give 220 mg (90%) of (S)-2-(3-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol Example 95. (S)-2-(4-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol

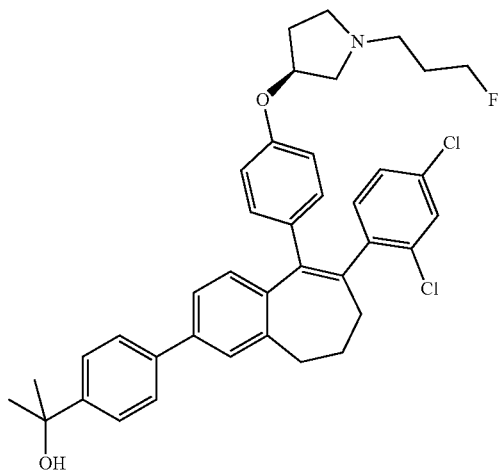 [SMILES: CC(C)(O)c1ccc(-c2ccc3c(c2)CCCC(c2ccc(Cl)cc2Cl)=C3c2ccc(O[C@H]3CCN(CCCF)C3)cc2)cc1]

A mixture of (S)-8-(2,4-dichlorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 1, Step 1] (300 mg, 455.56 µmol), 1,4-dioxane (13 ml), Pd(dppf)$_2$Cl$_2$ (20 mg, 27.33 µmol), water (3 ml), Cesium carbonate (326.55 mg, 1 mmol) and (4-(2-hydroxypropan-2-yl)phenyl)boronic acid (118.36 mg, 637.78 µmol) was mirowaved at 90° C. for 30 minutes. After cooling to room temperature, the reaction mixture was concentrated under reduced pressure. Water was added and the mixture was extracted twice with ethyl acetate. The organic layers were collected, washed with saturated aqueous solution of NaCl, dried over magnesium sulfate, filtered and evaporated under reduced pressure. The crude product obtained was purified by flash chromatography eluting with a gradient of ethyl acetate in heptane (95/5 to 0/100, v/v) to give 60 mg (60%) of (S)-2-(4-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol Example 96. (S)-3-(4-(8-(2-chloro-3-fluorophenyl)-3-(3-nitrophenyl)-6,7-dihydro-5H-benzo[7]annulen-9-yl)phenoxy)-1-(3-fluoropropyl)pyrrolidine

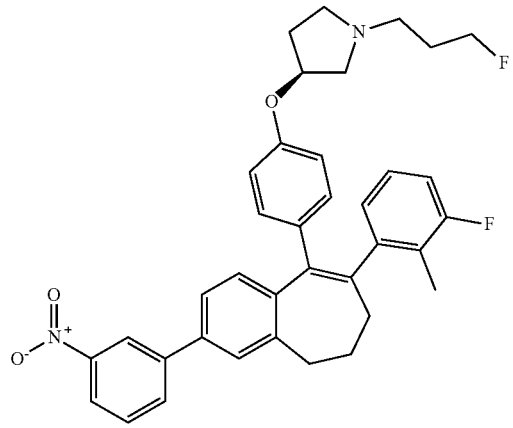 [SMILES: Cc1c(F)cccc1C1=C(c2ccc(O[C@H]3CCN(CCCF)C3)cc2)c2ccc(-c3cccc([N+](=O)[O-])c3)cc2CCC1]

To a solution of (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-yl trifluoromethanesulfonate [Example 98, Step 1] (260 mg, 404.94 µmol), in 1,4-dioxane (13 ml), was added 3-nitrophenylboronic acid (68.97 mg, 404.94 µmol), Pd(dppf)$_2$Cl$_2$ (17.78 mg, 24.30 µmol), and Cs$_2$CO$_3$ (290.26 mg, 890.86 µmol) in solution in water (3 ml). The reaction mixture was microwaved at 90° C. for 30 minutes. The reaction mixture was diluted with EtOAc, washed with a saturated K$_2$CO$_3$ solution, brine, dried over MgSO$_4$, filtered and evaporated under reduced pressure. The residue was purified by flash chromatography eluting with a mixture of heptane/EtOAc and EtOAc/MeOH (95/5; and 95/5; v/v) to give 175 mg (70.3%) of (S)-3-(4-(8-(2-chloro-3-fluorophenyl)-3-(3-nitrophenyl)-6,7-dihydro-5H-benzo[7]annulen-9-yl)phenoxy)-1-(3-fluoropropyl)pyrrolidine.

Example 97. (S)-3-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)aniline

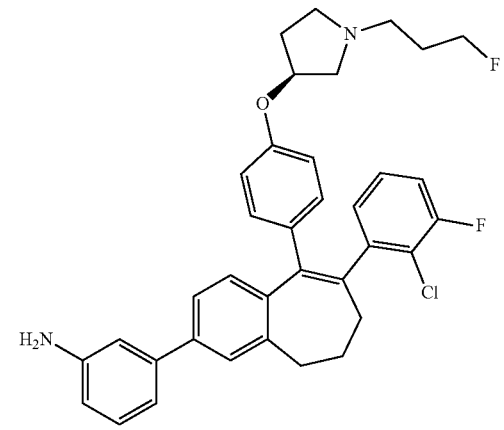 [SMILES: Nc1cccc(-c2ccc3c(c2)CCCC(c2cccc(F)c2Cl)=C3c2ccc(O[C@H]3CCN(CCCF)C3)cc2)c1]

To a solution of (S)-3-(4-(8-(2-chloro-3-fluorophenyl)-3-(3-nitrophenyl)-6,7-dihydro-5H-benzo[7]annulen-9-yl)phenoxy)-1-(3-fluoropropyl)pyrrolidine [Example 96] (150 mg, 243.86 µmol), in iPrOH (35 ml), was added zinc powder (95.66 mg, 1.46 mmol), and NH₄Cl (104.35 mg, 1.95 mmol) in solution in water (5 ml). The reaction mixture was refluxed for 2 hours, filtered, rinsed with iPrOH and the filtrate was evaporated under reduced pressure. The residue was taken up in EtOAc, washed with a saturated K₂CO₃ solution, brine, dried over MgSO₄, filtered and evaporated under reduced pressure. The residue was purified by flash chromatography eluting with a mixture of heptane/EtOAc and EtOAc/MeOH (95/5; and 95/5; v/v) to give 95 mg (67%) of (S)-3-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)aniline.

Example 98. (S)-2-(4-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)phenyl)propan-2-ol

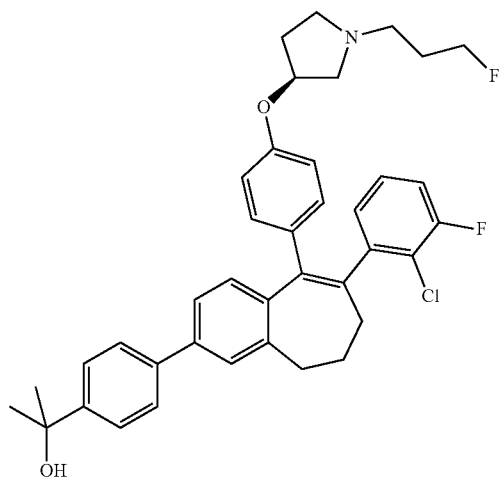 [SMILES: CC(C)(O)c1ccc(-c2ccc3c(c2)CCCC(c2cccc(F)c2Cl)=C3c2ccc(O[C@H]3CCN(CCCF)C3)cc2)cc1]

Step 1: (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-yl trifluoromethanesulfonate

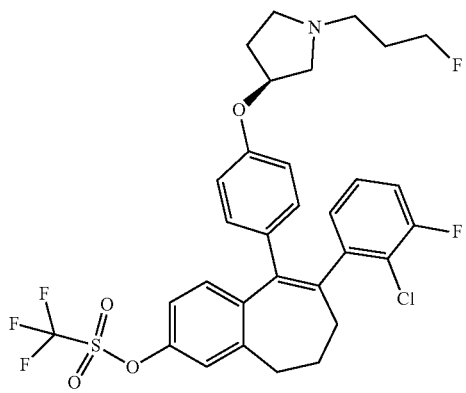 [SMILES: O=S(=O)(Oc1ccc2c(c1)CCCC(c1cccc(F)c1Cl)=C2c1ccc(O[C@H]2CCN(CCCF)C2)cc1)C(F)(F)F]

This compound was prepared as in Example 1, Step 1, but replacing (S)-8-(2,4-dichlorophenyl)-9-(4-((1-(3-fluoropropyl)pyrrolidin-3-yl)oxy)phenyl)-6,7-dihydro-5H-benzo[7]annulen-3-ol by (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-ol [WO2017140669] (750 mg, 1.47 mmol) to give 800 mg (85%) of (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-yl trifluoromethanesulfonate. LC/MS (m/z, MH⁺): 642.

Step 2: (S)-2-(4-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)phenyl)propan-2-ol

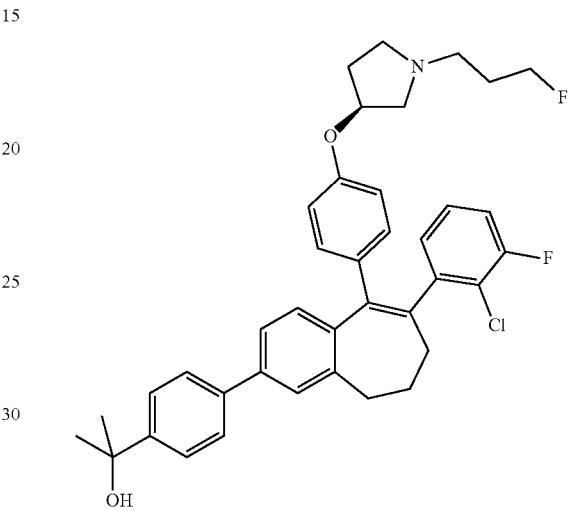

A mixture of (S)-8-(2-chloro-3-fluorophenyl)-9-(4-((1-(3-fluoropropyl)pyrrolidin-3-yl)oxy)phenyl)-6,7-dihydro-5H-benzo[7]annulen-3-yl trifluoromethanesulfonate (200 mg, 311.49 µmol), 1,4-dioxane (13 ml), Pd(dppf)₂Cl₂ (13.68 mg, 18.69 µmol), water (3 ml), Cesium carbonate (223.28 mg, 685.27 µmol) and (4-(2-hydroxypropan-2-yl)phenyl)boronic acid (80.93 mg, 436.08 µmol) was mirowaved at 60° C. for 30 minutes. After cooling to room temperature, the reaction mixture was concentrated under reduced pressure. Water was added and the mixture was extracted twice with ethyl acetate. The organic layers were collected, washed with saturated aqueous solution of K₂CO₃, dried over sodium sulfate, filtered and evaporated under reduced pressure. The crude product obtained was purified by flash chromatography eluting with a mixture of ethyl acetate in heptane (95/5, v/v) and ethyl acetate in methanol (95/5; v/v) to give 60 mg (60%) of (S)-2-(4-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)phenyl)propan-2-ol.

The compounds according to the invention were subjected to pharmacological tests for determining their degradation effects on estrogen receptors.

Test: Estrogen Receptor Degradation Activity

Said test involves measuring the in vitro degradation activity of the compounds of the invention.

The measurements of the degradation activities were made using a breast cancer cell ERα in cell western assay as described hereunder.

MCF7 cells (ATCC) were seeded in 384 wells microplate (collagen coated) at a concentration of 10000 cells/30 µL, per well in red phenol free MEM alpha medium (invitrogen) containing 5% charcoal dextran striped FBS. The following day, 9 points serial 1:5 dilution of each compound was added to the cells in 2.5 µL at final concentrations ranging either from 3-0.000018 µM (column «% Degradation at 3 µM in table 2) or from 0.3-0.0000018 µM (column «% Degradation at 0.3 µM in table 2), or 0.1 µM for fulvestrant (using as positive control). At 4 hours post compound addition the cells were fixed by adding 25 µL of formalin (final concentration 5% formalin containing 0.1% triton) for 10 minutes at room temperature and then washed twice with PBS. Then, 50 µL of LI-COR blocking buffer containing 0.1% Triton was added to plate for 30 minutes at room temperature. LI-COR blocking buffer was removed and cells were incubated overnight at cold room with 50 µL anti-ER rabbit monoclonal antibody (Thermo scientific MA1-39540) diluted at 1:1000 in LI-COR blocking buffer containing 0.1% tween-20. Wells which were treated with blocking buffer but no antibody were used as background control. Wells were washed twice with PBS (0.1% tween-20) and incubated at 37° C. for 60 minutes in LI-COR (0.1% tween-20) containing goat anti-rabbit antibody Alexa 488 (1:1000) and Syto-64 a DNA dye (2 final concentration). Cells were then washed 3 times in PBS and scanned in ACUMEN explorer (TTP-Labtech). Integrated intensities in the green fluorescence and red fluorescence were measured to determine the levels of ERα and DNA respectively.

The degradation activity with respect to estrogen receptors in this test is given by the concentration which degrades 50% of the estrogen receptor (or $IC_{50}$) in nM.

The % of ERα levels decrease were determined as follows: % inhibition=100*(1-(sample—fulvestrant: DMSO—fulvestrant)).

The Table 2 below indicates the estrogen receptor degradation activity results for the compounds according to the invention tested either at 3 µM or at 0.3 and demonstrates that said compounds have a significant degradation activity on estrogen receptors.

TABLE 2

| Compound No. | Degradation $IC_{50}$ (nM) | % Degradation At 3 µM | % Degradation At 0.3 µM |
|---|---|---|---|
| 1 | 2 | 86 | / |
| 2 | 3 | 92 | / |
| 3 | 5 | 95 | / |
| 4 | 7 | 87 | / |
| 5 | 8 | 93 | / |
| 6 | 9 | 88 | / |
| 7 | 11 | 86 | / |
| 8 | 11 | 95 | / |
| 9 | 12 | 79 | / |
| 10 | 22 | 92 | / |
| 11 | 23 | 94 | / |
| 12 | 24 | 83 | / |
| 13 | 40 | 76 | / |
| 14 | 50 | 90 | / |
| 15 | 93 | 90 | / |
| 16 | 123 | 86 | / |
| 17 | 166 | 84 | / |
| 18 | 0.2 | 85 | / |
| 19 | 10 | 86 | / |
| 20 | 6 | 85 | / |
| 21 | 0.7 | 78 | / |
| 22 | 27 | 82 | / |
| 23 | 6 | 74 | / |
| 24 | 77 | 74 | / |
| 25 | 115 | 65 | / |
| 26 | 9 | 90 | / |
| 27 | 299 | 71 | / |
| 28 | 0.8 | 94 | / |
| 29 | 24 | 91 | / |
| 30 | 103 | 70 | / |
| 31 | 1.8 | 95 | / |
| 32 | 310 | 73 | / |
| 33 | 20 | 95 | / |
| 34 | 753 | 66 | / |
| 35 | 320 | 52 | / |
| 36 | 277 | 93 | / |
| 37 | 194 | 98 | / |
| 38 | 281 | 69 | / |
| 39 | 4 | 94 | / |
| 40 | 104 | 66 | / |
| 41 | 392 | 74 | / |
| 42 | 0.2 | 90 | / |
| 43 | 13 | 95 | / |
| 44 | 23 | 50 | / |
| 45 | 22 | 96 | / |
| 46 | 153 | 95 | / |
| 47 | 61 | 78 | / |
| 48 | 111 | 70 | / |
| 49 | 3.8 | 90 | / |
| 50 | 50 | / | 73 |
| 51 | 10 | 81 | / |
| 52 | 11 | 87 | / |
| 53 | 11 | 91 | / |
| 54 | 21 | 90 | / |
| 55 | 23 | 84 | / |
| 56 | 45 | 89 | / |
| 57 | 71 | 87 | / |
| 58 | 63 | 77 | / |
| 59 | 24 | 91 | / |
| 60 | 75 | 74 | / |
| 61 | 6 | 76 | / |
| 62 | 89 | / | 68 |
| 63 | 1 | 97 | / |
| 64 | 21 | 102 | / |
| 65 | 5 | / | 90 |
| 66 | 111 | / | 74 |
| 67 | 26 | / | 79 |
| 68 | 63 | / | 67 |
| 69 | 134 | / | 69 |
| 70 | 40 | / | 74 |
| 71 | 17 | / | 91 |
| 72 | 51 | / | 74 |
| 73 | 13 | / | 89 |
| 74 | 240 | / | 59 |
| 75 | 158 | / | 71 |
| 76 | 120 | / | 75 |
| 77 | 57 | / | 55 |
| 78 | 1 | / | 90 |
| 79 | 5 | / | 91 |
| 80 | 55 | / | 90 |
| 81 | 47 | / | 67 |
| 82 | 1 | / | 93 |
| 83 | 158 | / | 63 |
| 84 | 112 | / | 71 |
| 85 | 125 | / | 69 |
| 86 | 19 | / | 88 |
| 87 | 110 | / | 73 |
| 88 | 232 | / | 51 |
| 89 | 1 | / | 95 |
| 90 | 61 | / | 77 |
| 91 | 2 | / | 90 |
| 92 | 1 | / | 85 |
| 93 | 99 | 84 | / |
| 94 | 40 | / | 64 |
| 95 | 72 | / | 66 |
| 96 | 4 | / | 76 |
| 97 | 7 | / | 90 |
| 98 | 50 | / | 59 |

It is therefore apparent that the compounds of the invention have degradation activities for estrogen receptors, with IC50 less than 1 µM and with degradation levels greater than 50%. The compounds according to the invention can therefore be used for preparing medicaments, especially medicaments which are degraders of estrogen receptors.

Accordingly, in another of its aspects, the invention provides medicaments which comprise a compound of the formula (I), or a pharmaceutically acceptable salt thereof.

The invention also relates to the compounds of formula (I) defined above, or a pharmaceutically acceptable salt thereof, for use in therapy, especially as inhibitors and degraders of estrogen receptors.

The invention also relates to the compounds of formula (I) defined above, or a pharmaceutically acceptable salt thereof, for use in the treatment of ovulatory dysfunction, cancer, endometriosis, osteoporosis, benign prostatic hypertrophy or inflammation.

In particular, the invention relates to the compounds of formula (I) defined above, or a pharmaceutically acceptable salt thereof, for use in the treatment of cancer.

In an embodiment, the cancer is a hormone dependent cancer.

In another embodiment, the cancer is an estrogen receptor dependent cancer, particularly the cancer is an estrogen receptor α dependent cancer.

In another embodiment, the cancer is selected from breast, ovarian, endometrial, prostate, uterine, cervical and lung cancer, or a metastasis thereof.

In another embodiment, the metastasis is a cerebral metastasis. In another embodiment, the cancer is breast cancer. Particularly, the breast cancer is an estrogen receptor positive breast cancer (ERα positive breast cancer).

In another embodiment, the cancer is resistant to anti-hormonal treatment.

In a further embodiment, the compound of formula (I) is as used as single agent or in combination with other agents such as CDK4/6 or PI3K inhibitors.

The present invention, according to another of its aspects, also relates to a method of treating the pathological conditions indicated above, comprising administering to a subject in need thereof a therapeutically effective amount of a compound of formula (I), or a pharmaceutically acceptable salt thereof. In an embodiment of this method of treatment, the subject is a human.

The present invention also relates to the use of a compound of the formula (I), or a pharmaceutically acceptable salt thereof, according to the present invention, for the manufacture of a medicament useful in treating any of the pathological conditions indicated above, more particularly useful in treating cancer.

According to another of its aspects, the present invention relates to pharmaceutical compositions comprising as active principle a compound according to the invention. These pharmaceutical compositions comprise an effective dose of at least one compound according to the invention, or a pharmaceutically acceptable salt thereof, and also at least one pharmaceutically acceptable excipient.

The said excipients are selected, in accordance with the pharmaceutical form and method of administration desired, from the customary excipients, which are known to a person skilled in the art.

In the pharmaceutical compositions of the present invention for oral, sublingual, subcutaneous, intramuscular, intravenous, topical, local, intra-tracheal, intranasal, transdermal or rectal administration, the active principle of formula (I) above, or its base, acid, zwitterion or salt thereof, may be administered in a unit administration form, in a mixture with conventional pharmaceutical excipients, to animals and to human beings for the treatment of the above disorders or diseases.

The unit administration forms appropriate include oral forms such as tablets, soft or hard gel capsules, powders, granules and oral solutions or suspensions, sublingual, buccal, intra-tracheal, intra-ocular and intra-nasal administration forms, forms for inhalative, topical, transdermal, subcutaneous, intra-muscular or intravenous administration, rectal administration forms and implants. For topical application it is possible to use the compounds according to the invention in creams, gels, ointments or lotions.

As an example, a unit administration form of a compound according to the invention in tablet form may comprise the following components:

| | |
|---|---:|
| Compound according to the invention | 50.0 mg |
| Mannitol | 223.75 mg |
| Sodium croscarmellose | 6.0 mg |
| Corn starch | 15.0 mg |
| Hydroxypropylmethylcellulose | 2.25 mg |
| Magnesium stearate | 3.0 mg |

There may be particular cases in which higher or lower dosages are appropriate; such dosages do not depart from the scope of the invention. According to usual practice, the dosage that is appropriate for each patient is determined by the doctor according to the mode of administration and the weight and response of the said patient.

The invention claimed is:

1. A compound of the formula (I)

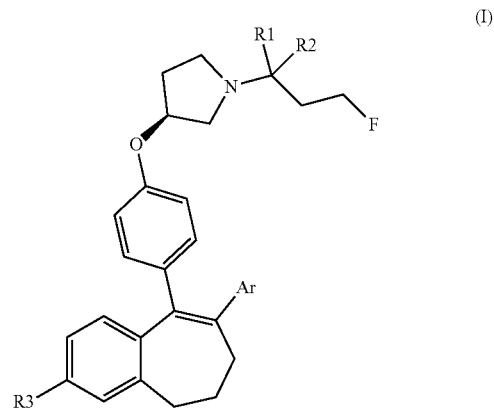

wherein:
Ar represents a phenyl or a 6-membered heteroaryl group, said phenyl or 6-membered heteroaryl group being optionally substituted with one to three groups selected from halogen atoms, a —OH group, a ($C_1$-$C_3$)alkyl group, a ($C_1$-$C_3$)alkoxy group, a ($C_1$-$C_3$)perfluoroalkoxy group and an oxooxazolidinyl group, R1 and R2 represent independently a hydrogen atom or a deuterium atom;

R3 represents
(1) a —COR4 group,
(2) a —BOR5OR6 group,
(3) a —X—Z group,
(4) a ($C_1$-$C_6$)alkyl group or a ($C_1$-$C_6$)alkenyl group, substituted by 1 to 8 groups selected from a fluorine atom, a —OH group and a —COOH group,
(5) a —X—S(O)$_n$(R7)$_p$(R8)$_q$ group,
(6) a —NH$_2$ group or a —CN group,
(7) a —O—R11 group,
(8) a —NH—COR9 group,
(9) a —C(=NH)NHOH group,
(10) a —NH—C(NH)—R9' group, or

(11) a —NHCOCOOR12 group or a —NHCOCONR12'R12" group,

R4 represents a ($C_1$-$C_6$)alkyl group, a —NRR' group, a —NHNH$_2$ group, a —NHNHCONH$_2$ group, a —NHNHCS-1H-imidazolyl group or a —NHSO$_2$CH$_3$ group, wherein R and R' independently represent a hydrogen atom, a OH group, a ($C_1$-$C_6$)alkoxy group or a ($C_1$-$C_6$)alkyl group, R5 and R6 independently represent a hydrogen atom, a ($C_1$-$C_6$)alkyl group, or form together with the boron atom to which they are attached a 4 or 5-membered ring, said ring being optionally substituted by 1 to 4 ($C_1$-$C_4$)alkyl groups, R7 and R8 independently represent a ($C_1$-$C_6$)alkyl group optionally partially or fully substituted by fluorine atoms, a —NH$_2$ group or a =NH group, R9 represents a hydrogen atom, a ($C_1$-$C_6$)alkoxy group, a ($C_1$-$C_6$)alkyl group or a ($C_3$-$C_6$)cycloalkyl group, wherein each ($C_1$-$C_6$)alkoxy group, ($C_1$-$C_6$)alkyl group or ($C_3$-$C_6$)cycloalkyl group is optionally substituted by one to three fluorine atom(s), a —OH group or a ($C_1$-$C_4$)alkyl group, R9' represents a ($C_1$-$C_6$)alkyl group or a ($C_3$-$C_6$)cycloalkyl group, R11 represents a ($C_1$-$C_6$)alkyl group, optionally substituted by one to six fluorine atoms, R12 represents a ($C_1$-$C_6$)alkyl group, R12' and R12" independently represent a hydrogen group or a ($C_1$-$C_6$)alkyl group, X represents a bond, a —NH— group, a —CONH— group or a —CO— group, Z represents
  (i) a 4 or 5-membered cycloalkyl,
  (ii) a 4 or 5-membered heterocycloalkyl group comprising 1 to 4 heteroatoms selected from oxygen, nitrogen and sulfur,
  (iii) a 4 or 5-membered heteroaryl group comprising 1 to 4 heteroatoms selected from oxygen, nitrogen and sulfur,
  said cycloalkyl, heteroaryl or heterocycloalkyl group being optionally substituted by 1 to 3 groups selected from a —OH group, an oxo group, a =NR12'R12" group and a thiooxo group, or
  (iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group itself optionally substituted by a hydroxy group, n is an integer selected from 1 and 2, and p and q together equal an integer selected from 1 and 2, with each of p and q being an integer selected from 0, 1, and 2, wherein when n is 1, then p and q together equal 2 and when n is 2, then p and q together equal 1, and wherein when n is 1 and p and q together equal 2, then R7 and R8 on the sulfur atom may form with the sulfur atom to which they are attached a 5-membered ring, optionally substituted by 1 to 3 groups selected from a ($C_1$-$C_6$)alkyl group and an oxo group, or a pharmaceutically acceptable salt thereof.

2. The compound of formula (I) according to claim 1, wherein Ar represents a phenyl or a pyridinyl group, said phenyl or pyridinyl group being optionally substituted with one or two groups selected from chlorine, fluorine, hydroxy, methyl, trifluoromethoxy, 2-oxooxazolidine-3-yl and ethoxy, or a pharmaceutically acceptable salt thereof.

3. The compound of formula (I) according to claim 1, wherein R3 represents a —COR4 group, wherein R4 represents a ($C_1$-$C_6$)alkyl group, a —NRR' group, a —NHNH$_2$ group, a —NHNHCONH$_2$ group, a —NHNHCS-1H-imidazolyl group or a —NHSO$_2$CH$_3$ group, and R and R' independently represent a hydrogen atom, a —OH group, a ($C_1$-$C_6$)alkoxy group or a ($C_1$-$C_6$)alkyl group, or a pharmaceutically acceptable salt thereof.

4. The compound of formula (I) according to claim 1, wherein R3 represents a —BOR5OR6 group, and R5 and R6 independently represent a hydrogen atom, a ($C_1$-$C_6$)alkyl group, or form together with the boron atom to which they are attached a 5-membered ring, said ring being optionally substituted by 1 to 4 methyl groups, or a pharmaceutically acceptable salt thereof.

5. The compound of formula (I) according to claim 1, wherein R3 represents a —X—Z group, X represents a bond, a —NH— group, a —CONH— group or a —CO— group, and Z represents
  (i) a 4 or 5-membered cycloalkyl,
  (ii) a 4 or 5-membered heterocycloalkyl group comprising 1 to 4 heteroatoms selected from oxygen, nitrogen and sulfur,
  (iii) a 4 or 5-membered heteroaryl group comprising 1 to 4 heteroatoms selected from oxygen, nitrogen and sulfur,
  said cycloalkyl, heteroaryl or heterocycloalkyl group being optionally substituted by 1 to 3 groups selected from a —OH group, an oxo group, a =NR12'R12" group and a thiooxo group, or
  (iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group, with R12' and R12" independently selected from a hydrogen group and a ($C_1$-$C_6$)alkyl group, or a pharmaceutically acceptable salt thereof.

6. The compound of formula (I) according to claim 1, wherein R3 represents
  (i) a 4 or 5-membered cycloalkyl,
  (ii) a 4 or 5-membered heterocycloalkyl group comprising 1 to 4 heteroatoms selected from oxygen, nitrogen and sulfur,
  (iii) a 4 or 5-membered heteroaryl group comprising 1 to 4 heteroatoms selected from oxygen, nitrogen and sulfur,
  said cycloalkyl, heteroaryl or heterocycloalkyl group being optionally substituted by 1 to 3 groups selected from a —OH group, an oxo group, a =NR12'R12" group and a thiooxo group, or
  (iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group, with R12' and R12" independently selected from a hydrogen group and a ($C_1$-$C_6$)alkyl group, or a pharmaceutically acceptable salt thereof.

7. The compound of formula (I) according to claim 1, wherein R3 represents
(i) a 4 or 5-membered cycloalkyl,
(ii) a 4 or 5-membered heterocycloalkyl group comprising 1 to 4 heteroatoms selected from oxygen, nitrogen and sulfur, or
(iii) a 4 or 5-membered heteroaryl group comprising 1 to 4 heteroatoms selected from oxygen, nitrogen and sulfur,
said cycloalkyl, heteroaryl or heterocycloalkyl group being optionally substituted by 1 to 3 groups selected from a —OH group and an oxo group,
or a pharmaceutically acceptable salt thereof.

8. The compound of formula (I) according to claim 1, wherein R3 represents a ($C_1$-$C_6$)alkyl group or a ($C_1$-$C_6$) alkenyl group, substituted by 1 to 4 groups selected from a fluorine atom, a —OH group and a —COOH group,
or a pharmaceutically acceptable salt thereof.

9. The compound of formula (I) according to claim 1, wherein R3 represents a —CONHSO$_2$(CH$_3$) group, a —SO$_2$NH$_2$ group, a —SO(CH$_3$)NH group, a —SO$_2$CH$_3$ group, a —NHSO$_2$(CH$_3$) group or a —NHSO$_2$(CF$_3$) group,
or a pharmaceutically acceptable salt thereof.

10. The compound of formula (I) according to claim 1, wherein R3 represents a —NH$_2$ group or a —CN group,
or a pharmaceutically acceptable salt thereof.

11. The compound of formula (I) according to claim 1, wherein R3 represents a —O—R11 group, wherein
R11 represents a ($C_1$-$C_6$)alkyl group optionally substituted by one to six fluorine atoms,
or a pharmaceutically acceptable salt thereof.

12. The compound of formula (I) according to claim 1, wherein R3 represents a —NH—COR9 group, wherein
R9 represents a ($C_1$-$C_6$)alkoxy group, a ($C_1$-$C_6$)alkyl group or a ($C_3$-$C_6$)cycloalkyl group, wherein each ($C_1$-$C_6$)alkyl group or ($C_3$-$C_6$)cycloalkyl group is optionally substituted by one to three fluorine atom(s), a —OH group or ($C_1$-$C_4$)alkyl group,
or a pharmaceutically acceptable salt thereof.

13. The compound of formula (I) according to claim 1, wherein R3 represents a —NH—C(NH)—R9' group, wherein
R9' represents a ($C_1$-$C_6$)alkyl group or a ($C_3$-$C_6$)cycloalkyl group,
or a pharmaceutically acceptable salt thereof.

14. The compound of formula (I) according to claim 1, wherein R3 represents a —NHCOCOOR12 group or a —NHCOCONR12'R12" group, wherein
R12 represents a ($C_1$-$C_6$)alkyl group, and
R12' and R12" independently represent a hydrogen group or a ($C_1$-$C_6$)alkyl group,
or a pharmaceutically acceptable salt thereof.

15. A pharmaceutical composition comprising a compound of formula (I) according to claim 1, or a pharmaceutically acceptable salt thereof, and at least one pharmaceutically acceptable excipient.

16. A method of inhibiting or degrading an estrogen receptor, the method comprising contacting a compound of formula (I) according to claim 1, or a pharmaceutically acceptable salt thereof, with an estrogen receptor.

17. A method of treating ovulatory dysfunction, endometriosis, osteoporosis, benign prostatic hypertrophy or inflammation, the method comprising administering a compound of formula (I) according to claim 1, or a pharmaceutically acceptable salt thereof, to a patient in need thereof.

18. A method of treating cancer, wherein the cancer is selected from breast, ovarian, endometrial, prostate, uterine, cervical, and lung cancer, or a metastasis thereof, and wherein the method comprising administering a compound of formula (I) according to claim 1, or a pharmaceutically acceptable salt thereof, to a patient in need thereof.

19. The compound according to claim 1, wherein Ar represents a phenyl or a 6-membered heteroaryl group, said phenyl or 6-membered heteroaryl group being optionally substituted with one to three groups selected from halogen atoms, a —OH group, a ($C_1$-$C_3$)alkyl group, a ($C_1$-$C_3$) alkoxy group, trifluoromethoxy and 2-oxooxazolidine-3-yl.

20. The compound of formula (I) according to claim 5, wherein R3 represents a —X—Z group,
Z is selected from
(i) a cyclobutenyl and a cyclopentenyl,
(ii) an azetidinyl, an oxetanyl, a dihydropyrazolyl, a dihydroisoxazolyl, and a dihydropyrrolyl,
(iii) a triazolyl,
wherein the groups in (i), (ii), and (iii) are optionally substituted by 1 to 3 groups selected from a —OH group, an oxo group, a =NR12'R12" group and a thiooxo group, and
(iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group,
with R12' and R12" independently selected from a hydrogen group and a ($C_1$-$C_6$)alkyl group,
or a pharmaceutically acceptable salt thereof.

21. The compound of formula (I) according to claim 5, wherein R3 represents a —X—Z group,
Z is selected from
(i) a cyclobutenyl and a cyclopentenyl,
(ii) a 1,5-dihydro-2H-pyrrolyl, an oxazolidinyl, an imidazolidinyl, and a dioxazolyl,
(iii) a 1,2,4-triazolyl, an isoxazolyl, a thiazolyl, and an oxadiazolyl,
wherein the groups in (i), (ii), and (iii) are optionally substituted by 1 to 3 groups selected from a —OH group, an oxo group, a =NR12'R12" group and a thiooxo group, and
(iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group,
with R12' and R12" independently selected from a hydrogen group and a ($C_1$-$C_6$)alkyl group,
or a pharmaceutically acceptable salt thereof.

22. The compound of formula (I) according to claim 5, wherein R3 represents a —X—Z group,
Z is selected from
(i) a cyclobutenyl and a cyclopentenyl,
(ii) a 1,2,4-dioxazolyl and an oxathiazolyl,
(iii) a 1,3,5-oxadiazolyl, a 1,3,4-oxadiazolyl, a 1,2,4-oxadiazolyl, a 1,2,5-oxadiazolyl, and a thiadiazolyl,
wherein the groups in (i), (ii), and (iii) are optionally substituted by 1 to 3 groups selected from a —OH group, an oxo group, a =NR12'R12" group and a thiooxo group, and
(iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group,
with R12' and R12" independently selected from a hydrogen group and a ($C_1$-$C_6$)alkyl group,
or a pharmaceutically acceptable salt thereof.

23. The compound of formula (I) according to claim 5, wherein R3 represents a —X—Z group,
Z is selected from
(i) a cyclobutenyl and a cyclopentenyl,
(ii) a 1,3,4-oxathiazolyl, an oxathiadiazolyl and a pyrrolidinyl,
(iii) a 1,3,5-thiadiazolyl, a 1,2,4-thiadiazolyl, a 1,2,5-thiadiazolyl, a 1,3,4-thiadiazolyl, a tetrazolyl and a pyrazolyl,
wherein the groups in (i), (ii), and (iii) are optionally substituted by 1 to 3 groups selected from a —OH group, an oxo group, a =NR12'R12" group and a thiooxo group, and
(iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group,
with R12' and R12" independently selected from a hydrogen group and a ($C_1$-$C_6$)alkyl group,
or a pharmaceutically acceptable salt thereof.

24. The compound of formula (I) according to claim 6, wherein R3 is selected from
(i) a cyclopentenyl,
(ii) a dihydropyrazolyl, a dihydroisoxazolyl, and a dihydropyrrolyl,
(iii) a triazolyl,
wherein the groups in (i), (ii), and (iii) are optionally substituted by 1 to 3 groups selected from a —OH group, an oxo group, a =NR12'R12" group and a thiooxo group, and
(iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group,
with R12' and R12" independently being a hydrogen group or a ($C_1$-$C_6$)alkyl group,
or a pharmaceutically acceptable salt thereof.

25. The compound of formula (I) according to claim 6, wherein R3 is selected from
(i) a cyclopentenyl,
(ii) 1,5-dihydro-2H-pyrrolyl, an oxazolidinyl, an imidazolidinyl, and a dioxazolyl,
(iii) a 1,2,4-triazolyl, an isoxazolyl, a thiazolyl, and an oxadiazolyl,
wherein the groups in (i), (ii), and (iii) are optionally substituted by 1 to 3 groups selected from a —OH group, an oxo group, a =NR12'R12" group and a thiooxo group, and
(iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group,
with R12' and R12" independently being a hydrogen group or a ($C_1$-$C_6$)alkyl group,
or a pharmaceutically acceptable salt thereof.

26. The compound of formula (I) according to claim 6, wherein R3 is selected from
(i) a cyclopentenyl,
(ii) a 1,2,4-dioxazolyl and an oxathiazolyl,
(iii) a 1,3,5-oxadiazolyl, a 1,3,4-oxadiazolyl, a 1,2,4-oxadiazolyl, a 1,2,5-oxadiazolyl, and a thiadiazolyl,
wherein the groups in (i), (ii), and (iii) are optionally substituted by 1 to 3 groups selected from a —OH group, an oxo group, a =NR12'R12" group and a thiooxo group, and
(iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group,
with R12' and R12" independently being a hydrogen group or a ($C_1$-$C_6$)alkyl group,
or a pharmaceutically acceptable salt thereof.

27. The compound of formula (I) according to claim 6, wherein R3 is selected from
(i) a cyclopentenyl,
(ii) a 1,3,4-oxathiazolyl, an oxathiadiazolyl and a pyrrolidinyl,
(iii) a 1,3,5-thiadiazolyl, a 1,2,4-thiadiazolyl, a 1,2,5-thiadiazolyl, a 1,3,4-thiadiazolyl, a tetrazolyl, and a pyrazolyl,
wherein the groups in (i), (ii), and (iii) are optionally substituted by 1 to 3 groups selected from a —OH group, an oxo group, a =NR12'R12" group and a thiooxo group, and
(iv) a phenyl group optionally substituted by a hydroxy group, by a COOR12' group, by a —CONH$_2$ group, by a —NO$_2$ group, by a —NH$_2$ group or by a ($C_1$-$C_6$)alkyl group, itself optionally substituted by a hydroxy group,
with R12' and R12" independently being a hydrogen group or a ($C_1$-$C_6$)alkyl group,
or a pharmaceutically acceptable salt thereof.

28. The compound of formula (I) according to claim 7, wherein R3 is selected from
(i) a cyclobutenyl,
(ii) an azetidinyl and an oxetanyl, or
(iii) a tetrazolyl,
said cyclobutenyl, azetidinyl, oxetanyl, or tetrazolyl is optionally substituted by 1 to 3 groups selected from a —OH group and an oxo group,
or a pharmaceutically acceptable salt thereof.

29. The compound of formula (I) according to claim 11, wherein R11 represents a ($C_1$-$C_6$)alkyl group optionally substituted by one to three fluorine atoms,
or a pharmaceutically acceptable salt thereof.

30. A compound of formula (I) according to claim 1, selected from:
(S)-3-(4-(8-(2,4-dichlorophenyl)-3-(4,4,5,5-tetramethyl-1,3,2-dioxaborolan-2-yl)-6,7-dihydro-5H-benzo[7]annulen-9-yl)phenoxy)-1-(3-fluoropropyl)pyrrolidine (1)
(S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)boronic acid (2)
(S)-8-(2,4-dichlorophenyl)-9-(4-((1-(3-fluoropropyl)pyrrolidin-3-yl)oxy)phenyl)-6,7-dihydro-5H-benzo[7]annulene-3-carboxamide (3)
(S)-5-(8-(2,4-dichlorophenyl)-9-(4-((1-(3-fluoropropyl)pyrrolidin-3-yl)oxy)phenyl)-6,7-dihydro-5H-benzo[7]annulen-3-yl)isoxazol-3-ol (4)
1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-2,2-difluoroethan-1-ol (5)
(S)-8-(2,4-dichlorophenyl)-9-(4-((1-(3-fluoropropyl)pyrrolidin-3-yl)oxy)phenyl)-6,7-dihydro-5H-benzo[7]annulene-3-carbohydrazide (6)
(S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-oxadiazole (7)
(S)-3-(4-(8-(2,4-dichlorophenyl)-3-(difluoromethyl)-6,7-dihydro-5H-benzo[7]annulen-9-yl)phenoxy)-1-(3-fluoropropyl)pyrrolidine (8)
(S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,3,4-thiadiazole (9)

1-(8-(2,4-dichlorophenyl)-9-(4-(((S)-1-(3-fluoropropyl) pyrrolidin-3-yl)oxy)phenyl)-6,7-dihydro-5H-benzo[7] annulen-3-yl)-2,2,2-trifluoroethan-1-ol (10)

(S)-5-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1,2-dihydro-3H-pyrazol-3-one (12)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)isoxazol-5(4H)-one (13)

(S)-2-(8-(2,4-dichlorophenyl)-9-(4-((1-(3-fluoropropyl) pyrrolidin-3-yl)oxy)phenyl)-6,7-dihydro-5H-benzo[7] annulene-3-carbonyl)hydrazine-1-carboxamide (14)

(S)-8-(2,4-dichlorophenyl)-9-(4-((1-(3-fluoropropyl)pyr-rolidin-3-yl)oxy)phenyl)-(methylsulfonyl)-6,7-dihydro-5H-benzo[7]annulene-3-carboxamide (15)

(S)-5-(8-(2,4-dichlorophenyl)-9-(4-((1-(3-fluoropropyl) pyrrolidin-3-yl)oxy)phenyl)-6,7-dihydro-5H-benzo[7] annulen-3-yl)-2H-tetrazole (16)

(S)-8-(2,4-dichlorophenyl)-9-(4-((1-(3-fluoropropyl)pyr-rolidin-3-yl)oxy)phenyl)-N-(2H-tetrazol-5-yl)-6,7-dihydro-5H-benzo[7]annulene-3-carboxamide (17)

(S)-8-(2,4-dichlorophenyl)-9-(4-((1-(3-fluoropropyl)pyr-rolidin-3-yl)oxy)phenyl)-N-hydroxy-6,7-dihydro-5H-benzo[7]annulene-3-carboxamide (18)

(S)-8-(2,4-dichlorophenyl)-9-(4-((1-(3-fluoropropyl)pyr-rolidin-3-yl)oxy)phenyl)-N-methoxy-6,7-dihydro-5H-benzo[7]annulene-3-carboxamide (19)

(S,E)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)acrylic acid (20)

(S)-4-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1H-pyrazole (21)

(S)-8-(2,4-dichlorophenyl)-9-(4-((1-(3-fluoropropyl)pyr-rolidin-3-yl)oxy)phenyl)-6,7-dihydro-5H-benzo[7]annulene-3-carbonitrile (22)

(S)-4-(9-(4-((1-(3-fluoropropyl)pyrrolidin-3-yl)oxy)phenyl)-8-(4-(trifluoromethoxy)phenyl)-6,7-dihydro-5H-benzo[7]annulen-3-yl)-1H-pyrazole (23)

(S)-3-(4-(3-(difluoromethoxy)-8-(4-(trifluoromethoxy) phenyl)-6,7-dihydro-5H-benzo[7]annulen-9-yl)phenoxy)-1-(3-fluoropropyl)pyrrolidine (24)

Methyl (S)-(8-(2,4-dichlorophenyl)-9-(4-((1-(3-fluoropropyl)pyrrolidin-3-yl)oxy)phenyl)-6,7-dihydro-5H-benzo[7]annulen-3-yl)carbamate (25)

(S)-8-(2,4-dichlorophenyl)-9-(4-((1-(3-fluoropropyl)pyr-rolidin-3-yl)oxy)phenyl)-N-hydroxy-6,7-dihydro-5H-benzo[7]annulene-3-carboximidamide (26)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1,2,4-oxadiazol-5(4H)-one (27)

(S)-8-(2,4-dichlorophenyl)-9-(4-((1-(3-fluoropropyl)pyr-rolidin-3-yl)oxy)phenyl)-6,7-dihydro-5H-benzo[7]annulen-3-amine (28)

4-(8-(2,4-dichlorophenyl)-9-(4-(((S)-1-(3-fluoropropyl) pyrrolidin-3-yl)oxy)phenyl)-6,7-dihydro-5H-benzo[7] annulen-3-yl)-3H-1,2,3,5-oxathiadiazole 2-oxide hydrochloride (29)

(S)—N-(8-(2,4-dichlorophenyl)-9-(4-((1-(3-fluoropropyl) pyrrolidin-3-yl)oxy)phenyl)-6,7-dihydro-5H-benzo[7]annulen-3-yl)methane sulfonamide (30)

(S)-5-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1,3,4-oxadiazol-2(3H)-one (31)

Tert-butyl (S)-(8-(2,4-dichlorophenyl)-9-(4-((1-(3-fluoropropyl) pyrrolidin-3-yl)oxy)phenyl)-6,7-dihydro-5H-benzo[7]annulen-3-yl)carbamate (32)

(S)-5-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1,3,4-oxathiazol-2-one (33)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1,2,4-oxadiazole-5(4H)-thione (34)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1,1,1-trifluoromethanesulfonamide (35)

(S)-3-((8-(2,4-dichlorophenyl)-9-(4-((1-(3-fluoropropyl) pyrrolidin-3-yl)oxy)phenyl)-6,7-dihydro-5H-benzo[7] annulen-3-yl)amino)-4-hydroxycyclobut-3-ene-1,2-dione (36)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1,2,4-thiadiazol-5(4H)-one (37)

(S)-1-(8-(2,4-dichlorophenyl)-9-(4-((1-(3-fluoropropyl) pyrrolidin-3-yl)oxy)phenyl)-6,7-dihydro-5H-benzo[7] annulen-3-yl)-3-methoxy-1,5-dihydro-2H-pyrrol-2-one (38)

(S)-1-(8-(2,4-dichlorophenyl)-9-(4-((1-(3-fluoropropyl) pyrrolidin-3-yl)oxy)phenyl)-6,7-dihydro-5H-benzo[7] annulen-3-yl)ethan-1-one (39)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)oxazolidin-2-one (40)

(S)-3-(8-(2-chloro-4-(2-oxooxazolidin-3-yl)phenyl)-9-(4-((1-(3-fluoropropyl)pyrrolidin-3-yl)oxy)phenyl)-6,7-dihydro-5H-benzo[7]annulen-3-yl)oxazolidin-2-one (41)

(S)-4-(3-amino-9-(4-((1-(3-fluoropropyl)pyrrolidin-3-yl) oxy)phenyl)-6,7-dihydro-5H-benzo[7]annulen-8-yl)-3-chlorophenol (42)

5-(8-(2,4-dichlorophenyl)-9-(4-(((S)-1-(3-fluoropropyl) pyrrolidin-3-yl)oxy)phenyl)-6,7-dihydro-5H-benzo[7] annulen-3-yl)imidazolidine-2,4-dione (43)

(S)-8-(2,4-dichlorophenyl)-9-(4-((1-(3-fluoropropyl)pyr-rolidin-3-yl)oxy)phenyl)-N-methoxy-N-methyl-6,7-dihydro-5H-benzo[7]annulene-3-carboxamide (44)

(S)-5-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1,3,4-oxadiazole-2(3H)-thione (45)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)acetimidamide (46)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-2,2,2-trifluoroacetamide (47)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl) acetamide (48)

1-(8-(2,4-dichlorophenyl)-9-(4-(((S)-1-(3-fluoropropyl) pyrrolidin-3-yl)oxy)phenyl)-6,7-dihydro-5H-benzo[7] annulen-3-yl)ethan-1-ol (49)

(S)-2-(8-(2,4-dichlorophenyl)-9-(4-((1-(3-fluoropropyl) pyrrolidin-3-yl)oxy)phenyl)-6,7-dihydro-5H-benzo[7] annulen-3-yl)propan-2-ol (50)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1H-pyrazole (51)

(S)-4-(8-(2,4-dichlorophenyl)-9-(4-((1-(3-fluoropropyl) pyrrolidin-3-yl)oxy)phenyl)-6,7-dihydro-5H-benzo[7] annulen-3-yl)phenol (52)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)phenol (53)

(S)-2-(8-(2,4-dichlorophenyl)-9-(4-((1-(3-fluoropropyl) pyrrolidin-3-yl)oxy)phenyl)-6,7-dihydro-5H-benzo[7] annulen-3-yl)phenol (54)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)benzoic acid (55)

methyl (S)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate (56)

methyl (S)-3-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate (57)

(S)-1-(8-(2,4-dichlorophenyl)-9-(4-((1-(3-fluoropropyl) pyrrolidin-3-yl)oxy)phenyl)-6,7-dihydro-5H-benzo[7] annulen-3-yl)pyrrolidin-2-one (58)

(S)-8-(2,4-dichlorophenyl)-9-(4-((1-(3-fluoropropyl)pyrrolidin-3-yl)oxy)phenyl)-N'-(1H-imidazole-1-carbonothioyl)-6,7-dihydro-5H-benzo[7]annulene-3-carbohydrazide (59)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)cyclopropanecarboxamide (60)

(S)-4-(8-(2,4-dichlorophenyl)-9-(4-((1-(3-fluoropropyl) pyrrolidin-3-yl)oxy)phenyl)-6,7-dihydro-5H-benzo[7] annulen-3-yl)thiazol-2-amine (61)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)pivalamide (62)

(S)-8-(2-chloro-4-methylphenyl)-9-(4-((1-(3-fluoropropyl)pyrrolidin-3-yl)oxy)phenyl)-6,7-dihydro-5H-benzo[7]annulene-3-carboxamide (63)

(S)-8-(2-chloro-4-methylphenyl)-9-(4-((1-(3-fluoropropyl)pyrrolidin-3-yl)oxy)phenyl)-6,7-dihydro-5H-benzo[7]annulene-3-carbonitrile 2,2,2-trifluoroacetate (64)

1-(8-(2-chloro-3-fluorophenyl)-9-(4-(((S)-1-(3-fluoropropyl)pyrrolidin-3-yl)oxy)phenyl)-6,7-dihydro-5H-benzo[7]annulen-3-yl)-2,2,2-trifluoroethan-1-ol (65)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-fluorocyclopropane-1-carboxamide (66)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-methylcyclopropane-1-carboxamide (67)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)-2-hydroxycyclopent-2-en-1-one (68)

(S,Z)-4-(8-(2,4-dichlorophenyl)-9-(4-((1-(3-fluoropropyl)pyrrolidin-3-yl)oxy)phenyl)-6,7-dihydro-5H-benzo[7]annulen-3-yl)-N,3-dimethylthiazol-2(3H)-imine hydrochloride (69)

(S)-5-(8-(2-chloro-4-methylphenyl)-9-(4-((1-(3-fluoropropyl)pyrrolidin-3-yl)oxy)phenyl)-6,7-dihydro-5H-benzo[7]annulen-3-yl)-2H-tetrazole 2,2,2-trifluoroacetate (70)

tert-butyl (S)-(9-(4-((1-(3-fluoropropyl)pyrrolidin-3-yl)oxy)phenyl)-8-phenyl-6,7-dihydro-5H-benzo[7]annulen-3-yl)carbamate (71)

(S)-4-(8-(2,4-dichlorophenyl)-9-(4-((1-(3-fluoropropyl) pyrrolidin-3-yl)oxy)phenyl)-6,7-dihydro-5H-benzo[7] annulen-3-yl)benzoic acid (72)

(S)-3-(8-(2,4-dichlorophenyl)-9-(4-((1-(3-fluoropropyl) pyrrolidin-3-yl)oxy)phenyl)-6,7-dihydro-5H-benzo[7] annulen-3-yl)-1H-pyrazol-5-amine (73)

(S)-(8-(2,4-dichlorophenyl)-9-(4-((1-(3-fluoropropyl) pyrrolidin-3-yl)oxy)phenyl)-6,7-dihydro-5H-benzo[7] annulen-3-yl)(3-hydroxyazetidin-1-yl)methanone (74)

(S)-8-(2,4-dichlorophenyl)-9-(4-((1-(3-fluoropropyl)pyrrolidin-3-yl)oxy)phenyl)-N-(oxetan-3-yl)-6,7-dihydro-5H-benzo[7]annulene-3-carboxamide (75)

ethyl (S)-2-((8-(2,4-dichlorophenyl)-9-(4-((1-(3-fluoropropyl)pyrrolidin-3-yl)oxy)phenyl)-6,7-dihydro-5H-benzo[7]annulen-3-yl)amino)-2-oxoacetate (76)

(S)—N1-(8-(2,4-dichlorophenyl)-9-(4-((1-(3-fluoropropyl)pyrrolidin-3-yl)oxy)phenyl)-6,7-dihydro-5H-benzo[7]annulen-3-yl)oxalamide (77)

(S)-8-(2-chloro-4-methylphenyl)-9-(4-((1-(3-fluoropropyl)pyrrolidin-3-yl)oxy)phenyl)-6,7-dihydro-5H-benzo[7]annulen-3-amine (78)

(S)-8-(6-ethoxy-2-fluoropyridin-3-yl)-9-(4-((1-(3-fluoropropyl)pyrrolidin-3-yl)oxy)phenyl)-6,7-dihydro-5H-benzo[7]annulene-3-carboxamide (79)

(S)-8-(6-ethoxy-2-fluoropyridin-3-yl)-9-(4-((1-(3-fluoropropyl)pyrrolidin-3-yl)oxy)phenyl)-6,7-dihydro-5H-benzo[7]annulene-3-carbonitrile 2,2,2-trifluoroacetate (80)

(S)-4-(8-(2,4-dichlorophenyl)-9-(4-((1-(3-fluoropropyl) pyrrolidin-3-yl)oxy)phenyl)-6,7-dihydro-5H-benzo[7] annulen-3-yl)benzamide (81)

(S)-(8-(2,4-dichlorophenyl)-9-(4-((1-(3-fluoropropyl) pyrrolidin-3-yl)oxy)phenyl)-6,7-dihydro-5H-benzo[7] annulen-3-yl)methanol (82)

methyl (S)-2-(8-(2,4-dichlorophenyl)-9-(4-((1-(3-fluoropropyl)pyrrolidin-3-yl)oxy)phenyl)-6,7-dihydro-5H-benzo[7]annulen-3-yl)benzoate (83)

(S)—N-(8-(2,4-dichlorophenyl)-9-(4-((1-(3-fluoropropyl)pyrrolidin-3-yl)oxy)phenyl)-6,7-dihydro-5H-benzo[7]annulen-3-yl)-1-hydroxycyclopropane-1-carboxamide formate (84)

(S)-1-(8-(2,4-dichlorophenyl)-9-(4-(((S)-1-(3-fluoropropyl)pyrrolidin-3-yl)oxy)phenyl)-6,7-dihydro-5H-benzo[7]annulen-3-yl)-4-hydroxypyrrolidin-2-one (85)

(S)-2-(8-(2,4-dichlorophenyl)-9-(4-((1-(3-fluoropropyl) pyrrolidin-3-yl)oxy)phenyl)-6,7-dihydro-5H-benzo[7] annulen-3-yl)benzoic acid (86)

N-(8-(2,4-dichlorophenyl)-9-(4-(((S)-1-(3-fluoropropyl) pyrrolidin-3-yl)oxy)phenyl)-6,7-dihydro-5H-benzo[7] annulen-3-yl)-2,2-difluorocyclopropane-1-carboxamide (87)

(S)-3-((8-(2-chloro-4-methylphenyl)-9-(4-((1-(3-fluoropropyl)pyrrolidin-3-yl)oxy)phenyl)-6,7-dihydro-5H-benzo[7]annulen-3-yl)amino)-4-hydroxycyclobut-3-ene-1,2-dione (88)

(S)-8-(2-chloro-3-fluorophenyl)-9-(4-((1-(3-fluoropropyl)pyrrolidin-3-yl)oxy)phenyl)-6,7-dihydro-5H-benzo[7]annulen-3-amine (89)

(S)—N-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)methanesulfonamide (90)

(S)-1-(3-fluoropropyl)-3-(4-(8-phenyl-3-(4,4,5,5-tetramethyl-1,3,2-dioxaborolan-2-yl)-6,7-dihydro-5H-benzo [7]annulen-9-yl)phenoxy)pyrrolidine (91)

(S)-(9-(4-((1-(3-fluoropropyl)pyrrolidin-3-yl)oxy)phenyl)-8-phenyl-6,7-dihydro-5H-benzo[7]annulen-3-yl) boronic acid (92)

(S)-2-(8-(2,4-dichlorophenyl)-9-(4-((1-(3-fluoropropyl) pyrrolidin-3-yl)oxy)phenyl)-6,7-dihydro-5H-benzo[7] annulen-3-yl)acetic acid (93)

(S)-2-(3-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol (94)

(S)-2-(4-(8-(2,4-dichlorophenyl)-9-(4-((1-(3-fluoropropyl)pyrrolidin-3-yl)oxy)phenyl)-6,7-dihydro-5H-benzo[7]annulen-3-yl)phenyl)propan-2-ol (95)

(S)-3-(4-(8-(2-chloro-3-fluorophenyl)-3-(3-nitrophenyl)-6,7-dihydro-5H-benzo[7]annulen-9-yl)phenoxy)-1-(3-fluoropropyl)pyrrolidine (96)

(S)-3-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)aniline (97)

(S)-2-(4-(8-(2-chloro-3-fluorophenyl)-9-(4-((1-(3-fluoropropyl)pyrrolidin-3-yl)oxy)phenyl)-6,7-dihydro-5H-benzo[7]annulen-3-yl)phenyl)propan-2-ol (98)

or a pharmaceutically acceptable salt thereof.

* * * * *